(12) United States Patent
DaCosta et al.

(10) Patent No.: US 11,182,709 B2
(45) Date of Patent: Nov. 23, 2021

(54) INTERACTIVE REAL TIME SYSTEM AND REAL TIME METHOD OF USE THEREOF IN CONVEYANCE INDUSTRY SEGMENTS

(71) Applicants: Alexis DaCosta, San Diego, CA (US); Vince Coletti, San Diego, CA (US)

(72) Inventors: Alexis DaCosta, San Diego, CA (US); Vince Coletti, San Diego, CA (US)

(73) Assignee: TELEPORT MOBILITY, INC., San Diego, CA (US)

( * ) Notice: Subject to any disclaimer, the term of this patent is extended or adjusted under 35 U.S.C. 154(b) by 0 days.

(21) Appl. No.: 16/222,817

(22) Filed: Dec. 17, 2018

(65) Prior Publication Data

US 2019/0251496 A1    Aug. 15, 2019

Related U.S. Application Data

(60) Continuation-in-part of application No. PCT/US2018/043363, filed on Jul. 24, 2018, and a
(Continued)

(51) Int. Cl.
*G06Q 10/06* (2012.01)
*H04W 4/029* (2018.01)
(Continued)

(52) U.S. Cl.
CPC ... *G06Q 10/063114* (2013.01); *G01C 21/343* (2013.01); *G01C 21/3438* (2013.01); *G06F 16/24578* (2019.01); *G06Q 10/02* (2013.01); *G06Q 10/06316* (2013.01); *G06Q 10/063112* (2013.01); *G06Q 30/0629* (2013.01);
(Continued)

(58) Field of Classification Search
CPC combination set(s) only.
See application file for complete search history.

(56) References Cited

U.S. PATENT DOCUMENTS 6,182,010 B1   1/2001   Berstis .......................... 701/211
6,297,748 B1  10/2001   Lappenbusch et al. ...... 340/905
(Continued)

FOREIGN PATENT DOCUMENTS

CA   2782611 A1   6/2011
CA   2974452 A1   7/2016
(Continued)

OTHER PUBLICATIONS

S. Abdel-Naby, S. Fante and P. Giorgini, "Auctions Negotiation for Mobile Rideshare Service," 2007 2nd International Conference on Pervasive Computing and Applications, 2007, pp. 225-230, doi: 10.1109/ICPCA.2007.4365444. (Year: 2007).*
(Continued)

*Primary Examiner* — Crystol Stewart
(74) *Attorney, Agent, or Firm* — Eleanor Musick; Musick Davison LLP

(57) ABSTRACT

The present invention recognizes that there is a long felt need for more efficient systems in the interactive conveyance industry for goods and services. A first aspect of the present invention generally relates to an interactive real time system in the conveyance and other industries. A second aspect of the present invention generally relates to a real time method of use of the interactive system of the present invention.

154 Claims, 13 Drawing Sheets

Related U.S. Application Data continuation-in-part of application No. PCT/US2018/043359, filed on Jul. 24, 2018, and a continuation-in-part of application No. 16/038,487, filed on Jul. 18, 2018, said application No. PCT/US2018/043363 is a continuation-in-part of application No. 16/038,487, filed on Jul. 18, 2018, which is a continuation-in-part of application No. 15/680,439, filed on Aug. 18, 2017, said application No. PCT/US2018/043363 is a continuation-in-part of application No. 15/680,439, filed on Aug. 18, 2017, which is a division of application No. 15/675,757, filed on Aug. 13, 2017, said application No. PCT/US2018/043363 is a continuation-in-part of application No. 15/675,757, filed on Aug. 13, 2017.

(60) Provisional application No. 62/539,706, filed on Aug. 1, 2017, provisional application No. 62/482,306, filed on Apr. 6, 2017, provisional application No. 62/426,549, filed on Nov. 27, 2016, provisional application No. 62/375,491, filed on Aug. 16, 2016.

(51) Int. Cl.
  *G08G 1/127* (2006.01)
  *G01C 21/34* (2006.01)
  *G06Q 30/06* (2012.01)
  *G06F 16/2457* (2019.01)
  *H04W 4/42* (2018.01)
  *G06Q 10/02* (2012.01)
  *G06Q 50/30* (2012.01)
  *G06F 16/248* (2019.01)
  *G06Q 10/08* (2012.01)
  *G08G 1/005* (2006.01)
  *G08G 5/00* (2006.01)
  *H04W 4/20* (2018.01)
  *G08G 1/00* (2006.01)
  *G06Q 50/32* (2012.01)
  *G06F 3/0485* (2013.01)

(52) U.S. Cl.
  CPC ..... *G06Q 30/0633* (2013.01); *G06Q 30/0635* (2013.01); *G08G 1/005* (2013.01); *G08G 1/127* (2013.01); *G08G 1/202* (2013.01); *G08G 5/0043* (2013.01); *G08G 5/0069* (2013.01); *H04W 4/029* (2018.02); *H04W 4/20* (2013.01); *H04W 4/42* (2018.02); *G01C 21/34* (2013.01); *G06F 3/0485* (2013.01); *G06F 16/248* (2019.01); *G06Q 10/0833* (2013.01); *G06Q 50/30* (2013.01); *G06Q 50/32* (2013.01)

(56) References Cited

U.S. PATENT DOCUMENTS

| | | | |
|---|---|---|---|
| 6,356,838 B1 | 3/2002 | Paul | |
| 7,561,069 B2 | 7/2009 | Horstemeyer | |
| 7,840,427 B2 | 11/2010 | O'Sullivan | |
| 7,894,984 B2 | 2/2011 | Rasmussen et al. | 701/208 |
| 7,920,967 B1 | 4/2011 | Harris et al. | |
| 7,941,267 B2 | 5/2011 | Adamczyk et al. | |
| 8,005,488 B2 | 8/2011 | Staffaroni et al. | |
| 8,244,594 B2 | 8/2012 | Barron et al. | |
| 8,285,570 B2 | 10/2012 | Meyer et al. | |
| 8,510,043 B1 | 8/2013 | Whiton et al. | |
| 8,630,791 B2 | 1/2014 | Yuasa | |
| 8,635,012 B2 | 1/2014 | O'Sullivan et al. | |
| 8,688,532 B2 | 4/2014 | Khunger et al. | 705/26.1 |
| 8,768,565 B2 | 7/2014 | Jefferies et al. | |
| 9,007,238 B2 | 4/2015 | Whiton et al. | |
| 9,014,876 B2 | 4/2015 | Mason et al. | |
| 9,026,367 B2 | 5/2015 | Paek et al. | |
| 9,026,454 B2 | 5/2015 | Hinrichs et al. | |
| 9,058,703 B2 | 6/2015 | Ricci | |
| 9,066,206 B2 | 6/2015 | Lin et al. | H04W 4/023 |
| 9,068,852 B2 | 6/2015 | Mason et al. | |
| 9,157,748 B2 | 10/2015 | Millspaugh | G01C 21/20 |
| 9,164,507 B2 | 10/2015 | Cheatham et al. | |
| 9,256,852 B1 | 2/2016 | Myllymaki | |
| 9,262,929 B1 | 2/2016 | Roy et al. | |
| 9,364,178 B2 | 6/2016 | Duncan et al. | |
| 9,368,026 B1 | 6/2016 | Herbach et al. | |
| 9,424,515 B2 | 8/2016 | Atlas | |
| 9,436,182 B2 | 9/2016 | Nemec et al. | |
| 9,459,622 B2 | 10/2016 | Abhyanker | |
| 9,488,484 B2 | 11/2016 | Lord et al. | |
| 9,534,913 B2 | 1/2017 | Newlin et al. | |
| 9,552,564 B1 | 1/2017 | Martenis | |
| 9,557,183 B1 | 1/2017 | Ross et al. | G01C 21/34 |
| 9,558,469 B2 | 1/2017 | Lord et al. | |
| 9,562,785 B1 * | 2/2017 | Racah | G01C 21/3438 |
| 9,569,740 B2 | 2/2017 | Lord et al. | |
| 9,581,455 B2 | 2/2017 | Lord et al. | |
| 9,606,539 B1 | 3/2017 | Kentley et al. | |
| 9,613,386 B1 | 4/2017 | Arden et al. | |
| 9,619,776 B1 | 4/2017 | Lord et al. | |
| 9,625,906 B2 | 4/2017 | Meuleau et al. | |
| 9,632,502 B1 | 4/2017 | Levinson et al. | |
| 9,646,356 B1 | 5/2017 | Schwie et al. | |
| 9,665,101 B1 | 5/2017 | Templeton | |
| 9,671,233 B2 | 6/2017 | Holden et al. | G01C 21/30 |
| 9,679,489 B2 | 6/2017 | Lambert et al. | G08G 1/202 |
| 9,684,914 B1 | 6/2017 | Porter et al. | |
| 9,689,694 B2 | 6/2017 | Lord et al. | |
| 9,706,367 B2 | 7/2017 | Tao et al. | |
| 9,715,378 B2 | 7/2017 | Dickerson et al. | |
| 9,716,565 B2 | 7/2017 | Mandeville-Clarke et al. | |
| 9,718,397 B2 | 8/2017 | Kalanick et al. | |
| 9,726,506 B2 | 8/2017 | O'Beirne et al. | |
| 9,741,010 B1 | 8/2017 | Heinla | |
| 9,743,239 B1 | 8/2017 | Mishra | |
| 9,754,490 B2 | 9/2017 | Kentley et al. | |
| 9,769,616 B1 | 9/2017 | Pao et al. | |
| 9,776,512 B2 | 10/2017 | Netzer | |
| 9,778,057 B2 | 10/2017 | O'Mahony et al. | |
| 9,778,060 B2 | 10/2017 | Cheng | |
| 9,786,187 B1 | 10/2017 | Bar-Zeev et al. | |
| 9,805,519 B2 | 10/2017 | Ramanujam | |
| 9,805,605 B2 | 10/2017 | Ramanujam | |
| 9,811,086 B1 | 11/2017 | Poeppel et al. | |
| 9,813,510 B1 | 11/2017 | Nickels et al. | |
| 9,857,188 B1 | 1/2018 | O'Hare et al. | |
| 9,857,190 B2 | 1/2018 | Marueli et al. | |
| 9,886,671 B2 | 2/2018 | Lord et al. | |
| 9,898,791 B1 | 2/2018 | Stumpf et al. | |
| 9,904,900 B2 | 2/2018 | Cao | |
| 10,055,995 B2 | 8/2018 | Marco et al. | |
| D832,304 S | 10/2018 | Whatman et al. | |
| 10,093,252 B2 * | 10/2018 | Zych | B60R 16/037 |
| 10,104,605 B1 | 10/2018 | Parshin et al. | |
| 10,168,164 B2 | 1/2019 | Shelby et al. | |
| 10,227,178 B2 | 3/2019 | High et al. | |
| 10,304,027 B1 * | 5/2019 | Haque | G06Q 50/30 |
| 10,345,117 B2 | 7/2019 | O'Beirne et al. | |
| 10,349,223 B1 | 7/2019 | Yoo et al. | |
| 10,365,783 B2 | 7/2019 | Bowden et al. | |
| 10,387,791 B2 | 8/2019 | Dukatz et al. | |
| 10,460,411 B2 | 10/2019 | Liu | |
| 10,467,554 B2 | 11/2019 | Yoo et al. | |
| 10,504,258 B2 | 12/2019 | Okumura | |
| 10,628,758 B2 | 4/2020 | Ikeda et al. | |
| 2001/0056396 A1 * | 12/2001 | Goino | G06Q 30/0601 705/37 |
| 2009/0234564 A1 | 9/2009 | Onishi et al. | |
| 2009/0248587 A1 | 10/2009 | Van Buskirk | |
| 2009/0319096 A1 | 12/2009 | Offer et al. | |
| 2010/0280884 A1 | 11/2010 | Levine et al. | |
| 2010/0312591 A1 | 12/2010 | Wu | |

(56) References Cited

U.S. PATENT DOCUMENTS

| | | | |
|---|---|---|---|
| 2011/0040655 A1* | 2/2011 | Hendrickson | G06Q 30/0619 705/27.1 |
| 2011/0055046 A1 | 3/2011 | Bowen et al. | |
| 2011/0137666 A1 | 6/2011 | Zuida et al. | |
| 2011/0153629 A1 | 6/2011 | Lehmann et al. | |
| 2013/0041696 A1* | 2/2013 | Richard | G06Q 30/06 705/5 |
| 2013/0096827 A1 | 4/2013 | McCall et al. | |
| 2013/0103313 A1 | 4/2013 | Moore et al. | |
| 2013/0132140 A1 | 5/2013 | Amin et al. | |
| 2014/0026065 A1* | 1/2014 | Wang | G06Q 10/02 715/744 |
| 2014/0039784 A1* | 2/2014 | Millspaugh | G08G 1/202 701/300 |
| 2014/0046585 A1 | 2/2014 | Morris et al. | |
| 2014/0067488 A1 | 3/2014 | James et al. | |
| 2014/0148970 A1 | 5/2014 | Dufford et al. | |
| 2014/0172727 A1 | 6/2014 | Abhyanker et al. | |
| 2014/0173511 A1 | 6/2014 | Lehmann et al. | |
| 2014/0229258 A1* | 8/2014 | Seriani | G06Q 10/08345 705/14.23 |
| 2014/0309876 A1 | 10/2014 | Ricci | |
| 2014/0365268 A1* | 12/2014 | Masterlark | G06F 11/1474 705/7.28 |
| 2015/0039365 A1 | 2/2015 | Haque | |
| 2015/0161564 A1 | 6/2015 | Sweeney et al. | |
| 2015/0161752 A1 | 6/2015 | Barreto et al. | G06Q 50/30 |
| 2015/0185034 A1 | 7/2015 | Abhyanker | |
| 2015/0206267 A1* | 7/2015 | Khanna | G06Q 30/0284 705/5 |
| 2015/0281387 A1 | 10/2015 | Barreto | |
| 2015/0294237 A1* | 10/2015 | Stener | G06Q 10/1093 705/5 |
| 2015/0323333 A1 | 11/2015 | Lord et al. | |
| 2015/0324708 A1 | 11/2015 | Skipp et al. | |
| 2015/0325128 A1 | 11/2015 | Lord et al. | |
| 2015/0338852 A1 | 11/2015 | Ramanujam | |
| 2015/0339928 A1 | 11/2015 | Ramanujam | G08G 1/202 |
| 2015/0356501 A1* | 12/2015 | Gorjestani | G06Q 10/0833 705/333 |
| 2015/0356703 A1 | 12/2015 | Ellis et al. | |
| 2015/0379437 A1 | 12/2015 | Reich | |
| 2016/0034845 A1 | 2/2016 | Hiyama et al. | G06Q 10/063114 |
| 2016/0055605 A1 | 2/2016 | Kim et al. | |
| 2016/0055743 A1* | 2/2016 | Raj | B60L 53/14 701/22 |
| 2016/0104110 A1 | 4/2016 | Jones et al. | |
| 2016/0110836 A1 | 4/2016 | Garg et al. | |
| 2016/0138928 A1 | 5/2016 | Guo et al. | |
| 2016/0171574 A1* | 6/2016 | Paulucci | G01C 21/3697 705/13 |
| 2016/0171637 A1 | 6/2016 | Rai | |
| 2016/0187150 A1 | 6/2016 | Sherman et al. | |
| 2016/0231129 A1 | 8/2016 | Erez et al. | |
| 2016/0244311 A1 | 8/2016 | Burks et al. | |
| 2016/0247106 A1 | 8/2016 | Dalloro et al. | |
| 2016/0298977 A1 | 10/2016 | Newlin et al. | |
| 2016/0321771 A1 | 11/2016 | Liu et al. | |
| 2016/0334232 A1 | 11/2016 | Zhuang | |
| 2016/0334797 A1 | 11/2016 | Ross et al. | |
| 2016/0356615 A1 | 12/2016 | Arata et al. | |
| 2016/0356624 A1 | 12/2016 | O'Beirne et al. | |
| 2016/0364679 A1 | 12/2016 | Cao | |
| 2016/0364812 A1 | 12/2016 | Cao | |
| 2016/0364823 A1 | 12/2016 | Cao | |
| 2017/0011324 A1 | 1/2017 | Truong et al. | G06Q 10/303112 |
| 2017/0024393 A1 | 1/2017 | Choksi et al. | G06F 17/3053 |
| 2017/0038948 A1 | 2/2017 | Cun et al. | |
| 2017/0059347 A1 | 3/2017 | Flier et al. | |
| 2017/0083957 A1 | 3/2017 | Ross et al. | |
| 2017/0091856 A1 | 3/2017 | Canberk et al. | |
| 2017/0098224 A1 | 4/2017 | Marco et al. | |
| 2017/0102243 A1 | 4/2017 | Samocha et al. | |
| 2017/0115125 A1 | 4/2017 | Outwater et al. | |
| 2017/0123421 A1 | 5/2017 | Kentley et al. | |
| 2017/0123422 A1 | 5/2017 | Kentley et al. | |
| 2017/0123429 A1 | 5/2017 | Levinson et al. | |
| 2017/0124205 A1* | 5/2017 | Shaam | G06F 16/24552 |
| 2017/0126810 A1 | 5/2017 | Kentley et al. | |
| 2017/0132934 A1 | 5/2017 | Kentley et al. | |
| 2017/0138749 A1 | 5/2017 | Pan et al. | G01C 21/3438 |
| 2017/0141873 A1 | 5/2017 | Mandeville-Clarke et al. | |
| 2017/0147959 A1 | 5/2017 | Sweeney et al. | |
| 2017/0163398 A1 | 6/2017 | Ross et al. | |
| 2017/0169366 A1 | 6/2017 | Klein et al. | |
| 2017/0176989 A1 | 6/2017 | Hay et al. | |
| 2017/0178085 A1 | 6/2017 | Kragh et al. | |
| 2017/0187787 A1 | 6/2017 | Syamala et al. | |
| 2017/0192428 A1 | 7/2017 | Vogt et al. | |
| 2017/0192437 A1 | 7/2017 | Bier et al. | |
| 2017/0193419 A1 | 7/2017 | Haparnas et al. | G06Q 10/06398 |
| 2017/0193627 A1 | 7/2017 | Urmson et al. | |
| 2017/0200321 A1 | 7/2017 | Hummel et al. | |
| 2017/0212525 A1 | 7/2017 | Wang et al. | |
| 2017/0213308 A1 | 7/2017 | Wellborn et al. | |
| 2017/0220045 A1 | 8/2017 | Templeton | |
| 2017/0220966 A1* | 8/2017 | Wang | G06Q 10/08 |
| 2017/0227370 A1 | 8/2017 | O'Mahony et al. | |
| 2017/0234687 A1 | 8/2017 | Tseng et al. | |
| 2017/0265040 A1 | 9/2017 | Friedlander et al. | |
| 2017/0262790 A1 | 10/2017 | Khasis | |
| 2017/0282821 A1* | 10/2017 | Zych | G06Q 50/30 |
| 2017/0285642 A1 | 10/2017 | Rander | |
| 2017/0293991 A1 | 10/2017 | High et al. | |
| 2017/0313323 A1 | 11/2017 | Tseng et al. | |
| 2017/0316387 A1 | 11/2017 | Joshi et al. | |
| 2017/0277191 A1 | 12/2017 | Fairfield et al. | |
| 2017/0351987 A1 | 12/2017 | Liu | |
| 2017/0352125 A1 | 12/2017 | Dicker et al. | |
| 2017/0372703 A1 | 12/2017 | Sung et al. | |
| 2018/0004202 A1 | 1/2018 | Onaga et al. | |
| 2018/0004211 A1 | 1/2018 | Grimm et al. | |
| 2018/0004224 A1 | 1/2018 | Arndt et al. | |
| 2018/0015801 A1 | 1/2018 | Mohamed et al. | |
| 2018/0024552 A1 | 1/2018 | She | |
| 2018/0024554 A1* | 1/2018 | Brady | G06Q 10/08 701/23 |
| 2018/0025298 A1 | 1/2018 | Baggott et al. | |
| 2018/0025407 A1* | 1/2018 | Zhang | G06Q 30/0635 705/26.81 |
| 2018/0032928 A1* | 2/2018 | Li | G06Q 10/02 |
| 2018/0033058 A1 | 2/2018 | Mukherjee et al. | |
| 2018/0039917 A1 | 2/2018 | Buttolo et al. | |
| 2018/0053136 A1 | 2/2018 | DaCosta et al. | |
| 2018/0059663 A1 | 3/2018 | Yako et al. | |
| 2018/0060813 A1 | 3/2018 | Ford | |
| 2018/0060827 A1 | 3/2018 | Abbas et al. | |
| 2018/0074494 A1 | 3/2018 | Myers et al. | |
| 2018/0087918 A1 | 3/2018 | Yamashita et al. | |
| 2018/0089786 A1 | 3/2018 | Shi et al. | |
| 2018/0100747 A1 | 4/2018 | Greenwood et al. | |
| 2018/0101170 A1 | 4/2018 | Cawley et al. | |
| 2018/0101179 A1 | 4/2018 | Louey et al. | |
| 2018/0075754 A1 | 8/2018 | Salter et al. | |
| 2018/0245942 A1 | 8/2018 | Scarr et al. | |
| 2018/0276863 A1 | 9/2018 | Nerurkar et al. | |
| 2018/0074495 A1 | 10/2018 | Myers et al. | |
| 2018/0336510 A1 | 11/2018 | DaCosta et al. | |
| 2018/0356821 A1 | 12/2018 | Kentley-Klay et al. | |
| 2018/0374182 A1 | 12/2018 | Khanna et al. | |
| 2019/0033883 A1 | 1/2019 | Ferguson et al. | |
| 2019/0094032 A1 | 3/2019 | Shelby et al. | |
| 2019/0129413 A1 | 5/2019 | Chamberlain et al. | |
| 2019/0204110 A1 | 7/2019 | Dubielzyk et al. | |
| 2019/0293447 A1 | 9/2019 | O'Beirne et al. | |
| 2020/0211142 A1 | 7/2020 | James et al. | |

FOREIGN PATENT DOCUMENTS

| | | | |
|---|---|---|---|
| CN | 105894099 A | 8/2016 | |
| DE | 10113803 A1 * | 9/2002 | G06Q 40/04 |

(56) References Cited

FOREIGN PATENT DOCUMENTS

| | | | |
|---|---|---|---|
| EP | 2507753 A4 | 10/2012 | |
| EP | 3183707 A1 | 6/2017 | |
| WO | WO2015160782 A1 | 10/2015 | |
| WO | WO2017053047 A1 | 3/2017 | |
| WO | WO2017064202 A1 | 4/2017 | |
| WO | WO2017079222 A1 | 5/2017 | |
| WO | WO2017156586 A1 | 9/2017 | |
| WO | WO2017172415 A1 | 10/2017 | |
| WO | WO2017173209 A1 | 10/2017 | |
| WO | WO2017145171 A3 | 11/2017 | |
| WO | WO2018071127 A1 | 4/2018 | |
| WO | WO2019018695 A1 | 1/2019 | |
| WO | WO2019027715 A1 | 2/2019 | |
| WO | WO2019027718 A1 | 2/2019 | |
| WO | WO2019118827 A1 | 6/2019 | |
| WO | WO-2019203806 A1 * | 10/2019 | ............ G06Q 50/30 |
| WO | WO2019204783 A1 | 10/2019 | |

OTHER PUBLICATIONS

PCT Search and Examination Reports for PCT/US18/43359, dated Oct. 16, 2018.
PCT Search and Examination Reports for PCT/US18/43363, dated Oct. 15, 2018.
"Why you'll love the new Apple CarPlay Features in iOS for iPhone 5/6/SE," from Auto Connected Car News, Jul. 3, 2016.
"Mapping a new course with smartphone apps," The Mercury News, Sep. 14, 2016.
"Catch a Ride with Lyft or Uber Straight from Apple Maps in iOS 11," from ios.gadgethacks.com, Oct. 6, 2017.
"Uber's Sire and Apple Maps Integrations Have Disappeared," from macrumors.com, Jan. 31, 2018.
"Google unveils ride-sharing price comparison tool," from businessinsider.com, obtained Aug. 18, 2018.
"Our Driver App Functionality," Materials from Uber from SEC. gov, S-1 SEC Filing of Apr. 11, 2019.
"Uber Freight," Materials from Uber from SEC.gov, S-1 SEC Filing of Apr. 11, 2019.
"Personal Mobility," Materials from Uber from SEC.gov, S-1 SEC filing of Apr. 11, 2019.
Anonymous: "Heat map—Wikipedia", Oct. 16, 2014 (Oct. 16, 2014), XP055424374, Rerieved from the Internet: URL: http://web.archive.org/web/20141016035026/https://fr.wikipedia.org/wiki/Heat_map[retrieved on Nov. 13, 2017].
EP18841983.2 Extended European Search Report and Search Opinion, dated Apr. 8, 2021, 18 pages.

* cited by examiner

INTERACTIVE REAL TIME SYSTEM AND REAL TIME METHOD OF USE THEREOF IN CONVEYANCE INDUSTRY SEGMENTS

RELATED APPLICATIONS AND/OR PRIORITY STATEMENT

The present application claims benefit of priority to PCT Application Serial Number PCT/US18/043363, filed Jul. 24, 2018; and to PCT Application Serial Number, PCT/US18/043359, filed Jul. 24, 2018; each of which are incorporated by referenced herein in their entirety.

The present application is a Continuation-in-Part of U.S. Utility application Ser. No. 16/038,487, filed Jul. 18, 2018; which is a Continuation-in-Part of U.S. Utility application Ser. No. 15/680,439, filed Aug. 18, 2017; which is a Divisional application of U.S. Utility application Ser. No. 15/675,757, filed Aug. 13, 2017; which claims benefit of priority to U.S. Provisional Application Ser. No. 62/539,706 filed Aug. 1, 2017; U.S. Provisional Application Ser. No. 62/482,306 filed Apr. 6, 2017; U.S. Provisional Application Ser. No. 62/426,549 filed Nov. 27, 2016; U.S. Provisional Application Ser. No. 62/375,491 filed Aug. 16, 2016; each of which are incorporated by reference herein in their entirety for all purposes.

TECHNICAL FIELD

The present invention relates generally to the fields of interactive real time systems and real time methods of use in the conveyance industry segments.

BACKGROUND

As in any new industry or industry segment, when created, there are typically multiple inefficiencies in the related systems and methods due to there not being enough data or knowledge on how to optimize these systems and methods ahead of time. These inefficiencies are typically identified over time through trial and error, which leads to technological advancement in the field. The same can be said about the conveyance industry and many of the new conveyance industry segments including but not limited to the ride-hail industry segment, rideshare industry segment, good delivery industry segment, and courier industry segment.

The current inefficient systems and methods available in the conveyance industry segments lead to disadvantages for conveyance clients. The companies or entities themselves, hereinafter referred to as service providers, as well as the representatives carrying out the services for the service providers, are disadvantaged also.

The problems relating to the current systems and methods used in the conveyance industry segments are rooted in computer technology and tied to the fact that the modern conveyance industry segments operate and change drastically in real time or near real time. Conveyance industry segments are real time or near real time environments in that conveyance service requests and conveyance service offerings are available one second and gone the next second. In the real time or near real time conveyance industry segments, neither a representative nor a conveyance client can procure all or most of the real time or near real time information and analyze or evaluate this information accurately to make a well informed decision on the fly. There is currently no real time or near real time system or real time or near real time method that can assist both a representative and a conveyance client with this type of analysis. This lack of a real time or near real time system or real time or near real time method leads to a representative securing or obtaining a suboptimal, one-size-fits-all conveyance service request and a conveyance client securing or obtaining a suboptimal, one-size-fits-all conveyance service offering due to the inability to apply their own preferences.

Currently, a conveyance client requesting a ride in the ride-hail industry segment, can have very different ride options, prices, wait times, and times to destination depending on which service provider a given conveyance service offering is from and when the conveyance service offering is secured or obtained. However, a conveyance client is given options of conveyance service offerings from only one service provider to accept or decline. A representative is limited even further as only one conveyance service request is shown when a representative wants to provide a conveyance service in any conveyance industry segment. Currently, there is a poor system and method to dispatch or assign representatives to conveyance service requests and conveyance service offerings to conveyance clients. Thus, there exists a need that the present invention addresses.

The current systems and methods for a representative to analyze or evaluate incoming conveyance service requests are very difficult and time consuming in the fast-paced, real time or near real time environment of conveyance industry segments. The current technology does not permit a representative to analyze or evaluate and then secure or obtain conveyance service requests that the representative would prefer based on their individual preferences. Representatives are currently given a single conveyance service request and only have the option to accept or decline that specific conveyance service request without an alternative. Generally, any details of a conveyance service request a representative is securing or obtaining are not provided ahead of time, but are only revealed after that conveyance service request is secured or obtained. A representative must choose to either secure or obtain a conveyance service request without knowing any of the details of the conveyance service to be provided or choose not to work at all.

Furthermore, a representative is penalized for canceling a conveyance service request the representative does not wish to fulfill even though the representative likely never would have secured or obtained that conveyance service request in the first place had the representative been given a choice. This disadvantage among others, has led to the common practice of representatives working for more than one service provider at the same time to give the representatives some semblance of choice. However, that method of analyzing or evaluating is a very laborious and time consuming process which is not useful or practical in the real time or near real time environment of conveyance industry segments.

To analyze or evaluate conveyance service requests, a representative would need to login to multiple applications from different service providers and navigate between these applications, viewing one individual conveyance service request per application. Analyzing or evaluating conveyance service requests in such a way takes a lot of time and can cause a representative to miss conveyance service requests in the real time or near real time environment that a representative would consider as preferred. Currently there is no system or method that a representative can use as a tool to analyze or evaluate conveyance service requests in real time or near real time.

A representative is currently not able to analyze or evaluate conveyance service requests from more than one service provider in real time or near real time given conventional systems and methods, which is a frustrating hindrance when every other aspect of conveyance industry segments operates in real time or near real time. A representative's decision-making ability is limited given the current state of the art. With no way to analyze or evaluate conveyance service requests continuously in real time or near real time, a representative currently is not able to maximize their profit or work as efficiently as they would like, as the representative is forced to secure or obtain less preferred conveyance service requests. To secure or obtain a preferred conveyance service request, a representative may have to wait and pass up less preferred conveyance service requests for a more preferred conveyance service request to become available to them, as representatives are only provided one conveyance service request at a time. A representative wishing to work more efficiently is not able to do so given the current limitations of the systems and methods in the conveyance industry segments.

There is also currently no system or method to analyze or evaluate and secure or obtain conveyance service requests in real time or near real time across more than one conveyance industry segment. This lack of a real time or near real time system or real time or near real time method further limits a representative's exposure in the conveyance industry and their ability to operate more efficiently if the representative wants to provide conveyance services in more than one conveyance industry segment. In addition, current limitations also reduce the amount of potential preferred conveyance service requests available to a representative. Currently, if a representative wants to provide a ride in the ride-hail industry segment, then deliver food in the good delivery industry segment because that conveyance service request is in close proximity to them, a representative would not have the ability to analyze or evaluate and then secure or obtain these preferred conveyance service requests in real time or near real time. If there were a system and method for a representative to be able to do so, the representative would have access to a greater number of diverse conveyance service requests and gives the representative more flexibility in providing conveyance services within the conveyance industry. One non-limiting aspect of the present invention solves this problem for representatives.

Currently, some service providers dynamically increase prices in certain areas for various reasons. Representatives looking to work more efficiently or earn more money try to work in these areas as much as possible. The problem is that by the time a representative gets to the area with elevated pricing, the increased pricing has either moved or been removed. Representatives experience the challenge of chasing the elevated pricing areas but generally do not have the chance to capitalize on them. As a result, some representatives have given up on chasing areas with elevated pricing. Currently there is no system or method a representative can use to predict where the areas of elevated pricing will be in order to maximize their earning potential.

Currently, representatives are assigned or provided with one conveyance service request at a time that can either be blindly accepted, without knowing any details, or rejected. This process is not a useful way of presenting conveyance service requests to representatives. Existing technology is lacking in a way to visually present preferred conveyance service requests from multiple service providers on a geographical map with dynamic icons being updated in real time or near real time. Currently there is no system or method to display to a representative a visually identifiable preferred conveyance service request relative to a less preferred conveyance service request.

Conveyance clients often endure similar problems or challenges as representatives. Currently when a conveyance client is looking to secure or obtain a conveyance service offering, the conveyance client is only shown the closest representatives from an individual service provider. The only way for conveyance clients to analyze or evaluate conveyance service offerings from different service providers is a very tedious and time consuming process similar to that for representatives. First a conveyance client would have to know about a competitor, then download the competitor's application, and input the same search criteria for the first service provider. This process would have to be repeated for every other competitor a conveyance client wishes to evaluate.

In the fast paced conveyance industry segments, where seconds can matter greatly in being able to secure or obtain a preferred conveyance service offering, current methods are not practical or useful to analyze or evaluate conveyance service offerings in real time or near real time. In most cases, by the time a conveyance client goes through the steps to analyze or evaluate even two or three service providers, the preferred conveyance service offering given a conveyance client's preferences is likely no longer available. As a result, a conveyance client often pays more or waits longer for a conveyance service than needed since there is currently no way to visually analyze or evaluate conveyance service offerings from multiple service providers in real time or near real time. Existing technology is lacking in a way to visually present preferred conveyance service offerings from multiple service providers on a geographical map with dynamic icons being updated in real time or near real time. An improved system and method is needed.

When service providers increase their pricing in certain areas, conveyance clients currently do not have a system or method to determine if there is an area close by which does not have elevated pricing. Currently, there is no way for a conveyance client to visually analyze or evaluate different areas on a geographical map to see pricing information for an individual service provider, let alone for multiple service providers. The downside of this lack in transparency is that conveyance clients do not have an opportunity to make an informed purchasing decision given their current limited options in the conveyance industry segments. One non-limiting aspect of the present invention solves this problem for conveyance clients.

SUMMARY

The present invention recognizes that there is a long felt need for more efficient systems in the interactive conveyance industry for goods and services.

A first aspect of the present invention generally relates to an interactive system in the conveyance and other industries.

A second aspect of the present invention generally relates to a method of use of the interactive system of the present invention.

Figure 1:
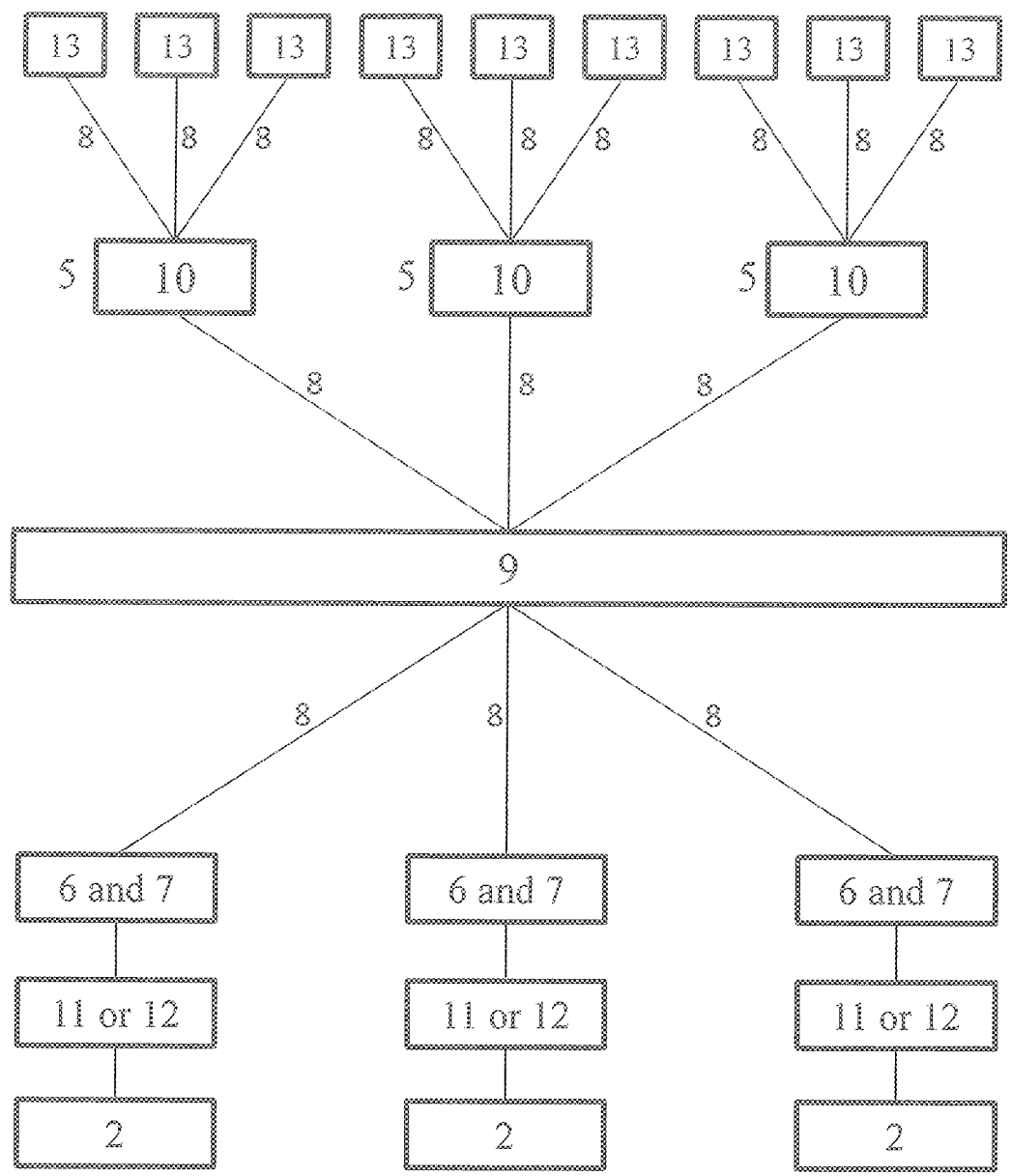
FIG. 1 relates to a preferred example of one non-limiting aspect of the present invention as a macro level view of a real time or near real time conveyance service system where at least one representative 2 can benefit from the present invention. The conveyance service requests 13 can be sourced from at least one external server 10 and can be transmitted to a central server 9 by way of at least one link 8. At least one service provider 5 can be associated with at least one external server 10. In this non-limiting figure, each service provider 5 is associated with one external server 10. A central server 9 can filter conveyance service requests 13 into filtered conveyance service requests 14 by using at least one representative preference 3 and preferably the real time or near real time geographical location of at least one representative 2. A central server 9 can calculate the weighted average of at least one representative preference 3. A central server 9 can preferably sort the filtered conveyance service requests 14 in an order relating to the corresponding weighted averages to identify at least one preferred conveyance service request 15. At least one preferred conveyance service request 15 can be identified by a central server 9 from the filtered conveyance service requests 14 that has the highest weighted average. At least one preferred conveyance service request 15 with corresponding conveyance data and filtered conveyance service requests 14 with corresponding conveyance data can be transmitted from a central server 9 to at least one application 6 by way of at least one link 8. At least one application 6 can operate on at least one terminal 7 and can display at least one visual representation such as but not limited to at least one dynamic map 11, at least one heat map 12, or a combination thereof. At least one representative 2 can analyze or evaluate at least one visual representation and then secure or obtain at least one preferred conveyance service request 15. At least one link 8 can be at least one connection or at least one association with at least one software function or at least one software component relating to at least one application 6, at least one terminal 7, at least one central server 9, at least one external server 10, or a combination thereof.
Figure 2:
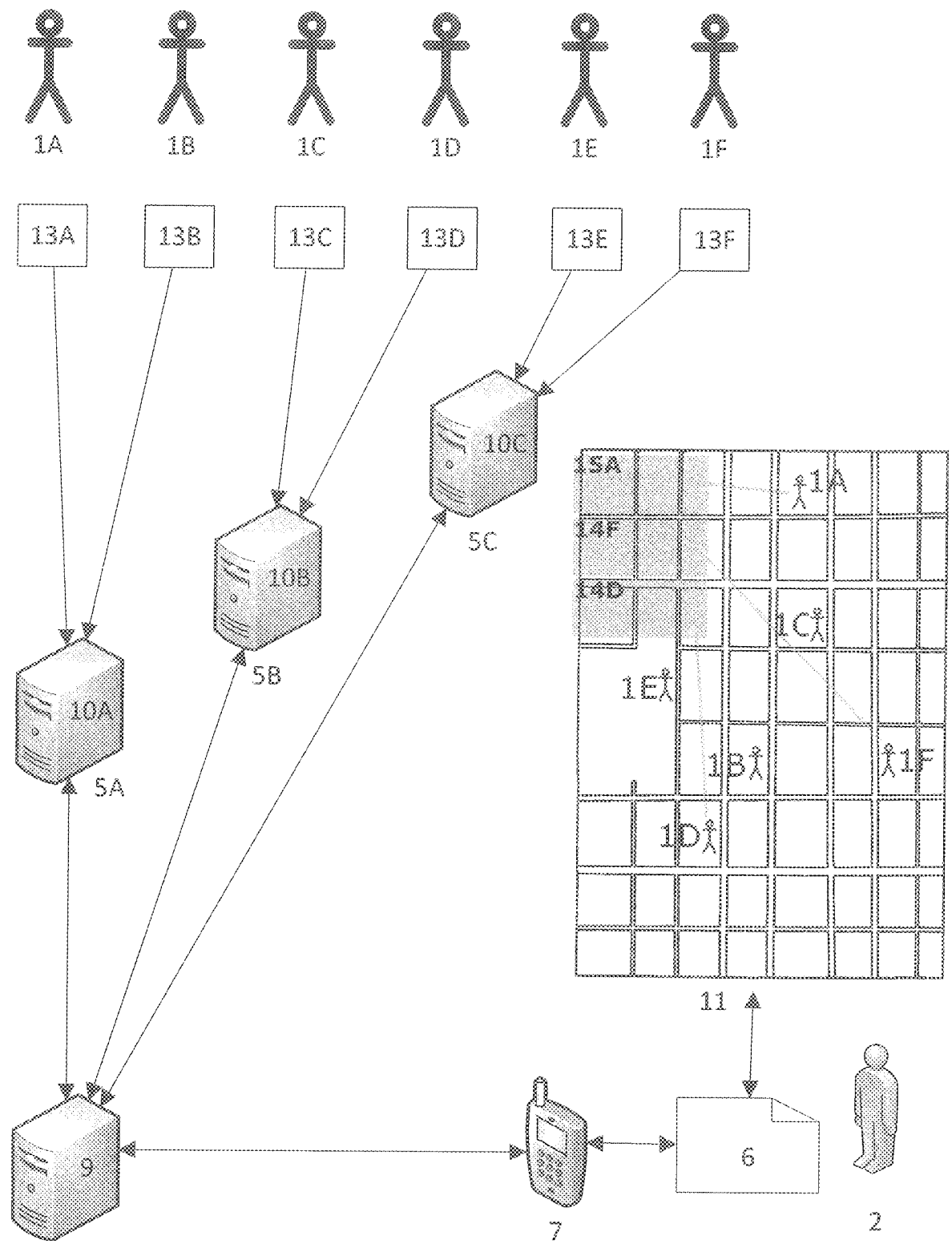
FIG. 2 relates to a preferred example of one non-limiting aspect of the present invention as a macro level view of a real time or near real time conveyance service system where a representative 2 can benefit from the present invention. An individual conveyance service request 13 can be submitted by each individual conveyance client 1A, 1B, 1C, 1D, 1E, and 1F. An individual conveyance service request 13 corresponds with each individual conveyance client 1 in the figure. Conveyance service requests 13A and 13B are submitted by conveyance clients 1A and 1B to external server 10A associated with service provider 5A. Conveyance service requests 13C and 13D are submitted by conveyance clients 1C and 1D to external server 10B associated with service provider 5B. Conveyance service requests 13E and 13F are submitted by conveyance clients 1E and 1F to external server 10C associated with service provider 5C. Each service provider 5 can have at least one external server 10.

A central server 9 can receive conveyance service requests 13 and then filter the conveyance service requests 13 into filtered conveyance service requests 14 by using at least one representative preference 3 and preferably the real time or near real time geographical location of a representative 2. A central server 9 can calculate the weighted average of at least one representative preference 3. A central server 9 can preferably sort the filtered conveyance service requests 14 in an order relating to the corresponding weighted averages to identify at least one preferred conveyance service request 15. At least one preferred conveyance service request 15 can be identified by a central server 9 from the filtered conveyance service requests 14 that has the highest weighted average. At least one preferred conveyance service request 15 with corresponding conveyance data and filtered conveyance service requests 14 with corresponding conveyance data can be transmitted from a central server 9 to an application 6 by way of at least one link 8. An application 6 can operate on a terminal 7 and can display at least one visual representation, for example, a dynamic map 11. Individual filtered conveyance service requests 14D, 14F and the preferred conveyance service request 15A can be shown on a dynamic map 11 as dynamic icons or visuals and can optionally show conveyance data. A representative 2 can analyze or evaluate a dynamic map 11 and then secure or obtain the preferred conveyance service request 15A. At least one link can be at least one connection or at least one association with at least one software function or at least one software component relating to at least one application 6, at least one terminal 7, at least one central server 9, at least one external server 10, or a combination thereof. At least one link can be at least one connection or at least one association with at least one application 6, at least one central server 9, at least one external server 10, or a combination thereof, on at least one terminal 7 associated with at least one representative 2.

Figure 3:
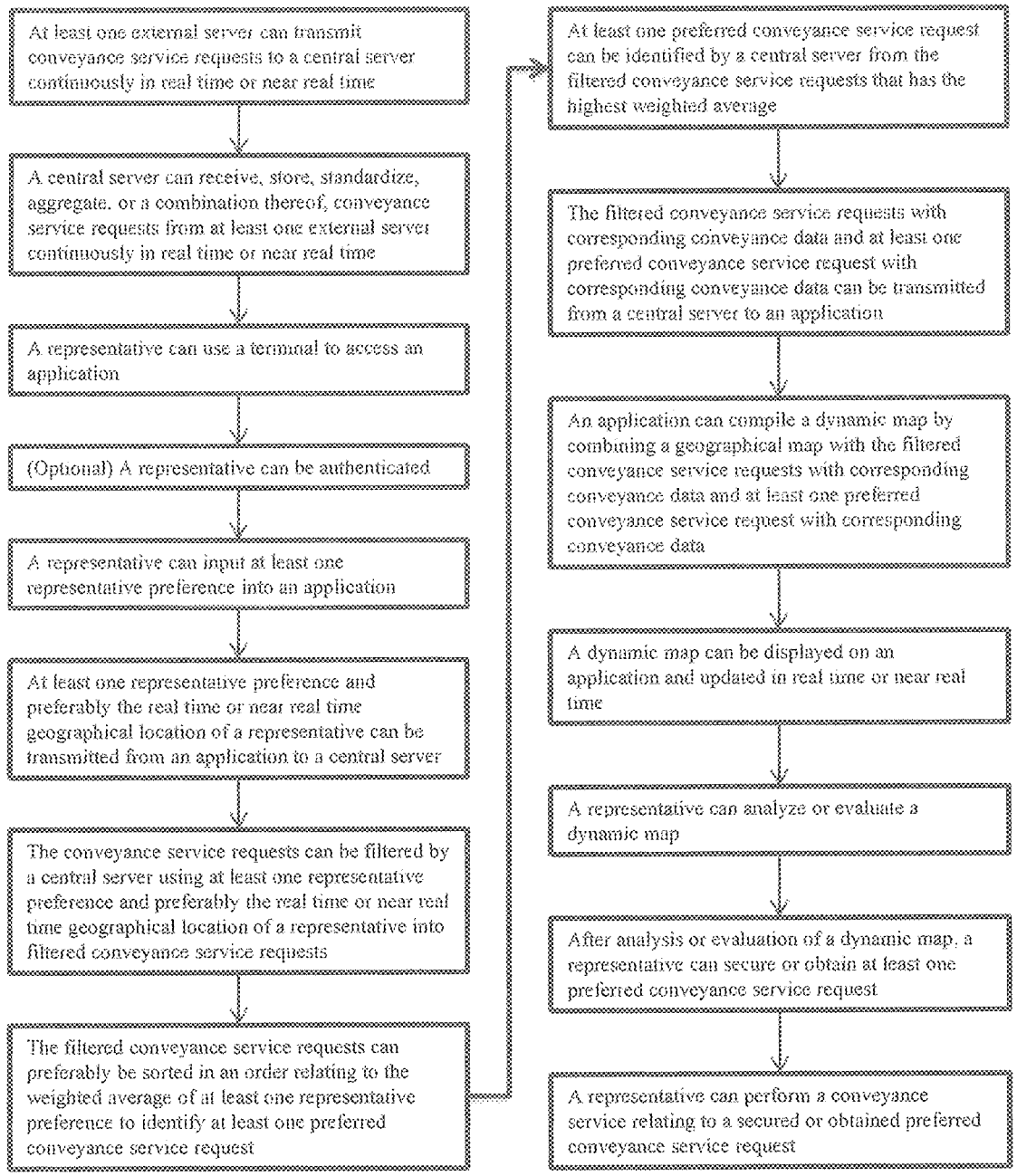

FIG. 3 relates to a preferred example of one non-limiting aspect of the present invention as a flowchart of steps of an exemplary method in a preferable but not required order where a representative 2 can benefit from the present invention. The flowchart describes steps of how a representative 2 can secure or obtain at least one preferred conveyance service request 15 by analyzing or evaluating a visual representation, in this non-limiting example, a dynamic map 11. At least one link can be at least one connection or at least one association with at least one software function or at least one software component relating to at least one application 6, at least one terminal 7, at least one central server 9, at least one external server 10, or a combination thereof.

Figure 4:
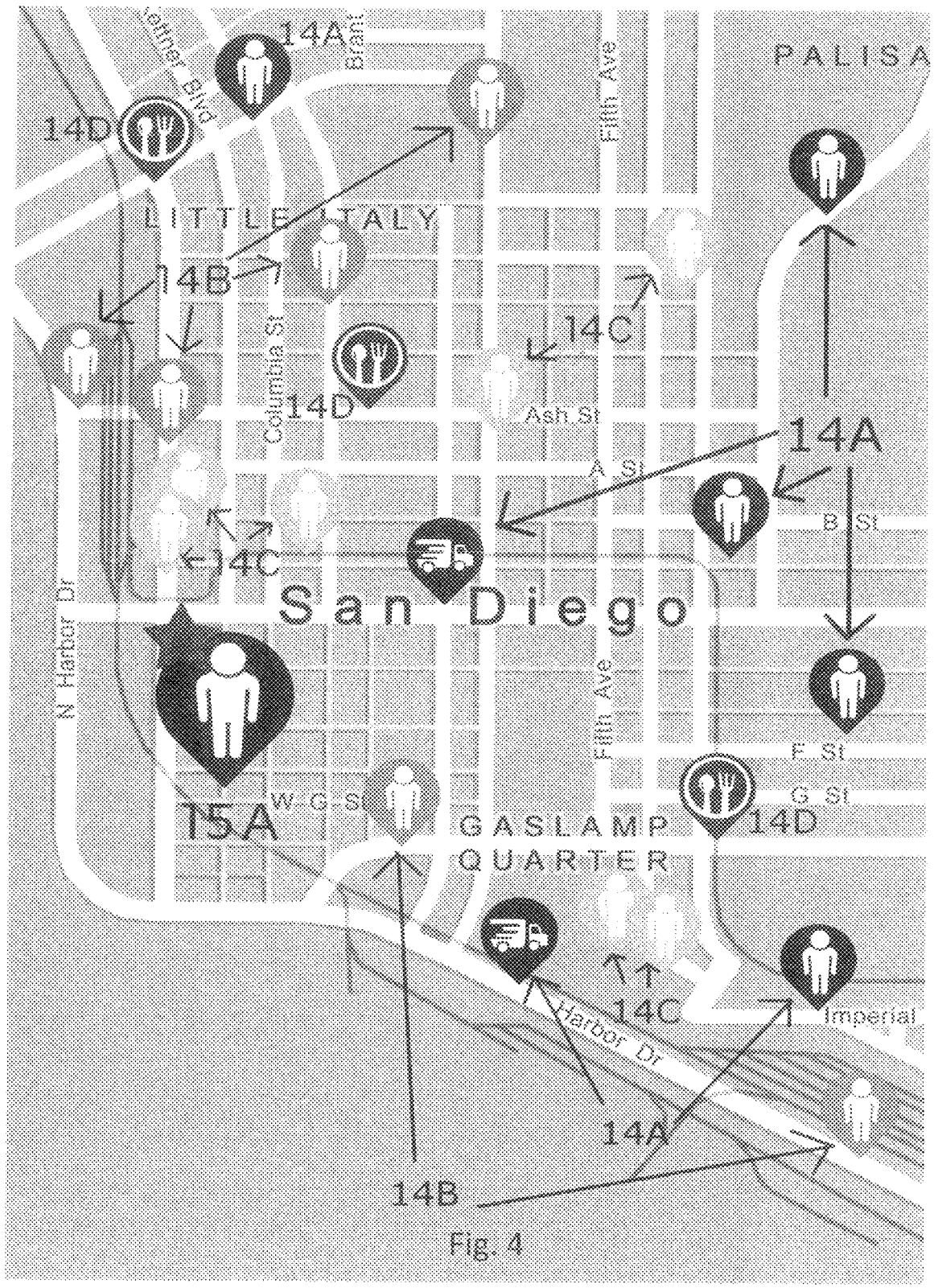

FIG. 4 relates to a preferred example of one non-limiting aspect of the present invention as a dynamic map 11 where at least one representative 2 can benefit from the present invention. A dynamic map 11 can be used by at least one representative 2 to analyze or evaluate and then secure or obtain the preferred conveyance service request 15A. The filtered conveyance service requests 14A, 14B, 14C, and 14D and the preferred conveyance service request 15A are associated with different service providers 5A, 5B, 5C, and 5D respectively. At least one link can be at least one connection or at least one association with at least one software function or at least one software component relating to at least one application 6, at least one terminal 7, at least one central server 9, at least one external server 10, or a combination thereof.

The preferred conveyance service request 15A can be visually identifiable compared to the filtered conveyance service requests 14A, 14B, 14C and 14D. In this non-limiting figure, a star is used in addition to a larger icon to demonstrate the preferred conveyance service request 15A as being visually identifiable. At least one different icon, symbol, color, shade, or visual can be used to identify individual filtered conveyance service requests 14A, 14B, 14C and 14D and the preferred conveyance service request 15A that are from different conveyance industry segments, different service providers 5, or a combination thereof. For example, in this non-limiting figure, icons displaying a person are ride service requests from the ride-hail industry segment, icons displaying a van are good delivery service requests from the courier industry segment, and icons with a spoon and fork are food delivery service requests from the food delivery industry segment. Each individual icon, symbol, color, shade, or visual can be mobile or dynamic and updated in real time or near real time on an application 6.

Figure 5:
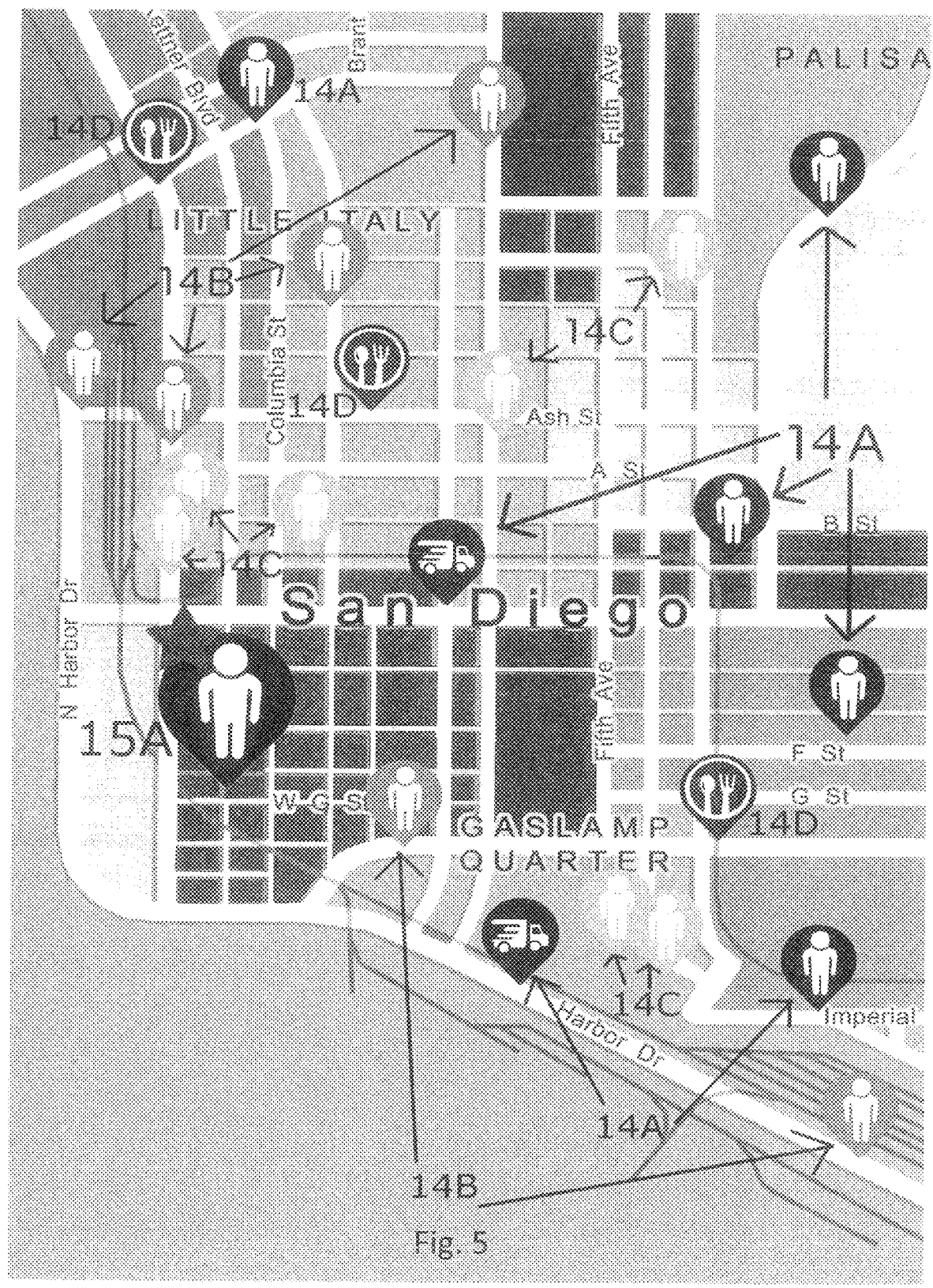

FIG. 5 relates to a preferred example of one non-limiting aspect of the present invention as a combination of a dynamic map 11 and a heat map 12 where at least one representative 2 can benefit from the present invention. A combination of a dynamic map 11 and a heat map 12 can be used by at least one representative 2 to analyze or evaluate on both a micro and macro level view of at least one conveyance industry segment and then secure or obtain the preferred conveyance service request 15A. The filtered conveyance service requests 14A, 14B, 14C, and 14D and the preferred conveyance service request 15A are associated with different service providers 5A, 5B, 5C, and 5D respectively. At least one link can be at least one connection or at least one association with at least one software function or at least one software component relating to at least one application 6, at least one terminal 7, at least one central server 9, at least one external server 10, or a combination thereof.

The preferred conveyance service request 15A can be visually identifiable compared to the filtered conveyance service requests 14A, 14B, 14C, and 14D. In this non-limiting figure, a star is used in addition to a larger icon to demonstrate the preferred conveyance service request 15A as being visually identifiable. At least one different icon, symbol, color, shade, or visual can be used to identify individual filtered conveyance service requests 14A, 14B, 14C and 14D and the preferred conveyance service request 15A that are from different conveyance industry segments, different service providers 5, or a combination thereof. For example, in this non-limiting figure, icons displaying a person are ride service requests from the ride-hail industry segment, icons displaying a van are good delivery service requests from the courier industry segment, and icons with a spoon and fork are food delivery service requests from the food delivery industry segment. Each individual icon, symbol, color, shade, or visual can be mobile or dynamic and updated in real time or near real time on an application 6.

In this non-limiting figure, a dynamic map 11 showing filtered conveyance service requests 14A, 14B, 14C, and 14D and the preferred conveyance service request 15A is displayed in combination with a heat map 12 showing areas with elevated pricing. Areas of the combination of a dynamic map 11 and a heat map 12 can be shaded or patterned in proportion to the measurement of an elevated pricing metric being displayed on a geographical map. Darker shaded areas, for example, can represent areas with higher elevated pricing whereas lighter shaded areas can represent areas with lower elevated pricing or potentially no elevated pricing. At least one representative 2 can use this combination of a dynamic map 11 and a heat map 12 to analyze and identify areas of elevated pricing shown as darker shaded areas to position themselves closer to areas of elevated pricing. In this non-limiting figure, at least one representative 2 can drive to a darker shaded area with higher pricing and then secure or obtain the preferred conveyance service request 15A.

Figure 6:
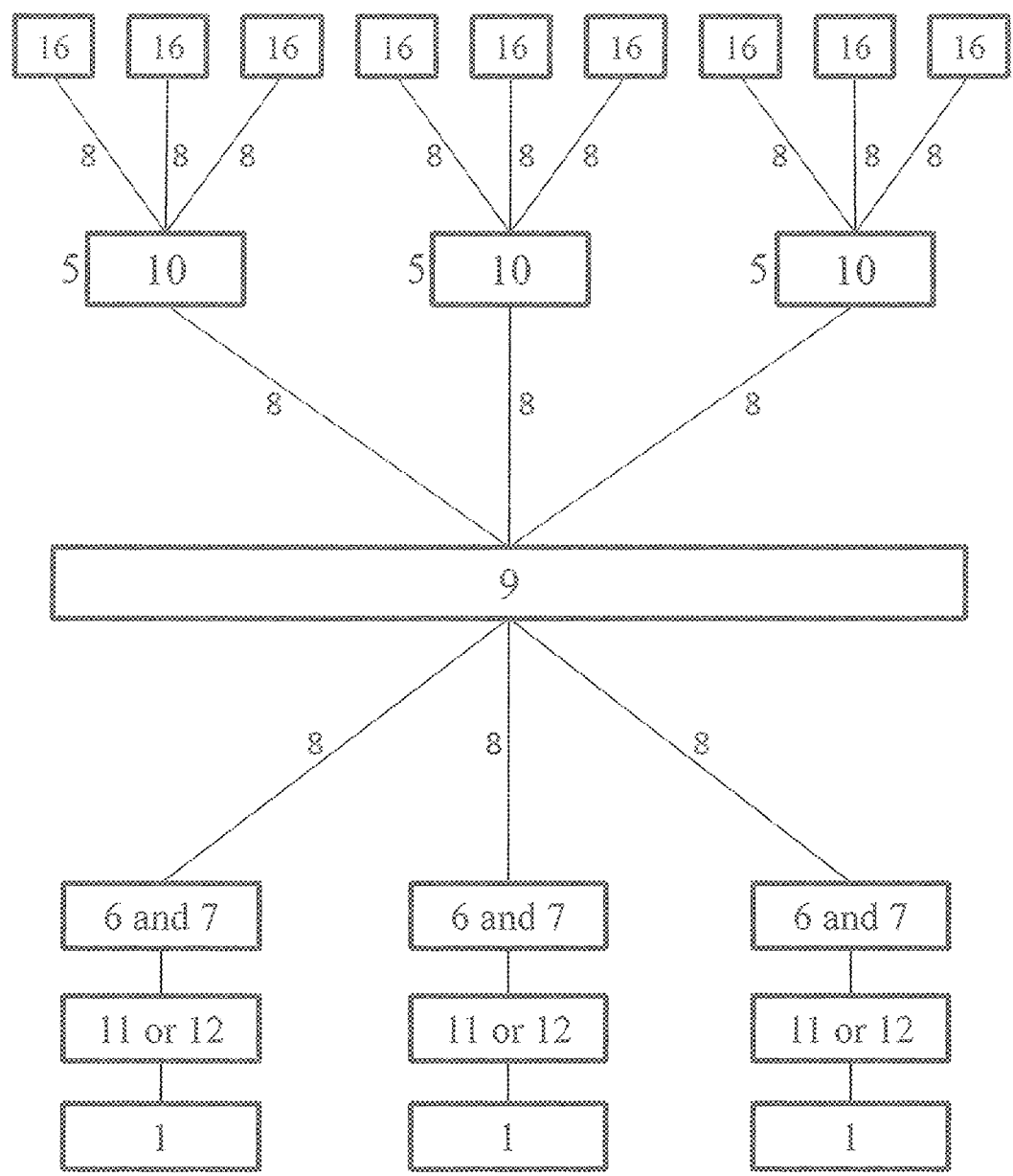

FIG. 6 relates to a preferred example of one non-limiting aspect of the present invention as a macro level view of a real time or near real time conveyance service system where at least one conveyance client 1 can benefit from the present invention. The conveyance service offerings 16 can be sourced from at least one external server 10 and can be transmitted to a central server 9 by way of at least one link 8. At least one service provider 5 can be associated with at least one external server 10. In this non-limiting figure, each service provider 5 is associated with one external server 10. A central server 9 can filter conveyance service offerings 16 into filtered conveyance service offerings 17 by using at least one conveyance client preference 4 and preferably the real time or near real time geographical location of at least one conveyance client 1. A central server 9 can calculate the weighted average of at least one conveyance client preference 4. A central server 9 can preferably sort the filtered conveyance service offerings 17 in an order relating to the corresponding weighted averages to identify at least one preferred conveyance service offering 18. At least one preferred conveyance service offering 18 can be identified by a central server 9 from the filtered conveyance service offerings 17 that has the highest weighted average. At least one preferred conveyance service offering 18 with corresponding conveyance data and filtered conveyance service offerings 17 with corresponding conveyance data can be transmitted from a central server 9 to at least one application 6 by way of at least one link 8. At least one application 6 can operate on at least one terminal 7 and can display at least one visual representation such as but not limited to at least one dynamic map 11, at least one heat map 12, or a combination thereof. At least one conveyance client 1 can analyze or evaluate at least one visual representation and then secure or obtain at least one preferred conveyance service offering 18. At least one link 8 can be at least one connection or at least one association with at least one software function or at least one software component relating to at least one application 6, at least one terminal 7, at least one central server 9, at least one external server 10, or a combination thereof.

Figure 7:
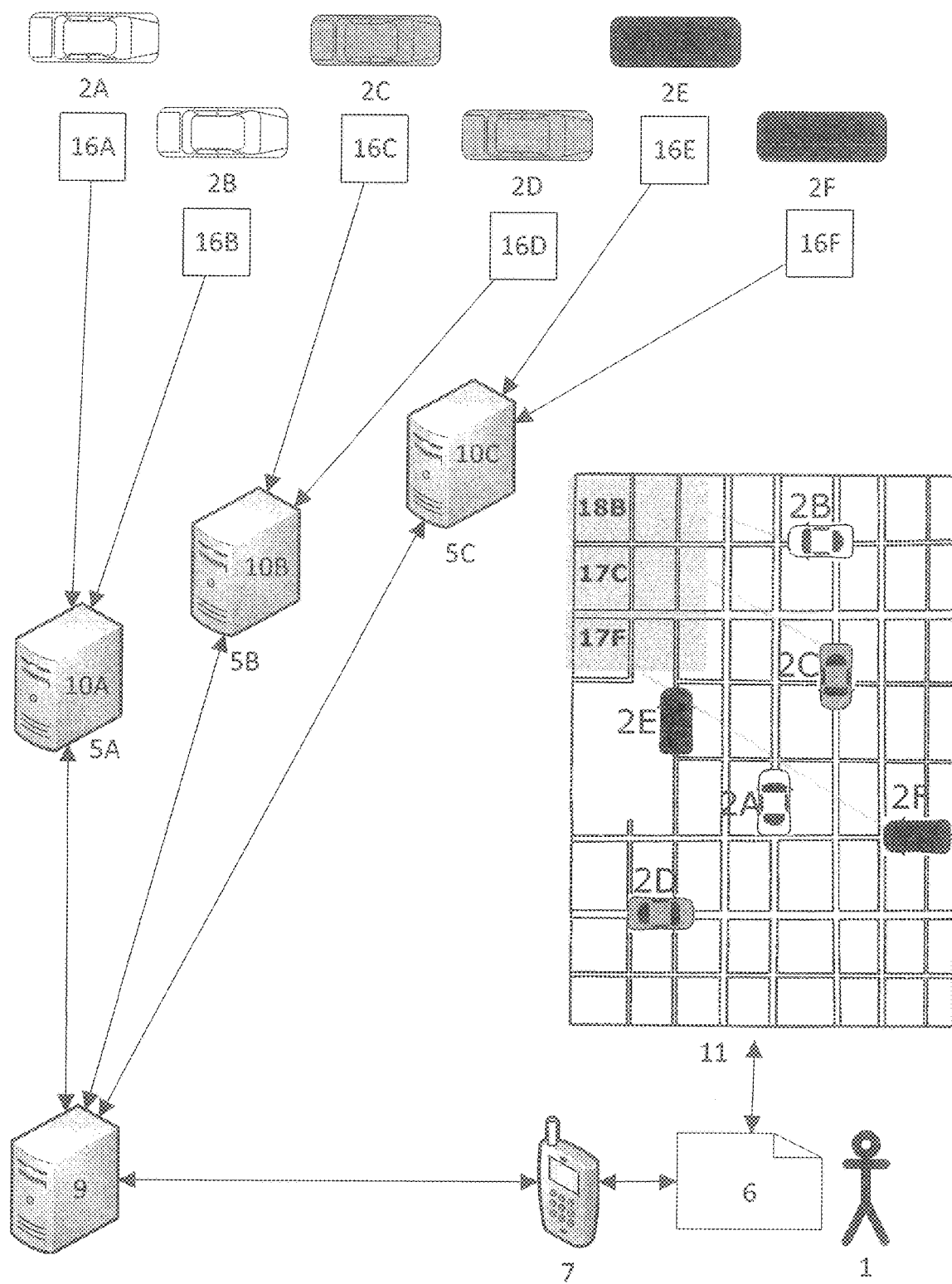

FIG. 7 relates to a preferred example of one non-limiting aspect of the present invention as a macro level view of a real time or near real time conveyance service system where a conveyance client 1 can benefit from the present invention. An individual conveyance service offering 16 can be performed by each individual representative 2A, 2B, 2C, 2D, 2E, and 2F. An individual conveyance service offering 16 corresponds with each individual representative 2 in the figure. Conveyance service offerings 16A and 16B are offered by representatives 2A and 2B to external server 10A associated with service provider 5A. Conveyance service offerings 16C and 16D are offered by representatives 2C and 2D to external server 10B associated with service provider 5B. Conveyance service offerings 16E and 16F are offered by representatives 2E and 2F to external server 10C associated with service provider 5C. Each service provider 5 can have at least one external server 10.

A central server 9 can receive conveyance service offerings 16 and then filter the conveyance service offerings 16 into filtered conveyance service offerings 17 by using at least one conveyance client preference 4 and preferably the real time or near real time geographical location of a conveyance client 1. A central server 9 can calculate the weighted average of at least one conveyance client preference 4. A central server 9 can preferably sort the filtered conveyance service offerings 17 in an order relating to the corresponding weighted averages to identify at least one preferred conveyance service offering 18. At least one preferred conveyance service offering 18 can be identified by a central server 9 from the filtered conveyance service offerings 17 that has the highest weighted average. At least one preferred conveyance service offering 18 with corresponding conveyance data and filtered conveyance service offerings 17 with corresponding conveyance data can be transmitted from a central server 9 to an application 6 by way of at least one link 8. An application 6 can operate on a terminal 7 and can display at least one visual representation, for example, a dynamic map 11. Individual filtered conveyance service offerings 17C, 17F and the preferred conveyance service offering 18B can be shown on a dynamic map 11 as dynamic icons or visuals and can optionally show conveyance data. A conveyance client 1 can analyze or evaluate a dynamic map 11 and then secure or obtain the preferred conveyance service offering 18B.

At least one link can be at least one connection or at least one association with at least one software function or at least one software component relating to at least one application 6, at least one terminal 7, at least one central server 9, at least one external server 10, or a combination thereof. At least one link can be at least one connection or at least one association with at least one application 6, at least one central server 9, at least one external server 10, or a combination thereof, on at least one terminal 7 associated with at least one conveyance client 1.

Figure 8:
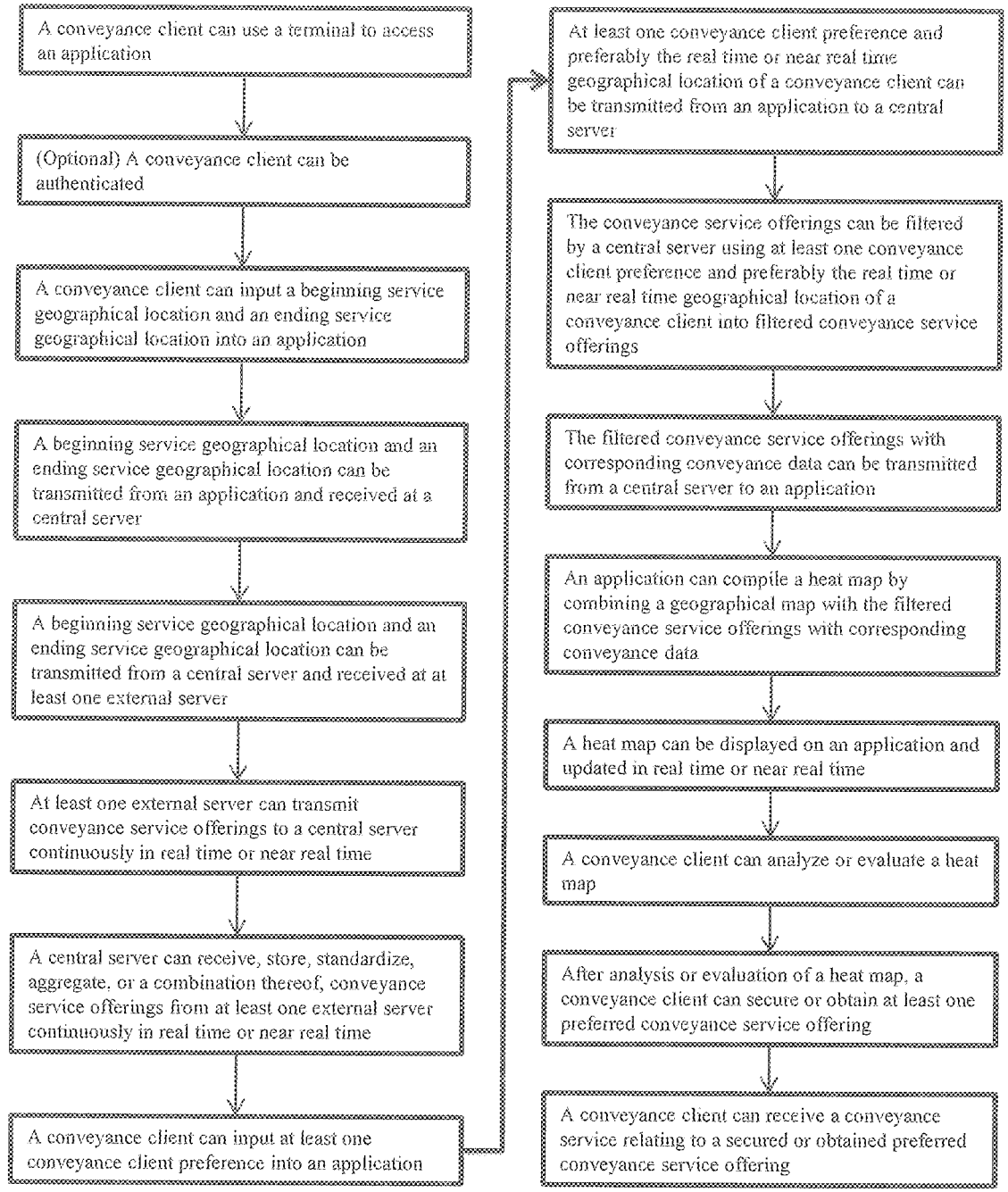

FIG. 8 relates to a preferred example of one non-limiting aspect of the present invention as a flowchart of steps of an exemplary method in a preferable but not required order where a conveyance client 1 can benefit from the present invention. The flowchart describes steps of how a conveyance client 1 can secure or obtain at least one preferred conveyance service offering 18 by analyzing or evaluating a visual representation, in this non-limiting example, a heat map 12. At least one link can be at least one connection or at least one association with at least one software function or at least one software component relating to at least one application 6, at least one terminal 7, at least one central server 9, at least one external server 10, or a combination thereof.

Figure 9:
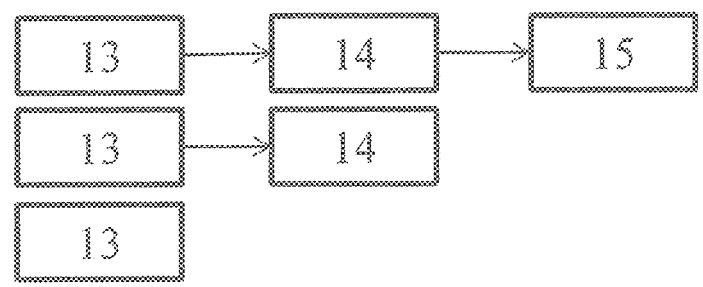

FIG. 9 relates to a preferred example of at least one non-limiting aspect of the present invention as a flowchart of the transformation of at least one conveyance service request 13 into at least one preferred conveyance service request 15. Once a central server 9 receives at least one conveyance service request 13 from at least one external server 10, a central server 9 can filter at least one conveyance service request 13 using at least one representative preference 3 and preferably the real time or near real time geographical location of at least one representative 2 into at least one filtered conveyance service request 14. A central server 9 can calculate the weighted average of at least one representative preference 3. A central server 9 can preferably sort at least one filtered conveyance service request 14 in an order relating to the corresponding weighted averages to identify at least one preferred conveyance service request 15. At least one preferred conveyance service request 15 can be identified by a central server 9 as at least one filtered conveyance service request 14 that has the highest weighted average from at least one filtered conveyance service request 14. Not every at least one conveyance service request 13 can become at least one filtered conveyance service request 14 and not every at least one filtered conveyance service request 14 can become at least one preferred conveyance service request 15. At least one function of a central server 9 can be performed by an application 6. At least one link can be at least one connection or at least one association with at least one software function or at least one software component relating to at least one application 6, at least one terminal 7, at least one central server 9, at least one external server 10, or a combination thereof.

Figure 10:
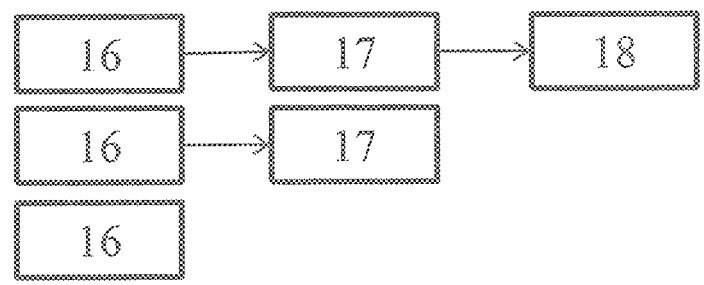

FIG. 10 relates to a preferred example of one non-limiting aspect of the present invention as a flowchart of the transformation of at least one conveyance service offering 16 into at least one preferred conveyance service offering 18. Once a central server 9 receives at least one conveyance service offering 16 from at least one external server 10, a central server 9 can filter at least one conveyance service offering 16 using at least one conveyance client preference 4 and preferably the real time or near real time geographical location of at least one conveyance client 1 into at least one filtered conveyance service offering 17. A central server 9 can calculate the weighted average of at least one conveyance client preference 4. A central server 9 can preferably sort at least one filtered conveyance service offering 17 in an order relating to the corresponding weighted averages to identify at least one preferred conveyance service offering 18. At least one preferred conveyance service offering 18 can be identified by a central server 9 as at least one filtered conveyance service offering 17 that has the highest weighted average from at least one filtered conveyance service offering 17. Not every at least one conveyance service offering 16 can become at least one filtered conveyance service offering 17 and not every at least one filtered conveyance service offering 17 can become at least one preferred conveyance service offering 18. At least one function of a central server 9 can be performed by an application 6. At least one link can be at least one connection or at least one association with at least one software function or at least one software component relating to at least one application 6, at least one terminal 7, at least one central server 9, at least one external server 10, or a combination thereof.

Figure 11:
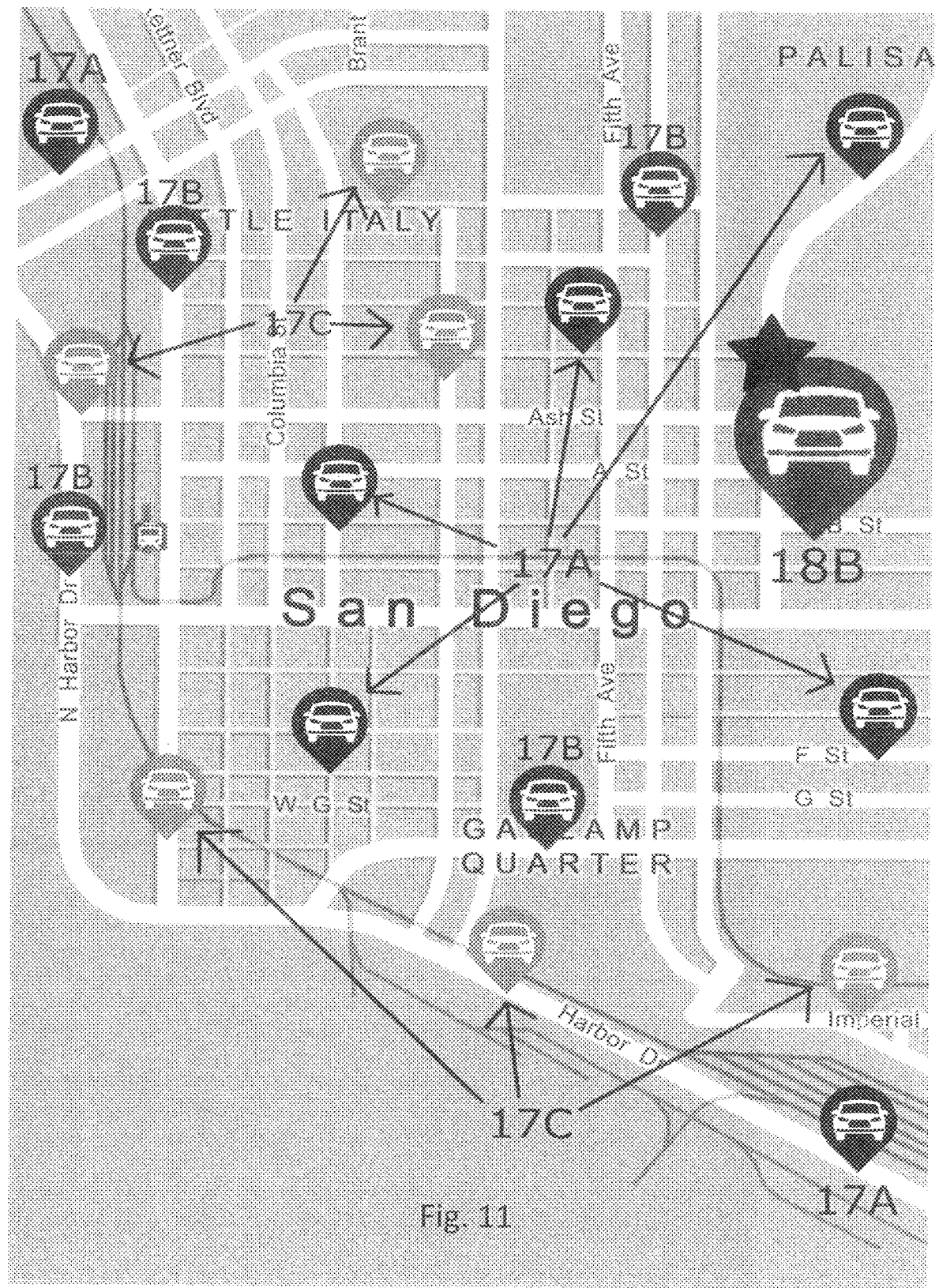

FIG. 11 relates to a preferred example of one non-limiting aspect of the present invention as a dynamic map 11 where at least one conveyance client 1 can benefit from the present invention. A dynamic map 11 can be used by at least one conveyance client 1 to analyze or evaluate and then secure or obtain the preferred conveyance service offering 18B. The filtered conveyance service offerings 17A, 17B, and 17C and the preferred conveyance service offering 18B are associated with different service providers 5A, 5B, and 5C respectively. At least one link can be at least one connection or at least one association with at least one software function or at least one software component relating to at least one application 6, at least one terminal 7, at least one central server 9, at least one external server 10, or a combination thereof.

The preferred conveyance service offering 18B can be visually identifiable compared to the filtered conveyance service offerings 17A, 17B, and 17C. In this non-limiting figure, a star is used in addition to a larger icon to demonstrate the preferred conveyance service offering 18B as being visually identifiable. At least one different icon, symbol, color, shade, or visual can be used to identify individual filtered conveyance service offerings 17A, 17B, and 17C and the preferred conveyance service offering 18B that are from different service providers 5. For example, in this non-limiting figure, icons displaying a car are ride service offerings from the ride-hail industry segment. Each individual icon, symbol, color, shade, or visual can be mobile or dynamic and updated in real time or near real time on an application 6.

Figure 12:
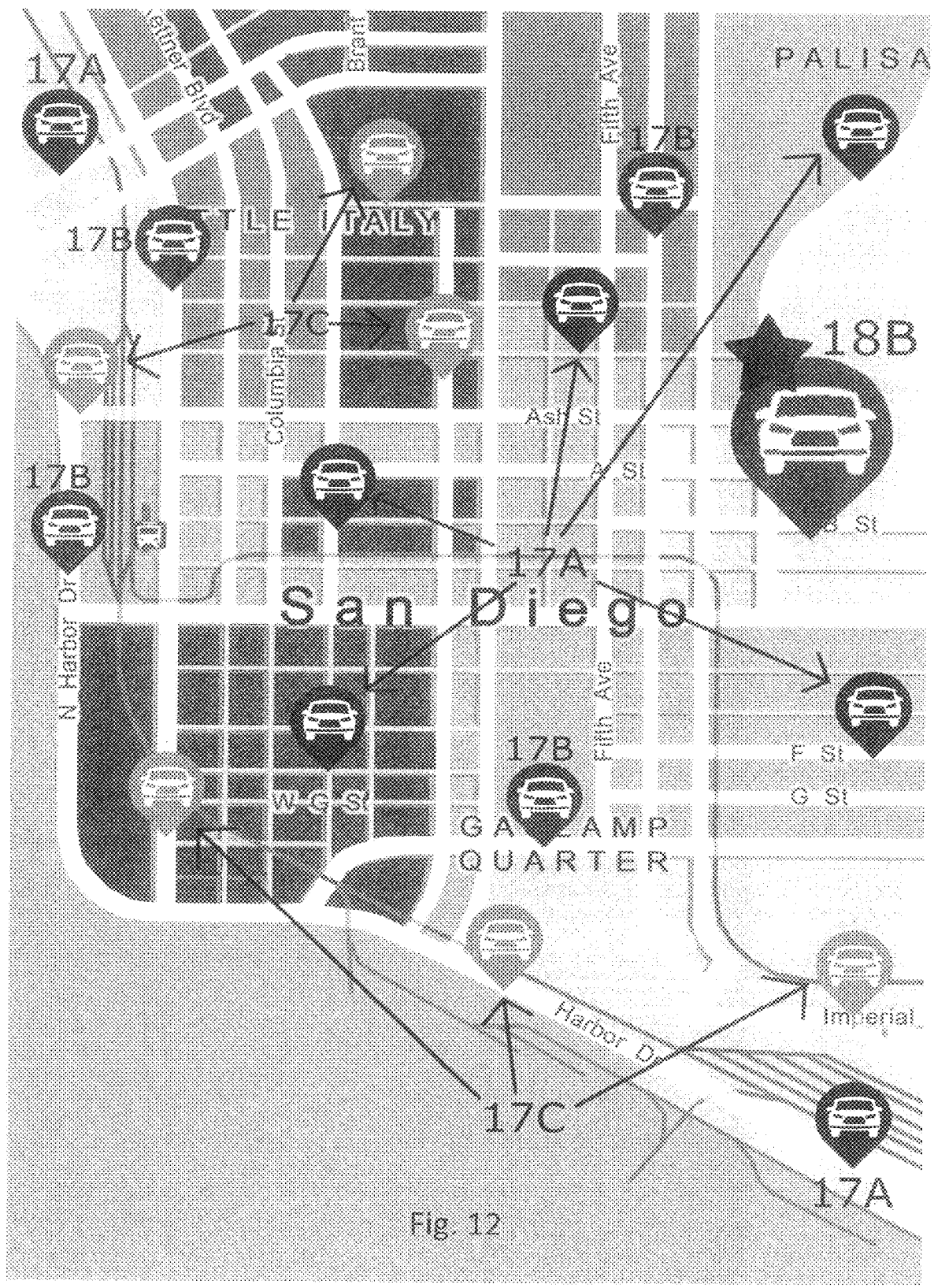

FIG. 12 relates to a preferred example of one non-limiting aspect of the present invention as a combination of a dynamic map 11 and a heat map 12 where at least one conveyance client 1 can benefit from the present invention. A combination of a dynamic map 11 and a heat map 12 can be used by at least one conveyance client 1 to analyze or evaluate on both a micro and macro level view of at least one conveyance industry segment and then secure or obtain the preferred conveyance service offering 18B. The filtered conveyance service offerings 17A, 17B, and 17C and the preferred conveyance service offering 18B are associated with different service providers 5A, 5B, and 5C respectively. At least one link can be at least one connection or at least one association with at least one software function or at least one software component relating to at least one application 6, at least one terminal 7, at least one central server 9, at least one external server 10, or a combination thereof.

The preferred conveyance service offering 18B can be visually identifiable compared to the filtered conveyance service offerings 17A, 17B, and 17C. In this non-limiting figure, a star is used in addition to a larger icon to demonstrate the preferred conveyance service offering 18B as being visually identifiable. At least one different icon, symbol, color, shade, or visual can be used to identify individual filtered conveyance service offerings 17A, 17B, and 17C and the preferred conveyance service offering 18B that are from different service providers 5. For example, in this non-limiting figure, icons displaying a car are ride service offerings from the ride-hail industry segment. Each individual icon, symbol, color, shade, or visual can be mobile or dynamic and updated in real time or near real time on an application 6.

In this non-limiting figure, a dynamic map 11 showing filtered conveyance service offerings 17A, 17B, and 17C and the preferred conveyance service offering 18B is displayed in combination with a heat map 12 showing areas with elevated pricing. Areas of the combination of a dynamic map 11 and a heat map 12 can be shaded or patterned in proportion to the measurement of an elevated pricing metric being displayed on a geographical map. Darker shaded areas, for example, can represent areas with higher elevated pricing whereas lighter shaded areas can represent areas with lower elevated pricing or potentially no elevated pricing. At least one conveyance client 1 can use this combination of a dynamic map 11 and a heat map 12 to analyze and identify areas of elevated pricing to position themselves in areas of lower pricing shown as lighter shaded areas. In this non-limiting figure, at least one conveyance client 1 can walk to a lighter shaded area with lower pricing and then secure or obtain the preferred conveyance service offering 18B.

Figure 13:
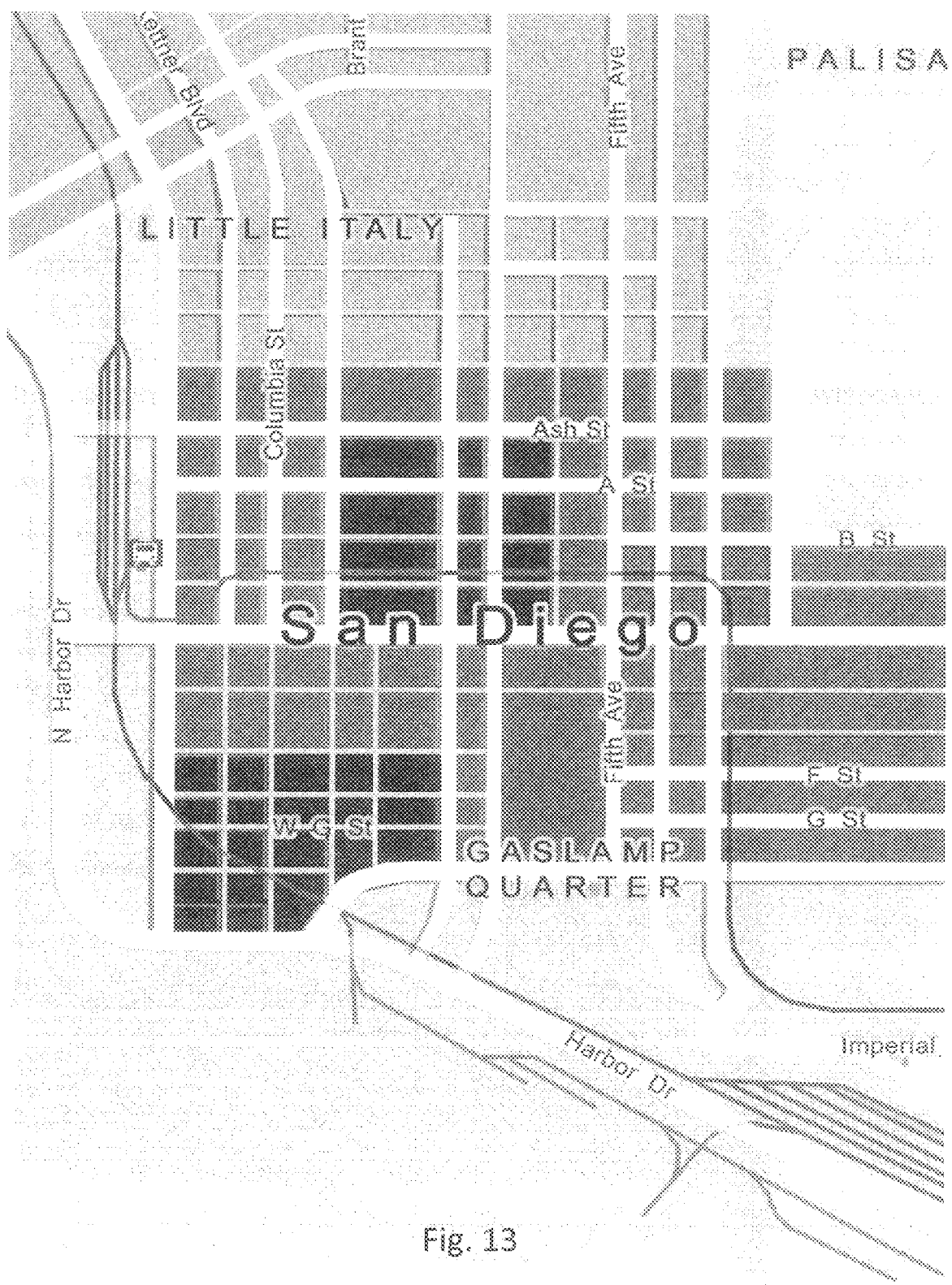

FIG. 13 relates to a preferred example of at least one non-limiting aspect of the present invention as a heat map 12 where at least one conveyance client 1 or at least one representative 2 can benefit from the present invention. At least one area of a heat map 12 can be shaded or patterned in proportion to at least one measurement of at least one statistical variable. Darker shaded areas, for example, can represent areas with a higher measurement of a statistical variable whereas lighter shaded areas can represent areas with a lower measurement of a statistical variable. For example in this non-limiting figure, a statistical variable can be an elevated pricing metric where darker shaded areas can represent areas with higher elevated pricing and lighter shaded areas can represent areas with lower elevated pricing or potentially no elevated pricing. At least one conveyance client 1 or at least one representative 2 can use a heat map 12 to analyze or evaluate and then secure or obtain preferred conveyance services. At least one link can be at least one connection or at least one association with at least one software function or at least one software component relating to at least one application 6, at least one terminal 7, at least one central server 9, at least one external server 10, or a combination thereof.

Figure 14:
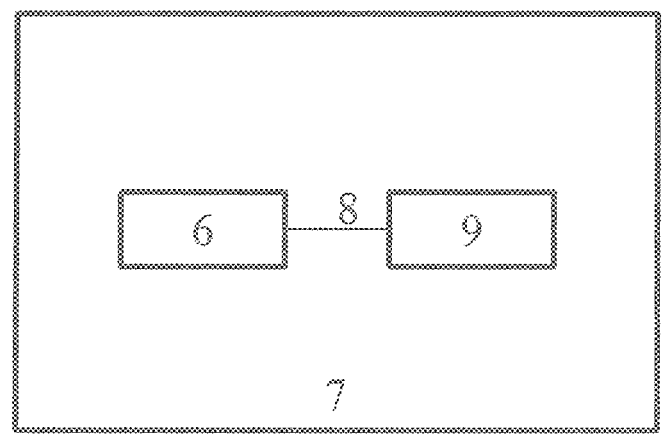

FIG. 14 relates to a preferred example of at least one non-limiting aspect of the present invention relating to at least one integration of hardware and software. At least one application 6, at least one central server 9, at least one external server 10, at least one terminal 7, at least one link 8, or a combination thereof, can be combined or integrated. At least one application 6, at least one central server 9, at least one external server 10, at least one link 8, or a combination thereof, can be combined or integrated on at least one terminal 7. At least one application 6, at least one central server 9, at least one external server 10, at least one link 8, or a combination thereof, can be combined or integrated on at least one terminal 7 associated with at least one conveyance client 1 or at least one representative 2. In this non-limiting figure, it can be common that at least one application 6, at least one central server 9, at least one external server 10, at least one terminal 7, at least one link 8, or a combination thereof, can be combined or integrated on at least one smartphone. In this non-limiting figure, at least one representative 2 can utilize at least one smartphone that can combine or integrate at least one application 6, at least one central server 9, at least one external server 10, at least one terminal 7, at least one link 8, or a combination thereof. In this non-limiting figure, at least one conveyance client 1 can utilize at least one smartphone that can combine or integrate at least one application 6, at least one central server 9, at least one external server 10, at least one terminal 7, at least one link 8, or a combination thereof.

At least one link 8 can be at least one connection or at least one association with at least one software function or at least one software component relating to at least one application 6, at least one terminal 7, at least one central server 9, at least one external server 10, or a combination thereof.

DETAILED DESCRIPTION OF THE INVENTION

Definitions

Unless defined otherwise, all technical and scientific terms used herein have the same meaning as commonly understood by one of ordinary skill in the art to which this invention belongs. Generally, the nomenclature used herein and the procedures described below are well-known and commonly employed in the art. Conventional methods are used for these procedures, such as those provided in the art and various general references. Where a term is provided in the singular, the inventors also contemplate the plural of that term, and where a term is provided in the plural, the inventors also contemplate the singular of that term. The nomenclature used herein and the procedures described below are those well-known and commonly employed in the art, unless otherwise indicated. Other technical terms used herein have their ordinary meaning in the art that they are used, as exemplified by a variety of technical dictionaries.

Introduction

The present invention recognizes that there is a long felt need for more efficient systems in the interactive conveyance industry for goods and services.

As a non-limiting introduction to the breath of the present invention, the present invention includes several general and useful aspects, including:

1. an interactive system in the conveyance and other industries; and
2. a method of use of the interactive system of the present invention.

These aspects of the invention, as well as others described herein, can be achieved by using the methods, articles of manufacture and compositions of matter described herein. To gain a full appreciation of the scope of the present invention, it will be further recognized that various aspects of the present invention can be combined to make desirable embodiments of the invention.

General Description of the Present Invention and Problems being Solved

One non-limiting aspect of the present invention can be at least one technology based solution that can use at least one real time or near real time system and at least one real time or near real time method to assist at least one representative in at least one process of analyzing or evaluating and then securing or obtaining at least one preferred conveyance service request using at least one visual representation of the present invention.

The present invention can receive and filter at least one conveyance service request based on at least one representative preference and preferably at least one real time or near real time geographical location of at least one representative. The present invention can identify at least one preferred conveyance service request from at least one filtered conveyance service request. At least one visual representation of the present invention of at least one filtered conveyance service request with corresponding conveyance data, at least one preferred conveyance service request with corresponding conveyance data, or a combination thereof, can be compiled with at least one geographical map on at least one application. The present invention can provide at least one representative with at least one visual tool to help analyze or evaluate and then secure or obtain at least one preferred conveyance service request.

One non-limiting embodiment of at least one visual representation of the present invention can be at least one dynamic map. At least one dynamic map of the present invention can be at least one geographical map that can display, including but not limited to, at least one preferred conveyance service request with corresponding conveyance data, at least one filtered conveyance service request with corresponding conveyance data, or a combination thereof, from at least one service provider in real time or near real time. At least one dynamic map of the present invention can display including but not limited to at least one real time or near real time geographical location of at least one conveyance client, at least one beginning service geographical location, at least one ending service geographical location, pricing information, or a combination thereof. At least one representative can visually identify at least one preferred conveyance service request to make at least one well informed decision when analyzing or evaluating and then securing or obtaining at least one preferred conveyance service request. One differentiating improvement of at least one dynamic map of the present invention can be that including but not limited to at least one conveyance client, at least one service provider, at least one good supplier, at least one corresponding conveyance service request, or a combination thereof, can be displayed individually as at least one mobile transitory icon, at least one mobile transitory visual, or at least one mobile transitory symbol, and can be updated in real time or near real time.

One non-limiting embodiment of at least one visual representation of the present invention can be at least one heat map. At least one heat map of the present invention can be at least one geographical map in which at least one area can be including but not limited to shaded, colored, patterned, or a combination thereof, in proportion to at least one measurement of at least one statistical variable being displayed on at least one geographical map to aid at least one representative when analyzing or evaluating at least one conveyance service request.

One non-limiting embodiment of at least one visual representation of the present invention can be at least one predictive heat map. At least one predictive heat map of the present invention can be at least one variation of at least one heat map of the present invention that can be compiled from at least one statistical variable of including but not limited to at least one real time or near real time filtered conveyance service request in conjunction with corresponding conveyance data, at least one past filtered conveyance service request in conjunction with corresponding conveyance data, or a combination thereof. At least one predictive heat map of the present invention can estimate including but not limited to future supply, future demand, at least one future statistical variable, or a combination thereof. At least one predictive heat map of the present invention can utilize machine learning technology.

One non-limiting embodiment of at least one visual representation of the present invention can be at least one historical heat map. At least one historical heat map of the present invention can be at least one variation of at least one heat map of the present invention that can be compiled from at least one statistical variable of including but not limited to at least one past filtered conveyance service request in conjunction with corresponding conveyance data. At least one historical heat map of the present invention can show past supply, past demand, at least one past statistical variable, or a combination thereof.

One non-limiting embodiment of at least one visual representation of the present invention can be at least one combination of at least one dynamic map of the present invention and at least one heat map of the present invention. At least one combination of at least one dynamic map of the present invention and at least one heat map of the present invention can allow at least one representative to view at least one service provider operating in at least one conveyance industry segment on both a macro and micro level.

One benefit of the present invention can be at least one improved technique of displaying information that can result in at least one new way of analyzing or evaluating at least one preferred conveyance service request by using at least one visual representation of the present invention. At least one improved technique relating to at least one dynamic map of the present invention can enable at least one representative to easily analyze or evaluate at least one visually identifiable preferred conveyance service request relative to at least one filtered conveyance service request. At least one representative can use at least one heat map of the present invention to analyze or evaluate if at least one given geographical location is at least one good area to work in. One advantage can be that at least one representative can gain insight and know which of at least one conveyance service request is preferred to be secured or obtained because at least one visual representation of the present invention can be updated continuously in real time or near real time. At least one improved technique can allow at least one representative to visually gain perspective of at least one real time or near real time environment in at least one conveyance industry segment, to identify at least one preferred conveyance service request.

One benefit of the present invention can be at least one new technique that can generate new data that can be useful to at least one representative. One non-limiting embodiment of at least one predictive heat map of the present invention, can transform including but not limited to at least one real time or near real time filtered conveyance service request in conjunction with corresponding conveyance data, at least one past filtered conveyance service request in conjunction with corresponding conveyance data, or a combination thereof, into at least one predictive heat map of the present invention that at least one representative can analyze or evaluate to work more in line with their goals. At least one predictive heat map of the present invention can provide at least one solution to at least one missed opportunity of chasing at least one area of elevated pricing. One non-limiting embodiment of at least one predictive heat map of the present invention, can provide at least one representative with new data for analysis or evaluation based on including but not limited to at least one real time or near real time filtered conveyance service request in conjunction with corresponding conveyance data, at least one past filtered conveyance service request in conjunction with corresponding conveyance data, or a combination thereof, and can utilize machine learning technology to predict future supply or future demand.

One benefit of the present invention can be at least one improved ability for at least one representative to interact with including but not limited to at least one conveyance client, at least one good supplier, at least one service provider, or a combination thereof, due to increased insight or knowledge relating to at least one conveyance industry segment. The present invention can be at least one tool for presenting including but not limited to at least one preferred conveyance service request, at least one filtered conveyance service request, conveyance data, or a combination thereof, to be analyzed or evaluated by at least one representative.

One benefit of the present invention can improve at least one representative's decision making ability, allowing at least one representative to use at least one representative preference, and can improve the ability for at least one representative to secure or obtain at least one most preferred conveyance service request available at that time.

One non-limiting aspect of the present invention can be at least one technology based solution that can use at least one real time or near real time system and at least one real time or near real time method to assist at least one conveyance client in at least one process of analyzing or evaluating and then securing or obtaining at least one preferred conveyance service offering using at least one visual representation of the present invention.

The present invention can receive and filter at least one conveyance service offering based on at least one conveyance client preference and preferably at least one real time or near real time geographical location of at least one conveyance client. The present invention can identify at least one preferred conveyance service offering from at least one filtered conveyance service offering. At least one visual representation of the present invention of at least one filtered conveyance service offering with corresponding conveyance data, at least one preferred conveyance service offering with corresponding conveyance data, or a combination thereof, can be compiled with at least one geographical map on at least one application. The present invention can provide at least one conveyance client with at least one visual tool to help analyze or evaluate and then secure or obtain at least one preferred conveyance service offering.

One non-limiting embodiment of at least one visual representation of the present invention can be at least one dynamic map. At least one dynamic map of the present invention can be at least one geographical map that can display, including but not limited to, at least one preferred conveyance service offering with corresponding conveyance data, at least one filtered conveyance service offering with corresponding conveyance data, or a combination thereof, from at least one service provider in real time or near real time. At least one dynamic map of the present invention can display including but not limited to at least one real time or near real time geographical location of at least one representative, at least one beginning service geographical location, at least one ending service geographical location, pricing information, or a combination thereof. At least one conveyance client can visually identify at least one preferred conveyance service offering to make at least one well informed decision when analyzing or evaluating and then securing or obtaining at least one preferred conveyance service offering. One differentiating improvement of at least one dynamic map of the present invention can be that including but not limited to at least one representative, at least one service provider, at least one good supplier, at least one corresponding conveyance service offering, or a combination thereof, can be displayed individually as at least one mobile transitory icon, at least one mobile transitory visual or at least one mobile transitory symbol, and can be updated in real time or near real time.

One non-limiting embodiment of at least one visual representation of the present invention can be at least one heat map. At least one heat map of the present invention can be at least one geographical map in which at least one area can be including but not limited to shaded, colored, patterned, or a combination thereof, in proportion to at least one measurement of at least one statistical variable being displayed on at least one geographical map to aid at least one conveyance client when analyzing or evaluating at least one conveyance service offering.

One non-limiting embodiment of at least one visual representation of the present invention can be at least one predictive heat map. At least one predictive heat map of the present invention can be at least one variation of at least one heat map of the present invention that can be compiled from at least one statistical variable of including but not limited to at least one real time or near real time filtered conveyance service offering in conjunction with corresponding conveyance data, at least one past filtered conveyance service offering in conjunction with corresponding conveyance data, or a combination thereof. At least one predictive heat map of the present invention can estimate including but not limited to future supply, future demand, at least one future statistical variable, or a combination thereof. At least one predictive heat map of the present invention can utilize machine learning technology.

One non-limiting embodiment of at least one visual representation of the present invention can be at least one historical heat map. At least one historical heat map of the present invention can be at least one variation of at least one heat map of the present invention that can be compiled from at least one statistical variable of including but not limited to at least one past filtered conveyance service offering in conjunction with corresponding conveyance data. At least one historical heat map of the present invention can show past supply, past demand, at least one past statistical variable, or a combination thereof.

One non-limiting embodiment of at least one visual representation of the present invention can be at least one combination of at least one dynamic map of the present invention and at least one heat map of the present invention. At least one combination of at least one dynamic map of the present invention and at least one heat map of the present invention can allow at least one conveyance client to view at least one service provider operating in at least one conveyance industry segment on both a macro and micro level.

One benefit of the present invention can be at least one improved technique of displaying information that can result in at least one new way of analyzing or evaluating at least one preferred conveyance service offering by using at least one visual representation of the present invention. At least one improved technique relating to at least one dynamic map of the present invention, can enable at least one conveyance client to easily analyze or evaluate at least one visually identifiable preferred conveyance service offering relative to at least one filtered conveyance service offering. At least one conveyance client can use at least one heat map of the present invention to analyze or evaluate if at least one conveyance client is in at least one area of elevated pricing. One advantage can be that at least one conveyance client can gain insight and know which of at least one conveyance service offering is preferred to be secured or obtained because at least one visual representation of the present invention can be updated continuously in real time or near real time. At least one improved technique can allow at least one conveyance client to visually gain perspective of at least one real time or near real time environment in at least one conveyance industry segment, to identify at least one preferred conveyance service offering.

One benefit of the present invention can be at least one new technique that can generate new data that can be useful to at least one conveyance client. One non-limiting embodiment of at least one predictive heat map of the present invention, can transform including but not limited to at least one real time or near real time filtered conveyance service offering in conjunction with corresponding conveyance data, at least one past filtered conveyance service offering in conjunction with corresponding conveyance data, or a combination thereof, into at least one predictive heat map of the present invention that at least one conveyance client can analyze or evaluate to help identify and at least one future preferred conveyance service offering. At least one predictive heat map of the present invention can provide at least one solution to at least one problem of paying more for at least one similar conveyance service. One non-limiting embodiment of at least one predictive heat map of the present invention, can provide at least one conveyance client with new data for analysis or evaluation based on including but not limited to at least one real time or near real time filtered conveyance service offering in conjunction with corresponding conveyance data, at least one past filtered conveyance service offering in conjunction with corresponding conveyance data, or a combination thereof, and can utilize machine learning technology to predict future supply or future demand.

One benefit of the present invention can be at least one improved ability for at least one conveyance client to interact with including but not limited to at least one representative, at least one good supplier, at least one service provider, or a combination thereof, due to increased insight or knowledge relating to at least one conveyance industry segment. The present invention can be at least one tool for presenting including but not limited to at least one preferred conveyance service offering, at least one filtered conveyance service offering, conveyance data, or a combination thereof, to be analyzed or evaluated by at least one conveyance client.

One benefit of the present invention can improve at least one conveyance client's decision making ability, allowing at least one conveyance client to use at least one conveyance client preference, and can improve the ability for at least one conveyance client to secure or obtain at least one most preferred conveyance service offering available at that time.

One benefit of the present invention can be that at least one visual representation of the present invention can provide more knowledge or information to at least one representative about at least one analysis or at least one trend based on including but not limited to at least one metric, at least one representative preference, or a combination thereof, inputted or provided by at least one representative to help analyze or evaluate and preferably secure or obtain at least one preferred conveyance service request. At least one visual representation of the present invention can be at least one tool to present including but not limited to real time information or data, near real time information or data, historical information or data, predictive information or data, or a combination thereof, that can assist at least one representative when analyzing or evaluating at least one conveyance service request and can provide more transparency.

One benefit of the present invention can be that at least one representative can have more control or flexibility when analyzing or evaluating and then securing or obtaining at least one preferred conveyance service request. At least one representative can set at least one parameter or at least one representative preference on how and where at least one representative wants to work, thus providing more control or flexibility for at least one representative.

One benefit of the present invention can be that at least one visual representation of the present invention can provide more knowledge or information to at least one conveyance client about at least one analysis or at least one trend based on including but not limited to at least one metric, at least one conveyance client preference, or a combination thereof, inputted or provided by at least one conveyance client to help analyze or evaluate and preferably secure or obtain at least one preferred conveyance service offering. At least one visual representation of the present invention can be at least one tool that can present including but not limited to real time information or data, near real time information or data, historical information or data, predictive information or data, or a combination thereof, that can assist at least one conveyance client when analyzing or evaluating at least one conveyance service offering and can provide more transparency. Increased knowledge or information can be amplified for at least one conveyance client when travelling outside of at least one conveyance client's hometown. At least one conveyance client may not have the same local knowledge or information of at least one different area as at least one person from that at least one different area can have. The present invention can provide at least one conveyance client with pricing information from at least one service provider, which can aid in balancing supply and demand. The present invention can provide more price transparency, thus improving knowledge or information for at least one conveyance client.

One benefit of the present invention for at least one representative can be that at least one method of analyzing or evaluating and then securing or obtaining at least one preferred conveyance service request can now be accomplished in real time or near real time. By utilizing at least one system and at least one method that can operate in real time or near real time, quantum computing, machine learning technology, or a combination thereof, can be incorporated to further improve analysis or evaluation for including but not limited to at least one representative to secure or obtain at least one preferred conveyance service request.

One benefit of the present invention for at least one conveyance client can be that at least one method of analyzing or evaluating and then securing or obtaining at least one preferred conveyance service offering can now be accomplished in real time or near real time. By utilizing at least one system and at least one method that can operate in real time or near real time, quantum computing, machine learning technology, or a combination thereof, can be incorporated to further improve analysis or evaluation for including but not limited to at least one conveyance client to secure or obtain at least one preferred conveyance service offering.

One benefit of the present invention can be a larger number of at least one conveyance service request available to be analyzed or evaluated by at least one representative. The larger number of at least one conveyance service request that at least one representative has exposure to, the greater the chance of identifying at least one preferred conveyance service request to secure or obtain given at least one representative preference.

One benefit of the present invention can be a larger number of at least one conveyance service offering available to be analyzed or evaluated by at least one conveyance client. The larger number of at least one conveyance service offering that at least one conveyance client has exposure to, the greater the chance of identifying at least one preferred conveyance service offering to secure or obtain given at least one conveyance client preference.

One benefit of the present invention can be that at least one representative can now input or provide at least one representative preference to filter at least one conveyance service request into at least one filtered conveyance service request and identify at least one preferred conveyance service request from at least one filtered conveyance service request. At least one representative can analyze or evaluate at least one conveyance service request more efficiently due to at least one improved process by using at least one representative preference to identify and preferably secure or obtain at least one preferred conveyance service request. At least one improved process can allow at least one representative to work more efficiently and spend less time on identifying and securing or obtaining at least one preferred conveyance service request and more time on providing at least one conveyance service.

One benefit of the present invention can be that at least one conveyance client can now input or provide at least one conveyance client preference to filter at least one conveyance service offering into at least one filtered conveyance service offering and identify at least one preferred conveyance service offering from at least one filtered conveyance service offering. At least one conveyance client can analyze or evaluate at least one conveyance service offering more efficiently due to at least one improved process by using at least one conveyance client preference to identify and preferably secure or obtain at least one preferred conveyance service offering.

One benefit of the present invention can be that at least one representative can increase their earning potential when securing or obtaining at least one preferred conveyance service request relating to at least one representative preference. The present invention can provide at least one ability for at least one representative to input or provide at least one representative preference to identify and preferably secure or obtain at least one preferred conveyance service request. At least one improved process can allow at least one representative to secure or obtain only at least one preferred conveyance service request that can increase at least one representative's earning potential over at least one given period of time when using at least one elevated pricing preference. At least one representative may only want to provide at least one shorter distance conveyance service to stay within at least one given area when using at least one elevated pricing preference to increase earning potential. At least one representative can increase earning potential for every at least one conveyance service provided within at least one area of elevated pricing rather than at least one representative performing at least one similar conveyance service outside of at least one area of elevated pricing.

One benefit of the present invention can be that at least one conveyance client can save money when securing or obtaining at least one preferred conveyance service offering relating to at least one conveyance client preference. The present invention can provide at least one ability for at least one conveyance client to input or provide at least one conveyance client preference to identify and preferably secure or obtain at least one preferred conveyance service offering. At least one improved process can allow at least one conveyance client to secure or obtain only at least one preferred conveyance service offering that can save at least one conveyance client from paying more money for at least one similar conveyance service when using at least one pricing preference. At least one conveyance client can use at least one heat map of the present invention to determine at least one area of elevated pricing around at least one real time or near real time geographical location of at least one conveyance client. If at least one conveyance client is in at least one area of elevated pricing, at least one conveyance client can visually determine at least one potential nearby area that does not have elevated pricing. At least one conveyance client can then have at least one option of walking to at least one area that does not have elevated pricing to request at least one conveyance service. As a result, at least one conveyance client can now pay much less for at least one similar conveyance service.

One benefit of the present invention can be at least one ability of at least one representative to operate or provide at least one conveyance service in at least one conveyance industry segment. Currently, at least one service provider does not have at least one ability to enable at least one representative to operate in at least one additional conveyance industry segment at the same time. The present invention can allow at least one representative to operate initially in at least one conveyance industry segment, then perform at least one conveyance service in at least one different conveyance industry segment, and then go back to operate in at least one first conveyance industry segment. The present invention can seamlessly allow at least one representative to transfer between at least one conveyance industry segment based on at least one representative preference.

One benefit of the present invention can be at least one ability of at least one conveyance client to analyze or evaluate and then secure or obtain at least one preferred conveyance service offering in at least one conveyance industry segment.

One benefit of the present invention can be that value can be added to the conveyance industry as a whole. At least one representative and at least one service provider can benefit from the present invention by increasing satisfaction of at least one representative and allowing at least one representative to identify and perform at least one preferred conveyance service based on at least one representative preference. At least one conveyance client can benefit from the present invention including but not limited to shorter wait times, higher quality of at least one conveyance service, more price transparency, or a combination thereof. Together, the present invention can improve at least one existing system and at least one existing method by adapting to the real time or near real time environment to enhance at least one conveyance industry segment for the better for all involved.

Detailed Description of Exemplary Aspects and Embodiments of the Present Invention I. System #1: Representative Maps A first aspect of the present invention includes a real time or near real time system to assist at least one representative in at least one process of securing or obtaining, within the conveyance industry, at least one preferred conveyance service request relating to at least one representative preference and at least one real time or near real time geographical location of said at least one representative by using at least one visual representation, including:

a) at least one external server; including:
   i) at least one computer processor;
   ii) at least one computer readable memory;
   iii) at least one network interface;
   iv) at least one real time or near real time source of a plurality of conveyance service requests;
   v) or a combination thereof;
b) at least one central server; including:
   i) at least one computer processor;
   ii) at least one computer readable memory;
   iii) at least one network interface;
   iv) or a combination thereof;
c) at least one terminal; including:
   at least one electronic computing device including:
      (i) at least one computer processor;
      (ii) at least one computer readable memory;
      (iii) at least one input source;
      (iv) at least one display;
      (v) at least one geographical location module;
      (vi) at least one network interface;
      (vii) or a combination thereof;
d) at least one application; comprising:
   i) at least one computer program being operable to display said at least one visual representation;
   ii) said at least one computer program being operable to secure or obtain said at least one preferred conveyance service request;
   iii) or a combination thereof;
e) at least one link; comprising:
   i) at least one electronic communication network channel;
   ii) at least one connection or at least one association with at least one software function or at least one software component;
   iii) or a combination thereof;
f) a plurality of conveyance service requests, including:
   at least one individual conveyance service request including:
      (i) at least one request for transporting at least one person, at least one good, at least one thing, or a combination thereof, from at least one geographical location to at least one other geographical location;
      (ii) said individual conveyance service request being updated in real time or near real time;
      (iii) qualitative and quantitative conveyance data corresponding to said individual conveyance service request;
      (iv) or a combination thereof;
g) a plurality of filtered conveyance service requests; including:
   i) at least one subset of all or some of said plurality of conveyance service requests that is at least one result of filtering all or some of said plurality of conveyance service requests using said at least one representative preference and at least one real time or near real time geographical location of said at least one representative;
   ii) all or some of said plurality of filtered conveyance service requests being updated in real time or near real time;
   iii) qualitative and quantitative conveyance data corresponding to individual filtered conveyance service requests;
   iv) or a combination thereof;
h) at least one preferred conveyance service request; including:
   i) at least one request for transporting said at least one person, said at least one good, said at least one thing, or a combination thereof, from at least one geographical location to at least one other geographical location that is identified from all or some of said plurality of filtered conveyance service requests;
   ii) said at least one preferred conveyance service request being updated in real time or near real time;
   iii) qualitative and quantitative conveyance data corresponding to an individual preferred conveyance service request;
   iv) or a combination thereof;
i) at least one representative; including:
   i) at least one person, at least one machine, or a combination thereof, that analyzes or evaluates said at least one visual representation and then secures or obtains said at least one preferred conveyance service request;
   ii) said at least one representative performs at least one conveyance service;
   iii) or a combination thereof;
j) at least one representative preference; including:
   i) at least one option selected or provided by said at least one representative that is used to filter all or some of said plurality of conveyance service requests into all or some of said plurality of filtered conveyance service requests;
   ii) said at least one representative preference being used to identify said at least one preferred conveyance service request;
   iii) or a combination thereof; and
k) at least one visual representation; including:
   at least one geographical map displaying all or some of said plurality of filtered conveyance service requests in conjunction with corresponding conveyance data, said at least one preferred conveyance service request in conjunction with corresponding conveyance data, said at least one representative preference, or a combination thereof;

wherein, all or some of said plurality of conveyance service requests are transmitted in real time or near real time between said at least one external server and said at least one central server by way of at least one link between said at least one external server and said at least one central server; further wherein, all or some of said plurality of filtered conveyance service requests in conjunction with corresponding conveyance data, said at least one preferred conveyance service request in conjunction with corresponding conveyance data, said at least one representative preference, said at least one real time or near real time geographical location of said at least one representative, or a combination thereof, is transmitted in real time or near real time between said at least one central server and said at least one application by way of at least one link between said at least one central server and said at least one application;

further wherein, said at least one application operates on said at least one terminal and said at least one representative uses said at least one application to analyze or evaluate said at least one visual representation of all or some of said plurality of filtered conveyance service requests in conjunction with corresponding conveyance data, said at least one preferred conveyance service request in conjunction with corresponding conveyance data, said at least one representative preference, or a combination thereof;

further wherein, said at least one representative uses said at least one application to analyze or evaluate said at least one visual representation and then secure or obtain said at least one preferred conveyance service request;

further wherein, said at least one external server is at least one real time or near real time source of all or some of said plurality of conveyance service requests transmitted in real time or near real time from said at least one external server to said at least one central server by way of at least one link between said at least one external server and said at least one central server; further wherein, all or some of said plurality of conveyance service requests are updated in real time or near real time;

further wherein, said at least one central server standardizes, aggregates, or a combination thereof, in real time or near real time, all or some of said plurality of conveyance service requests;

further wherein, said at least one central server filters in real time or near real time, all or some of said plurality of conveyance service requests by using said at least one representative preference and said at least one real time or near real time geographical location of said at least one representative, to identify all or some of said plurality of filtered conveyance service requests; further wherein, all or some of said plurality of filtered conveyance service requests are updated in real time or near real time;

further wherein, said at least one central server identifies in real time or near real time, said at least one preferred conveyance service request from all or some of said plurality of filtered conveyance service requests relating to said at least one representative preference; further wherein, said at least one preferred conveyance service request is updated in real time or near real time;

further wherein, said at least one central server transmits in real time or near real time, all or some of said plurality of filtered conveyance service requests in conjunction with corresponding conveyance data, said at least one preferred conveyance service request in conjunction with corresponding conveyance data, said at least one representative preference, or a combination thereof, to said at least one application by way of at least one link between said at least one central server and said at least one application;

further wherein, said at least one terminal facilitates or provides at least one input function, at least one display function, and operation of said at least one application and is used by said at least one representative to interface with said at least one application;

further wherein, said at least one terminal, said at least one application, said at least one central server, said at least one external server, at least one link, or a combination thereof, is combined or integrated;

further wherein, said at least one application compiles in real time or near real time, said at least one visual representation of all or some of said plurality of filtered conveyance service requests in conjunction with corresponding conveyance data, said at least one preferred conveyance service request in conjunction with corresponding conveyance data, said at least one representative preference, or a combination thereof;

further wherein, said at least one application displays, updated in real time or near real time, said at least one visual representation;

further wherein, said at least one representative uses said at least one application to analyze or evaluate said at least one visual representation and then secure or obtain said at least one preferred conveyance service request; and further wherein, said at least one representative performs said at least one conveyance service.

A. At Least One Central Server

An embodiment of the present invention includes, wherein at least one function of said at least one central server or said at least one external server is performed by said at least one application.

Another embodiment of the present invention includes, wherein said at least one central server is located on or associated with said at least one terminal.

A further embodiment of the present invention includes, wherein all or some of said plurality of conveyance service requests, said at least one real time or near real time geographical location of said at least one representative, or a combination thereof, is structured in at least one different format, and is standardized or converted into at least one uniform format.

An additional embodiment of the present invention includes, wherein all or some of said plurality of conveyance service requests are structured in at least one uniform format prior to being transmitted from said at least one external server to said at least one central server by way of at least one link between said at least one external server and said at least one central server, and are not standardized.

B. At Least One Application

An embodiment of the present invention includes, wherein said at least one application operates on said at least one central server.

Another embodiment of the present invention includes, wherein at least one function of said at least one application is performed by said at least one central server or said at least one external server.

C. Plurality of Conveyance Service Requests

An embodiment of the present invention includes, wherein all or some of said plurality of conveyance service requests in conjunction with corresponding conveyance data are sourced or provided by at least one service provider or at least one good supplier operating in at least one conveyance industry segment.

Another embodiment of the present invention includes, wherein all or some of said plurality of conveyance service requests includes at least one ride-hail service request, at least one ride-share service request, at least one car-share service request, at least one peer-to-peer conveyance service request, at least one transportation service request, at least one scooter service request, at least one bicycle service request, at least one person delivery service request, at least one taxi service request, at least one shuttle service request, at least one good delivery service request, at least one item delivery service request, at least one medical service and delivery request, at least one food delivery service request, at least one courier delivery service request, at least one freight delivery service request, at least one animal delivery service request, at least one delivery service request, or a combination thereof.

A further embodiment of the present invention includes, wherein said plurality of conveyance service requests is a single conveyance service request.

An additional embodiment of the present invention includes, wherein conveyance data includes at least one beginning service geographical location, at least one ending service geographical location, pricing information, elevated pricing information, at least one representative preference, at least one conveyance client preference, at least one distance parameter, at least one estimated time of arrival, at least one time to destination, at least one conveyance client geographical location, at least one conveyance client review, at least one conveyance client rating, at least one conveyance client detail, at least one conveyance service detail, at least one conveyance service route, at least one preferred conveyance client, at least one sensor data, at least one representative geographical location, at least one representative review, at least one representative rating, at least one representative detail, at least one autonomous vehicle, geographical location, at least one autonomous vehicle review, at least one autonomous vehicle rating, at least one autonomous vehicle detail, at least one preferred autonomous vehicle, at least one route planning preference, at least one fuel economy preference, at least one battery longevity preference, at least one vehicle capacity preference, at least one vehicle diagnostic preference, at least one conveyance data preference, at least one service provider geographical location, at least one service provider review, at least one service provider rating, at least one service provider detail, at least one preferred service provider, at least one good supplier geographical location, at least one good supplier review, at least one good supplier rating, at least one good supplier detail, at least one preferred good supplier, at least one owner or at least one controller of at least one autonomous vehicle geographical location, at least one owner or at least one controller of at least one autonomous vehicle review, at least one owner or at least one controller of at least one autonomous vehicle rating, at least one owner or at least one controller of at least one autonomous vehicle detail, at least one preferred owner or at least one preferred controller of at least one autonomous vehicle, at least one fleet manager geographical location, at least one fleet manager review, at least one fleet manager rating, at least one fleet manager detail, at least one preferred fleet manager, at least one logistics provider geographical location, at least one logistics provider review, at least one logistics provider rating, at least one logistics provider detail, at least one preferred logistics provider, at least one logistics supplier geographical location, at least one logistics supplier review, at least one logistics supplier rating, at least one logistics supplier detail, at least one preferred logistics supplier, at least one conveyance industry segment detail, at least one preferred conveyance industry segment, at least one good detail, at least one item detail, at least one type of vehicle detail, at least one vehicle detail, at least one measurement of at least one statistical variable, at least one level of service detail, at least one fuel consumption, at least one battery level, at least one vehicle diagnostic, at least one vehicle capacity, or a combination thereof.

D. Plurality of Filtered Conveyance Service Requests

An embodiment of the present invention includes, wherein all or some of said plurality of conveyance service requests are filtered relating to said at least one representative preference and said at least one real time or near real time geographical location of said at least one representative, to identify all or some of said plurality of filtered conveyance service requests by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

Another embodiment of the present invention includes, wherein said at least one preferred conveyance service request is identified from all or some of said plurality of filtered conveyance service requests relating to at least one weighted average of said at least one representative preference.

A further embodiment of the present invention includes, wherein at least one different geographical location is used other than said at least one real time or near real time geographical location of said at least one representative when filtering all or some of said plurality of conveyance service requests.

Another embodiment of the present invention includes, wherein said plurality of filtered conveyance service requests is a single filtered conveyance service request.

E. At Least One Preferred Conveyance Service Request

An embodiment of the present invention includes, wherein said at least one representative secures or obtains at least one said filtered conveyance service request other than said at least one preferred conveyance service request.

F. At Least One Representative Preference

An embodiment of the present invention includes, wherein said at least one representative preference includes at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one sensor preference, at least one event preference, at least one traffic based preference, at least one road condition preference, at least one weather condition preference, at least one transportation preference, at least one route planning preference, at least one fuel economy preference, at least one battery longevity preference, at least one vehicle capacity preference, at least one vehicle diagnostic preference, at least one conveyance data preference, at least one duration of conveyance service preference, at least one conveyance service request density preference, at least one conveyance client density preference, at least one conveyance client detail preference, at least one conveyance client rating preference, at least one representative density preference, at least one autonomous vehicle density preference, at least one service provider preference, at least one service provider density preference, at least one level of service preference, at least one good supplier preference, at least one good supplier density preference, at least one owner or at least one controller of at least one autonomous vehicle preference, at least one owner or at least one controller of at least one autonomous vehicle density preference, at least one fleet manager preference, at least one fleet manager density preference, at least one logistics provider preference, at least one logistics provider density preference, at least one logistics supplier preference, at least one logistics supplier density preference, at least one good detail preference, at least one conveyance industry segment preference, at least one freight preference, at least one waypoint preference, at least one delivery service preference, at least one oldest outstanding request preference, or a combination thereof.

G. At Least One Visual Representation

An embodiment of the present invention includes, wherein said at least one visual representation is compiled on said at least one central server and transmitted to said at least one application by way of at least one link between said at least one central server and said at least one application.

Another embodiment of the present invention includes, wherein said at least one visual representation includes at least one dynamic map, at least one heat map, or a combination thereof.

Another embodiment of the present invention includes, wherein said at least one representative utilizes said at least one visual representation to secure or obtain said at least one preferred conveyance service request in real time or near real time, related to said at least one representative preference, said at least one real time or near real time geographical location of said at least one representative, or a combination thereof.

Another embodiment of the present invention includes, wherein said at least one representative preference is displayed as at least one icon or at least one visual with or on said at least one visual representation, to allow said at least one representative to analyze or evaluate all or some of said plurality of filtered conveyance service requests in conjunction with corresponding conveyance data, said at least one preferred conveyance service request in conjunction with corresponding conveyance data, or a combination thereof, and secure or obtain said at least one preferred conveyance service request relating to at least one service provider or at least one good supplier operating in at least one conveyance industry segment.

Another embodiment of the present invention includes, wherein said at least one preferred conveyance service request, said at least one representative preference, or a combination thereof, is displayed in at least one visually identifiable format compared to all or some of said plurality of filtered conveyance service requests relating to at least one service provider or at least one good supplier operating in at least one conveyance industry segment.

An additional embodiment of the present invention includes, wherein said at least one dynamic map includes said at least one geographical map that displays in real time or near real time, all or some of said plurality of filtered conveyance service requests in conjunction with corresponding conveyance data, said at least one preferred conveyance service request in conjunction with corresponding conveyance data, said at least one representative preference, or a combination thereof.

Another embodiment of the present invention includes, wherein all or some of said plurality of filtered conveyance service requests, said at least one preferred conveyance service request, said at least one representative preference, or a combination thereof, relating to at least one service provider or at least one good supplier operating in at least one conveyance industry segment, is displayed individually as at least one mobile or transitory icon or at least one mobile or transitory visual and updates or changes in real time or near real time.

Another embodiment of the present invention includes, wherein all or some of said plurality of filtered conveyance service requests, said at least one preferred conveyance service request, said at least one representative preference, or a combination thereof, relating to at least one individual service provider or at least one individual good supplier operating in at least one conveyance industry segment, is displayed as at least one distinguishable icon or at least one distinguishable visual and updates or changes in real time or near real time.

Another embodiment of the present invention includes, wherein all or some of said plurality of filtered conveyance service requests, said at least one preferred conveyance service request, said at least one representative preference, or a combination thereof, relating to at least one individual service provider or at least one individual good supplier operating in at least one conveyance industry segment, is displayed as at least one icon or at least one visual and updates or changes in real time or near real time.

Another embodiment of the present invention includes, wherein all or some of said plurality of filtered conveyance service requests, said at least one preferred conveyance service request, said at least one representative preference, or a combination thereof, relating to at least one individual service provider or at least one individual good supplier is displayed as or with at least one different icon, at least one different symbol, at least one different color, at least one different shading, at least one different pattern, at least one different visual, or a combination thereof.

Another embodiment of the present invention includes, wherein all or some of said plurality of filtered conveyance service requests, said at least one preferred conveyance service request, said at least one representative preference, or a combination thereof, relating to at least one individual service provider or at least one individual good supplier is displayed as or with at least one similar icon, at least one similar symbol, at least one similar color, at least one similar shading, at least one similar pattern, at least one similar visual, or a combination thereof.

Another embodiment of the present invention includes, wherein said at least one representative updates, modifies, or changes said at least one representative preference and said at least one dynamic map displays in real time or near real time, all or some of said plurality of filtered conveyance service requests in conjunction with corresponding conveyance data, said at least one preferred conveyance service request in conjunction with corresponding conveyance data, said at least one representative preference, or a combination thereof, based on the updated, modified, or changed said at least one representative preference.

A further embodiment of the present invention includes, wherein said at least one heat map includes said at least one geographical map that displays at least one visual depiction of at least one statistical variable of:
  all or some of said plurality of conveyance service requests in conjunction with corresponding conveyance data;
  all or some of said plurality of filtered conveyance service requests in conjunction with corresponding conveyance data;
  all or some of said at least one preferred conveyance service request in conjunction with corresponding conveyance data;
  said at least one representative preference; or
  a combination thereof.

An additional embodiment of the present invention includes, wherein said at least one statistical variable includes at least one measurement of conveyance service availability, pricing, elevated pricing, conveyance service request density, filtered conveyance service request density, preferred conveyance service request density, level of service density, at least one conveyance service distance, at least one estimated time of arrival, preferred conveyance client density, preferred good supplier density, at least one preferred conveyance industry segment, conveyance industry segment density, representative density, conveyance client density, service provider density, good supplier density, or a combination thereof.

An embodiment of the present invention includes, wherein at least one area of said at least one heat map is distinguished in proportion to at least one measurement of said at least one statistical variable and displayed as having at least one distinguishable hue, at least one distinguishable shade, at least one distinguishable saturation, at least one distinguishable opacity, at least one distinguishable color, at least one distinguishable value of color, at least one distinguishable pattern, at least one distinguishable hatch fill, at least one distinguishable fill, at least one distinguishable shape, at least one distinguishable image, at least one distinguishable animation, or a combination thereof.

Another embodiment of the present invention includes, wherein said at least one preferred conveyance service request is not identified prior to compiling said at least one heat map, at least one real time or near real time heat map, at least one historical heat map, at least one predictive heat map, or a combination thereof.

A further embodiment of the present invention includes, wherein at least one real time or near real time heat map is compiled from said at least one statistical variable of all or some of said plurality of conveyance service requests in conjunction with corresponding conveyance data, all or some of said plurality of filtered conveyance service requests in conjunction with corresponding conveyance data, all or some of said at least one preferred conveyance service request in conjunction with corresponding conveyance data, said at least one representative preference, or a combination thereof.

An additional embodiment of the present invention includes, wherein at least one historical heat map is compiled from said at least one statistical variable of all or some of past said plurality of conveyance service requests in conjunction with corresponding conveyance data, all or some of past said plurality of filtered conveyance service requests in conjunction with corresponding conveyance data, all or some of past said at least one preferred conveyance service request in conjunction with corresponding conveyance data, said at least one representative preference, or a combination thereof.

An embodiment of the present invention includes, wherein at least one predictive heat map is compiled from said at least one statistical variable of all or some of past said plurality of conveyance service requests in conjunction with corresponding conveyance data, all or some of past said plurality of filtered conveyance service requests in conjunction with corresponding conveyance data, all or some of past said at least one preferred conveyance service request in conjunction with corresponding conveyance data, all or some of said plurality of conveyance service requests in conjunction with corresponding conveyance data, all or some of said plurality of filtered conveyance service requests in conjunction with corresponding conveyance data, all or some of said at least one preferred conveyance service request in conjunction with corresponding conveyance data, said at least one representative preference, or a combination thereof.

An embodiment of the present invention includes, wherein said at least one predictive heat map identifies or estimates at least one of future conveyance service availability, future pricing, future elevated pricing, future conveyance service request density, future filtered conveyance service request density, future preferred conveyance service request density, future level of service density, future conveyance industry segment density, future representative density, future conveyance client density, future service provider density, future good supplier density, future level of service demand, future conveyance industry segment demand, future conveyance service demand, future service provider demand, future good supplier demand, future conveyance service supply, future representative supply, or a combination thereof.

An embodiment of the present invention includes, wherein said at least one predictive heat map generates at least one visual notification or at least one audio notification to notify said at least one representative of at least one future change or update to said at least one statistical variable, said at least one measurement of said at least one statistical variable, or a combination thereof.

H. Functionality

An embodiment of the present invention includes, wherein said at least one representative, said at least one central server, said at least one application, or a combination thereof, secures or obtains said at least one preferred conveyance service request in at least one conveyance industry segment.

Another embodiment of the present invention includes, wherein said at least one representative secures or obtains more than one said preferred conveyance service requests concurrently.

A further embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of subsequent or additional said plurality of filtered conveyance service requests in conjunction with corresponding conveyance data, all or some of subsequent or additional said at least one preferred conveyance service request in conjunction with corresponding conveyance data, all or some of said at least one real time or near real time geographical location of said at least one representative, said at least one representative preference, said at least one beginning service geographical location, said at least one ending service geographical location, or a combination thereof, is identified or updated in real time or near real time as said at least one real time or near real time geographical location of said at least one representative updates or changes or as traffic information updates or changes.

An embodiment of the present invention includes, wherein said at least one visual representation is displayed on at least one remote display.

Another embodiment of the present invention includes, wherein said at least one representative browses or navigates at least one area of said at least one visual representation to identify and then secure or obtain said at least one preferred conveyance service request or at least one said filtered conveyance service request by selecting or accepting said at least one preferred conveyance service request, at least one said filtered conveyance service request, said at least one representative preference, or a combination thereof.

Another embodiment of the present invention includes, wherein said at least one application, said at least one terminal, said at least one central server, said at least one external server, at least one link, or a combination thereof, is combined or integrated.

Another embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of said at least one real time or near real time geographical location of said at least one representative, said at least one representative preference, all or some of subsequent or additional said plurality of filtered conveyance service requests in conjunction with corresponding conveyance data, all or some of subsequent or additional said at least one preferred conveyance service request in conjunction with corresponding conveyance data, at least one secured or obtained preferred conveyance service request, said at least one beginning service geographical location, said at least one ending service geographical location, or a combination thereof, is transmitted in real time or near real time between said at least one application and said at least one central server and updated in real time or near real time by way of at least one link between said at least one application and said at least one central server.

Another embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of said at least one real time or near real time geographical location of said at least one representative, said at least one representative preference, all or some of subsequent or additional said plurality of filtered conveyance service requests in conjunction with corresponding conveyance data, all or some of subsequent or additional said at least one preferred conveyance service request in conjunction with corresponding conveyance data, at least one secured or obtained preferred conveyance service request, said at least one beginning service geographical location, said at least one ending service geographical location, or a combination thereof, is transmitted in real time or near real time between said at least one application and said at least one external server and updated in real time or near real time by way of at least one link between said at least one application and said at least one external server.

Another embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of said at least one real time or near real time geographical location of said at least one representative, said at least one representative preference, all or some of subsequent or additional said plurality of filtered conveyance service requests in conjunction with corresponding conveyance data, all or some of subsequent or additional said at least one preferred conveyance service request in conjunction with corresponding conveyance data, at least one secured or obtained preferred conveyance service request, said at least one beginning service geographical location, said at least one ending service geographical location, or a combination thereof, is transmitted in real time or near real time between said at least one central server and said at least one external server and updated in real time or near real time by way of at least one link between said at least one central server and said at least one external server.

II. Method #1: Representative Maps

A second aspect of the present invention includes a real time or near real time method to assist at least one representative in at least one process of securing or obtaining, within the conveyance industry, at least one preferred conveyance service request relating to at least one representative preference and at least one real time or near real time geographical location of said at least one representative by using at least one visual representation, the method including:

a) providing any system of section I above;
b) receiving in real time or near real time, at said at least one central server, all or some of said plurality of conveyance service requests from said at least one external server by way of at least one link between said at least one central server and said at least one external server;
c) storing in real time or near real time, all or some of said plurality of conveyance service requests in said at least one computer readable memory of said at least one central server;
d) standardizing in real time or near real time, all or some of said plurality of conveyance service requests using said at least one central server;
e) aggregating in real time or near real time, all or some of said plurality of conveyance service requests using said at least one central server;
f) transmitting in real time or near real time, said at least one representative preference and said at least one real time or near real time geographical location of said at least one representative from said at least one application to said at least one central server by way of at least one link between said at least one application and said at least one central server, wherein:
   i) said at least one representative, using said at least one input source of said at least one terminal, inputs or provides said at least one representative preference into said at least one application;
   ii) said at least one application provides said at least one real time or near real time geographical location of said at least one representative using said at least one geographical location module of said at least one terminal;
   iii) or a combination thereof;
g) receiving in real time or near real time, said at least one representative preference and said at least one real time or near real time geographical location of said at least one representative at said at least one central server from said at least one application by way of at least one link between said at least one central server and said at least one application;
h) filtering in real time or near real time, at said at least one central server, all or some of said plurality of conveyance service requests by using said at least one representative preference and said at least one real time or near real time geographical location of said at least one representative, to identify all or some of said plurality of filtered conveyance service requests;
i) identifying in real time or near real time, at said at least one central server, said at least one preferred conveyance service request from all or some of said plurality of filtered conveyance service requests relating to said at least one representative preference;
j) transmitting in real time or near real time, all or some of said plurality of filtered conveyance service requests in conjunction with corresponding conveyance data, said at least one preferred conveyance service request in conjunction with corresponding conveyance data, or a combination thereof, from said at least one central server to said at least one application by way of at least one link between said at least one central server and said at least one application;
k) receiving in real time or near real time, all or some of said plurality of filtered conveyance service requests in conjunction with corresponding conveyance data, said at least one preferred conveyance service request in conjunction with corresponding conveyance data, or a combination thereof, at said at least one application from said at least one central server by way of at least one link between said at least one application and said at least one central server;

l) compiling in real time or near real time, at said at least one application, said at least one visual representation in digital form, wherein:
  i) said at least one geographical map relating to said at least one real time or near real time geographical location of said at least one representative is provided on said at least one application;
  ii) all or some of said plurality of filtered conveyance service requests in conjunction with corresponding conveyance data, said at least one preferred conveyance service request in conjunction with corresponding conveyance data, or a combination thereof, is positioned on said at least one geographical map relating to at least one corresponding geographical location contained therein;
  iii) said at least one visual representation is updated in real time or near real time with all or some of subsequent or additional said plurality of filtered conveyance service requests in conjunction with corresponding conveyance data, subsequent or additional said at least one preferred conveyance service request in conjunction with corresponding conveyance data, or a combination thereof;
  iv) or a combination thereof;

m) displaying in real time or near real time, said at least one visual representation on said at least one application using said at least one display of said at least one terminal; and n) wherein said at least one representative analyzes or evaluates said at least one visual representation to secure or obtain said at least one preferred conveyance service request and then said at least one representative performs said at least one conveyance service.

A. Standardizing Plurality of Conveyance Service Requests

An embodiment of the present invention includes, wherein all or some of said plurality of conveyance service requests, said at least one real time or near real time geographical location of said at least one representative, or a combination thereof, is structured in at least one different format, and is standardized or converted into at least one uniform format.

Another embodiment of the present invention includes, wherein all or some of said plurality of conveyance service requests are structured in at least one uniform format prior to being transmitted from said at least one external server to said at least one central server by way of at least one link between said at least one external server and said at least one central server, and are not standardized.

A further embodiment of the present invention includes, wherein steps C-G can be in any order prior to filtering all or some of said plurality of conveyance service requests.

B. Transmitting at Least One Representative Preference and at Least One Geographical Location An embodiment of the present invention includes, wherein said at least one representative preference, once inputted or provided into said at least one application, is stored or cached on said at least one application, said at least one computer readable memory of said at least one central server, or a combination thereof, and said at least one representative preference is not inputted or provided again into said at least one application by said at least one representative.

Another embodiment of the present invention includes, wherein said at least one representative preference is stored or cached in said at least one computer readable memory of said at least one central server and said at least one representative preference is not transmitted again from said at least one application to said at least one central server.

A further embodiment of the present invention includes, wherein said at least one representative preference, said at least one real time or near real time geographical location of said at least one representative, or a combination thereof, is transmitted from said at least one application to said at least one central server at any time prior to filtering all or some of said plurality of conveyance service requests.

C. Filtering Plurality of Conveyance Service Requests

An embodiment of the present invention includes, wherein all or some of said plurality of conveyance service requests are filtered relating to said at least one representative preference and said at least one real time or near real time geographical location of said at least one representative, to identify all or some of said plurality of filtered conveyance service requests by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

Another embodiment of the present invention includes, wherein all or some of said plurality of conveyance service requests are filtered in real time or near real time and said at least one preferred conveyance service request is identified in real time or near real time from all or some of said plurality of filtered conveyance service requests on said at least one application by:
  a) transmitting in real time or near real time, all or some of said plurality of conveyance service requests from said at least one central server to said at least one application by way of at least one link between said at least one central server and said at least one application;
  b) filtering in real time or near real time, all or some of said plurality of conveyance service requests by using said at least one representative preference and said at least one real time or near real time geographical location of said at least one representative, to identify all or some of said plurality of filtered conveyance service requests; and
  c) identifying in real time or near real time, said at least one preferred conveyance service request from all or some of said plurality of filtered conveyance service requests relating to said at least one representative preference.

A further embodiment of the present invention includes, wherein at least one different geographical location is used other than said at least one real time or near real time geographical location of said at least one representative when filtering all or some of said plurality of conveyance service requests.

D. Identifying at Least One Preferred Conveyance Service Request

An embodiment of the present invention includes, wherein said at least one preferred conveyance service request relating to said at least one representative preference is identified from all or some of said plurality of filtered conveyance service requests by using at least one sorting algorithm, at least one selection algorithm, at least one search algorithm, at least one merge algorithm, at least one maximum function, at least one minimum function, at least one graph algorithm, at least one graph search algorithm, at least one tree algorithm, at least one tree search algorithm, at least one matrix calculation, at least one matrix algorithm, at least one comparison, or a combination thereof.

Another embodiment of the present invention includes, wherein said at least one preferred conveyance service request is identified from all or some of said plurality of filtered conveyance service requests relating to at least one weighted average of said at least one representative preference.

A further embodiment of the present invention includes, wherein said at least one preferred conveyance service request is identified in real time or near real time from all or some of said plurality of filtered conveyance service requests on said at least one application by:
  a) transmitting in real time or near real time, all or some of said plurality of filtered conveyance service requests from said at least one central server to said at least one application by way of at least one link between said at least one central server and said at least one application; and
  b) identifying in real time or near real time, said at least one preferred conveyance service request from all or some of said plurality of filtered conveyance service requests relating to said at least one representative preference.

E. Compiling at Least One Visual Representation

An embodiment of the present invention includes, wherein said at least one visual representation is compiled on said at least one central server and transmitted to said at least one application by way of at least one link between said at least one central server and said at least one application.

F. Displaying at Least One Visual Representation

An embodiment of the present invention includes, wherein said at least one visual representation is displayed on at least one remote display.

Another embodiment of the present invention includes, wherein said at least one visual representation includes at least one dynamic map, at least one heat map, or a combination thereof.

Another embodiment of the present invention includes, wherein said at least one representative utilizes said at least one visual representation to secure or obtain said at least one preferred conveyance service request in real time or near real time, related to said at least one representative preference, said at least one real time or near real time geographical location of said at least one representative, or a combination thereof.

Another embodiment of the present invention includes, wherein said at least one representative preference is displayed as at least one icon or at least one visual with or on said at least one visual representation, to allow said at least one representative to analyze or evaluate all or some of said plurality of filtered conveyance service requests in conjunction with corresponding conveyance data, said at least one preferred conveyance service request in conjunction with corresponding conveyance data, or a combination thereof, and secure or obtain said at least one preferred conveyance service request relating to at least one service provider or at least one good supplier operating in at least one conveyance industry segment.

Another embodiment of the present invention includes, wherein said at least one preferred conveyance service request, said at least one representative preference, or a combination thereof, is displayed in at least one visually identifiable format compared to all or some of said plurality of filtered conveyance service requests relating to at least one service provider or at least one good supplier operating in at least one conveyance industry segment.

An additional embodiment of the present invention includes, wherein said at least one dynamic map includes said at least one geographical map that displays in real time or near real time, all or some of said plurality of filtered conveyance service requests in conjunction with corresponding conveyance data, said at least one preferred conveyance service request in conjunction with corresponding conveyance data, said at least one representative preference, or a combination thereof.

A further embodiment of the present invention includes, wherein all or some of said plurality of filtered conveyance service requests, said at least one preferred conveyance service request, said at least one representative preference, or a combination thereof, relating to at least one service provider or at least one good supplier operating in at least one conveyance industry segment, is displayed individually as at least one mobile or transitory icon or at least one mobile or transitory visual and updates or changes in real time or near real time.

A further embodiment of the present invention includes, wherein all or some of said plurality of filtered conveyance service requests, said at least one preferred conveyance service request, said at least one representative preference, or a combination thereof, relating to at least one individual service provider or at least one individual good supplier operating in at least one conveyance industry segment, is displayed as at least one distinguishable icon or at least one distinguishable visual and updates or changes in real time or near real time.

A further embodiment of the present invention includes, wherein all or some of said plurality of filtered conveyance service requests, said at least one preferred conveyance service request, said at least one representative preference, or a combination thereof, relating to at least one individual service provider or at least one individual good supplier operating in at least one conveyance industry segment, is displayed as at least one icon or at least one visual and updates or changes in real time or near real time.

A further embodiment of the present invention includes, wherein all or some of said plurality of filtered conveyance service requests, said at least one preferred conveyance service request, said at least one representative preference, or a combination thereof, relating to at least one individual service provider or at least one individual good supplier is displayed as or with at least one different icon, at least one different symbol, at least one different color, at least one different shading, at least one different pattern, at least one different visual, or a combination thereof.

A further embodiment of the present invention includes, wherein all or some of said plurality of filtered conveyance service requests, said at least one preferred conveyance service request, said at least one representative preference, or a combination thereof, relating to at least one individual service provider or at least one individual good supplier is displayed as or with at least one similar icon, at least one similar symbol, at least one similar color, at least one similar shading, at least one similar pattern, at least one similar visual, or a combination thereof.

A further embodiment of the present invention includes, wherein said at least one representative updates, modifies, or changes said at least one representative preference and said at least, one dynamic map displays in real time or near real time, all or some of said plurality of filtered conveyance service requests in conjunction with corresponding conveyance data, said at least one preferred conveyance service request in conjunction with corresponding conveyance data, said at least one representative preference, or a combination thereof, based on the updated, modified, or changed said at least one representative preference.

An additional embodiment of the present invention includes, wherein said at least one heat map includes said at least one geographical map that displays at least one visual depiction of at least one statistical variable of:
- all or some of said plurality of conveyance service requests in conjunction with corresponding conveyance data;
- all or some of said plurality of filtered conveyance service requests in conjunction with corresponding conveyance data;
- all or some of said at least one preferred conveyance service request in conjunction with corresponding conveyance data;
- said at least one representative preference; or
- a combination thereof.

An embodiment of the present invention includes, wherein said at least one statistical variable includes at least one measurement of conveyance service availability, pricing, elevated pricing, conveyance service request density, filtered conveyance service request density, preferred conveyance service request density, level of service density, at least one conveyance service distance, at least one estimated time of arrival, preferred conveyance client density, preferred good supplier density, at least one preferred conveyance industry segment, conveyance industry segment density, representative density, conveyance client density, service provider density, good supplier density, or a combination thereof.

Another embodiment of the present invention includes, wherein at least one area of said at least one heat map is distinguished in proportion to at least one measurement of said at least one statistical variable and displayed as having at least one distinguishable hue, at least one distinguishable shade, at least one distinguishable saturation, at least one distinguishable opacity, at least one distinguishable color, at least one distinguishable value of color, at least one distinguishable pattern, at least one distinguishable hatch fill, at least one distinguishable fill, at least one distinguishable shape, at least one distinguishable image, at least one distinguishable animation, or a combination thereof.

A further embodiment of the present invention includes, wherein said at least one preferred conveyance service request is not identified prior to compiling said at least one heat map, at least one real time or near real time heat map, at least one historical heat map, at least one predictive heat map, or a combination thereof.

Another embodiment of the present invention includes, wherein at least one real time or near real time heat map is compiled from said at least one statistical variable of all or some of said plurality of conveyance service requests in conjunction with corresponding conveyance data, all or some of said plurality of filtered conveyance service requests in conjunction with corresponding conveyance data, all or some of said at least one preferred conveyance service request in conjunction with corresponding conveyance data, said at least one representative preference, or a combination thereof.

An embodiment of the present invention includes, wherein at least one historical heat map is compiled from said at least one statistical variable of all or some of past said plurality of conveyance service requests in conjunction with corresponding conveyance data, all or some of past said plurality of filtered conveyance service requests in conjunction with corresponding conveyance data, all or some of past said at least one preferred conveyance service request in conjunction with corresponding conveyance data, said at least one representative preference, or a combination thereof.

Another embodiment of the present invention includes, wherein at least one predictive heat map is compiled from said at least one statistical variable of all or some of past said plurality of conveyance service requests in conjunction with corresponding conveyance data, all or some of past said plurality of filtered conveyance service requests in conjunction with corresponding conveyance data, all or some of past said at least one preferred conveyance service request in conjunction with corresponding conveyance data, all or some of said plurality of conveyance service requests in conjunction with corresponding conveyance data, all or some of said plurality of filtered conveyance service requests in conjunction with corresponding conveyance data, all or some of said at least one preferred conveyance service request in conjunction with corresponding conveyance data, said at least one representative preference, or a combination thereof.

A further embodiment of the present invention includes, wherein said at least one predictive heat map identifies or estimates at least one of future conveyance service availability, future pricing, future elevated pricing, future conveyance service request density, future filtered conveyance service request density, future preferred conveyance service request density, future level of service density, future conveyance industry segment density, future representative density, future conveyance client density, future service provider density, future good supplier density, future level of service demand, future conveyance industry segment demand, future conveyance service demand, future service provider demand, future good supplier demand, future conveyance service supply, future representative supply, or a combination thereof.

An additional embodiment of the present invention includes, wherein said at least one predictive heat map generates at least one visual notification or at least one audio notification to notify said at least one representative of at least one future change or update to said at least one statistical variable, said at least one measurement of said at least one statistical variable, or a combination thereof.

G. Additional Embodiments

An embodiment of the present invention includes, wherein at least one function of said at least one central server or said at least one external server is performed by said at least one application.

Another embodiment of the present invention includes, wherein said at least one application operates on said at least one central server.

A further embodiment of the present invention includes, wherein at least one function of said at least one application is performed by said at least one central server or said at least one external server.

An additional embodiment of the present invention includes, wherein said at least one representative, said at least one central server, said at least one application, or a combination thereof, secures or obtains said at least one preferred conveyance service request in at least one conveyance industry segment.

An embodiment of the present invention includes, wherein all or some of said plurality of conveyance service requests in conjunction with corresponding conveyance data are sourced or provided by at least one service provider or at least one good supplier operating in at least one conveyance industry segment.

Another embodiment of the present invention includes, wherein said at least one representative secures or obtains more than one said preferred conveyance service requests concurrently.

A further embodiment of the present invention includes, wherein said at least one representative secures or obtains at least one said filtered conveyance service request other than said at least one preferred conveyance service request.

An additional embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of subsequent or additional said plurality of filtered conveyance service requests in conjunction with corresponding conveyance data, all or some of subsequent or additional said at least one preferred conveyance service request in conjunction with corresponding conveyance data, all or some of said at least one real time or near real time geographical location of said at least one representative, said at least one representative preference, said at least one beginning service geographical location, said at least one ending service geographical location, or a combination thereof, is identified or updated in real time or near real time as said at least one real time or near real time geographical location of said at least one representative updates or changes or as traffic information updates or changes.

An embodiment of the present invention includes, wherein said plurality of conveyance service requests is a single conveyance service request.

Another embodiment of the present invention includes, wherein said plurality of filtered conveyance service requests is a single filtered conveyance service request.

A further embodiment of the present invention includes, wherein said at least one representative browses or navigates at least one area of said at least one visual representation to identify and then secure or obtain said at least one preferred conveyance service request or at least one said filtered conveyance service request by selecting or accepting said at least one preferred conveyance service request, at least one said filtered conveyance service request, said at least one representative preference, or a combination thereof.

Another embodiment of the present invention includes, wherein said at least one central server is located on or associated with said at least one terminal.

Another embodiment of the present invention includes, wherein said at least one application, said at least one terminal, said at least one central server, said at least one external server, at least one link, or a combination thereof, is combined or integrated.

Another embodiment of the present invention includes, wherein said at least one beginning service geographical location, said at least one ending service geographical location, said at least one representative preference, or a combination thereof, is provided prior to receiving all or some of said plurality of conveyance service requests on or at said at least one central server.

Another embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of said at least one real time or near real time geographical location of said at least one representative, said at least one representative preference, all or some of subsequent or additional said plurality of filtered conveyance service requests in conjunction with corresponding conveyance data, all or some of subsequent or additional said at least one preferred conveyance service request in conjunction with corresponding conveyance data, at least one secured or obtained preferred conveyance service request, said at least one beginning service geographical location, said at least one ending service geographical location, or a combination thereof, is transmitted in real time or near real time between said at least one application and said at least one central server and updated in real time or near real time by way of at least one link between said at least one application and said at least one central server.

Another embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of said at least one real time or near real time geographical location of said at least one representative, said at least one representative preference, all or some of subsequent or additional said plurality of filtered conveyance service requests in conjunction with corresponding conveyance data, all or some of subsequent or additional said at least one preferred conveyance service request in conjunction with corresponding conveyance data, at least one secured or obtained preferred conveyance service request, said at least one beginning service geographical location, said at least one ending service geographical location, or a combination thereof, is transmitted in real time or near real time between said at least one application and said at least one external server and updated in real time or near real time by way of at least one link between said at least one application and said at least one external server.

Another embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of said at least one real time or near real time geographical location of said at least one representative, said at least one representative preference, all or some of subsequent or additional said plurality of filtered conveyance service requests in conjunction with corresponding conveyance data, all or some of subsequent or additional said at least one preferred conveyance service request in conjunction with corresponding conveyance data, at least one secured or obtained preferred conveyance service request, said at least one beginning service geographical location, said at least one ending service geographical location, or a combination thereof, is transmitted in real time or near real time between said at least one central server and said at least one external server and updated in real time or near real time by way of at least one link between said at least one central server and said at least one external server.

III. System #2: Conveyance Client Maps

A third aspect of the present invention includes a real time or near real time system to assist at least one conveyance client in at least one process of securing or obtaining, within the conveyance industry, at least one preferred conveyance service offering relating to at least one conveyance client preference and at least one real time or near real time geographical location of said at least one conveyance client by using at least one visual representation, including:

a) at least one external server; including:
   i) at least one computer processor;
   ii) at least one computer readable memory;
   iii) at least one network interface;
   iv) at least one real time or near real time source of a plurality of conveyance service offerings;
   v) or a combination thereof;
b) at least one central server; including:
   i) at least one computer processor;
   ii) at least one computer readable memory;
   iii) at least one network interface;
   iv) or a combination thereof;
c) at least one terminal; including:
   at least one electronic computing device including:
      (i) at least one computer processor;
      (ii) at least one computer readable memory;
      (iii) at least one input source;
      (iv) at least one display;
      (v) at least one geographical location module;
      (vi) at least one network interface;
      (vii) or a combination thereof;
d) at least one application; including:
   i) at least one computer program being operable to display said at least one visual representation;
   ii) said at least one computer program being operable to secure or obtain said at least one preferred conveyance service offering;
   iii) or a combination thereof;
e) at least one link; including:
   i) at least one electronic communication network channel;
   ii) at least one connection or at least one association with at least one software function or at least one software component;
   iii) or a combination thereof;
f) a plurality of conveyance service offerings, including:
   at least one individual conveyance service offering including:
      (i) at least one offering for transporting at least one person, at least one good, at least one thing, or a combination thereof, from at least one geographical location to at least one other geographical location;
      (ii) said individual conveyance service offering being updated in real time or near real time;
      (iii) qualitative and quantitative conveyance data corresponding to said individual conveyance service offering;
      (iv) or a combination thereof;
g) a plurality of filtered conveyance service offerings; including:
   i) at least one subset of all or some of said plurality of conveyance service offerings that is at least one result of filtering all or some of said plurality of conveyance service offerings using said at least one conveyance client preference and said at least one real time or near real time geographical location of said at least one conveyance client;
   ii) all or some of said plurality of filtered conveyance service offerings being updated in real time or near real time;
   iii) qualitative and quantitative conveyance data corresponding to individual filtered conveyance service offerings;
   iv) or a combination thereof;
h) at least one preferred conveyance service offering; including:
   i) at least one offering for transporting said at least one person, said at least one good, said at least one thing, or a combination thereof, from at least one geographical location to at least one other geographical location that is identified from all or some of said plurality of filtered conveyance service offerings;
   ii) said at least one preferred conveyance service offering being updated in real time or near real time;
   iii) qualitative and quantitative conveyance data corresponding to an individual preferred conveyance service offering;
   iv) or a combination thereof;
i) at least one conveyance client; including:
   i) at least one person, at least one machine, or a combination thereof, that analyzes or evaluates said at least one visual representation and then secures or obtains said at least one preferred conveyance service offering;
   ii) said at least one conveyance client receives at least one conveyance service;
   iii) or a combination thereof;
j) at least one conveyance client preference; including:
   i) at least one option selected or provided by said at least one conveyance client that is used to filter all or some of said plurality of conveyance service offerings into all or some of said plurality of filtered conveyance service offerings;
   ii) said at least one conveyance client preference being used to identify said at least one preferred conveyance service offering;
   iii) or a combination thereof; and
k) at least one visual representation; including:
   at least one geographical map displaying all or some of said plurality of filtered conveyance service offerings in conjunction with corresponding conveyance data, said at least one preferred conveyance service offering in conjunction with corresponding conveyance data, said at least one conveyance client preference, or a combination thereof;

wherein, at least one beginning service geographical location and at least one ending service geographical location are inputted or provided to said at least one application to be transmitted in real time or near real time to said at least one central server by way of at least one link between said at least one application and said at least one central server;

further wherein, said at least one beginning service geographical location and said at least one ending service geographical location are transmitted in real time or near real time from said at least one central server to said at least one external server by way of at least one link between said at least one central server and said at least one external server;

further wherein, all or some of said plurality of conveyance service offerings are transmitted in real time or near real time between said at least one external server and said at least one central server by way of at least one link between said at least one external server and said at least one central server;

further wherein, all or some of said plurality of filtered conveyance service offerings in conjunction with corresponding conveyance data, said at least one preferred conveyance service offering in conjunction with corresponding conveyance data, said at least one conveyance client preference, said at least one real time or near real time geographical location of said at least one conveyance client, or a combination thereof, is transmitted in real time or near real time between said at least one central server and said at least one application by way of at least one link between said at least one central server and said at least one application;

further wherein said at least one application operates on said at least one terminal and said at least one conveyance client uses said at least one application to analyze or evaluate said at least one visual representation of all or some of said plurality of filtered conveyance service offerings in conjunction with corresponding conveyance data, said at least one preferred conveyance service offering in conjunction with corresponding conveyance data, or a combination thereof;

further wherein, said at least one conveyance client uses said at least one application to analyze or evaluate said at least one visual representation and then secure or obtain said at least one preferred conveyance service offering;

further wherein, said at least one external server is at least one real time or near real time source of all or some of said plurality of conveyance service offerings transmitted in real time or near real time from said at least one external server to said at least one central server by way of at least one link between said at least one external server and said at least one central server; further wherein, all or some of said plurality of conveyance service offerings are updated in real time or near real time;

further wherein, said at least one central server standardizes, aggregates, or a combination thereof, in real time or near real time, all or some of said plurality of conveyance service offerings;

further wherein, said at least one central server filters in real time or near real time, all or some of said plurality of conveyance service offerings by using said at least one conveyance client preference and said at least one real time or near real time geographical location of said at least one conveyance client, to identify all or some of said plurality of filtered conveyance service offerings;

further wherein, all or some of said plurality of filtered conveyance service offerings are updated in real time or near real time;

further wherein, said at least one central server identifies in real time or near real time, said at least one preferred conveyance service offering from all or some of said plurality of filtered conveyance service offerings relating to said at least one conveyance client preference; further wherein, said at least one preferred conveyance service offering is updated in real time or near real time;

further wherein, said at least one central server transmits in real time or near real time, all or some of said plurality of filtered conveyance service offerings in conjunction with corresponding conveyance data, said at least one preferred conveyance service offering in conjunction with corresponding conveyance data, or a combination thereof, to said at least one application by way of at least one link between said at least one central server and said at least one application;

further wherein, said at least one terminal facilitates or provides at least one input function, at least one display function, and operation of said at least one application and is used by said at least one conveyance client to interface with said at least one application;

further wherein, said at least one application compiles in real time or near real time, said at least one visual representation of all or some of said plurality of filtered conveyance service offerings in conjunction with corresponding conveyance data, said at least one preferred conveyance service offering in conjunction with corresponding conveyance data, or a combination thereof; further wherein, said at least one application displays, updated in real time or near real time, said at least one visual representation;

further wherein, said at least one conveyance client uses said at least one application to analyze or evaluate said at least one visual representation and then secure or obtain said at least one preferred conveyance service offering; and further wherein, said at least one conveyance client receives said at least one conveyance service.

A. At Least One Central Server

An embodiment of the present invention includes, wherein at least one function of said at least one central server or said at least one external server is performed by said at least one application.

Another embodiment of the present invention includes, wherein said at least one central server is located on or associated with said at least one terminal.

A further embodiment of the present invention includes, wherein all or some of said plurality of conveyance service offerings, said at least one real time or near real time geographical location of said at least one conveyance client, or a combination thereof, is structured in at least one different format, and is standardized or converted into at least one uniform format.

An additional embodiment of the present invention includes, wherein all or some of said plurality of conveyance service offerings are structured in at least one uniform format prior to being transmitted from said at least one external server to said at least one central server by way of at least one link between said at least one external server and said at least one central server, and are not standardized.

B. At Least One Application

An embodiment of the present invention includes, wherein said at least one application operates on said at least one central server.

Another embodiment of the present invention includes, wherein at least one function of said at least one application is performed by said at least one central server or said at least one external server.

C. Plurality of Conveyance Service Offerings

An embodiment of the present invention includes, wherein all or some of said plurality of conveyance service offerings in conjunction with corresponding conveyance data are sourced or provided by at least one service provider or at least one good supplier operating in at least one conveyance industry segment.

Another embodiment of the present invention includes, wherein all or some of said plurality of conveyance service offerings includes at least one ride-hail service offering, at least one ride-share service offering, at least one car-share service offering, at least one peer-to-peer conveyance service offering, at least one transportation service offering, at least one scooter service offering, at least one bicycle service offering, at least one person delivery service offering, at least one taxi service offering, at least one shuttle service offering, at least one good delivery service offering, at least one item delivery service offering, at least one medical service and delivery offering, at least one food delivery service offering, at least one courier delivery service offering, at least one freight delivery service offering, at least one animal delivery service offering, at least one delivery service offering, or a combination thereof.

A further embodiment of the present invention includes, wherein said plurality of conveyance service offerings is a single conveyance service offering.

An additional embodiment of the present invention includes, wherein conveyance data includes at least one beginning service geographical location, at least one ending service geographical location, pricing information, elevated pricing information, at least one representative preference, at least one conveyance client preference, at least one distance parameter, at least one estimated time of arrival, at least one time to destination, at least one conveyance client geographical location, at least one conveyance client review, at least one conveyance client rating, at least one conveyance client detail, at least one conveyance service detail, at least one conveyance service route, at least one preferred conveyance client, at least one sensor data, at least one representative geographical location, at least one representative review, at least one representative rating, at least one representative detail, at least one autonomous vehicle geographical location, at least one autonomous vehicle review, at least one autonomous vehicle rating, at least one autonomous vehicle detail, at least one preferred autonomous vehicle, at least one route planning preference, at least one fuel economy preference, at least one battery longevity preference, at least one vehicle capacity preference, at least one vehicle diagnostic preference, at least one conveyance data preference, at least one service provider geographical location, at least one service provider review, at least one service provider rating, at least one service provider detail, at least one preferred service provider, at least one good supplier geographical location, at least one good supplier review, at least one good supplier rating, at least one good supplier detail, at least one preferred good supplier, at least one owner or at least one controller of at least one autonomous vehicle geographical location, at least one owner or at least one controller of at least one autonomous vehicle review, at least one owner or at least one controller of at least one autonomous vehicle rating, at least one owner or at least one controller of at least one autonomous vehicle detail, at least one preferred owner or at least one preferred controller of at least one autonomous vehicle, at least one fleet manager geographical location, at least one fleet manager review, at least one fleet manager rating, at least one fleet manager detail, at least one preferred fleet manager, at least one logistics provider geographical location, at least one logistics provider review, at least one logistics provider rating, at least one logistics provider detail, at least one preferred logistics provider, at least one logistics supplier geographical location, at least one logistics supplier review, at least one logistics supplier rating, at least one logistics supplier detail, at least one preferred logistics supplier, at least one conveyance industry segment detail, at least one preferred conveyance industry segment, at least one good detail, at least one item detail, at least one type of vehicle detail, at least one vehicle detail, at least one measurement of at least one statistical variable, at least one level of service detail, at least one fuel consumption, at least one battery level, at least one vehicle diagnostic, at least one vehicle capacity, or a combination thereof.

D. Plurality of Filtered Conveyance Service Offerings

An embodiment of the present invention includes, wherein all or some of said plurality of conveyance service offerings are filtered relating to said at least one conveyance client preference and said at least one real time or near real time geographical location of said at least one conveyance client, to identify all or some of said plurality of filtered conveyance service offerings by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

An additional embodiment of the present invention includes, wherein said at least one preferred conveyance service offering is identified from all or some of said plurality of filtered conveyance service offerings relating to at least one weighted average of said at least one conveyance client preference.

A further embodiment of the present invention includes, wherein at least one different geographical location is used other than said at least one real time or near real time geographical location of said at least one conveyance client when filtering all or some of said plurality of conveyance service offerings.

An additional embodiment of the present invention includes, wherein said plurality of filtered conveyance service offerings is a single filtered conveyance service offering.

E. At Least One Preferred Conveyance Service Offering

An embodiment of the present invention includes, wherein said at least one conveyance client secures or obtains at least one said filtered conveyance service offering other than said at least one preferred conveyance service offering.

F. At Least One Conveyance Client

An embodiment of the present invention includes, wherein said at least one conveyance client secures or obtains more than one said representatives or more than one said autonomous vehicles for said at least one preferred conveyance service offering.

G. At Least One Conveyance Client Preference

An embodiment of the present invention includes, wherein said at least one conveyance client preference includes at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one sensor preference, at least one event preference, at least one traffic based preference, at least one road condition preference, at least one weather condition preference, at least one transportation preference, at least one route planning preference, at least one fuel economy preference, at least one battery longevity preference, at least one vehicle capacity preference, at least one vehicle diagnostic preference, at least one conveyance data preference, at least one duration of conveyance service preference, at least one conveyance service offering density preference, at least one conveyance client density preference, at least one conveyance client detail preference, at least one conveyance client rating preference, at least one representative density preference, at least one autonomous vehicle density preference, at least one service provider preference, at least one service provider density preference, at least one level of service preference, at least one good supplier preference, at least one good supplier density preference, at least one owner or at least one controller of at least one autonomous vehicle preference, at least one owner or at least one controller of at least one autonomous vehicle density preference, at least one fleet manager preference, at least one fleet manager density preference, at least one logistics provider preference, at least one logistics provider density preference, at least one logistics supplier preference, at least one logistics supplier density preference, at least one good detail preference, at least one conveyance industry segment preference, at least one freight preference, at least one waypoint preference, at least one delivery service preference, at least one oldest outstanding offering preference, or a combination thereof.

H. At Least One Visual Representation

An embodiment of the present invention includes, wherein said at least one visual representation is compiled on said at least one central server and transmitted to said at least one application by way of at least one link between said at least one central server and said at least one application.

Another embodiment of the present invention includes, wherein said at least one visual representation includes at least one dynamic map, at least one heat map, or a combination thereof.

A further embodiment of the present invention includes, wherein said at least one conveyance client utilizes said at least one visual representation to secure or obtain said at least one preferred conveyance service offering in real time or near real time, related to said at least one conveyance client preference, said at least one real time or near real time geographical location of said at least one conveyance client, or a combination thereof.

A further embodiment of the present invention includes, wherein said at least one conveyance client preference is displayed as at least one icon or at least one visual with or on said at least one visual representation, to allow said at least one conveyance client to analyze or evaluate all or some of said plurality of filtered conveyance service offerings in conjunction with corresponding conveyance data, said at least one preferred conveyance service offering in conjunction with corresponding conveyance data, or a combination thereof, and secure or obtain said at least one preferred conveyance service offering relating to at least one service provider or at least one good supplier operating in at least one conveyance industry segment.

A further embodiment of the present invention includes, wherein said at least one preferred conveyance service offering, said at least one conveyance client preference, or a combination thereof, is displayed in at least one visually identifiable format compared to all or some of said plurality of filtered conveyance service offerings relating to at least one service provider or at least one good supplier operating in at least one conveyance industry segment.

An additional embodiment of the present invention includes, wherein said at least one dynamic map includes said at least one geographical map that displays in real time or near real time, all or some of said plurality of filtered conveyance service offerings in conjunction with corresponding conveyance data, said at least one preferred conveyance service offering in conjunction with corresponding conveyance data, said at least one conveyance client preference, or a combination thereof.

An embodiment of the present invention includes, wherein all or some of said plurality of filtered conveyance service offerings, said at least one preferred conveyance service offering, said at least one conveyance client preference, or a combination thereof, relating to at least one service provider or at least one good supplier operating in at least one conveyance industry segment, is displayed individually as at least one mobile or transitory icon or at least one mobile or transitory visual and updates or changes in real time or near real time.

An embodiment of the present invention includes, wherein all or some of said plurality of filtered conveyance service offerings, said at least one preferred conveyance service offering, said at least one conveyance client preference, or a combination thereof, relating to at least one individual service provider or at least one individual good supplier operating in at least one conveyance industry segment, is displayed as at least one distinguishable icon or at least one distinguishable visual and updates or changes in real time or near real time.

An embodiment of the present invention includes, wherein all or some of said plurality of filtered conveyance service offerings, said at least one preferred conveyance service offering, said at least one conveyance client preference, or a combination thereof, relating to at least one individual service provider or at least one individual good supplier operating in at least one conveyance industry segment, is displayed as at least one icon or at least one visual and updates or changes in real time or near real time.

An embodiment of the present invention includes, wherein all or some of said plurality of filtered conveyance service offerings, said at least one preferred conveyance service offering, said at least one conveyance client preference, or a combination thereof, relating to at least one individual service provider or at least one individual good supplier is displayed as or with at least one different icon, at least one different symbol, at least one different color, at least one different shading, at least one different pattern, at least one different visual, or a combination thereof.

An embodiment of the present invention includes, wherein all or some of said plurality of filtered conveyance service offerings, said at least one preferred conveyance service offering, said at least one conveyance client preference, or a combination thereof, relating to at least one individual service provider or at least one individual good supplier is displayed as or with at least one similar icon, at least one similar symbol, at least one similar color, at least one similar shading, at least one similar pattern, at least one similar visual, or a combination thereof.

An embodiment of the present invention includes, wherein said at least one conveyance client updates, modifies, or changes said at least one conveyance client preference and said at least one dynamic map displays in real time or near real time, all or some of said plurality of filtered conveyance service offerings in conjunction with corresponding conveyance data, said at least one preferred conveyance service offering in conjunction with corresponding conveyance data, said at least one conveyance client preference, or a combination thereof, based on the updated, modified, or changed said at least one conveyance client preference.

A further embodiment of the present invention includes, wherein said at least one heat map includes said at least one geographical map that displays at least one visual depiction of at least one statistical variable of:
  all or some of said plurality of conveyance service offerings in conjunction with corresponding conveyance data;
  all or some of said plurality of filtered conveyance service offerings in conjunction with corresponding conveyance data;
  all or some of said at least one preferred conveyance service offering in conjunction with corresponding conveyance data;
  said at least one conveyance client preference; or
  a combination thereof.

An additional embodiment of the present invention includes, wherein said at least one statistical variable includes at least one measurement of conveyance service availability, pricing, elevated pricing, conveyance service offering density, filtered conveyance service offering density, preferred conveyance service offering density, preferred good supplier density, at least one preferred conveyance industry segment, conveyance industry segment density, level of service density, at least one conveyance service distance, at least one estimated time of arrival, preferred representative density, representative density, conveyance client density, service provider density, good supplier density, or a combination thereof.

An embodiment of the present invention includes, wherein at least one area of said at least one heat map is distinguished in proportion to at least one measurement of said at least one statistical variable and displayed as having at least one distinguishable hue, at least one distinguishable shade, at least one distinguishable saturation, at least one distinguishable opacity, at least one distinguishable color, at least one distinguishable value of color, at least one distinguishable pattern, at least one distinguishable hatch fill, at least one distinguishable fill, at least one distinguishable shape, at least one distinguishable image, at least one distinguishable animation, or a combination thereof.

Another embodiment of the present invention includes, wherein said at least one preferred conveyance service offering is not identified prior to compiling said at least one heat map, at least one real time or near real time heat map, at least one historical heat map, at least one predictive heat map, or a combination thereof.

A further embodiment of the present invention includes, wherein at least one real time or near real time heat map is compiled from said at least one statistical variable of all or some of said plurality of conveyance service offerings in conjunction with corresponding conveyance data, all or some of said plurality of filtered conveyance service offerings in conjunction with corresponding conveyance data, all or some of said at least one preferred conveyance service offering in conjunction with corresponding conveyance data, said at least one conveyance client preference, or a combination thereof.

An additional embodiment of the present invention includes, wherein at least one historical heat map is compiled from said at least one statistical variable of all or some of past said plurality of conveyance service offerings in conjunction with corresponding conveyance data, all or some of past said plurality of filtered conveyance service offerings in conjunction with corresponding conveyance data, all or some of past said at least one preferred conveyance service offering in conjunction with corresponding conveyance data, said at least one conveyance client preference, or a combination thereof.

An embodiment of the present invention includes, wherein at least one predictive heat map is compiled from said at least one statistical variable of all or some of past said plurality of conveyance service offerings in conjunction with corresponding conveyance data, all or some of past said plurality of filtered conveyance service offerings in conjunction with corresponding conveyance data, all or some of past said at least one preferred conveyance service offering in conjunction with corresponding conveyance data, all or some of said plurality of conveyance service offerings in conjunction with corresponding conveyance data, all or some of said plurality of filtered conveyance service offerings in conjunction with corresponding conveyance data, all or some of said at least one preferred conveyance service offering in conjunction with corresponding conveyance data, said at least one conveyance client preference, or a combination thereof.

Another embodiment of the present invention includes, wherein said at least one predictive heat map identifies or estimates at least one of future conveyance service availability, future pricing, future elevated pricing, future conveyance service offering density, future filtered conveyance service offering density, future preferred conveyance service offering density, future level of service density, future conveyance industry segment density, future representative density, future conveyance client density, future service provider density, future good supplier density, future level of service supply, future conveyance industry segment supply, future conveyance service supply, future service provider supply, future good supplier supply, future conveyance service demand, future conveyance client demand, or a combination thereof.

A further embodiment of the present invention includes, wherein said at least one predictive heat map generates at least one visual notification or at least one audio notification to notify said at least one conveyance client of at least one future change or update to said at least one statistical variable, said at least one measurement of said at least one statistical variable, or a combination thereof.

I. Functionality

An embodiment of the present invention includes, wherein said at least one conveyance client, said at least one central server, said at least one application, or a combination thereof, secures or obtains said at least one preferred conveyance service offering in at least one conveyance industry segment.

Another embodiment of the present invention includes, wherein said at least one preferred conveyance service offering in conjunction with corresponding conveyance data, all or some of said plurality of filtered conveyance service offerings in conjunction with corresponding conveyance data, all or some of said plurality of conveyance service offerings in conjunction with corresponding conveyance data, all or some of subsequent or additional said plurality of filtered conveyance service offerings in conjunction with corresponding conveyance data, all or some of subsequent or additional said at least one preferred conveyance service offering in conjunction with corresponding conveyance data, all or some of said at least one real time or near real time geographical location of said at least one conveyance client, said at least one conveyance client preference, said at least one beginning service geographical location, said at least one ending service geographical location, or a combination thereof, is identified or updated in real time or near real time as said at least one real time or near real time geographical location of said at least one conveyance client updates or changes or as traffic information updates or changes.

An additional embodiment of the present invention includes, wherein said at least one visual representation is displayed on at least one remote display.

An embodiment of the present invention includes, wherein said at least one conveyance client browses or navigates at least one area of said at least one visual representation to identify and then secure or obtain said at least one preferred conveyance service offering or at least one said filtered conveyance service offering by selecting or accepting said at least one preferred conveyance service offering, at least one said filtered conveyance service offering, said at least one conveyance client preference, or a combination thereof.

Another embodiment of the present invention includes, wherein said at least one application, said at least one terminal, said at least one central server, said at least one external server, at least one link, or a combination thereof, is combined or integrated.

Another embodiment of the present invention includes, wherein said at least one preferred conveyance service offering in conjunction with corresponding conveyance data, all or some of said plurality of filtered conveyance service offerings in conjunction with corresponding conveyance data, all or some of said plurality of conveyance service offerings in conjunction with corresponding conveyance data, all or some of said at least one real time or near real time geographical location of said at least one conveyance client, said at least one conveyance client preference, all or some of subsequent or additional said plurality of filtered conveyance service offerings in conjunction with corresponding conveyance data, all or some of subsequent or additional said at least one preferred conveyance service offering in conjunction with corresponding conveyance data, at least one secured or obtained preferred conveyance service offering, said at least one beginning service geographical location, said at least one ending service geographical location, or a combination thereof, is transmitted in real time or near real time between said at least one application and said at least one central server and updated in real time or near real time by way of at least one link between said at least one application and said at least one central server.

Another embodiment of the present invention includes, wherein said at least one preferred conveyance service offering in conjunction with corresponding conveyance data, all or some of said plurality of filtered conveyance service offerings in conjunction with corresponding conveyance data, all or some of said plurality of conveyance service offerings in conjunction with corresponding conveyance data, all or some of said at least one real time or near real time geographical location of said at least one conveyance client, said at least one conveyance client preference, all or some of subsequent or additional said plurality of filtered conveyance service offerings in conjunction with corresponding conveyance data, all or some of subsequent or additional said at least one preferred conveyance service offering in conjunction with corresponding conveyance data, at least one secured or obtained preferred conveyance service offering, said at least one beginning service geographical location, said at least one ending service geographical location, or a combination thereof, is transmitted in real time or near real time between said at least one application and said at least one external server and updated in real time or near real time by way of at least one link between said at least one application and said at least one external server.

Another embodiment of the present invention includes, wherein said at least one preferred conveyance service offering in conjunction with corresponding conveyance data, all or some of said plurality of filtered conveyance service offerings in conjunction with corresponding conveyance data, all or some of said plurality of conveyance service offerings in conjunction with corresponding conveyance data, all or some of said at least one real time or near real time geographical location of said at least one conveyance client, said at least one conveyance client preference, all or some of subsequent or additional said plurality of filtered conveyance service offerings in conjunction with corresponding conveyance data, all or some of subsequent or additional said at least one preferred conveyance service offering in conjunction with corresponding conveyance data, at least one secured or obtained preferred conveyance service offering, said at least one beginning service geographical location, said at least one ending service geographical location, or a combination thereof, is transmitted in real time or near real time between said at least one central server and said at least one external server and updated in real time or near real time by way of at least one link between said at least one central server and said at least one external server.

IV. Method #2: Conveyance Client Maps

An fourth aspect of the present invention includes a real time or near real time method to assist at least one conveyance client in at least one process of securing or obtaining, within the conveyance industry, at least one preferred conveyance service offering relating to at least one conveyance client preference and at least one real time or near real time geographical location of said at least one conveyance client by using at least one visual representation, the method includes:

a) providing any system of section III above;

b) providing said at least one beginning service geographical location and said at least one ending service geographical location to said at least one application on said at least one terminal;

c) transmitting in real time or near real time, said at least one beginning service geographical location and said at least one ending service geographical location from said at least one application to said at least one central server, by way of at least one link between said at least one application and said at least one central server;

d) receiving in real time or near real time, at said at least one central server, said at least one beginning service geographical location and said at least one ending service geographical location from said at least one application by way of at least one link between said at least one central server and said at least one application;

e) transmitting in real time or near real time, said at least one beginning service geographical location and said at least one ending service geographical location from said at least one central server to said at least one external server, by way of at least one link between said at least one central server and said at least one external server;

f) receiving in real time or near real time, at said at least one external server, said at least one beginning service geographical location and said at least one ending service geographical location from said at least one central server by way of at least one link between said at least one external server and said at least one central server;

g) receiving in real time or near real time, at said at least one central server, all or some of said plurality of conveyance service offerings from said at least one external server by way of at least one link between said at least one central server and said at least one external server;

h) storing in real time or near real time, all or some of said plurality of conveyance service offerings in said at least one computer readable memory of said at least one central server;

i) standardizing in real time or near real time, all or some of said plurality of conveyance service offerings using said at least one central server;

j) aggregating in real time or near real time, all or some of said plurality of conveyance service offerings using said at least one central server;

k) transmitting in real time or near real time, said at least one conveyance client preference and said at least one real time or near real time geographical location of said at least one conveyance client from said at least one application to said at least one central server by way of at least one link between said at least one application and said at least one central server, wherein:
  i) said at least one conveyance client, using said at least one input source of said at least one terminal, inputs or provides said at least one conveyance client preference into said at least one application;
  ii) said at least one application provides said at least one real time or near real time geographical location of said at least one conveyance client using said at least one geographical location module of said at least one terminal;
  iii) or a combination thereof;
l) receiving in real time or near real time, said at least one conveyance client preference and said at least one real time or near real time geographical location of said at least one conveyance client at said at least one central server from said at least one application by way of at least one link between said at least one central server and said at least one application;
m) filtering in real time or near real time, at said at least one central server, all or some of said plurality of conveyance service offerings by using said at least one conveyance client preference and said at least one real time or near real time geographical location of said at least one conveyance client, to identify all or some of said plurality of filtered conveyance service offerings;
n) identifying in real time or near real time, at said at least one central server, said at least one preferred conveyance service offering from all or some of said plurality of filtered conveyance service offerings relating to said at least one conveyance client preference;
o) transmitting in real time or near real time, all or some of said plurality of filtered conveyance service offerings in conjunction with corresponding conveyance data, said at least one preferred conveyance service offering in conjunction with corresponding conveyance data, or a combination thereof, from said at least one central server to said at least one application by way of at least one link between said at least one central server and said at least one application;
p) receiving in real time or near real time, all or some of said plurality of filtered conveyance service offerings in conjunction with corresponding conveyance data, said at least one preferred conveyance service offering in conjunction with corresponding conveyance data, or a combination thereof, at said at least one application from said at least one central server by way of at least one link between said at least one application and said at least one central server;
q) compiling in real time or near real time, at said at least one application, said at least one visual representation in digital form, wherein:
  i) said at least one geographical map relating to said at least one real time or near real time geographical location of said at least one conveyance client is provided on said at least one application;
  ii) all or some of said plurality of filtered conveyance service offerings in conjunction with corresponding conveyance data, said at least one preferred conveyance service offering in conjunction with corresponding conveyance data, or a combination thereof, is positioned on said at least one geographical map relating to at least one corresponding geographical location contained therein;
  iii) or a combination thereof;
  iv) said at least one visual representation is updated in real time or near real time with all or some of subsequent or additional said plurality of filtered conveyance service offerings in conjunction with corresponding conveyance data, subsequent or additional said at least one preferred conveyance service offering in conjunction with corresponding conveyance data, or a combination thereof;
r) displaying in real time or near real time, said at least one visual representation on said at least one application using said at least one display of said at least one terminal; and
s) wherein said at least one conveyance client analyzes or evaluates said at least one visual representation to secure or obtain said at least one preferred conveyance service offering and then said at least one conveyance client receives said at least one conveyance service.

A. Standardizing Plurality of Conveyance Service Offerings

An embodiment of the present invention includes, wherein all or some of said plurality of conveyance service offerings, said at least one real time or near real time geographical location of said at least one conveyance client, or a combination thereof, is structured in at least one different format, and is standardized or converted into at least one uniform format.

Another embodiment of the present invention includes, wherein all or some of said plurality of conveyance service offerings are structured in at least one uniform format prior to being transmitted from said at least one external server to said at least one central server by way of at least one link between said at least one external server and said at least one central server, and are not standardized.

A further embodiment of the present invention includes, wherein steps H-L can be in any order prior to filtering all or some of said plurality of conveyance service offerings.

B. Transmitting at Least One Conveyance Client Preference and at Least One Geographical Location An additional embodiment of the present invention includes, wherein said at least one conveyance client preference, once inputted or provided into said at least one application, is stored or cached on said at least one application, said at least one computer readable memory of said at least one central server, or a combination thereof, and said at least one conveyance client preference is not inputted or provided again into said at least one application by said at least one conveyance client.

An embodiment of the present invention includes, wherein said at least one conveyance client preference is stored or cached in said at least one computer readable memory of said at least one central server and said at least one conveyance client preference is not transmitted again from said at least one application to said at least one central server.

Another embodiment of the present invention includes, wherein said at least one conveyance client preference, said at least one real time or near real time geographical location of said at least one conveyance client, or a combination thereof, is transmitted from said at least one application to said at least one central server at any time prior to filtering all or some of said plurality of conveyance service offerings.

C. Filtering Plurality of Conveyance Service Offerings

An embodiment of the present invention includes, wherein all or some of said plurality of conveyance service offerings are filtered relating to said at least one conveyance client preference and said at least one real time or near real time geographical location of said at least one conveyance client, to identify all or some of said plurality of filtered conveyance service offerings by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

Another embodiment of the present invention includes, wherein all or some of said plurality of conveyance service offerings are filtered in real time or near real time and said at least one preferred conveyance service offering is identified in real time or near real time from all or some of said plurality of filtered conveyance service offerings on said at least one application by:

a) transmitting in real time or near real time, all or some of said plurality of conveyance service offerings from said at least one central server to said at least one application by way of at least one link between said at least one central server and said at least one application;

b) filtering in real time or near real time, all or some of said plurality of conveyance service offerings by using said at least one conveyance client preference and said at least one real time or near real time geographical location of said at least one conveyance client, to identify all or some of said plurality of filtered conveyance service offerings; and c) identifying in real time or near real time, said at least one preferred conveyance service offering from all or some of said plurality of filtered conveyance service offerings relating to said at least one conveyance client preference.

A further embodiment of the present invention includes, wherein at least one different geographical location is used other than said at least one real time or near real time geographical location of said at least one conveyance client when filtering all or some of said plurality of conveyance service offerings.

D. Identifying at Least One Preferred Conveyance Service Offering

An embodiment of the present invention includes, wherein said at least one preferred conveyance service offering relating to said at least one conveyance client preference is identified from all or some of said plurality of filtered conveyance service offerings by using at least one sorting algorithm, at least one selection algorithm, at least one search algorithm, at least one merge algorithm, at least one maximum function, at least one minimum function, at least one graph algorithm, at least one graph search algorithm, at least one tree algorithm, at least one tree search algorithm, at least one matrix calculation, at least one matrix algorithm, at least one comparison, or a combination thereof.

Another embodiment of the present invention includes, wherein said at least one preferred conveyance service offering is identified from all or some of said plurality of filtered conveyance service offerings relating to at least one weighted average of said at least one conveyance client preference.

A further embodiment of the present invention includes, wherein said at least one preferred conveyance service offering is identified in real time or near real time from all or some of said plurality of filtered conveyance service offerings on said at least one application by:

a) transmitting in real time or near real time, all or some of said plurality of filtered conveyance service offerings from said at least one central server to said at least one application by way of at least one link between said at least one central server and said at least one application; and b) identifying in real time or near real time, said at least one preferred conveyance service offering from all or some of said plurality of filtered conveyance service offerings relating to said at least one conveyance client preference.

E. Compiling at Least One Visual Representation

An embodiment of the present invention includes, wherein said at least one visual representation is compiled on said at least one central server and transmitted to said at least one application by way of at least one link between said at least one central server and said at least one application.

F. Displaying at Least One Visual Representation

An embodiment of the present invention includes, wherein said at least one visual representation is displayed on at least one remote display.

Another embodiment of the present invention includes, wherein said at least one visual representation includes at least one dynamic map, at least one heat map, or a combination thereof.

Another embodiment of the present invention includes, wherein said at least one conveyance client utilizes said at least one visual representation to secure or obtain said at least one preferred conveyance service offering in real time or near real time, related to said at least one conveyance client preference, said at least one real time or near real time geographical location of said at least one conveyance client, or a combination thereof.

Another embodiment of the present invention includes, wherein said at least one conveyance client preference is displayed as at least one icon or at least one visual with or on said at least one visual representation, to allow said at least one conveyance client to analyze or evaluate all or some of said plurality of filtered conveyance service offerings in conjunction with corresponding conveyance data, said at least one preferred conveyance service offering in conjunction with corresponding conveyance data, or a combination thereof, and secure or obtain said at least one preferred conveyance service offering relating to at least one service provider or at least one good supplier operating in at least one conveyance industry segment.

Another embodiment of the present invention includes, wherein said at least one preferred conveyance service offering, said at least one conveyance client preference, or a combination thereof, is displayed in at least one visually identifiable format compared to all or some of said plurality of filtered conveyance service offerings relating to at least one service provider or at least one good supplier operating in at least one conveyance industry segment.

An additional embodiment of the present invention includes, wherein said at least one dynamic map includes said at least one geographical map that displays in real time or near real time, all or some of said plurality of filtered conveyance service offerings in conjunction with corresponding conveyance data, said at least one preferred conveyance service offering in conjunction with corresponding conveyance data, said at least one conveyance client preference, or a combination thereof.

An embodiment of the present invention includes, wherein all or some of said plurality of filtered conveyance service offerings, said at least one preferred conveyance service offering, said at least one conveyance client preference, or a combination thereof, relating to at least one service provider or at least one good supplier operating in at least one conveyance industry segment, is displayed individually as at least one mobile or transitory icon or at least one mobile or transitory visual and updates or changes in real time or near real time.

An embodiment of the present invention includes, wherein all or some of said plurality of filtered conveyance service offerings, said at least one preferred conveyance service offering, said at least one conveyance client preference, or a combination thereof, relating to at least one individual service provider or at least one individual good supplier operating in at least one conveyance industry segment, is displayed as at least one distinguishable icon or at least one distinguishable visual and updates or changes in real time or near real time.

An embodiment of the present invention includes, wherein all or some of said plurality of filtered conveyance service offerings, said at least one preferred conveyance service offering, said at least one conveyance client preference, said at least one conveyance client preference, or a combination thereof, relating to at least one individual service provider or at least one individual good supplier operating in at least one conveyance industry segment, is displayed as at least one icon or at least one visual and updates or changes in real time or near real time.

An embodiment of the present invention includes, wherein all or some of said plurality of filtered conveyance service offerings, said at least one preferred conveyance service offering, said at least one conveyance client preference, or a combination thereof, relating to at least one individual service provider or at least one individual good supplier is displayed as or with at least one different icon, at least one different symbol, at least one different color, at least one different shading, at least one different pattern, at least one different visual, or a combination thereof.

An embodiment of the present invention includes, wherein all or some of said plurality of filtered conveyance service offerings, said at least one preferred conveyance service offering, said at least one conveyance client preference, or a combination thereof, relating to at least one individual service provider or at least one individual good supplier is displayed as or with at least one similar icon, at least one similar symbol, at least one similar color, at least one similar shading, at least one similar pattern, at least one similar visual, or a combination thereof.

An embodiment of the present invention includes, wherein said at least one conveyance client updates, modifies, or changes said at least one conveyance client preference and said at least one dynamic map displays in real time or near real time, all or some of said plurality of filtered conveyance service offerings in conjunction with corresponding conveyance data, said at least one preferred conveyance service offering in conjunction with corresponding conveyance data, said at least one conveyance client preference, or a combination thereof, based on the updated, modified, or changed said at least one conveyance client preference.

Another embodiment of the present invention includes, wherein said at least one heat map includes said at least one geographical map that displays at least one visual depiction of at least one statistical variable of:
   all or some of said plurality of conveyance service offerings in conjunction with corresponding conveyance data;
   all or some of said plurality of filtered conveyance service offerings in conjunction with corresponding conveyance data;
   all or some of said at least one preferred conveyance service offering in conjunction with corresponding conveyance data;
   said at least one conveyance client preference; or
   a combination thereof.

A further embodiment of the present invention includes, wherein said at least one statistical variable includes at least one measurement of conveyance service availability, pricing, elevated pricing, conveyance service offering density, filtered conveyance service offering density, preferred conveyance service offering density, preferred good supplier density, at least one preferred conveyance industry segment, conveyance industry segment density, level of service density, at least one conveyance service distance, at least one estimated time of arrival, preferred representative density, representative density, conveyance client density, service provider density, good supplier density, or a combination thereof.

Another embodiment of the present invention includes, wherein at least one area of said at least one heat map is distinguished in proportion to at least one measurement of said at least one statistical variable and displayed as having at least one distinguishable hue, at least one distinguishable shade, at least one distinguishable saturation, at least one distinguishable opacity, at least one distinguishable color, at least one distinguishable value of color, at least one distinguishable pattern, at least one distinguishable hatch fill, at least one distinguishable fill, at least one distinguishable shape, at least one distinguishable image, at least one distinguishable animation, or a combination thereof.

An additional embodiment of the present invention includes, wherein said at least one preferred conveyance service offering is not identified prior to compiling said at least one heat map, at least one real time or near real time heat map, at least one historical heat map, at least one predictive heat map, or a combination thereof.

An embodiment of the present invention includes, wherein at least one real time or near real time heat map is compiled from said at least one statistical variable of all or some of said plurality of conveyance service offerings in conjunction with corresponding conveyance data, all or some of said plurality of filtered conveyance service offerings in conjunction with corresponding conveyance data, all or some of said at least one preferred conveyance service offering in conjunction with corresponding conveyance data, said at least one conveyance client preference, or a combination thereof.

Another embodiment of the present invention includes, wherein at least one historical heat map is compiled from said at least one statistical variable of all or some of past said plurality of conveyance service offerings in conjunction with corresponding conveyance data, all or some of past said plurality of filtered conveyance service offerings in conjunction with corresponding conveyance data, all or some of past said at least one preferred conveyance service offering in conjunction with corresponding conveyance data, said at least one conveyance client preference, or a combination thereof.

A further embodiment of the present invention includes, wherein at least one predictive heat map is compiled from said at least one statistical variable of all or some of past said plurality of conveyance service offerings in conjunction with corresponding conveyance data, all or some of past said plurality of filtered conveyance service offerings in conjunction with corresponding conveyance data, all or some of past said at least one preferred conveyance service offering in conjunction with corresponding conveyance data, all or some of said plurality of conveyance service offerings in conjunction with corresponding conveyance data, all or some of said plurality of filtered conveyance service offerings in conjunction with corresponding conveyance data, all or some of said at least one preferred conveyance service offering in conjunction with corresponding conveyance data, said at least one conveyance client preference, or a combination thereof.

An additional embodiment of the present invention includes, wherein said at least one predictive heat map identifies or estimates at least one of future conveyance service availability, future pricing, future elevated pricing, future conveyance service offering density, future filtered conveyance service offering density, future preferred conveyance service offering density, future level of service density, future conveyance industry segment density, future representative density, future conveyance client density, future service provider density, future good supplier density, future level of service supply, future conveyance industry segment supply, future conveyance service supply, future service provider supply, future good supplier supply, future conveyance service demand, future conveyance client demand, or a combination thereof.

An embodiment of the present invention includes, wherein said at least one predictive heat map generates at least one visual notification or at least one audio notification to notify said at least one conveyance client of at least one future change or update to said at least one statistical variable, said at least one measurement of said at least one statistical variable, or a combination thereof.

G. Additional Embodiments

An embodiment of the present invention includes, wherein at least one function of said at least one central server or said at least one external server is performed by said at least one application.

Another embodiment of the present invention includes, wherein said at least one application operates on said at least one central server.

A further embodiment of the present invention includes, wherein at least one function of said at least one application is performed by said at least one central server or said at least one external server.

An additional embodiment of the present invention includes, wherein said at least one conveyance client, said at least one central server, said at least one application, or a combination thereof, secures or obtains said at least one preferred conveyance service offering in at least one conveyance industry segment.

An embodiment of the present invention includes, wherein all or some of said plurality of conveyance service offerings in conjunction with corresponding conveyance data are sourced or provided by at least one service provider or at least one good supplier operating in at least one conveyance industry segment.

Another embodiment of the present invention includes, wherein said at least one conveyance client secures or obtains more than one said representatives or more than one said autonomous vehicles for said at least one preferred conveyance service offering.

A further embodiment of the present invention includes, wherein said at least one conveyance client secures or obtains at least one said filtered conveyance service offering other than said at least one preferred conveyance service offering.

An additional embodiment of the present invention includes, wherein said at least one preferred conveyance service offering in conjunction with corresponding conveyance data, all or some of said plurality of filtered conveyance service offerings in conjunction with corresponding conveyance data, all or some of said plurality of conveyance service offerings in conjunction with corresponding conveyance data, all or some of subsequent or additional said plurality of filtered conveyance service offerings in conjunction with corresponding conveyance data, all or some of subsequent or additional said at least one preferred conveyance service offering in conjunction with corresponding conveyance data, all or some of said at least one real time or near real time geographical location of said at least one conveyance client, said at least one conveyance client preference, said at least one beginning service geographical location, said at least one ending service geographical location, or a combination thereof, is identified or updated in real time or near real time as said at least one real time or near real time geographical location of said at least one conveyance client updates or changes or as traffic information updates or changes.

An embodiment of the present invention includes, wherein said plurality of conveyance service offerings is a single conveyance service offering.

Another embodiment of the present invention includes, wherein said plurality of filtered conveyance service offerings is a single filtered conveyance service offering.

A further embodiment of the present invention includes, wherein said at least one conveyance client browses or navigates at least one area of said at least one visual representation to identify and then secure or obtain said at least one preferred conveyance service offering or at least one said filtered conveyance service offering by selecting or accepting said at least one preferred conveyance service offering, at least one said filtered conveyance service offering, said at least one conveyance client preference, or a combination thereof.

Another embodiment of the present invention includes, wherein said at least one central server is located on or associated with said at least one terminal.

Another embodiment of the present invention includes, wherein said at least one application, said at least one terminal, said at least one central server, said at least one external server, at least one link, or a combination thereof, is combined or integrated.

Another embodiment of the present invention includes, wherein said at least one beginning service geographical location, said at least one ending service geographical location, said at least one conveyance client preference, or a combination thereof, is provided prior to receiving all or some of said plurality of conveyance service offerings on or at said at least one central server.

Another embodiment of the present invention includes, herein said at least one preferred conveyance service offering in conjunction with corresponding conveyance data, all or some of said plurality of filtered conveyance service offerings in conjunction with corresponding conveyance data, all or some of said plurality of conveyance service offerings in conjunction with corresponding conveyance data, all or some of said at least one real time or near real time geographical location of said at least one conveyance client, said at least one conveyance client preference, all or some of subsequent or additional said plurality of filtered conveyance service offerings in conjunction with corresponding conveyance data, all or some of subsequent or additional said at least one preferred conveyance service offering in conjunction with corresponding conveyance data, at least one secured or obtained preferred conveyance service offering, said at least one beginning service geographical location, said at least one ending service geographical, location, or a combination thereof, is transmitted in real time or near real time between said at least one application and said at least one central server and updated in real time or near real time by way of at least one link between said at least one application and said at least one central server.

Another embodiment of the present invention includes, wherein said at least one preferred conveyance service offering in conjunction with corresponding conveyance data, all or some of said plurality of filtered conveyance service offerings in conjunction with corresponding conveyance data, all or some of said plurality of conveyance service offerings in conjunction with corresponding conveyance data, all or some of said at least one real time or near real time geographical location of said at least one conveyance client, said at least one conveyance client preference, all or some of subsequent or additional said plurality of filtered conveyance service offerings in conjunction with corresponding conveyance data, all or some of subsequent or additional said at least one preferred conveyance service offering in conjunction with corresponding conveyance data, at least one secured or obtained preferred conveyance service offering, said at least one beginning service geographical location, said at least one ending service geographical location, or a combination thereof, is transmitted in real time or near real time between said at least one application and said at least one external server and updated in real time or near real time by way of at least one link between said at least one application and said at least one external server.

Another embodiment of the present invention includes, wherein said at least one preferred conveyance service offering in conjunction with corresponding conveyance data, all or some of said plurality of filtered conveyance service offerings in conjunction with corresponding conveyance data, all or some of said plurality of conveyance service offerings in conjunction with corresponding conveyance data, all or some of said at least one real time or near real time geographical location of said at least one conveyance client, said at least one conveyance client preference, all or some of subsequent or additional said plurality of filtered conveyance service offerings in conjunction with corresponding conveyance data, all or some of subsequent or additional said at least one preferred conveyance service offering in conjunction with corresponding conveyance data, at least one secured or obtained preferred conveyance service offering, said at least one beginning service geographical location, said at least one ending service geographical location, or a combination thereof, is transmitted in real time or near real time between said at least one central server and said at least one external server and updated in real time or near real time by way of at least one link between said at least one central server and said at least one external server.

V. Detailed Description of Sections I Through VIII

The following detailed description of invention, which includes in part, a system and method for securing or obtaining at least one preferred conveyance service request or at least one preferred conveyance service offering within the conveyance industry. The system includes but is not limited to the following hardware, software, parties, interactive geographical maps, and some information involved in securing or obtaining at least one preferred conveyance service request or at least one preferred conveyance service offering within the conveyance industry.

Near Real Time

Near real time can for example pertain to a delay introduced, by automated data processing, between at least one occurrence of at least one event and at least one use of the processed data. Near real time can refer to the timeliness of data or information, which can be delayed by the time required for electronic communication and automatic data processing. Near real time can imply no significant delays. Near real time can refer to the highest level of development or state of the art.

As a non-limiting example, near real time can be in or similar to real time. As a non-limiting example, near real time can depict at least one event or at least one situation as it existed at the current time less the processing time. As a non-limiting example, at least one function of at least one system, at least one method, or a combination thereof, can be performed in real time or near real time. As a non-limiting example, at least one real time or near real time geographical location of at least one autonomous vehicle can be updated in real time or near real time. As a non-limiting example, at least one real time or near real time geographical location of at least one conveyance client can be updated in real time or near real time. As a non-limiting example, at least one real time or near real time geographical location of at least one representative can be updated in real time or near real time.

Conveyance Client

At least one conveyance client can be but is not limited to at least one person, at least one entity, at least one robot, at least one machine, or a combination thereof, that can for example analyze or evaluate and then secure or obtain at least one preferred conveyance service offering. At least one conveyance client does not have to be at least one consumer of at least one conveyance service. At least one conveyance client can secure or obtain at least one conveyance service offering for including but not limited to at least one other person, at least one other machine, at least one other conveyance client, or a combination thereof. At least one conveyance client or at least one consumer of at least one service can receive or request at least one conveyance service.

At least one conveyance client can input or provide at least one conveyance client preference to be used to filter at least one conveyance service offering. At least one conveyance client can input or provide at least one conveyance client preference used to identify including but not limited to at least one preferred conveyance service offering, at least one filtered conveyance service offering, or a combination thereof. At least one conveyance client can perform at least one function in real time or near real time being updated or refreshed in the highest level of development or state of the art.

At least one conveyance client can secure or obtain at least one preferred conveyance service offering via including but not limited to at least one terminal, at least one application, at least one central server, at least one external server, or a combination thereof. At least one conveyance client can secure or obtain at least one conveyance service offering, at least one filtered conveyance service offering, at least one preferred conveyance service offering, or a combination thereof, relating to at least one service provider in at least one conveyance industry segment.

At least one conveyance client can, for example, input or generate at least one conveyance service request, which can become at least one filtered conveyance service request and/or at least one preferred conveyance service request for or with including but not limited to at least one representative, at least one autonomous vehicle, at least one owner or at least one controller of at least one autonomous vehicle, at least one service provider, at least one good supplier, at least one fleet manager, at least one logistics provider, at least one logistics supplier, at least one map provider, at least one third party, or a combination thereof.

As a non-limiting example, at least one conveyance client can secure or obtain at least one filtered conveyance service offering other than at least one preferred conveyance service offering. As a non-limiting example, at least one conveyance client can be at least one digital personal assistant or at least one machine, capable of securing or obtaining at least one preferred conveyance service offering. As a non-limiting example, at least one conveyance client can be at least one passenger in the ride-hail industry segment. As a non-limiting example, at least one conveyance client can be at least one consumer of at least one good in the food delivery industry segment. As a non-limiting example, at least one conveyance client can be at least one consumer of freight in the freight delivery industry segment. As a non-limiting example, at least one conveyance client can use at least one scooter or at least one bicycle. As a non-limiting example, at least one conveyance client can secure or obtain at least one conveyance service offering, at least one filtered conveyance service offering, at least one preferred conveyance service offering, or a combination thereof, relating to at least one individual service provider in at least one individual conveyance industry segment.

As a non-limiting example, at least one conveyance client can use at least one visual representation such as but not limited to at least one dynamic map, at least one heat map, or a combination thereof, to analyze or evaluate and then secure or obtain at least one preferred conveyance service offering. As a non-limiting example, at least one conveyance client can secure or obtain more than one representative or more than one autonomous vehicle for at least one preferred conveyance service offering. As a non-limiting example, at least one conveyance client can utilize or perform at least one function of at least one visual representation the same or similar as at least one representative.

Service Provider

At least one service provider can be for example at least one entity or at least one business that can retain or contract with including but not limited to at least one representative, at least one autonomous vehicle, at least one owner or at least one controller of at least one autonomous vehicle, at least one good supplier, at least one fleet manager, at least one logistics provider, at least one logistics supplier, at least one map provider, at least one third party, or a combination thereof, to provide at least one conveyance service. At least one service provider can facilitate at least one conveyance service between including but not limited to at least one representative, at least one autonomous vehicle, at least one owner or at least one controller of at least one autonomous vehicle, at least one good supplier, at least one fleet manager, at least one conveyance client, at least one logistics provider, at least one logistics supplier, at least one map provider, at least one third party, or a combination thereof. At least one service provider can be at least one entity or at least one business that can for example provide or perform at least one service, at least one delivery service, or a combination thereof.

At least one service provider, via at least one external server, can be at least one source or at least one provider of all or some of at least one conveyance service request with corresponding conveyance data, all or some of at least one conveyance service offering with corresponding conveyance data, or a combination thereof, relating to at least one conveyance industry segment. At least one service provider can use including but not limited to at least one central server, at least one external server, at least one application, or a combination thereof, to facilitate and perform at least one conveyance service.

At least one service provider can operate in at least one conveyance industry segment. At least one service provider can independently control or operate including but not limited to at least one conveyance network of at least one representative, at least one autonomous vehicle, at least one good supplier, at least one map provider, at least one third party, at least one conveyance client, or a combination thereof. At least one service provider can utilize Information Technology infrastructure relating to including but not limited to at least one service provider, at least one good supplier, at least one owner or at least one controller of at least one autonomous vehicle, at least one fleet manager, at least one logistics provider, at least one loistics supplier, at least one map provider, at least one third party, or a combination thereof. At least one service provider can perform at least one function in real time or near real time being updated or refreshed in the highest level of development or state of the art. At least one service provider can accept or decline at least one preferred conveyance service request or at least one preferred conveyance service offering.

At least one service provider can use at least one visual representation, at least one dynamic map, at least one heat map, or a combination thereof, to facilitate, operate, or manage at least one conveyance service. At least one service provider can use at least one visual representation, at least one dynamic map, at least one heat map, or a combination thereof, to facilitate, operate, or manage at least one conveyance service for at least one conveyance client or at least one representative. At least one service provider can use at least one visual representation, at least one dynamic map, at least one heat map, or a combination thereof, as at least one tool for at least one conveyance client or at least one representative to secure or obtain at least one preferred conveyance service offering or at least one preferred conveyance service request. At least one map provider can use at least one visual representation, at least one dynamic map, at least one heat map, or a combination thereof, to facilitate, operate, or manage at least one conveyance service for at least one service provider operating in at least one conveyance industry segment.

At least one service provider can own, operate, or control at least one autonomous vehicle. At least one service provider can operate, own, or control at least one autonomous vehicle on behalf of at least one third party. At least one service provider can optionally be perceived or referred to as at least one owner or at least one controller of at least one autonomous vehicle. At least one service provider can operate, own, or control at least one network to facilitate at least one conveyance service in at least one conveyance industry segment. At least one service provider can operate, own, or control at least one autonomous vehicle, at least one representative, or a combination thereof, on at least one network. At least one service provider can operate, own, or control at least one autonomous vehicle, at least one representative, or a combination thereof, on at least one other network. At least one service provider can operate, own, or control at least one autonomous vehicle, at least one representative, or a combination thereof, on behalf of at least one third party on at least one network.

At least one service provider can be but is not limited to at least one vehicle that can have or utilize at least one designated locker, or the like, that can be at least one good supplier or at least one autonomous vehicle. At least one service provider can be but is not limited to at least one vehicle that can have or utilize at least one compartment, or the like, that can be at least one mobile good supplier, at least one mobile autonomous vehicle, at least one mobile store front, at least one last mile delivery vehicle, at least one mobile logistics provider, at least one mobile logistics supplier, or a combination thereof.

As a non-limiting example, at least one service provider can be but is not limited to at least one rideshare service controller, at least one ride-hail service controller, at least one car-share service controller, at least one taxi service controller, at least one shuttle service controller, at least one person delivery service controller, at least one food delivery service controller, at least one good delivery service controller, at least one animal delivery service controller, at least one medical service and delivery controller, at least one courier service controller, at least one item delivery service controller, at least one freight delivery service controller, at least one peer-to-peer conveyance service controller, at least one delivery service controller, at least one transportation service controller, or a combination thereof.

As a non-limiting example, at least one service provider can be perceived or referred to as at least one representative when utilizing at least one autonomous vehicle. As a non-limiting example, at least one service provider can be perceived or referred to as at least one autonomous vehicle, at least one representative, at least one good supplier, at least one fleet manager, at least one owner or at least one controller of at least one autonomous vehicle, at least one logistics provider, at least one logistics supplier, at least one map provider, at least one third party, or a combination thereof.

As a non-limiting example, at least one service provider can operate in at least one individual conveyance industry segment. As a non-limiting example, at least one service provider can be at least one source or at least one provider of all or some of at least one conveyance service request in conjunction with corresponding conveyance data, all or some of at least one conveyance service offering in conjunction with corresponding conveyance data, all or some of at least one real time or near real time geographical location of at least one representative, all or some of at least one real time or near real time geographical location of at least one conveyance client, all or some of conveyance data relating to at least one autonomous vehicle, all or some of at least one real time or near real time geographical location of at least one autonomous vehicle, or a combination thereof. As a non-limiting example, at least one service provider can provide at least one scooter service. As a non-limiting example, at least one service provider can provide at least one bicycle service.

As a non-limiting example, at least one service provider can have or utilize at least one API that can provide all or some of at least one conveyance service request in conjunction with corresponding conveyance data, all or some of at least one conveyance service offering in conjunction with corresponding conveyance data, all or some of at least one real time or near real time geographical location of at least one representative, all or some of at least one real time or near real time geographical location of at least one conveyance client, all or some of conveyance data relating to at least one autonomous vehicle, all or some of at least one real time or near real time geographical location of at least one autonomous vehicle, or a combination thereof. As a non-limiting example, at least one service provider can have or generate all or some of conveyance data.

As a non-limiting example, at least one service provider can operate or control at least one autonomous vehicle for or on behalf of at least one OEM or at least one auto manufacturer to provide at least one conveyance service. As a non-limiting example, at least one service provider can control or operate at least one autonomous vehicle or at least one fleet of at least one autonomous vehicle for or on behalf of at least one OEM on at least one network that can operate in at least one conveyance industry segment. As a non-limiting example, at least one service provider can utilize at least one external server for or with at least one conveyance industry segment. As a non-limiting example, at least one service provider can lease or sublease at least one autonomous vehicle. As a non-limiting example, at least one service provider can lease or sublease at least one fleet of at least one autonomous vehicle. As a non-limiting example, at least one service provider can lease or sublease at least one autonomous vehicle or at least one fleet of at least one autonomous vehicle from at least one third party.

As a non-limiting example, at least one service provider can have at least one conveyance service request displayed on at least one visual representation that can be provided by at least one map provider or at least one map provider application. As a non-limiting example, at least one service provider can have at least one conveyance service offering displayed on at least one visual representation that can be provided by at least one map provider or at least one map provider application.

Good Supplier

At least one good supplier can be for example at least one entity or at least one business that can provide or supply including but not limited to at least one good, at least one article, at least one thing, at least one item, or a combination thereof, to be conveyed in at least one conveyance service. At least one good supplier can be for example at least one entity or at least one business that can provide or supply including but not limited to at least one service, at least one delivery service, or a combination thereof.

At least one good supplier can be for example at least one entity or at least one business that can retain or contract with including but not limited to at least one representative, at least one autonomous vehicle, at least one owner or at least one controller of at least one autonomous vehicle, at least one service provider, at least one fleet manager, at least one logistics provider, at least one logistics supplier, at least one map provider, at least one third party, or a combination thereof, to provide at least one conveyance service. At least one good supplier can facilitate at least one conveyance service between including but not limited to at least one representative, at least one autonomous vehicle, at least one owner or at least one controller of at least one autonomous vehicle, at least one service provider, at least one fleet manager, at least one logistics provider, at least one logistics supplier, at least one conveyance client, at least one map provider, at least one third party, or a combination thereof.

At least one good supplier can for example utilize at least one external server that can be at least one source or at least one provider of at least one conveyance service request with corresponding conveyance data, at least one conveyance service offering with corresponding conveyance data, or a combination thereof, relating to at least one conveyance industry segment. At least one good supplier can use including but not limited to at least one central server, at least one external server, at least one application, or a combination thereof, to facilitate and perform at least one conveyance service.

At least one good supplier can operate in at least one conveyance industry segment. At least one good supplier can operate for or with at least one service provider or the like. At least one good supplier can independently control or operate including but not limited to at least one conveyance network of at least one representative, at least one autonomous vehicle, at least one good supplier, at least one map provider, at least one third party, at least one conveyance client, or a combination thereof. At least one good supplier can utilize Information Technology infrastructure relating to including but not limited to at least one good supplier, at least one service provider, at least one owner or at least one controller of at least one autonomous vehicle, at least one fleet manager, at least one logistics provider, at least one logistics supplier, at least one map provider, at least one third party, or a combination thereof. At least one good supplier can perform at least one function in real time or near real time being updated or refreshed in the highest level of development or state of the art. At least one good supplier can accept or decline at least one preferred conveyance service request or at least one preferred conveyance service offering.

At least one good supplier can use at least one visual representation, at least one dynamic map, at least one heat map, or a combination thereof, to facilitate, operate, or manage at least one conveyance service. At least one good supplier can use at least one visual representation, at least one dynamic map, at least one heat map, or a combination thereof, to facilitate, operate, or manage at least one conveyance service for at least one conveyance client or at least one representative. At least one good supplier can use at least one visual representation, at least one dynamic map, at least one heat map, or a combination thereof, as at least one tool for at least one conveyance client or at least one representative to secure or obtain at least one preferred conveyance service offering or at least one preferred conveyance service request. At least one map provider can use at least one visual representation, at least one dynamic map, at least one heat map, or a combination thereof, to facilitate, operate, or manage at least one conveyance service for at least one good supplier operating in at least one conveyance industry segment.

At least one good supplier can operate, own, or control at least one autonomous vehicle. At least one good supplier can operate, own, or control at least one autonomous vehicle on behalf of at least one third party. At least one good supplier can operate, own, or control at least one network to facilitate at least one conveyance service in at least one conveyance industry segment. At least one good supplier can operate, own, or control at least one autonomous vehicle on at least one network. At least one good supplier can operate, own, or control at least one autonomous vehicle on at least one other network. At least one good supplier can operate, own, or control at least one autonomous vehicle on behalf of at least one third party on at least one network.

At least one good supplier can be but is not limited to at least one vehicle that can have or utilize at least one designated locker, or the like, that can be at least one service provider or at least one autonomous vehicle. At least one good supplier can be but is not limited to at least one vehicle that can have or utilize at least one compartment, or the like, that can be at least one mobile service provider, at least one mobile autonomous vehicle, at least one mobile store front, at least one last mile delivery vehicle, at least one mobile logistics provider, at least one mobile logistics supplier, or a combination thereof.

As a non-limiting example, at least one good supplier can be but is not limited to at least one food delivery service controller, at least one good delivery service controller, at least one animal delivery service controller, at least one medical service and delivery controller, at least one courier service controller, at least one item delivery service controller, at least one freight delivery service controller, at least one peer-to-peer conveyance service controller, at least one delivery service controller, at least one transportation service controller, or a combination thereof.

As a non-limiting example, at least one good supplier can be perceived or referred to as at least one service provider. As a non-limiting example, at least one good supplier can optionally be perceived or referred to as at least one autonomous vehicle, at least one representative, at least one service provider, at least one fleet manager, at least one owner or at least one controller of at least one autonomous vehicle, at least one logistics provider, at least one logistics supplier, at least one map provider, at least on third party, or a combination thereof.

As a non-limiting example, at least one good supplier can be at least one food truck. As a non-limiting example, at least one good supplier can be at least one entity that produces or supplies freight. As a non-limiting example, at least one good supplier can provide or perform at least one conveyance service relating to at least one food item. As a non-limiting example, at least one good supplier can operate in at least one individual conveyance industry segment. As a non-limiting example, at least one good supplier can operate for at least one individual service provider. As a non-limiting example, at least one good supplier can be at least one source or at least one provider of at least one conveyance service request in conjunction with corresponding conveyance data, at least one conveyance service offering in conjunction with corresponding conveyance data, at least one real time or near real time geographical location of at least one representative, at least one real time or near real time geographical location of at least one conveyance client, all or some of conveyance data relating to at least one autonomous vehicle, at least one real time or near real time geographical location of at least one autonomous vehicle, or a combination thereof.

As a non-limiting example, at least one good supplier can optionally retain and/or contract with at least one representative, at least one autonomous vehicle, or a combination thereof. As a non-limiting example, at least one good supplier can use, including but not limited to, at least one central server, at least one external server, at least one application, or a combination thereof, to facilitate at least one conveyance service.

As a non-limiting example, at least one good supplier can have or utilize at least one API that can provide all or some of at least one conveyance service request in conjunction with corresponding conveyance data, all or some of at least one conveyance service offering in conjunction with corresponding conveyance data, all or some of at least one real time or near real time geographical location of at least one representative, all or some of at least one real time or near real time geographical location of at least one conveyance client, all or some of conveyance data relating to at least one autonomous vehicle, all or some of at least one real time or near real time geographical location of at least one autonomous vehicle, or a combination thereof. As a non-limiting example, at least one good supplier can have or generate all or some of conveyance data.

As a non-limiting example, at least one good supplier can utilize at least one external server for or with at least one conveyance industry segment. As a non-limiting example, at least one good supplier can lease or sublease at least one autonomous vehicle. As a non-limiting example, at least one good supplier can lease or sublease at least one fleet of at least one autonomous vehicle. As a non-limiting example, at least one good supplier can lease or sublease at least one autonomous vehicle or at least one fleet of at least one autonomous vehicle from at least one third party.

As a non-limiting example, at least one good supplier can have at least one conveyance service request displayed on at least one visual representation that can be provided by at least one map provider or at least one map provider application. As a non-limiting example, at least one good supplier can have at least one conveyance service offering displayed on at least one visual representation that can be provided by at least one map provider or at least one map provider application.

Representative

At least one representative can be but is not limited to at least one person, at least one entity, at least one robot, at least one machine, or the like, that can for example secure or obtain at least one preferred conveyance service request, at least one filtered conveyance service request, at least one conveyance service request, or a combination thereof. At least one representative can provide or perform at least one conveyance service of including but not limited to at least one person, at least one good, at least one article, at least one thing, at least one item, at least one conveyance client, or a combination thereof. At least one representative can be retained by or contracted with at least one service provider, at least one good supplier, at least one owner or at least one controller of at least one autonomous vehicle, at least one fleet manager, at least one logistics provider, at least one logistics supplier, or a combination thereof. At least one representative can be at least one entity or at least one person that can for example provide or perform at least one service, at least one delivery service, or a combination thereof. At least one representative can own, operate, or control at least one autonomous vehicle.

At least one representative can at any time sign on and/or sign off of including but not limited to at least one service provider network, at least one owner or at least one controller of at least one autonomous vehicle network, at least one fleet manager network, at least one logistics provider network, at least one logistics supplier network, at least one application, at least one central server, at least one external server, or a combination thereof. At least one representative can sign in to including but not limited to at least one service provider network, at least one owner or at least one controller of at least one autonomous vehicle network, at least one fleet manager network, at least one logistics provider network, at least one logistics supplier network, at least one central server, at least one external server, or a combination thereof. Once, for example, at least one beginning service geographical location, at least one ending service geographical location, pricing information, or a combination thereof, is known, at least one conveyance service offering relating to at least one representative can be generated.

At least one representative can input or provide at least one representative preference to be used to filter at least one conveyance service request. At least one representative can input or provide at least one representative preference used to identify including but not limited to at least one preferred conveyance service request, at least one filtered conveyance service request, or a combination thereof.

At least one representative can use at least one application to access at least one service provider network, at least one good supplier network, at least one owner or at least one controller of at least one autonomous vehicle network, at least one fleet manager network, at least one logistics provider network, at least one logistics supplier network, or a combination thereof, via including but not limited to at least one terminal, at least one central server, at least one external server, at least one application, or a combination thereof, to facilitate at least one conveyance service. At least one representative can provide at least one conveyance service in at least one conveyance industry segment. At least one representative can provide at least one conveyance service for at least one service provider, at least one good supplier, at least one owner or at least one controller of at least one autonomous vehicle, at least one fleet manager, at least one logistics provider, at least one logistics supplier, or a combination thereof. At least one representative can use Information Technology infrastructure relating to including but not limited to at least one service provider, at least one good supplier, at least one owner or at least one controller of at least one autonomous vehicle, at least one fleet manager, at least one logistics provider, at least one logistics supplier, or a combination thereof. At least one representative can perform at least one function in real time or near real time being updated or refreshed in the highest level of development or state of the art.

As a non-limiting example, at least one representative can secure or obtain at least one filtered conveyance service request other than at least one preferred conveyance service request. As a non-limiting example, at least one representative can secure or obtain at least one preferred conveyance service request using at least one application, at least one central server, at least one external server, or a combination thereof. As a non-limiting example, at least one representative can use at least one visual representation such as but not limited to at least one dynamic map, at least one heat map, or a combination thereof, to analyze or evaluate and then secure or obtain at least one preferred conveyance service request.

As a non-limiting example, at least one representative can be perceived or referred to as at least one service provider or the like when utilizing at least one autonomous vehicle. As a non-limiting example, at least one representative can be perceived or referred to as at least one owner or at least one controller of at least one autonomous vehicle or the like when utilizing at least one autonomous vehicle. As a non-limiting example, at least one representative can be perceived or referred to as at least one autonomous vehicle, at least one owner or at least one controller of at least one autonomous vehicle, at least one service provider, at least one good supplier, at least one fleet manager, at least one logistics provider, at least one logistics supplier, at least one third party, or a combination thereof. As a non-limiting example, at least one representative can use at least one autonomous vehicle to perform at least one conveyance service. As a non-limiting example, at least one representative can be perceived or referred to as at least one good supplier or the like when utilizing at least one autonomous vehicle. As a non-limiting example, at least one representative can use at least one scooter or at least one bicycle.

As a non-limiting example, at least one representative can be at least one independent third party. As a non-limiting example, at least one representative can be at least one independent contractor. As a non-limiting example, in the ride-hail/ride-share industry segment, at least one representative can be at least one driver. As a non-limiting example, in the food delivery industry segment, at least one representative can be at least one driver picking up at least one food item and dropping at least one food item off to at least one conveyance client. As a non-limiting example, in the courier industry segment, at least one representative can be at least one person picking up and dropping off at least one good, at least one thing, at least one article, or a combination thereof As a non-limiting example, at least one representative can provide at least one conveyance service in at least one individual conveyance industry segment. As a non-limiting example, at least one representative can provide at least one conveyance service for at least one individual service provider.

As a non-limiting example, at least one representative can utilize or perform at least one function of at least one visual representation the same or similar as at least one conveyance client. As a non-limiting example, at least one representative can be managed or operated with at least one autonomous vehicle or at least one fleet of at least one autonomous vehicle to perform at least one conveyance service. As a non-limiting example, at least one service provider, at least one fleet manager, at least one logistics provider, at least one logistics supplier, or the like, can use at least one representative and at least one autonomous vehicle to perform at least one conveyance service in at least one conveyance industry segment. As a non-limiting example, at least one representative can have or generate all or some of conveyance data.

As a non-limiting example, at least one representative can perform all or some of at least one conveyance service. As a non-limiting example, at least one representative can perform all or some of at least one conveyance service in conjunction with at least one autonomous vehicle. As a non-limiting example, at least one representative can perform part of at least one conveyance service and at least one autonomous vehicle can perform at least one other part of at least one conveyance service. As a non-limiting example, at least one representative can perform part of at least one conveyance service during at least one waypoint and at least one autonomous vehicle can perform at least one other part of at least one conveyance service.

As a non-limiting example, at least one representative can pick up food and put the food in at least one autonomous vehicle to be delivered. As a non-limiting example, at least one representative can order food and put the food in at least one autonomous vehicle to be delivered. As a non-limiting example, at least one representative can put food in at least one autonomous vehicle, such as at least one drone to be delivered. As a non-limiting example, at least one representative can put food in at least one autonomous vehicle, such as at least one autonomous ground vehicle to be delivered. As a non-limiting example, at least one representative can be perceived as or similar to at least one scooter, at least one scooter service, at least one bicycle, at least one bicycle service, or the like.

Visual Representation

At least one visual representation can for example facilitate at least one operation or at least one function to secure or obtain at least one preferred conveyance service request or at least one preferred conveyance service offering. At least one visual representation can be for example utilized or operated by at least one conveyance client, at least one representative, at least one service provider, at least one good supplier, at least one fleet manager, at least one owner or at least one controller of at least one autonomous vehicle, at least one logistics provider, at least one logistics supplier, at least one map provider, at least one third party, or a combination thereof.

At least one visual representation can be at least one tool used to assist at least one representative analyze or evaluate at least one conveyance service request or at least one conveyance service request metric on, for example, at least one geographical map to secure or obtain at least one preferred conveyance service request. At least one visual representation can be at least one tool used to assist at least one conveyance client analyze or evaluate at least one conveyance service offering or at least one conveyance service offering metric on, for example, at least one geographical map to secure or obtain at least one preferred conveyance service offering. At least one visual representation can be viewed from including but not limited to at least one perspective, at least one point of reference, at least one point of interest, or a combination thereof. At least one visual representation can be including but not limited to at least one dynamic map, at least one real time or near real time heat map, at least one historical heat map, at least one predictive heat map, or a combination thereof.

At least one visual representation can facilitate securing or obtaining at least one preferred conveyance service request or at least one preferred conveyance service offering. At least one visual representation can be used to facilitate securing or obtaining at least one preferred conveyance service request or at least one preferred conveyance service offering. At least one visual representation can facilitate securing or obtaining at least one preferred conveyance service request or at least one preferred conveyance service offering utilizing at least one application. At least one visual representation can facilitate securing or obtaining at least one preferred conveyance service request or at least one preferred conveyance service offering, utilizing at least one service provider application, at least one third party application, or the like.

At least one visual representation can be, for example, at least one geographical map that can display including but not limited to at least one preferred conveyance service request in conjunction with corresponding conveyance data, at least one filtered conveyance service request in conjunction with corresponding conveyance data, at least one conveyance service request in conjunction with corresponding conveyance data, at least one preferred conveyance service offering in conjunction with corresponding conveyance data, at least one filtered conveyance service offering in conjunction with corresponding conveyance data, at least one conveyance service offering in conjunction with corresponding conveyance data, at least one metric relating to a respective request or offering, at least one real time or near real time geographical location of at least one representative, at least one real time or near real time geographical location of at least one autonomous vehicle, at least one real time or near real time geographical location of at least one service provider, at least one real time or near real time geographical location of at least one good supplier, at least one real time or near real time geographical location of at least one fleet manager, at least one real time or near real time geographical location of at least one conveyance client, at least one real time or near real time geographical location of at least one logistics provider, at least one real time or near real time geographical location of at least one logistics supplier, at least one conveyance client preference, at least one representative preference, or a combination thereof.

At least one visual representation can be, for example, at least one geographical map that can display including but not limited to at least one preferred conveyance service offering in conjunction with corresponding conveyance data, at least one filtered conveyance service offering in conjunction with corresponding conveyance data, at least one conveyance service offering in conjunction with corresponding conveyance data, at least one metric relating to at least one respective offering, or a combination thereof.

At least one visual representation can be displayed in or on at least one autonomous vehicle. At least one visual representation can be displayed in or on at least one autonomous vehicle to show at least one route or at least one path for at least one autonomous vehicle. At least one visual representation can be utilized by at least one conveyance client in at least one autonomous vehicle. At least one visual representation can have or be associated with at least one commercial or at least one advertisement. At least one visual representation can be at least one interactive map. At least one visual representation can be at least one interactive map that can be used by at least one conveyance client. At least one visual representation can be at least one interactive map that can be used by at least one representative.

At least one visual representation can be at least one interactive map that can be used by at least one conveyance client to communicate with, including but not limited to, at least one service provider, at least one good supplier, at least one fleet manager, at least one owner or at least one controller of at least one autonomous vehicle, at least one logistics provider, at least one logistics supplier, at least one autonomous vehicle, at least one map provider, at least one third party, at least one representative, or a combination thereof. At least one visual representation can be at least one interactive map that can be used by at least one representative to communicate with, including but not limited to, at least one service provider, at least one good supplier, at least one fleet manager, at least one owner or at least one controller of at least one autonomous vehicle, at least one logistics provider, at least one logistics supplier, at least one autonomous vehicle, at least one map provider, at least one third party, at least one conveyance client, or a combination thereof.

At least one visual representation can be utilized and updated in real time or near real time by communicating information or data including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of at least one preferred conveyance service offering in conjunction with corresponding conveyance data, all or some of at least one filtered conveyance service offering in conjunction with corresponding conveyance data, all or some of at least one conveyance service offering in conjunction with corresponding conveyance data, all or some of subsequent or additional plurality of filtered conveyance service offerings in conjunction with corresponding conveyance data, all or some of subsequent or additional at least one preferred conveyance service offering in conjunction with corresponding conveyance data, at least one beginning service geographical location, at least one ending service geographical location, all or some of at least one real time or near real time geographical location of at least one representative, all or some of at least one real time or near real time geographical location of at least one conveyance client, at least one representative preference, at least one conveyance client preference, at least one secured or obtained preferred conveyance service request, at least one secured or obtained preferred conveyance service offering, or the like. At least one visual representation can be utilized and updated in real time or near real time by communicating information or data with at least one central server, at least one external server, at least one application, or a combination thereof.

At least one visual representation can be compiled on including but not limited to at least one application, at least one central server, or a combination thereof. At least one visual representation can be displayed on including but not limited to at least one application, at least one central server, at least one remote display, or a combination thereof At least one visual representation can be in any form or format, preferably visual. At least one variation in the form, format, and order of at least one visual representation component is within the scope of the present invention. At least one visual representation can be updated or refreshed in real time or near real time and can refer to being updated or refreshed in the highest level of development or state of the art. At least one visual representation can perform at least one function in real time or near real time and can refer to being updated or refreshed in the highest level of development or state of the art.

At least one representative can use at least one visual representation to apply at least one representative preference to display including but not limited to at least one preferred conveyance service request, at least one filtered conveyance service request, or a combination thereof, that can relate to at least one representative preference. Applying or using at least one representative preference can allow at least one representative to filter out, hide, or remove at least one conveyance service request from at least one visual representation that do not match at least one representative preference, to better identify at least one preferred conveyance service request or at least one geographical area to secure or obtain at least one preferred conveyance service request. At least one representative can browse or navigate at least one area of at least one visual representation to identify and then secure or obtain at least one preferred conveyance service request or at least one filtered conveyance service request by selecting at least one preferred conveyance service request or at least one filtered conveyance service request.

At least one conveyance client can use at least one visual representation to apply at least one conveyance client preference to display including but not limited to at least one preferred conveyance service offering, at least one filtered conveyance service offering, or a combination thereof, that can relate to at least one conveyance client preference. Applying or using at least one conveyance client preference can allow at least one conveyance client to filter out, hide, or remove at least one conveyance service offering from at least one visual representation that do not match at least one conveyance client preference, to better identify at least one preferred conveyance service offering or at least one geographical area to secure or obtain at least one preferred conveyance service offering. At least one conveyance client can browse or navigate at least one area of at least one visual representation to identify and then secure or obtain at least one preferred conveyance service offering or at least one filtered conveyance service offering by selecting at least one preferred conveyance service offering or at least one filtered conveyance service offering.

At least one visual representation can display including but not limited to at least one conveyance service request, at least one conveyance service request metric, at least one conveyance service offering, at least one conveyance service offering metric, or a combination thereof, in at least one conveyance industry segment on at least one geographical map respectively. At least one visual representation can be at least one tool that can display including but not limited to at least one conveyance service request, at least one conveyance service request metric, at least one conveyance service offering, at least one conveyance service offering metric, or a combination thereof, relating to at least one service provider on at least one geographical map respectively. At least one visual representation can display at least one route from at least one representative to at least one beginning service geographical location and then to at least one ending service geographical location.

At least one service provider, at least one good supplier, at least one fleet manager, at least one owner or at least one controller of at least one autonomous vehicle, at least one logistics provider, at least one logistics supplier, at least one map provider, at least one third party, or a combination thereof, can be displayed on or with at least one visual representation that can display at least one level of service preference. At least one owner or at least one controller of at least one autonomous vehicle, at least one service provider, at least one good supplier, at least one fleet manager, at least one logistics provider, at least one logistics supplier, at least one map provider, at least one third party, or a combination thereof, can be displayed on or with at least one dynamic map that can display at least one level of service preference. At least one owner or at least one controller of at least one autonomous vehicle, at least one service provider, at least one good supplier, at least one fleet manager, at least one logistics provider, at least one logistics supplier, at least one map provider, at least one third party, or a combination thereof, can be displayed on or with at least one heat map that can display at least one level of service preference.

At least one visual representation can comprise at least one dynamic map and can display at least one level of service preference relating to at least one service provider, at least one good supplier, at least one owner or at least one controller of at least one autonomous vehicle, at least one fleet manager, at least one logistics provider, at least one logistics supplier, at least one map provider, at least one third party, or a combination thereof, operating in at least one conveyance industry segment. At least one visual representation can display at least one dynamic map with at least one level of service preference as at least one tab or at least one icon relating to at least one service provider, at least one good supplier, at least one owner or at least one controller of at least one autonomous vehicle, at least one fleet manager, at least one logistics provider, at least one logistics supplier, at least one map provider, at least one third party, or a combination thereof, operating in at least one conveyance industry segment.

At least one visual representation can display at least one dynamic map, at least one conveyance client preference, at least one conveyance service offering, at least one filtered conveyance service offering, at least one preferred conveyance service offering, all or some of at least one real time or near real time geographical location of at least one conveyance client, or a combination thereof. At least one visual representation can display at least one dynamic map, at least one conveyance client preference, at least one conveyance service offering, at least one filtered conveyance service offering, at least one preferred conveyance service offering, or a combination thereof, relating to at least one real time or near real time geographical location of at least one conveyance client. At least one visual representation can display at least one dynamic map, at least one conveyance client preference, at least one conveyance service offering, at least one filtered conveyance service offering, at least one preferred conveyance service offering, all or some of at least one real time or near real time geographical location of at least one conveyance client, or a combination thereof, relating to at least one conveyance client preference.

At least one visual representation can utilize at least one application, at least one terminal, at least one central server, at least one external server, at least one link, or a combination thereof, that can be combined or integrated. At least one visual representation can utilize at least one application, at least one terminal, at least one central server, at least one external server, at least one link, or a combination thereof, that can be combined or integrated on at least one smartphone. At least one visual representation can utilize at least one application, at least one autonomous vehicle, at least one terminal, at least one central server, at least one external server, at least one link, or a combination thereof, that can be combined or integrated.

As a non-limiting example, at least one representative can use at least one visual representation to analyze or evaluate at least one historical preferred conveyance service request relating to at least one, service provider. As a non-limiting example, at least one conveyance client can use at least one visual representation to analyze or evaluate at least one historical preferred conveyance service offering relating to at least one service provider. As a non-limiting example, at least one visual representation can be compiled on at least one third party server such as but not limited to at least one map provider server. As a non-limiting example, at least one representative and/or at least one conveyance client can use at least one visual representation to analyze or evaluate pricing information or at least one other metric from at least one service provider respectively. As a non-limiting example, at least one visual representation can be used to analyze or evaluate at least one area on at least one geographical map that can show at least one metric relating to at least one individual conveyance industry segment. As a non-limiting example, at least one visual representation can be used to analyze or evaluate at least one area on at least one geographical map that can show at least one metric relating to at least one individual service provider.

As a non-limiting example, at least one visual representation can be compiled with information or data from at least one map provider. As a non-limiting example, at least one level of service preference can be used by at least one conveyance client to identify at least one at least one luxury vehicle, at least one environmentally friendly vehicle, at least one driverless vehicle, or the like. As a non-limiting example, at least one visual representation can display at least one scooter, at least one bicycle, at least one mobility option, or the like.

As a non-limiting example, at least one level of service preference can be displayed on or with at least one visual representation to identify different levels of service that at least one service provider, at least one good supplier, at least one owner or at least one controller of at least one autonomous vehicle, at least one fleet manager, at least one logistics provider, at least one logistics supplier, at least one map provider, at least one third party, or a combination thereof, can provide. As a non-limiting example, at least one level of service preference can be displayed as at least one icon or at least one visual with or on at least one visual representation to allow at least one selection of different levels of service that at least one service provider, at least one good supplier, at least one owner or at least one controller of at least one autonomous vehicle, at least one fleet manager, at least one logistics provider, at least one logistics supplier, at least one map provider, at least one third party, or a combination thereof, can provide. As a non-limiting example, at least one level of service preference can be displayed on at least one visual representation to identify different levels of service that at least one service provider, at least one good supplier, at least one owner or at least one controller of at least one autonomous vehicle, at least one fleet manager, at least one logistics provider, at least one logistics supplier, at least one map provider, at least one third party, or a combination thereof, can provide.

As a non-limiting example, at least one visual representation can facilitate securing or obtaining at least one preferred conveyance service request or at least one preferred conveyance service offering utilizing more than one application. As a non-limiting example, at least one third party can provide at least one visual representation on a third party application that can be used to facilitate securing or obtaining at least one preferred conveyance service request on at least one service provider application or the like. As a non-limiting example, at least one third party can provide at least one visual representation on a third party application that can be used to facilitate securing or obtaining at least one preferred conveyance service offering on at least one service provider application or the like.

Dynamic Map

At least one dynamic map can be at least one visual representation that can for example facilitate at least one operation or at least one function to secure or obtain at least one preferred conveyance service request or at least one preferred conveyance service offering. At least one dynamic map can be at least one visual representation that can for example be utilized or operated by at least one conveyance client, at least one representative, at least one service provider, at least one good supplier, at least one fleet manager, at least one owner or at least one controller of at least one autonomous vehicle, at least one logistics provider, at least one logistics supplier, at least one map provider, at least one third party, or a combination thereof.

At least one dynamic map can be for example at least one geographical map that can display including but not limited to at least one conveyance service request in conjunction with corresponding conveyance data, at least one filtered conveyance service request in conjunction with corresponding conveyance data, at least one preferred conveyance service request in conjunction with corresponding conveyance data, or a combination thereof. At least one dynamic map can be for example at least one geographical map that can display including but not limited to at least one conveyance service offering in conjunction with corresponding conveyance data, at least one filtered conveyance service offering in conjunction with corresponding conveyance data, at least one preferred conveyance service offering in conjunction with corresponding conveyance data, or a combination thereof. At least one dynamic map can be for example at least one geographical map that can display including but not limited to at least one real time or near real time geographical location of at least one autonomous vehicle, at least one real time or near real time geographical location of at least one representative, at least one real time or near real time geographical location of at least one conveyance client, or a combination thereof.

At least one dynamic map can be used by at least one representative or the like to analyze or evaluate and then preferably secure or obtain at least one preferred conveyance service request. At least one dynamic map can be used by at least one representative or the like to find or identify and preferably secure or obtain at least one preferred conveyance service request for at least one representative relating to at least one service provider or the like operating in at least one conveyance industry segment. At least one dynamic map can be used by at least one conveyance client or the like to analyze or evaluate and then preferably secure or obtain at least one preferred conveyance service offering. At least one dynamic map can be used by at least one conveyance client or the like to find or identify and preferably secure or obtain at least one preferred conveyance service offering for at least one conveyance client relating to at least one service provider or the like operating in at least one conveyance industry segment.

At least one dynamic map can be but is not limited to at least one geographical map that can for example display at least one distinguishable conveyance client, at least one distinguishable representative, at least one distinguishable autonomous vehicle, at least one distinguishable service provider, at least one distinguishable good supplier, or the like. At least one preferred conveyance service request, at least one filtered conveyance service request, at least one preferred conveyance service offering, at least one filtered conveyance service offering, at least one conveyance client, at least one representative, at least one autonomous vehicle, at least one service provider, at least one good supplier, at least one owner or at least one controller of at least one autonomous vehicle, at least one fleet manager, at least one logistics provider, at least one logistics supplier, at least one map provider, at least one third party, or a combination thereof, can be displayed individually as at least one mobile or transitory icon or at least one mobile or transitory visual on at least one dynamic map. At least one dynamic map can be compiled on including but not limited to at least one application, at least one central server, at least one external server, or a combination thereof At least one dynamic map can be in any form or format, preferably visual. At least one variation in the form, format, and order of at least one dynamic map component is within the scope of the present invention.

At least one dynamic map can be viewed from including but not limited to at least one perspective, at least one point of reference, at least one point of interest, or a combination thereof. At least one real time or near real time geographical location of including but not limited to at least one conveyance client, at least one representative, at least one autonomous vehicle, at least one service provider, at least one good supplier, at least one owner or at least one controller of at least one autonomous vehicle, at least one fleet manager, at least one logistics provider, at least one logistics supplier, at least one map provider, at least one third party, or a combination thereof, can change and can be updated in real time or near real time and can optionally reflect their availability status. At least one dynamic map can be updated or refreshed in real time or near real time and can refer to being updated or refreshed in the highest level of development or state of the art. At least one dynamic map can perform at least one function in real time or near real time and can refer to being updated or refreshed in the highest level of development or state of the art.

At least one dynamic map can be used to analyze or evaluate at least one area on at least one geographical map that can show at least one different service provider or at least one other conveyance service metric relating to at least one service provider. At least one dynamic map can be used to analyze or evaluate at least one area on at least one geographical map that can show at least one available service provider or at least one other conveyance service metric relating to at least one conveyance industry segment. At least one dynamic map can be used to analyze or evaluate at least one location of including but not limited to at least one conveyance client, at least one representative, at least one autonomous vehicle, at least one service provider, at least one good supplier, at least one owner or at least one controller of at least one autonomous vehicle, at least one fleet manager, at least one logistics provider, at least one logistics supplier, at least one map provider, at least one third party, or a combination thereof, from at least one service provider. At least one dynamic map can be combined with at least one heat map.

At least one preferred conveyance service request can be displayed in at least one visually identifiable format compared to at least one filtered conveyance service request. At least one preferred conveyance service offering can be displayed in at least one visually identifiable format compared to at least one filtered conveyance service offering.

At least one representative can use at least one dynamic map to analyze or evaluate at least one filtered conveyance service request, at least one preferred conveyance service request, at least one conveyance client, at least one good supplier, at least one conveyance service metric, or a combination thereof, relating to at least one service provider or the like across at least one conveyance industry segment. At least one conveyance client can use at least one dynamic map to analyze or evaluate including but not limited to at least one filtered conveyance service offering, at least one preferred conveyance service offering, at least one representative, at least one autonomous vehicle, at least one good supplier, at least one conveyance service metric, or a combination thereof, relating to at least one service provider or the like across at least one conveyance industry segment.

At least one dynamic map can facilitate securing or obtaining at least one preferred conveyance service request or at least one preferred conveyance service offering. At least one dynamic map can be used to facilitate securing or obtaining at least one preferred conveyance service request or at least one preferred conveyance service offering. At least one dynamic map can facilitate securing or obtaining at least one preferred conveyance service request or at least one preferred conveyance service offering utilizing at least one application. At least one dynamic map can facilitate securing or obtaining at least one preferred conveyance service request or at least one preferred conveyance service offering, utilizing at least one service provider application, at least one third party application, at least one map provider application, or the like.

At least one service provider, at least one good supplier, at least one fleet manager, at least one owner or at least one controller of at least one autonomous vehicle, at least one logistics provider, at least one logistics supplier, at least one representative, at least one conveyance client, at least one map provider, at least one third party, or a combination thereof, can be displayed on or with at least one dynamic map that can display at least one level of service preference.

As a non-limiting example, at least one individual service provider can be displayed as at least one different icon, at least one different symbol, at least one different color, at least one different shading, at least one different visual, or the like. As a non-limiting example, at least one individual service provider can be displayed as at least one similar icon, at least one similar symbol, at least one similar color, at least one similar shading, at least one similar visual, or the like for at least one conveyance service, at least one level of service, or a combination thereof. As a non-limiting example, at least one service provider can be displayed on at least one dynamic map with at least one similar or different icon, at least one similar or different symbol, at least one similar or different color, at least one similar or different shading, at least one similar or different visual, or the like but can be identifiably different.

As a non-limiting example, at least one dynamic map can be compiled on at least one central server and then transmitted to and displayed on at least one application. As a non-limiting example, at least one dynamic map can be used for at least one individual conveyance industry segment. As a non-limiting example, at least one dynamic map can be used for at least one individual service provider or the like. As a non-limiting example, at least one dynamic map can have one car icon or the like represent at least one service provider as half black/half white. As a non-limiting example, at least one dynamic map can display at least one icon or the like to show that at least one conveyance client has inputted or generated at least one conveyance service request to at least one service provider by displaying at least one conveyance client and/or at least one conveyance service request as half red and half blue. As a non-limiting example, at least one dynamic map can display at least one icon or the like to show that at least one representative or at least one autonomous vehicle can work for at least one additional service provider or the like by displaying at least one car icon or the like and/or at least one conveyance service offering as half black and half pink. As a non-limiting example, at least one dynamic map can display at least one scooter, at least one scooter service, at least one bicycle, at least one bicycle service, or the like.

As a non-limiting example, at least one dynamic map can utilize at least one application, at least one terminal, at least one central server, at least one external server, at least one link, or a combination thereof, that can be combined or integrated. As a non-limiting example, at least one dynamic map can utilize at least one application, at least one terminal, at least one central server, at least one external server, at least one link, or a combination thereof, that can be combined or integrated on at least one smartphone.

As a non-limiting example, at least one map provider can provide or utilize at least one dynamic map that can display at least one individual service provider, at least one individual good supplier, or the like, with associated conveyance service offerings or associated conveyance service requests.

As a non-limiting example, at least one conveyance client can visually identify at least one service provider, at least one good supplier, or the like, and the corresponding at least one conveyance service offering associated on at least one dynamic map. As a non-limiting example, at least one conveyance client can visually identify three service providers on at least one dynamic map with the associated conveyance service offerings along with pricing information. As a non-limiting example, at least one representative can visually identify at least one service provider, at least one good supplier, or the like, and the corresponding at least one conveyance service request associated on at least one dynamic map. As a non-limiting example, at least one representative can visually identify four good suppliers on at least one dynamic map with the associated conveyance service requests along with pricing information.

As a non-limiting example, at least one level of service preference can be displayed on at least one dynamic map to identify different levels of service that at least one service provider or the like can provide. As a non-limiting example, at least one owner or at least one controller of at least one autonomous vehicle, at least one service provider, at least one good supplier, at least one fleet manager, at least one logistics provider, at least one logistics supplier, at least one conveyance client, at least one representative, at least one third party, or a combination thereof, can be displayed on or with at least one dynamic map that can display at least one level of service preference and can be represented by at least one mobile or transitory icon.

As a non-limiting example, at least one dynamic map can facilitate securing or obtaining at least one preferred conveyance service offering utilizing more than one application.

As a non-limiting example, at least one third party can provide at least one dynamic map on a third party application that can be used to facilitate securing or obtaining at least one preferred conveyance service offering on at least one service provider application or the like. As a non-limiting example, at least one dynamic map can facilitate securing or obtaining at least one preferred conveyance service request utilizing more than one application. As a non-limiting example, at least one third party can provide at least one dynamic map on a third party application that can be used to facilitate securing or obtaining at least one preferred conveyance service request on at least one service provider application or the like.

Heat Map

At least one heat map can be at least one visual representation that can for example facilitate at least one operation or at least one function to secure or obtain at least one preferred conveyance service request or at least one preferred conveyance service offering. At least one heat map can be at least one visual representation that can for example be utilized or operated by at least one conveyance client, at least one representative, at least one service provider, at least one good supplier, at least one fleet manager, at least one owner or at least one controller of at least one autonomous vehicle, at least one logistics provider, at least one logistics supplier, at least one map provider, at least one third party, or a combination thereof.

At least one heat map can for example provide an improved way to visualize how at least one metric varies across at least one geographical area or can show at least one level of variability within at least one geographical region of at least one metric. At least one heat map can be but is not limited to at least one geographical map in which at least one area can be for example shaded or patterned in proportion to at least one measurement of at least one statistical variable being displayed on at least one geographical map. At least one heat map can be used by at least one representative to analyze or evaluate and then preferably secure or obtain at least one preferred conveyance service request. At least one heat map can be used by at least one conveyance client to analyze or evaluate and then preferably secure or obtain at least one preferred conveyance service offering.

At least one statistical variable can be aggregated or not aggregated. At least one statistical variable can be quantitative, qualitative, or a combination thereof. At least one statistical variable can be but is not limited to at least one measurement of conveyance service availability, pricing, elevated pricing, conveyance service offering density, filtered conveyance service offering density, preferred conveyance service offering density, conveyance service request density, filtered conveyance service request density, preferred conveyance service request density, preferred good supplier density, at least one preferred conveyance industry segment, conveyance industry segment density, level of service density, at least one conveyance service distance, at least one estimated time of arrival, preferred representative density, representative density, conveyance client density, service provider density, good supplier density, or a combination thereof.

At least one metric can be at least one basis for comparison or at least one reference point against which at least one other thing can be evaluated. At least one metric can be at least one standard of measurement by which value, efficiency, performance, progress or quality of at least one process, at least one product or at least one variable can be assessed.

At least one distinguishable pricing metric, at least one distinguishable conveyance service metric, at least one distinguishable conveyance client metric, at least one distinguishable representative metric, at least one distinguishable autonomous vehicle metric, at least one distinguishable service provider metric, and/or at least one distinguishable good supplier metric can optionally be aggregated and/or differentiated on at least one heat map. At least one variation in the form, format, and order of at least one heat map component is within the scope of the present invention. At least one heat map can be in any form or format, preferably visual. At least one heat map can be viewed from including but not limited to at least one perspective, at least one point of reference, at least one point of interest, or a combination thereof. At least one heat map can be compiled on including but not limited to at least one application, at least one central server, or a combination thereof.

At least one heat map can be at least one geographical map that can display at least one visual depiction of at least one statistical variable of including but not limited to at least one conveyance service request in conjunction with corresponding conveyance data, at least one filtered conveyance service request in conjunction with corresponding conveyance data, at least one preferred conveyance service request in conjunction with corresponding conveyance data, or a combination thereof. At least one heat map can be at least one geographical map that can display at least one visual depiction of at least one statistical variable of including but not limited to at least one conveyance service offering in conjunction with corresponding conveyance data, at least one filtered conveyance service offering in conjunction with corresponding conveyance data, at least one preferred conveyance service offering in conjunction with corresponding conveyance data, or a combination thereof.

At least one heat map can be updated or refreshed in real time or near real time and can refer to being updated or refreshed in the highest level of development or state of the art. At least one heat map can perform at least one function in real time or near real time and can refer to being updated or refreshed in the highest level of development or state of the art.

At least one heat map can be used to analyze or evaluate at least one area on at least one geographical map that can for example show at least one pricing metric or at least one other conveyance service metric relating to at least one service provider, at least one good supplier, or the like. At least one heat map can be used to analyze or evaluate at least one area on at least one geographical map that can for example show at least one pricing metric or at least one other conveyance service metric relating to at least one conveyance industry segment. At least one heat map can be combined with at least one dynamic map.

At least one representative can use at least one heat map to analyze or evaluate at least one measurement of at least one statistical variable from at least one service provider, at least one good supplier, or the like, across at least one conveyance industry segment. At least one conveyance client can use at least one heat map to analyze or evaluate at least one measurement of at least one statistical variable from at least one service provider, at least one good supplier, or the like, across at least one conveyance industry segment.

At least one heat map can be including but not limited to at least one real time or near real time heat map, at least one historical heat map, at least one predictive heat map, or a combination thereof.

At least one real time or near real time heat map, at least one historical heat map, at least one predictive heat map, or a combination thereof, can be at least one tool to aid at least one representative or at least one conveyance client when analyzing or evaluating at least one conveyance service metric. At least one real time or near real time heat map can display at least one time frame in seconds, minutes, hours, days, or any other increment of time. At least one historical heat map can display at least one time frame in seconds, minutes, hours, days, or any other increment of time. At least one predictive heat map can provide at least one estimate in seconds, minutes, hours, days, or any other increment of time. At least one predictive heat map can incorporate at least one feedback mechanism to improve quality of at least one future estimate. At least one predictive heat map can incorporate at least one feedback mechanism from, including but not limited to, at least one representative, at least one autonomous vehicle, at least one conveyance client, at least one good supplier, at least one service provider, at least one owner or at least one controller of at least one autonomous vehicle, at least one fleet manager, at least one logistics provider, at least one logistics supplier, at least one map provider, at least one third party, or a combination thereof.

At least one heat map can be viewed from including but not limited to at least one perspective, at least one point of reference, at least one point of interest, or a combination thereof. At least one heat map can be for example at least one geographical map that can display including but not limited to at least one real time or near real time geographical location of at least one autonomous vehicle, at least one real time or near real time geographical location of at least one representative, at least one real time or near real time geographical location of at least one conveyance client, at least one real time or near real time geographical location of at least one service provider, at least one real time or near real time geographical location of at least one good supplier, at least one real time or near real time geographical location of at least one fleet manager, at least one real time or near real time geographical location of at least one third party, or a combination thereof.

At least one service provider, at least one good supplier, at least one fleet manager, at least one owner or at least one controller of at least one autonomous vehicle, at least one logistics provider, at least one logistics supplier, at least one representative, at least one conveyance client, at least one map provider, at least one third party, or a combination thereof, can be displayed on or with at least one heat map that can display at least one level of service preference.

At least one heat map can facilitate securing or obtaining at least one preferred conveyance service request or at least one preferred conveyance service offering. At least one heat map can be used to facilitate securing or obtaining at least one preferred conveyance service request or at least one preferred conveyance service offering. At least one heat map can facilitate securing or obtaining at least one preferred conveyance service request or at least one preferred conveyance service offering utilizing at least one application. At least one heat map can facilitate securing or obtaining at least one preferred conveyance service request or at least one preferred conveyance service offering, utilizing at least one service provider application, at least one third party application, at least one map provider application, or the like.

At least one heat map can be used by at least one representative or the like to analyze or evaluate and then preferably secure or obtain at least one preferred conveyance service request. At least one heat map can be used by at least one representative or the like to find or identify and preferably secure or obtain at least one preferred conveyance service request for at least one representative relating to at least one service provider or the like operating in at least one conveyance industry segment. At least one heat map can be used by at least one conveyance client or the like to analyze or evaluate and then preferably secure or obtain at least one preferred conveyance service offering. At least one heat map can be used by at least one conveyance client or the like to find or identify and preferably secure or obtain at least one preferred conveyance service offering for at least one conveyance client relating to at least one service provider or the like operating in at least one conveyance industry segment.

At least one heat map can be used to analyze or evaluate at least one area on at least one geographical map that can show at least one different service provider or at least one other conveyance service metric relating to at least one service provider, at least one good supplier, or the like. At least one heat map can be used to analyze or evaluate at least one area on at least one geographical map that can show at least one other conveyance service metric, at least one available service provider, at least one available good supplier, or the like, relating to at least one conveyance industry segment. At least one heat map can be used to analyze or evaluate at least one location of including but not limited to at least one conveyance client, at least one representative, at least one autonomous vehicle, at least one service provider, at least one good supplier, at least one owner or at least one controller of at least one autonomous vehicle, at least one fleet manager, at least one logistics provider, at least one logistics supplier, at least one map provider, at least one third party, or a combination thereof, from at least one service provider.

As a non-limiting example, at least one statistical variable can be but is not limited to conveyance service availability, pricing, elevated pricing, conveyance service request density, conveyance service offering density, filtered conveyance service request density, filtered conveyance service offering density, preferred conveyance service request density, preferred conveyance service offering density, level of service density, at least one conveyance service distance, at least one estimated time of arrival, preferred conveyance client density, preferred representative density, preferred good supplier density, at least one preferred conveyance industry segment, conveyance industry segment density, representative density, conveyance client density, service provider density, good supplier density, or a combination thereof. As a non-limiting example, at least one statistical variable can preferably be displayed as but not limited to at least one distinguishable hue, at least one distinguishable shade, at least one distinguishable saturation, at least one distinguishable opacity, at least one distinguishable color, at least one distinguishable value of color, at least one distinguishable pattern, at least one distinguishable hatch fill, at least one distinguishable fill, at least one distinguishable shape, at least one distinguishable image, at least one distinguishable animation, or a combination thereof.

As a non-limiting example, at least one heat map can optionally be at least one geographical map that can be separate or can be at least one layer on at least one dynamic map. As a non-limiting example, at least one heat map can be compiled on at least one central server and then transmitted to and displayed on at least one application or at least one remote display. As a non-limiting example, at least one heat map can be at least one choropleth map or the like. As a non-limiting example, at least one heat map can be at least one thematic map or the like.

As a non-limiting example, at least one map provider can provide or utilize at least one heat map that can display at least one metric or at least one statistical variable relating to at least one individual service provider, at least one individual good supplier, or the like. As a non-limiting example, at least one heat map can depict at least one pricing metric or at least one other relevant conveyance service metric. As a non-limiting example, at least one heat map can depict at least one estimated time of arrival. As a non-limiting example, at least one heat map can depict at least one estimated time of arrival relating to at least one conveyance service request, at least one filtered conveyance service request, at least one preferred conveyance service request, at least one conveyance service offering, at least one filtered conveyance service offering, at least one preferred conveyance service offering, at least one representative, at least one conveyance client, at least one service provider, at least one good supplier, at least one owner or at least one controller of at least one autonomous vehicle, at least one fleet manager, at least one logistics provider, at least one logistics supplier, at least one map provider, at least one third party, or a combination thereof.

As a non-limiting example, at least one central server or at least one application can generate prediction data based on at least one conveyance service request in conjunction with corresponding conveyance data and/or at least one conveyance service offering in conjunction with corresponding conveyance data and can transmit to at least one application to create at least one predictive heat map. As a non-limiting example, at least one heat map can be used for at least one individual conveyance industry segment. As a non-limiting example, at least one heat map can be used for at least one individual service provider, at least one individual good supplier, or the like.

As a non-limiting example, at least one preferred conveyance service request is not identified prior to compiling at least one heat map, at least one real time or near real time heat map, at least one historical heat map, at least one predictive heat map, or a combination thereof. As a non-limiting example, at least one preferred conveyance service offering is not identified prior to compiling at least one heat map, at least one real time or near real time heat map, at least one historical heat map, at least one predictive heat map, or a combination thereof.

As a non-limiting example, at least one real time or near real time heat map can be compiled from at least one statistical variable of at least one conveyance service request in conjunction with corresponding conveyance data, at least one filtered conveyance service request in conjunction with corresponding conveyance data, at least one preferred conveyance service request in conjunction with corresponding conveyance data, or a combination thereof. As a non-limiting example, at least one real time or near real time heat map can be compiled from at least one statistical variable of at least one conveyance service offering in conjunction with corresponding conveyance data, at least one filtered conveyance service offering in conjunction with corresponding conveyance data, at least one preferred conveyance service offering in conjunction with corresponding conveyance data, or a combination thereof. As a non-limiting example, at least one real time or near real time heat map can display including but not limited to current conveyance client density, current representative density, current autonomous vehicle density, current service provider density, current good supplier density, or a combination thereof, based on at least one current or historical estimated time of arrival.

As a non-limiting example, at least one historical heat map can be compiled from at least one statistical variable of at least one past conveyance service request in conjunction with corresponding conveyance data, at least one past filtered conveyance service request in conjunction with corresponding conveyance data, at least one past preferred conveyance service request in conjunction with corresponding conveyance data, or a combination thereof. As a non-limiting example, at least one historical heat map can be compiled from at least one statistical variable of at least one past conveyance service offering in conjunction with corresponding conveyance data, at least one past filtered conveyance service offering in conjunction with corresponding conveyance data, at least one past preferred conveyance service offering in conjunction with corresponding conveyance data, or a combination thereof. As a non-limiting example, at least one historical heat map can be used to analyze or evaluate at least one historical trend relating to at least one conveyance industry segment. As a non-limiting example, at least one historical heat map can display including but not limited to historical conveyance client density, historical representative density, historical autonomous vehicle density, historical service provider density, historical good supplier density, or a combination thereof, based on at least one historical estimated time of arrival.

As a non-limiting example, at least one predictive heat map can be compiled from at least one statistical variable of at least one real time or near real time conveyance service request in conjunction with corresponding conveyance data, at least one past conveyance service request in conjunction with corresponding conveyance data, at least one real time or near real time filtered conveyance service request in conjunction with corresponding conveyance data, at least one past filtered conveyance service request in conjunction with corresponding conveyance data, real time or near real time preferred conveyance service request in conjunction with corresponding conveyance data, at least one past preferred conveyance service request in conjunction with corresponding conveyance data, or a combination thereof.

As a non-limiting example, a predictive heat map can be compiled from at least one statistical variable of at least one real time or near real time conveyance service offering in conjunction with corresponding conveyance data, at least one past conveyance service offering in conjunction with corresponding conveyance data, at least one real time or near real time filtered conveyance service offering in conjunction with corresponding conveyance data, at least one past filtered conveyance service offering in conjunction with corresponding conveyance data, at least one real time or near real time preferred conveyance service offering in conjunction with corresponding conveyance data, at least one past preferred conveyance service offering in conjunction with corresponding conveyance data, or a combination thereof. As a non-limiting example, at least one predictive heat map can display including but not limited to future conveyance client density, future representative density, future autonomous vehicle density, future service provider density, future good supplier density, or a combination thereof, based on at least one current and historical estimated time of arrival.

As a non-limiting example, at least one predictive heat map can utilize at least one neural network or the like. As a non-limiting example, at least one predictive heat map can utilize machine learning technology or the like. As a non-limiting example, at least one predictive heat map can utilize quantum computing or the like. As a non-limiting example, at least one predictive heat map can be used by at least one representative or at least one conveyance client to find at least one potential upcoming area with elevated pricing.

As a non-limiting example, at least one predictive heat map can identify or estimate at least one of but not limited to future conveyance service availability, future pricing, future elevated pricing, future conveyance service request density, future conveyance service offering density, future filtered conveyance service request density, future filtered conveyance service offering density, future preferred conveyance service request density, future preferred conveyance service offering density, future level of service density, future conveyance industry segment density, future representative density, future conveyance client density, future service provider density, future good supplier density, future level of service demand, future conveyance industry segment demand, future conveyance service demand, future service provider demand, future good supplier demand, future conveyance service supply, future representative supply, or a combination thereof.

As a non-limiting example, at least one predictive heat map can generate at least one visual notification or at least one audio notification to notify at least one representative or at least one conveyance client of at least one future change or update of at least one statistical variable, at least one measurement of at least one statistical variable, or a combination thereof.

As a non-limiting example, at least one heat map can utilize at least one application, at least one terminal, at least one central server, at least one external server, at least one link, or a combination thereof, that can be combined or integrated. As a non-limiting example, at least one heat map can utilize at least one application, at least one terminal, at least one central server, at least one external server, at least one link, or a combination thereof, that can be combined or integrated on at least one smartphone. As a non-limiting example, at least one real time or near real time heat map can utilize at least one application, at least one terminal, at least one central server, at least one external server, at least one link, or a combination thereof, that can be combined or integrated. As a non-limiting example, at least one historical heat map can utilize at least one application, at least one terminal, at least one central server, at least one external server, at least one link, or a combination thereof, that can be combined or integrated. As a non-limiting example, at least one predictive heat map can utilize at least one application, at least one terminal, at least one central server, at least one external server, at least one link, or a combination thereof, that can be combined or integrated.

At least one owner or at least one controller of at least one autonomous vehicle, at least one service provider, at least one good supplier, at least one fleet manager, at least one logistics provider, at least one logistics supplier, or a combination thereof, can be displayed on or with at least one heat map that can display at least one level of service preference.

As a non-limiting example, at least one conveyance client can visually identify at least one metric or at least one statistical variable relating to at least one service provider, at least one good supplier, at least one map provider, or the like, associated with at least one heat map. As a non-limiting example, at least one conveyance client can visually identify two service providers or the like on at least one heat map with the different pricing information. As a non-limiting example, at least one representative can visually identify at least one metric or at least one statistical variable relating to at least one service provider, at least one good supplier, at least one map provider, or the like, associated with at least one heat map. As a non-limiting example, at least one representative can visually identify three good suppliers or the like on at least one heat map with different elevated pricing information.

As a non-limiting example, at least one level of service preference can be displayed on at least one heat map to identify at least one metric or at least one statistical variable relating to at least one service provider, at least one good supplier, at least one map provider, or the like. As a non-limiting example, at least one service provider, at least one good supplier, at least one fleet manager, at least one owner or at least one controller of at least one autonomous vehicle, at least one logistics provider, at least one logistics supplier, at least one conveyance client, at least one representative, at least one third party, or a combination thereof, can be displayed on or with at least one heat map that can display at least one level of service preference. As a non-limiting example, at least one heat map can display at least one scooter, at least one scooter service, at least one bicycle, at least one bicycle service, or the like.

As a non-limiting example, at least one heat map can facilitate securing or obtaining at least one preferred conveyance service offering utilizing more than one application. As a non-limiting example, at least one third party can provide at least one heat map on a third party application that can be used to facilitate securing or obtaining at least one preferred conveyance service offering on at least one service provider application or the like. As a non-limiting example, at least one heat map can facilitate securing or obtaining at least one preferred conveyance service request utilizing more than one application. As a non-limiting example, at least one third party can provide at least one heat map on a third party application that can be used to facilitate securing or obtaining at least one preferred conveyance service request on at least one service provider application or the like.

Application

At least one application can be at least one software that can for example facilitate at least one operation or at least one function to secure or obtain at least one preferred conveyance service request or at least one preferred conveyance service offering. At least one application can be at least one software that can for example be utilized or operated by at least one conveyance client, at least one representative, at least one owner or at least one controller of at least one autonomous vehicle, at least one service provider, at least one good supplier, at least one fleet manager, at least one logistics provider, at least one logistics supplier, at least one map provider, at least one third party, or a combination thereof. At least one application can be at least one software for example at least one smartphone application, at least one computer application, at least one computer program, at least one API, at least one website, at least one web application, at least one smartphone application, at least one cloud application, at least one service, or the like.

At least one application can be but is not limited to software that can for example facilitate analyzing, evaluating, securing, obtaining, accepting, declining, canceling, displaying, communicating, or a combination thereof, at least one preferred conveyance service request, at least one preferred conveyance service offering, at least one real time or near real time geographical location of at least one conveyance client, at least one real time or near real time geographical location of at least one representative, or a combination thereof. At least one application can be provided in any form or format, such as but not limited to any appropriate tangible or intangible medium of expression, but can preferably be provided in at least one electronic form. At least one application can be associated with, including but not limited to, at least one central server, at least one link, at least one external server, at least one application, at least one good supplier, at least one service provider, at least one owner or at least one controller of at least one autonomous vehicle, at least one good supplier, at least one fleet manager, at least one logistics provider, at least one logistics supplier, at least one map provider, at least one third party, at least one conveyance client, at least one representative, or a combination thereof.

At least one application can be software appropriate for communicating to or with including but not limited to at least one central server, at least one external server, at least one application, at least one good supplier, at least one autonomous vehicle, at least one terminal, at least one service provider, at least one good supplier, at least one fleet manager, at least one logistics provider, at least one logistics supplier, at least one representative, at least one conveyance client, at least one map provider, at least one third party, or a combination thereof. At least one application can operate on including but not limited to at least one terminal, at least one central server, at least one external server, or a combination thereof. At least one application can standardize or convert at least one conveyance service request in conjunction with corresponding conveyance data or at least one conveyance service offering in conjunction with corresponding conveyance data, at least one real time or near real time geographical location of at least one conveyance client, at least one real time or near real time geographical location of at least one representative, or a combination thereof structured in at least one different format, into at least one uniform format. At least one representative can input or provide at least one representative preference into at least one application. At least one conveyance client can input or provide at least one conveyance client preference into at least one application.

At least one application can provide including but not limited to at least one real time or near real time geographical location of at least one representative, at least one real time or near real time geographical location of at least one conveyance client, at least one real time or near real time geographical location of at least one service provider, at least one real time or near real time geographical location of at least one good supplier, at least one real time or near real time geographical location of at least one fleet manager, at least one real time or near real time geographical location of at least one logistics provider, at least one real time or near real time geographical location of at least one logistics supplier, at least one real time or near real time geographical location of at least one map provider, at least one real time or near real time geographical location of at least one third party, or a combination thereof, using at least one geographical location module of at least one terminal. Information and/or data inputted or discovered by at least one application can be cached. At least one application can be updated or refreshed in real time or near real time and can refer to being updated or refreshed in the highest level of development or state of the art. At least one application can perform at least one function in real time or near real time and can refer to being updated or refreshed in the highest level of development or state of the art.

At least one application can communicate information or data including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of at least one preferred conveyance service offering in conjunction with corresponding conveyance data, all or some of at least one filtered conveyance service offering in conjunction with corresponding conveyance data, all or some of at least one conveyance service offering in conjunction with corresponding conveyance data, all or some of subsequent or additional plurality of filtered conveyance service offerings in conjunction with corresponding conveyance data, all or some of subsequent or additional at least one preferred conveyance service offering in conjunction with corresponding conveyance data, at least one beginning service geographical location, at least one ending service geographical location, all or some of at least one real time or near real time geographical location of at least one representative, all or some of at least one real time or near real time geographical location of at least one conveyance client, at least one representative preference, at least one conveyance client preference, at least one secured or obtained preferred conveyance service request, at least one secured or obtained preferred conveyance service offering, or the like. At least one application can communicate all or some of information or data with at least one central server, at least one external server, at least one application, or a combination thereof.

At least one application can filter and identify including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of at least one preferred conveyance service offering in conjunction with corresponding conveyance data, all or some of at least one filtered conveyance service offering in conjunction with corresponding conveyance data, all or some of at least one conveyance service offering in conjunction with corresponding conveyance data, all or some of subsequent or additional plurality of filtered conveyance service offerings in conjunction with corresponding conveyance data, all or some of subsequent or additional at least one preferred conveyance service offering in conjunction with corresponding conveyance data, at least one beginning service geographical location, at least one ending service geographical location, all or some of at least one real time or near real time geographical location of at least one representative, all or some of at least one real time or near real time geographical location of at least one conveyance client, at least one representative preference, at least one conveyance client preference, at least one secured or obtained preferred conveyance service request, at least one secured or obtained preferred conveyance service offering, or a combination thereof, together or separately.

At least one application can be at least one software that can for example facilitate at least one operation or at least one function to secure or obtain at least one conveyance service request, at least one filtered conveyance service request, at least one preferred conveyance service request, at least one conveyance service offering, at least one filtered conveyance service offering, at least one preferred conveyance service offering, or a combination thereof. At least one conveyance service offering or at least one conveyance service request can be pre-filtered or pre-categorized on at least one central server, at least one external server, at least one application, or a combination thereof.

At least one application can be used to analyze, evaluate, secure, or obtain, accept, decline, cancel, or communicate at least one preferred conveyance service request or at least one preferred conveyance service offering. At least one application can be used by including but not limited to at least one representative, at least one conveyance client, at least one service provider, at least one good supplier, at least one fleet manager, at least one logistics provider, at least one logistics supplier, at least one map provider, at least one third party, or a combination thereof. At least one application can be used, accessed, controlled, or operated by including but not limited to at least one representative, at least one conveyance client, at least one service provider, at least one good supplier, at least one fleet manager, at least one logistics provider, at least one logistics supplier, at least one map provider, at least one third party, or a combination thereof, to optionally analyze or evaluate and then preferably secure or obtain at least one preferred conveyance service request, at least one preferred conveyance service offering, or a combination thereof.

At least one application can display at least one visual representation including but not limited to at least one dynamic map, at least one heat map, or a combination thereof. At least one application can display at least one secured or obtained preferred conveyance service request. At least one application can display at least one secured or obtained preferred conveyance service offering. At least one application can display conveyance data relating to including but not limited to at least one conveyance service request, at least one filtered conveyance service request, at least one preferred conveyance service request, at least one conveyance service offering, at least one filtered conveyance service offering, at least one preferred conveyance service offering, or a combination thereof.

As a non-limiting example, at least one application, at least one terminal, at least one central server, at least one external server, at least one link, or a combination thereof, can be combined or integrated. As a non-limiting example, there can be at least one different variation of at least one application used by including but not limited to at least one representative, at least one conveyance client, at least one service provider, at least one good supplier, at least one fleet manager, at least one logistics provider, at least one logistics supplier, at least one map provider, at least one third party, or a combination thereof. As a non-limiting example, at least one application can transmit at least one Inertial Measurement Unit (IMU) reading of at least one terminal to at least one central server to determine at least one orientation or at least one direction of at least one representative, at least one conveyance client, at least one service provider, at least one good supplier, at least one fleet manager, at least one logistics provider, at least one logistics supplier, at least one map provider, at least one third party, or a combination thereof. As a non-limiting example, at least one application can be in at least one form of but is not limited to at least one mobile application, at least one non-mobile application, at least one website, at least one plugin, or a combination thereof.

As a non-limiting example, at least one application can operate on at least one central server, at least one external server, or a combination thereof. As a non-limiting example, at least one application can perform at least one central server function or at least one external server function. As a non-limiting example, at least one application can perform at least one similar function as at least one central server or at least one external server function to identify at least one preferred conveyance service request or at least one preferred conveyance service offering. As a non-limiting example, there can be at least one different application used by at least one representative, at least one conveyance client, at least one service provider, at least one good supplier, at least one fleet manager, at least one logistics provider, at least one logistics supplier, at least one map provider, at least one third party, or a combination thereof.

As a non-limiting example, at least one preferred conveyance service request in conjunction with corresponding conveyance data or at least one preferred conveyance service offering in conjunction with corresponding conveyance data can be transmitted to at least one application and can be displayed as at least one pop-up, at least one icon, at least one visual, at least one symbol, at least one pattern, at least one marker, at least one notification, at least one alert, at least one message, at least one short message service, at least one multimedia messaging service, at least one smart messaging service, at least one extended message service, or a combination thereof.

As a non-limiting example, at least one application can secure or obtain at least one preferred conveyance service request, at least one filtered conveyance service request, at least one conveyance service request, at least one preferred conveyance service offering, at least one filtered conveyance service offering, at least one conveyance service offering, or a combination thereof, and can communicate directly or indirectly with at least one central server, at least one external server, at least one application, at least one service provider, at least one good supplier, at least one fleet manager, at least one logistics provider, at least one logistics supplier, at least one map provider, at least one third party, at least one representative, at least one conveyance client, or a combination thereof.

As a non-limiting example, at least one application can secure or obtain at least one preferred conveyance service request, at least one filtered conveyance service request, at least one preferred conveyance service offering, at least one filtered conveyance service offering, or a combination thereof, and can communicate indirectly with at least one external server or at least one service provider via at least one central server. As a non-limiting example, at least one application can secure or obtain at least one preferred conveyance service request, at least one filtered conveyance service request, at least one preferred conveyance service offering, at least one filtered conveyance service offering, or a combination thereof, and can communicate directly with at least one external server, at least one service provider, or the like.

As a non-limiting example, at least one application can be at least one service provider application, at least one good supplier application, at least one owner or at least one controller of at least one autonomous vehicle application, at least one fleet manager application, at least one logistics provider application, at least one logistics supplier application, at least one representative application, at least one conveyance client application, at least one map provider application, at least one third party application, or a combination thereof. As a non-limiting example, at least one map provider can provide at least one application that can be utilized by at least one conveyance client or at least one representative. As a non-limiting example, at least one map provider can provide at least one visual representation on at least one application that can be utilized by at least one conveyance client or at least one representative.

As a non-limiting example, at least one application can be accessed, controlled, or operated remotely by at least one service provider, at least one good supplier, at least one fleet manager, at least one logistics provider, at least one logistics supplier, at least one representative, at least one conveyance client, at least one map provider, at least one third party, or a combination thereof, to optionally analyze or evaluate and then preferably secure or obtain at least one preferred conveyance service request or at least one preferred conveyance service offering.

As a non-limiting example, at least one application can manage or process at least one conveyance service offering the same as at least one conveyance service request. As a non-limiting example, at least one application can manage or process at least one conveyance service request the same as at least one conveyance service offering. As a non-limiting example, at least one conveyance service request or at least one conveyance service offering can be filtered in real time or near real time on at least one application. As a non-limiting example, at least one preferred conveyance service request can be identified in real time, from at least one filtered conveyance service request on at least one application. As a non-limiting example, at least one preferred conveyance service offering can be identified in real time or near real time, from at least one filtered conveyance service offering on at least one application.

As a non-limiting example, at least one different geographical location can be used other than at least one real time or near real time geographical location of at least one representative or the like when filtering at least one conveyance service request. As a non-limiting example, at least one different geographical location can be used other than at least one real time or near real time geographical location of at least one conveyance client or the like when filtering at least one conveyance service offering. As a non-limiting example, at least one application can expose or be accessed through at least one API relating to at least one service provider, at least one good supplier, at least one fleet manager, at least one logistics provider, at least one logistics supplier, at least one map provider, at least one third party, or the like.

As a non-limiting example, there can be at least one application on or associated with at least one autonomous vehicle. As a non-limiting example, there can be at least one different application on or associated with at least one autonomous vehicle. As a non-limiting example, there can be at least one application with at least one different function that can reside on or be associated with one autonomous vehicle. As a non-limiting example, there can be more than one application on or associated with one autonomous vehicle. As a non-limiting example, there can be more than one different application on or associated with one autonomous vehicle. As a non-limiting example, there can be two different applications on or associated with one autonomous vehicle, first being a dealership application allowing for vehicle maintenance and second an application integrated with at least one central server that facilitates conveyance services. As a non-limiting example, at least one application can be associated with at least one autonomous vehicle. As a non-limiting example, at least one application can be associated with at least one fleet of at least one autonomous vehicle.

The following are different examples of at least one application used by various parties:

At least one conveyance client can access at least one application via at least one terminal. As a non-limiting example, at least one conveyance client can analyze or evaluate and then preferably secure or obtain at least one preferred conveyance service offering.

At least one representative can access at least one application via at least one terminal. As a non-limiting example, at least one representative can analyze or evaluate and then secure or obtain at least one preferred conveyance service request.

At least one map provider can provide at least one visual representation via at least one application. As a non-limiting example, at least one representative can analyze or evaluate and then secure or obtain at least one preferred conveyance service request. As a non-limiting example, at least one conveyance client can analyze or evaluate and then preferably secure or obtain at least one preferred conveyance service offering.

Terminal

At least one terminal can be at least one hardware that can for example facilitate at least one operation or at least one function to secure or obtain at least one preferred conveyance service request or at least one preferred conveyance service offering. At least one terminal can be at least one hardware that can for example be utilized or operated by at least one conveyance client, at least one representative, at least one map provider, at least one third party, at least one owner or at least one controller of at least one autonomous vehicle, at least one service provider, at least one good supplier, at least one fleet manager, at least one logistics provider, at least one logistics supplier, or a combination thereof.

At least one terminal can be but is not limited to at least one device that can for example facilitate operating at least one application. At least one terminal can for example be capable of communicating with at least one central server, at least one external server, at least one application, or a combination thereof, by way of at least one link. At least one terminal can be but is not limited to at least one electronic computing device that can include at least one computer processor, at least one computer readable memory, at least one input source, at least one geographical location module, at least one display, at least one network interface, or a combination thereof. At least one terminal can encompass hardware and/or software alone or in a combination.

At least one terminal can be for example at least one smartphone or the like that can be utilized to combine or integrate at least one application, at least one central server, at least one external server, at least one terminal, at least one link, or a combination thereof. At least one terminal can be used to access including but not limited to at least one application. At least one application can operate on at least one terminal. At least one operating system can run on at least one terminal. At least one terminal can facilitate including but not limited to at least one display function, at least one input function, at least one operation, or a combination thereof, of at least one application. At least one application can provide at least one real time or near real time geographical location of including but not limited to at least one representative, at least one conveyance client, at least one service provider, at least one good supplier, at least one fleet manager, at least one logistics provider, at least one logistics supplier, at least one map provider, at least one third party, at least one owner or at least one controller of at least one autonomous vehicle, or a combination thereof, using at least one geographical location module of at least one terminal. At least one terminal can be associated with at least one display or at least one remote display.

As a non-limiting example, at least one terminal can be but is not limited to at least one computer, at least one smartphone device, at least one plug-in device, at least one mobile computing device, at least one handheld computing device, at least one tablet computing device, at least one laptop computing device, at least one wearable computing device, at least one portable computing device, at least one fixed computing device, at least one non-fixed computing device, at least one physiologically embedded computing device, at least one biologically integrated computing device, at least one In-Vehicle infotainment device, at least one Internet of Things (IoT) device, at least one projecting device, at least one computing device embedded in at least one vehicle, at least one head-up display, at least one voice recognition, at least one voice control, or a combination thereof.

As a non-limiting example, at least one Inertial Measurement Unit (IMU) reading of at least one terminal can be used to determine at least one orientation or at least one direction least one representative, at least one conveyance client, at least one service provider, at least one good supplier, at least one fleet manager, at least one logistics provider, at least one logistics supplier, at least one map provider, at least one third party, at least one owner or at least one controller of at least one autonomous vehicle, or a combination thereof. As a non-limiting example, at least one geographical location module of at least one terminal can include but is not limited to at least one Global Positioning System (GPS), at least one satellite tracking, at least one RFID tracking, at least one radiolocation, at least one WiFi positioning system, at least one geofencing, at least one global system for mobile communications, at least one cell phone triangulation, at least one Internet tracking, or a combination thereof.

As a non-limiting example, at least one application, at least one central server, at least one external server, at least one link, or a combination thereof; can be combined or integrated on at least one terminal, such as at least one smartphone. As a non-limiting example, at least one terminal does not need at least one physical connection to be associated or communicate with at least one application, at least one link, at least one terminal, at least one central server, at least one external server, at least one autonomous vehicle, or a combination thereof.

As a non-limiting example, at least one central server can optionally be located on at least one terminal. As a non-limiting example, at least one input source of at least one terminal can be but is not limited to at least one touchscreen, at least one keypad, at least one keyboard, at least one voice controlled input, or a combination thereof As a non-limiting example, at least one visual representation can be displayed on at least one application using at least one display of at least one terminal. As a non-limiting example, at least one terminal can be at least one smartphone that can be used by at least one representative, at least one conveyance client, at least one owner or at least one controller of at least one autonomous vehicle, at least one service provider, at least one good supplier, at least one fleet manager, at least one logistics provider, at least one logistics supplier, at least one map provider, at least one third party, or a combination thereof.

Link

At least one link can be at least one software and/or at least one hardware that can for example facilitate at least one operation or at least one function to secure or obtain at least one preferred conveyance service request or at least one preferred conveyance service offering. At least one link can be at least one software and/or at least one hardware that can for example be utilized or operated by at least one conveyance client, at least one representative, at least one owner or at least one controller of at least one autonomous vehicle, at least one service provider, at least one good supplier, at least one fleet manager, at least one logistics provider, at least one logistics supplier, at least one map provider, at least one third party, or a combination thereof.

At least one link can be for example at least one connection or at least one association with at least one software function, at least one software operation, at least one software component, at least one software module, or a combination thereof. At least one link can connect or be associated with at least one software function or at least one software operation. At least one link can connect or be associated with at least one software module. At least one link can include but is not limited to at least one electronic communication network channel. At least one link can be for example at least one appropriate link that can allow an efficient, rapid, accurate, or the like transmission of information or data. At least one link can be but is not limited to at least one combination of at least one connection between at least one central server, at least one external server, at least one terminal, at least one application, at least one autonomous vehicle, or a combination thereof. Preferably, at least one link between including but not limited to at least one central server, at least one external server, at least one terminal, at least one application, or a combination thereof, can be via the Internet, preferably secure, and can be more preferably encrypted. The definition of at least one link can encompass hardware and/or software alone or in a combination.

At least one link can be utilized by at least one representative, at least one conveyance client, at least one owner or at least one controller of at least one autonomous vehicle, at least one service provider, at least one good supplier, at least one fleet manager, at least one logistics provider, at least one logistics supplier, at least one map provider, at least one third party, or a combination thereof, to communicate at least one conveyance service request in conjunction with corresponding conveyance data. At least one link can be utilized by at least one representative, at least one conveyance client, at least one owner or at least one controller of at least one autonomous vehicle, at least one service provider, at least one good supplier, at least one fleet manager, at least one logistics provider, at least one logistics supplier, at least one map provider, at least one third party, or a combination thereof, to communicate at least one conveyance service offering in conjunction with corresponding conveyance data.

At least one link can be utilized by at least one service provider, at least one good supplier, at least one fleet manager, at least one owner or at least one controller of at least one autonomous vehicle, at least one logistics provider, at least one logistics supplier, at least one representative, at least one conveyance client, at least one map provider, at least one third party, or a combination thereof, to facilitate at least one conveyance service.

At least one link can be utilized to communicate information or data including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of at least one preferred conveyance service offering in conjunction with corresponding conveyance data, all or some of at least one filtered conveyance service offering in conjunction with corresponding conveyance data, all or some of at least one conveyance service offering in conjunction with corresponding conveyance data, all or some of subsequent or additional plurality of filtered conveyance service offerings in conjunction with corresponding conveyance data, all or some of subsequent or additional at least one preferred conveyance service offering in conjunction with corresponding conveyance data, at least one beginning service geographical location, at least one ending service geographical location, all or some of at least one real time or near real time geographical location of at least one representative, all or some of at least one real time or near real time geographical location of at least one conveyance client, at least one representative preference, at least one conveyance client preference, at least one secured or obtained preferred conveyance service request, at least one secured or obtained preferred conveyance service offering, or the like.

At least one link can communicate or provide data or information in real time or near real time and can refer to the highest level of development or state of the art. At least one link can be updated or refreshed in real time or near real time and can refer to being updated or refreshed in the highest level of development or state of the art. At least one link can perform at least one function in real time or near real time and can refer to being updated or refreshed in the highest level of development or state of the art.

As a non-limiting example, at least one link can be in at least one form of at least one software interface or API. As a non-limiting example at least one link can be at least one inter-process communication. As a non-limiting example, at least one link can be utilized to connect to or be associated with at least one application, at least one terminal, at least one central server, at least one external server, or a combination thereof, on one software application. As a non-limiting example, at least one central server can connect to or communicate with at least one application, at least one terminal, at least one central server, at least one external server, or a combination thereof, on the same software application. As a non-limiting example, at least one link can be utilized to connect to or be associated with at least one application, at least one terminal, at least one central server, at least one external server, or a combination thereof, to secure or obtain at least one preferred conveyance service offering, or a combination thereof. As a non-limiting example, at least one link does not need at least one physical connection to connect or communicate with at least one application, at least one terminal, at least one central server, at least one external server, at least one autonomous vehicle, or a combination thereof.

As a non-limiting example, at least one link can be any appropriate connection, such as but not limited to at least one WiFi connection, at least one wireless connection, at least one Ethernet connection, at least one LTE connection, at least one 3G connection, at least one 4G connection, at least one 5G connection, at least one 6G connection, at least one 7G connection, at least one radio connection, at least one RFID connection, at least one Bluetooth connection, at least one BLE connection, at least one PAN connection, at least one LAN connection, at least one MAN connection, at least one WAN connection, at least one WLAN connection, at least one GSM connection, at least one GPRS connection, at least one UMTS connection, at least one dial-up connection, at least one broadband connection, at least one mobile connection, at least one DSL connection, at least one cable connection, at least one wired connection, at least one satellite connection, at least one ISDN connection, at least one fiber-optics connection, at least one infrared connection, at least one client-server network such as at least one cloud computing network connection, at least one other appropriate method, means, hardware and/or software capable of conveying information, or a combination thereof.

As a non-limiting example, at least one link can be but is not limited to at least one combination of at least one connection between at least one central server, at least one external server, at least one terminal, at least one application, or a combination thereof, that can be integrated or combined on at least one terminal, being at least one smartphone. As a non-limiting example, at least one application, at least one central server, at least one external server, at least one link, or a combination thereof, can be combined or integrated on at least one terminal, such as at least one smartphone.

As a non-limiting example, at least one link can be but is not limited to at least one combination of at least one connection between at least one central server, at least one external server, at least one terminal, at least one autonomous vehicle, at least one application, at least one application associated with at least one autonomous vehicle, or a combination thereof.

As a non-limiting example, at least one link can be utilized by at least one representative, at least one conveyance client, at least one owner or at least one controller of at least one autonomous vehicle, at least one service provider, at least one good supplier, at least one fleet manager, at least one logistics provider, at least one logistics supplier, at least one map provider, at least one third party, or a combination thereof, to communicate at least one conveyance service request in conjunction with conveyance data, at least one filtered conveyance service request in conjunction with conveyance data, at least one preferred conveyance service request in conjunction with conveyance data, at least one conveyance service offering in conjunction with conveyance data, at least one filtered conveyance service offering in conjunction with conveyance data, at least one preferred conveyance service offering in conjunction with conveyance data, or a combination thereof, with including but not limited to at least one central server, at least one external server, at least one terminal, at least one autonomous vehicle, at least one application, at least one application associated with at least one autonomous vehicle, at least one map provider, at least one third party, at least one representative, at least one conveyance client, or a combination thereof.

As a non-limiting example, at least one link can be but is not limited to at least one combination of at least one connection between at least one central server, at least one external server, at least one terminal, at least one autonomous vehicle, at least one application, at least one application associated with at least one autonomous vehicle, or a combination thereof. As a non-limiting example, at least one link can connect at least one central server with at least one other central server. As a non-limiting example, at least one link can be utilized by at least one owner or at least one controller of at least one autonomous vehicle, at least one service provider, at least one good supplier, at least one fleet manager, at least one logistics provider, at least one logistics supplier, or a combination thereof, to communicate with at least one map provider or at least one third party indirectly or directly.

Central Server

At least one central server can be at least one software and/or at least one hardware that can for example facilitate at least one operation or at least one function to secure or obtain at least one preferred conveyance service request or at least one preferred conveyance service offering. At least one central server can be at least one software and/or at least one hardware that can for example be utilized or operated by at least one conveyance client, at least one representative, at least one service provider, at least one good supplier, at least one fleet manager, at least one logistics provider, at least one logistics supplier, at least one map provider, at least one third party, or a combination thereof. At least one central server can be at least one software and/or at least one hardware for example at least one smartphone application, at least one computer application, at least one computer program, at least one website, at least one web application, at least one cloud application, at least one service, or the like.

At least one central server can for example facilitate at least one operation or at least one function to secure or obtain at least one preferred conveyance service request or at least one preferred conveyance service offering. At least one central server can include but is not limited to at least one computer processor, at least one computer readable memory, at least one network interface, or a combination thereof. At least one central server can be but is not limited to at least one computer network system. At least one central server can preferably encompass hardware and/or software alone or in a combination.

At least one central server can be associated with including but not limited to at least one external server, at least one link, at least one good supplier, at least one autonomous vehicle, at least one application, at least one central server, at least one service provider, at least one representative, at least one conveyance client, or a combination thereof. At least one central server can encompass different hardware and/or software alone or in a combination. At least one central server can include or connect to at least one database. At least one computer readable memory of at least one central server can be or include at least one database that at least one central server can use or connect to. At least one central server can store, retrieve, or utilize any information or data from at least one database, at least one real time database, at least one near real time database, at least one database trigger, at least one database table, at least one database row, at least one database column, at least one database result set, at least one database node, at least one database edge, at least one database property, at least one blockchain, at least one blockchain technology, or a combination thereof. At least one central server can store or retrieve any information or data in at least one database, at least one schemaless database, at least one graph database, at least one relational database, at least one non-relational database, at least one distributed database, at least one parallel database, or the like.

At least one central server can connect to or communicate with including but not limited to at least one application, at least one external server, at least one central server, at least one terminal, or a combination thereof, by way of at least one link. At least one central server can control at least one flow of information or data between including but not limited to at least one application, at least one external server, at least one central server, or a combination thereof, in either direction. At least one central server can be at least one server in at least one individual geographical location or at least one additional geographical location. At least one central server can preferably relate to a single Internet location, but that need not be the case.

At least one central server can communicate information or data including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of at least one preferred conveyance service offering in conjunction with corresponding conveyance data, all or some of at least one filtered conveyance service offering in conjunction with corresponding conveyance data, all or some of at least one conveyance service offering in conjunction with corresponding conveyance data, all or some of subsequent or additional plurality of filtered conveyance service offerings in conjunction with corresponding conveyance data, all or some of subsequent or additional at least one preferred conveyance service offering in conjunction with corresponding conveyance data, at least one beginning service geographical location, at least one ending service geographical location, all or some of at least one real time or near real time geographical location of at least one representative, all or some of at least one real time or near real time geographical location of at least one conveyance client, at least one representative preference, at least one conveyance client preference, at least one secured or obtained preferred conveyance service request, at least one secured or obtained preferred conveyance service offering, or the like. At least one central server can communicate all or some of information or data with at least one central server, at least one external server, at least one application, or a combination thereof.

At least one central server can filter and identify including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of at least one preferred conveyance service offering in conjunction with corresponding conveyance data, all or some of at least one filtered conveyance service offering in conjunction with corresponding conveyance data, all or some of at least one conveyance service offering in conjunction with corresponding conveyance data, all or some of subsequent or additional plurality of filtered conveyance service offerings in conjunction with corresponding conveyance data, all or some of subsequent or additional at least one preferred conveyance service offering in conjunction with corresponding conveyance data, at least one beginning service geographical location, at least one ending service geographical location, all or some of at least one real time or near real time geographical location of at least one representative, all or some of at least one real time or near real time geographical location of at least one conveyance client, at least one representative preference, at least one conveyance client preference, at least one secured or obtained preferred conveyance service request, at least one secured or obtained preferred conveyance service offering, or a combination thereof, together or separately.

At least one central server can be at least one software and/or at least one hardware that can for example facilitate at least one operation or at least one function to secure or obtain at least one conveyance service request, at least one filtered conveyance service request, at least one preferred conveyance service request, at least one conveyance service offering, at least one filtered conveyance service offering, at least one preferred conveyance service offering, or a combination thereof.

At least one central server can secure or obtain at least one preferred conveyance service request, at least one filtered conveyance service request, at least one conveyance service request, at least one preferred conveyance service offering, at least one filtered conveyance service offering, at least one conveyance service offering, or a combination thereof, and can communicate directly or indirectly with at least one central server, at least one external server, at least one application, at least one terminal, at least one autonomous vehicle, at least one owner or at least one controller of at least one autonomous vehicle, at least one service provider, at least one good supplier, at least one fleet manager, at least one logistics provider, at least one logistics supplier, at least one third party, at least one map provider, at least one conveyance client, at least one representative, or a combination thereof.

At least one central server can standardize or convert at least one conveyance service request, structured in at least one different format, into at least one uniform format. At least one central server can standardize or convert at least one conveyance service offering, structured in at least one different format, into at least one uniform format. At least one central server can preferably be at least one secure server. At least one central server can be made secure using hardware and/or software commercially available. Additionally, at least one central server can include encryption software such that communications entering or exiting at least one server are encrypted. Encryption hardware and/or software are commercially available. At least one central server can be updated or refreshed in real time or near real time and can refer to being updated or refreshed in the highest level of development or state of the art. At least one central server can perform at least one function in real time or near real time and can refer to being updated or refreshed in the highest level of development or state of the art. At least one central server can use machine learning technology or the like to identify at least one pattern that can improve at least one visual representation.

At least one central server can use at least one database, at least one database table, at least one result set, or the like, to filter at least one conveyance service request or at least one conveyance service offering. At least one central server can use at least one database, at least one database table, at least one result set, or the like, to identify at least one preferred conveyance service request or at least one preferred conveyance service offering.

At least one central server can filter at least one conveyance service request relating to at least one representative preference and preferably at least one real time or near real time geographical location of at least one representative, to identify at least one filtered conveyance service request by at least one process including but not limited to at least one of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

At least one central server can filter at least one conveyance service offering relating to at least one conveyance client preference and preferably at least one real time or near real time geographical location of at least one conveyance client, to identify at least one filtered conveyance service offering by at least one process including but not limited to at least one of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

At least one central server can filter, categorize, or the like, at least one conveyance service request upon being received. At least one central server can filter, categorize, or the like, at least one conveyance service offering upon being received. At least one central server can filter, or the like, at least one conveyance service request or at least one conveyance service offering more than once. At least one central server can, including but not limited to, receive, transmit, store, standardize, aggregate, or a combination thereof, at least one conveyance service request in any order prior to filtering at least one conveyance service request. At least one central server can receive, transmit, store, standardize, aggregate, or a combination thereof, at least one conveyance service offering in any order prior to filtering at least one conveyance service offering.

At least one central server can identify at least one preferred conveyance service request from at least one filtered conveyance service request or at least one pre-filtered conveyance service request. At least one central server can identify at least one preferred conveyance service offering from at least one filtered conveyance service offering or at least one pre-filtered conveyance service offering.

At least one preferred conveyance service request relating to at least one representative preference can be identified from at least one filtered conveyance service request by using including but not limited to at least one sorting algorithm, at least one selection algorithm, at least one search algorithm, at least one merge algorithm, at least one maximum function, at least one minimum function, at least one graph algorithm, at least one graph search algorithm, at least one tree algorithm, at least one tree search algorithm, at least one matrix calculation, at least one matrix algorithm, at least one comparison, or a combination thereof.

At least one preferred conveyance service offering relating to at least one conveyance client preference can be identified from at least one filtered conveyance service offering by using including but not limited to at least one sorting algorithm, at least one selection algorithm, at least one search algorithm, at least one merge algorithm, at least one maximum function, at least one minimum function, at least one graph algorithm, at least one graph search algorithm, at least one tree algorithm, at least one tree search algorithm, at least one matrix calculation, at least one matrix algorithm, at least one comparison, or a combination thereof.

At least one central server can preferably sort, or the like, at least one filtered conveyance service request using at least one representative preference to identify at least one preferred conveyance service request. At least one filtered conveyance service request can preferably be sorted relating to at least one weighted average of at least one representative preference however, sorting is not required to identify at least one preferred conveyance service request. At least one central server can preferably sort, or the like, at least one filtered conveyance service offering using at least one conveyance client preference to identify at least one preferred conveyance service offering. At least one filtered conveyance service offering can preferably be sorted relating to at least one weighted average of at least one conveyance client preference however, sorting is not required to identify at least one preferred conveyance service offering. At least one central server can preferably sort, or the like, at least one filtered conveyance service request or at least one filtered conveyance service offering more than once to identify at least one preferred conveyance service request or at least one preferred conveyance service offering respectively.

At least one central server can preferably sort, or the like, at least one filtered conveyance service request in at least one order relating to at least one weighted average of at least one representative preference to identify at least one preferred conveyance service request. At least one central server can preferably sort, or the like, at least one filtered conveyance service offering in at least one order relating to at least one weighted average of at least one conveyance client preference to identify at least one preferred conveyance service offering.

At least one central server can process or facilitate including but not limited to at least one conveyance service request, at least one filtered conveyance service request, at least one preferred conveyance service request, or a combination thereof, relating to at least one service provider operating in at least one conveyance industry segment. At least one central server can process or facilitate including but not limited to at least one conveyance service offering, at least one filtered conveyance service offering, at least one preferred conveyance service offering, or a combination thereof, relating at least one service provider operating in at least one conveyance industry segment. At least one central server can use or have at least one default representative preference, at least one default conveyance client preference, or a combination thereof.

If at least one conveyance service request is pre-filtered or pre-categorized, then at least one conveyance service request can be perceived or referred to as at least one filtered conveyance service request and at least one central server can identify at least one preferred conveyance service request. If at least one conveyance service offering is pre-filtered or pre-categorized, then at least one conveyance service offering can be perceived or referred to as at least one filtered conveyance service offering and at least one central server can identify at least one preferred conveyance service offering.

As a non-limiting example, at least one computer readable memory of at least one central server can be but is not limited to at least one database, at least one database table, at least one database result set, at least one cloud storage, at least one hard disk drive, at least one solid state drive, at least one optical disk drive, at least one flash memory, at least one Random Access Memory (RAM), at least one tape, or a combination thereof.

As a non-limiting example, at least one central server can include at least one distinct server operably linked in the same or at least one different geographical location. As a non-limiting example, at least one central server can optionally be part of at least one terminal. As a non-limiting example, at least one central server can optionally be part of at least one application. As a non-limiting example, at least one central server can optionally be located on at least one terminal. As a non-limiting example, at least one application can optionally operate on at least one central server. As a non-limiting example, at least one function of at least one central server or at least one external server can be performed by at least one application. As a non-limiting example, at least one function of at least one application can be performed by at least one central server or at least one external server. As a non-limiting example, at least one function of at least one central server can be performed by at least one external server. As a non-limiting example, at least one central server can include or utilize quantum computing. As a non-limiting example, at least one central server can include or utilize at least one neural network. As a non-limiting example, at least one central server can include or utilize machine learning technology or the like. As a non-limiting example, at least one central server can be dispersed across at least one geographical location such as Los Angeles and New York.

As a non-limiting example, at least one central server can aggregate at least one conveyance service request, at least one conveyance service offering, or a combination thereof, within at least one service provider, at least one owner or at least one controller of at least one autonomous vehicle, at least one good supplier, at least one fleet manager, at least one logistics provider, at least one logistics supplier, at least one map provider, or a combination thereof. As a non-limiting example, at least one central server can process or facilitate at least one conveyance service request, at least one filtered conveyance service request, at least one preferred conveyance service request, at least one conveyance service offering, at least one filtered conveyance service offering, at least one preferred conveyance service offering, or a combination thereof, from at least one individual service provider relating to at least one individual conveyance industry segment. As a non-limiting example, at least one central server can compile at least one visual representation to be transmitted to at least one application.

As a non-limiting example, at least one conveyance service request, at least one conveyance service offering, all or some of at least one real time or near real time geographical location of at least one representative, all or some of at least one real time or near real time geographical location of at least one conveyance client, or a combination thereof, can be transmitted from at least one external server to at least one central server by way of at least one link. As a non-limiting example, at least one conveyance service request, at least one conveyance service offering, all or some of at least one real time or near real time geographical location of at least one conveyance client, all or some of at least one real time or near real time geographical location of at least one representative or a combination thereof, can be transmitted from at least one service provider, at least one owner or at least one controller of at least one autonomous vehicle, at least one good supplier, at least one fleet manager, at least one logistics provider, at least one logistics supplier, at least one map provider, or a combination thereof, to at least one central server by way of at least one link.

As a non-limiting example, at least one conveyance service request can be structured in at least one uniform format prior to being transmitted from at least one external server and is not needed to be standardized. As a non-limiting example, at least one conveyance service offering can be structured in at least one uniform format prior to being transmitted from at least one external server and is not needed to be standardized.

As a non-limiting example, at least one central server can execute at least one function of the present invention for at least one conveyance client including but not limited to receiving, standardizing, aggregating, filtering, and preferably sorting, or the like, at least one conveyance service offering in conjunction with corresponding conveyance data, and securing or obtaining at least one preferred conveyance service offering.

As a non-limiting example, at least one central server can execute at least one function of the present invention for at least one representative and/or at least one autonomous vehicle including but not limited to receiving, standardizing, aggregating, filtering and preferably sorting, at least one conveyance service request in conjunction with corresponding conveyance data, and securing or obtaining at least one preferred conveyance service request.

As a non-limiting example, at least one different geographical location can be used other than at least one real time or near real time geographical location of at least one representative when filtering at least one conveyance service request. As a non-limiting example, at least one different geographical location can be used other than at least one real time or near real time geographical location of at least one conveyance client when filtering at least one conveyance service offering.

As a non-limiting example, at least one conveyance client preference, preferably at least one real time or near real time geographical location of at least one conveyance client, or a combination thereof, can be transmitted to at least one central server at any time prior to filtering at least one conveyance service offering. As a non-limiting example, at least one representative preference, preferably at least one real time or near real time geographical location of at least one representative, or a combination thereof, can be transmitted to at least one central server at any time prior to filtering at least one conveyance service request.

As a non-limiting example, at least one central server can use at least one equal weight or at least one unequal weight for at least one representative preference when calculating at least one weighted average to identify at least one preferred conveyance service request. As a non-limiting example, at least one central server can use at least one equal weight or at least one unequal weight for at least one conveyance client preference when calculating at least one weighted average to identify at least one preferred conveyance service offering.

As a non-limiting example, when at least one central server receives at least one conveyance service request or at least one conveyance service offering, at least one central server can categorize or pre-filter at least one conveyance service request or at least one conveyance service offering. As a non-limiting example, at least one central server can obtain or receive at least one pre-filtered or at least one pre-categorized conveyance service request relating to at least one geographical area. As a non-limiting example, at least one central server can obtain or receive at least one pre-filtered or at least one pre-categorized conveyance service request relating to at least one level of service. As a non-limiting example, at least one central server can obtain or receive at least one pre-filtered or at least one pre-categorized at least one conveyance service offering relating to at least one geographical area. As a non-limiting example, at least one central server can obtain or receive at least one pre-filtered or at least one pre-categorized at least one conveyance service offering relating to at least one level of service. As a non-limiting example, at least one conveyance service request or at least one conveyance service offering can be pre-filtered or pre-categorized on at least one central server based on at least one geographical area. As a non-limiting example, at least one conveyance service request or at least one conveyance service offering can be pre-filtered or pre-categorized on at least one central server based on at least one level of service.

As a non-limiting example, when at least one central server receives all or some of conveyance service offerings or all or some of conveyance service requests, at least one central server can categorize or pre-filter all or some of conveyance service offerings or all or some of conveyance service requests. As a non-limiting example, at least one central server can obtain or receive all or some of at least one pre-filtered conveyance service offerings, or all or some of at least one pre-categorized conveyance service requests, relating to at least one geographical area. As a non-limiting example, at least one central server can obtain or receive all or some of at least one pre-filtered conveyance service requests or all or some of at least one pre-categorized conveyance service offerings, relating to at least one level of service. As a non-limiting example, all or some of conveyance service requests or all or some of conveyance service offerings can be pre-filtered or pre-categorized on at least one central server based on at least one geographical area. As a non-limiting example, all or some of conveyance service requests or all or some of conveyance service offerings can be pre-filtered or pre-categorized on at least one central server based on at least one level of service.

As a non-limiting example, at least one conveyance service request can be pre-filtered or pre-categorized on at least one external server or at least one central server, at least one conveyance service request can become at least one filtered conveyance service request and filtering is not required on at least one central server. As a non-limiting example, if at least one conveyance service request is pre-filtered or pre-categorized, at least one central server does not need to filter at least one conveyance service request and can identify at least one preferred conveyance service request.

As a non-limiting example, at least one conveyance service offering can be pre-filtered or pre-categorized on at least one external server or at least one central server, at least one conveyance service offering can become at least one filtered conveyance service offering and filtering is not required on at least one central server. As a non-limiting example, if at least one conveyance service offering is pre-filtered or pre-categorized, at least one central server does not need to filter at least one conveyance service offering and can identify at least one preferred conveyance service offering.

As a non-limiting example, at least one conveyance service request can be filtered based on at least one representative preference on at least one central server after being pre-filtered or pre-categorized. As a non-limiting example, at least one conveyance service request can be filtered based on at least one representative preference on at least one central server after being pre-filtered or pre-categorized on at least one external server. As a non-limiting example, at least one conveyance service offering can be filtered based on at least one conveyance client preference on at least one central server after being pre-filtered or pre-categorized. As a non-limiting example, at least one conveyance service offering can be filtered based on at least one conveyance client preference on at least one central server after being pre-filtered or pre-categorized on at least one external server.

As a non-limiting example, when at least one central server obtains at least one pre-filtered conveyance service request, at least one central server can compare at least one pre-filtered conveyance service request to at least one representative preference to identify at least one filtered conveyance service request. As a non-limiting example, when at least one central server obtains at least one pre-filtered conveyance service offering, at least one central server can compare at least one pre-filtered conveyance service offering to at least one conveyance client preference to identify at least one filtered conveyance service offering.

As a non-limiting example, if at least one conveyance service request or at least one conveyance service offering is pre-filtered, then at least one conveyance service request or at least one conveyance service offering is not filtered. As a non-limiting example, at least one pre-filtered conveyance service request or at least one pre-filtered conveyance service offering can be perceived or referred to as at least one filtered conveyance service request or at least one filtered conveyance service offering respectively. As a non-limiting example, at least one central server can filter at least one conveyance service request or at least one conveyance service offering at least once. As a non-limiting example, at least one central server can preferably sort, or the like, at least one conveyance service request or at least one conveyance service offering at least once to identify at least one preferred conveyance service request or at least one preferred conveyance service offering. As a non-limiting example, at least one central server can filter at least one conveyance service request or at least one conveyance service offering more than once based on at least one pricing preference and then at least one service provider preference. As a non-limiting example, at least one conveyance service request or at least one conveyance service offering can be categorized by at least one geographical location after being received on at least one central server.

As a non-limiting example, at least one filtered conveyance service request can preferably be sorted in at least one ascending or descending order relating to at least one weighted average of at least one representative preference to identify at least one preferred conveyance service request. As a non-limiting example, at least one filtered conveyance service offering can preferably be sorted in at least one ascending or descending order relating to at least one weighted average of at least one conveyance client preference to identify at least one preferred conveyance service offering.

As a non-limiting example, at least one preferred conveyance service request in conjunction with corresponding conveyance data, at least one filtered conveyance service request in conjunction with corresponding conveyance data, or a combination thereof, can be identified or updated in real time or near real time as at least one real time or near real time geographical location of at least one representative updates or changes. As a non-limiting example, at least one preferred conveyance service offering in conjunction with corresponding conveyance data, at least one filtered conveyance service offering in conjunction with corresponding conveyance data, or a combination thereof, can be identified or updated in real time or near real time as at least one real time or near real time geographical location of at least one conveyance client updates or changes.

As a non-limiting example, at least one preferred conveyance service request in conjunction with corresponding conveyance data, at least one preferred conveyance service offering in conjunction with corresponding conveyance data, at least one filtered conveyance service request in conjunction with corresponding conveyance data, at least one filtered conveyance service offering in conjunction with corresponding conveyance data, at least one conveyance client preference, at least one representative preference, at least one secured or obtained preferred conveyance service request, at least one secured or obtained preferred conveyance service offering, or a combination thereof, can be identified or updated in real time or near real time as traffic information updates or changes.

As a non-limiting example, at least one central server can secure or obtain at least one preferred conveyance service request, at least one filtered conveyance service request, or a combination thereof, and can communicate directly with at least one external server or at least one service provider. As a non-limiting example, at least one central server can secure or obtain at least one preferred conveyance service offering, at least one filtered conveyance service offering, or a combination thereof, and can communicate directly with at least one external server or at least one service provider.

As a non-limiting example, at least one secured or obtained preferred conveyance service request or at least one secured or obtained preferred conveyance service offering can be sent to including but not limited to at least one service provider, at least one external server, at least one good supplier, at least one fleet manager, at least one logistics provider, at least one logistics supplier, at least one representative, at least one conveyance client, at least one map provider, or a combination thereof.

As a non-limiting example, at least one central server, at least one external server, at least one application, at least one terminal, at least one link, or a combination thereof, can be combined or integrated. As a non-limiting example, at least one central server can manage or process at least one conveyance service offering the same as at least one conveyance service request. As a non-limiting example, at least one central server can manage or process at least one conveyance service request the same as at least one conveyance service offering. At least one conveyance service offering or at least one conveyance service request can be pre-filtered or pre-categorized on at least one central server, at least one external server, at least one application, or a combination thereof.

As a non-limiting example, at least one central server can use at least one graph database to identify at least one preferred conveyance service request, at least one preferred conveyance service offering, or a combination thereof, that can be in the closest proximity. As a non-limiting example, at least one central server can utilize at least one directed graph or at least one undirected graph with at least one node and/or at least one edge to identify at least one autonomous vehicle within the shortest travel time to at least one conveyance client, at least one preferred conveyance service request, at least one preferred conveyance service offering, or a combination thereof.

System

At least one system can be but is not limited to a collection of elements of the present invention that can for example secure or obtain at least one preferred conveyance service request or at least one preferred conveyance service offering. At least one system can be but is not limited to a collection of elements of the present invention, where at least one element can be associated or integrated with at least one other element. The collection of elements or individual elements can be in the same or different locations. At least one system can be but is not limited to at least one computer program product.

As a non-limiting example, in the present invention, at least one conveyance client, at least one application, at least one representative, at least one terminal, at least one link, at least one central server, at least one external server, at least one service provider, at least one good supplier, at least one map provider, at least one autonomous vehicle, at least one visual representation, at least one dynamic map, at least one heat map, at least one real time or near real time heat map, at least one historical heat map, at least one predictive heat map, at least one representative preference, at least one conveyance client preference, conveyance data, at least one conveyance service request, at least one filtered conveyance service request, at least one preferred conveyance service request, at least one conveyance service offering, at least one filtered conveyance service offering, and at least one preferred conveyance service offering can all be in at least one similar geographical location, or spread out in at least one distant location, including at least one cross-border location.

At least one system can be used to analyze or evaluate and preferably secure or obtain at least one preferred conveyance service request or at least one preferred conveyance service offering relating to at least one service provider or the like operating in at least one conveyance industry segment. At least one system can be updated or refreshed in real time or near real time and can refer to being updated or refreshed in the highest level of development or state of the art. At least one system can perform at least one function in real time or near real time and can refer to being updated or refreshed in the highest level of development or state of the art.

Method

At least one method can be but is not limited to a collection of elements of the present invention that can for example secure or obtain at least one preferred conveyance service request or at least one preferred conveyance service offering. At least one method can be but is not limited to a collection of elements of the present invention, where at least one element can be associated or integrated with at least one other element. The collection of elements or individual elements can be in the same or different locations. At least one method can be but is not limited to at least one computer program product.

As a non-limiting example, in the present invention, at least one conveyance client, at least one application, at least one representative, at least one terminal, at least one link, at least one central server, at least one external server, at least one service provider, at least one good supplier, at least one map provider, at least one autonomous vehicle, at least one visual representation, at least one dynamic map, at least one heat map, at least one real time or near real time heat map, at least one historical heat map, at least one predictive heat map, at least one representative preference, at least one conveyance client preference, conveyance data, at least one conveyance service request, at least one filtered conveyance service request, at least one preferred conveyance service request, at least one conveyance service offering, at least one filtered conveyance service offering, and at least one preferred conveyance service offering can all be in at least one similar geographical location, or spread out in at least one distant location, including at least one cross-border location.

At least one method can be used to analyze or evaluate and preferably secure or obtain at least one preferred conveyance service request or at least one preferred conveyance service offering relating to at least one service provider or the like operating in at least one conveyance industry segment. At least one method can be updated or refreshed in real time or near real time and can refer to being updated or refreshed in the highest level of development or state of the art. At least one method can perform at least one function in real time or near real time and can refer to being updated or refreshed in the highest level of development or state of the art.

External Server

At least one external server can be at least one software and/or at least one hardware that can for example facilitate at least one operation or at least one function to secure or obtain at least one preferred conveyance service request or at least one preferred conveyance service offering. At least one external server can be at least one software and/or at least one hardware that can for example be utilized or operated by at least one conveyance client, at least one representative, at least one service provider, at least one good supplier, at least one fleet manager, at least one owner or at least one controller of at least one autonomous vehicle, at least one logistics provider, at least one logistics supplier, at least one map provider, at least one third party, or a combination thereof. At least one external server can be at least one software and/or at least one hardware for example at least one computer application, at least one computer program, at least one API, at least one smartphone application, at least one website, at least one web application, at least one smartphone application, at least one cloud application, at least one service, or the like.

At least one external server can communicate information or data including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of at least one preferred conveyance service offering in conjunction with corresponding conveyance data, all or some of at least one filtered conveyance service offering in conjunction with corresponding conveyance data, all or some of at least one conveyance service offering in conjunction with corresponding conveyance data, all or some of subsequent or additional plurality of filtered conveyance service offerings in conjunction with corresponding conveyance data, all or some of subsequent or additional at least one preferred conveyance service offering in conjunction with corresponding conveyance data, at least one beginning service geographical location, at least one ending service geographical location, all or some of at least one real time or near real time geographical location of at least one representative, all or some of at least one real time or near real time geographical location of at least one conveyance client, at least one representative preference, at least one conveyance client preference, at least one secured or obtained preferred conveyance service request, at least one secured or obtained preferred conveyance service offering, or the like. At least one external server can communicate all or some of information or data with at least one central server, at least one external server, at least one application, or a combination thereof.

At least one external server can be at least one software and/or at least one hardware that can for example facilitate at least one operation or at least one function to secure or obtain at least one conveyance service request, at least one filtered conveyance service request, at least one preferred conveyance service request, at least one conveyance service offering, at least one filtered conveyance service offering, at least one preferred conveyance service offering, or a combination thereof.

At least one external server can expose or be accessed through at least one API relating to at least one service provider, at least one good supplier, at least one owner or at least one controller of at least one autonomous vehicle, at least one fleet manager, at least one logistics provider, at least one logistics supplier, at least one map provider, at least one third party, or the like.

All or some of conveyance data relating to at least one conveyance service request or at least one conveyance service offering can be sourced or provided by at least one external server that can be associated with at least one service provider, at least one good supplier, at least one fleet manager, at least one logistics provider, at least one logistics supplier, at least one owner or at least one controller of at least one autonomous vehicle, at least one map provider, at least one third party, or a combination thereof. All or some of conveyance data relating to at least one autonomous vehicle can be sourced or provided by at least one external server that can also have or provide at least one conveyance service request in conjunction with corresponding conveyance data, at least one conveyance service offering in conjunction with corresponding conveyance data, or a combination thereof. All or some of conveyance data relating to at least one autonomous vehicle can be sourced or provided by at least one external server that does not have or does not provide at least one conveyance service request in conjunction with corresponding conveyance data, at least one conveyance service offering in conjunction with corresponding conveyance data, or a combination thereof. At least one autonomous vehicle, all or some of conveyance data relating to at least one autonomous vehicle, or a combination thereof, can be sourced or provided by at least one third party.

At least one external server can include but is not limited to at least one source of at least one conveyance service request in conjunction with corresponding conveyance data, at least one conveyance service offering in conjunction with corresponding conveyance data, or a combination thereof. At least one external server can be for example at least one source of at least one real time or near real time conveyance service request. At least one external server can be for example at least one source of at least one real time or near real time conveyance service offering. At least one external server can be but is not limited to at least one computer network system. At least one external server can include but is not limited to at least one computer processor, at least one computer readable memory, and at least one network interface. At least one external server preferably can encompass hardware and/or software alone or in a combination.

All or some of conveyance data relating to at least one conveyance service request or at least one conveyance service offering can be transmitted to or communicated with at least one central server, at least one external server, at least one application, at least one application that can be associated with at least one autonomous vehicle, at least one terminal, at least one autonomous vehicle, at least one owner or at least one controller of at least one autonomous vehicle, at least one service provider, at least one good supplier, at least one fleet manager, at least one logistics provider, at least one logistics supplier, at least one map provider, at least one third party, at least one conveyance client, at least one representative, or a combination thereof.

At least one preferred conveyance service request or at least one preferred conveyance service offering can be secured or obtained through or by at least one central server, at least one application, at least one external server, at least one terminal, at least one link, or a combination thereof. At least one external server can have or be associated with at least one database based on at least one data point. At least one external server can have or be associated with at least one database for at least one conveyance service request, at least one conveyance service offering, or a combination thereof. At least one external server can have or be associated with at least one database based on at least one conveyance client preference, at least one representative preference, or a combination thereof. At least one external server can have or be associated with at least one database for at least one conveyance industry segment. At least one external server can have or be associated with at least one conveyance industry segment.

At least one external server can be but is not limited to at least one server that can connect to or communicate with at least one central server, at least one application, or a combination thereof, by way of at least one link. At least one external server can transmit in real time or near real time, including but not limited to, at least one conveyance service request in conjunction with conveyance data, at least one conveyance service offering in conjunction with conveyance data, or a combination thereof, to at least one central server or at least one application by way of at least one link. At least one external server can encompass different hardware and/or software alone or in a combination. At least one external server can include or connect to at least one database. At least one computer readable memory of at least one external server can be at least one database that at least one external server can connect to.

At least one external server can have or be associated with including but not limited to at least one central server, at least one external server, at least one link, at least one terminal, at least one good supplier, at least one autonomous vehicle, at least one application, at least one service provider, at least one good supplier server, at least one fleet manager server, at least one owner or at least one controller of at least one autonomous vehicle server, at least one logistics provider, at least one logistics supplier, at least one map provider, at least one third party, at least one conveyance client, at least one representative, or a combination thereof. At least one external server can optionally be perceived or referred to as at least one service provider server, at least one good supplier server, at least one fleet manager server, at least one owner or at least one controller of at least one autonomous vehicle server, at least one logistics provider server, at least one logistics supplier server, at least one map provider server, at least one third party server, or the like.

At least one external server can be at least one server in at least one individual geographical location or at least one additional geographical location. At least one external server can preferably relate to a single Internet location, but that need not be the case. Preferably, at least one external server can be at least one secure server. At least one external server can be made secure using hardware and/or software commercially available. Additionally, at least one external server can include encryption software such that communications entering or exiting at least one external server are encrypted. Encryption hardware and/or software are commercially available.

At least one external server can be associated with at least one Application Program Interface (API) or the like. At least one external server Application Program Interface (API) or the like can be used to facilitate communication between including but not limited to at least one central server, at least one external server, at least one application, at least one terminal, at least one conveyance client, at least one representative, at least one map provider, at least one third party, at least one service provider, at least one good supplier, at least one owner or at least one controller of at least one autonomous vehicle, at least one fleet manager, at least one logistics provider, at least one logistics supplier, or a combination thereof. At least one external server can provide at least one conveyance service request in conjunction with conveyance data, at least one conveyance service offering in conjunction with conveyance data, or a combination thereof, relating to at least one service provider or the like operating in at least one conveyance industry segment. At least one external server can be updated or refreshed in real time or near real time and can refer to being updated or refreshed in the highest level of development or state of the art. At least one external server can perform at least one function in real time or near real time and can refer to being updated or refreshed in the highest level of development or state of the art.

As a non-limiting example, at least one external server being at least one source of at least one conveyance service request in conjunction with corresponding conveyance data, at least one conveyance service offering in conjunction with corresponding conveyance data, or a combination thereof, can be associated with at least one individual service provider, at least one individual good supplier, at least one individual fleet manager, at least one individual owner or at least one individual controller of at least one autonomous vehicle, at least one individual logistics provider, at least one individual logistics supplier, at least one individual map provider, at least one individual third party, at least one individual representative, at least one individual conveyance client, or the like.

As a non-limiting example, an individual service provider, an individual map provider, or the like can be associated with at least one external server that can use or have at least one database based on at least one data point. As a non-limiting example, an individual service provider, an individual map provider, or the like can be associated with at least one external server that can use or have at least one database for at least one conveyance service request, at least one conveyance service offering, or a combination thereof. As a non-limiting example, an individual service provider, an individual map provider, or the like can be associated with at least one external server that can use or have at least one database based on at least one conveyance client preference or at least one representative preference. As a non-limiting example, an individual service provider, an individual map provider, or the like can be associated with at least one external server that can use or have at least one database for at least one conveyance industry segment. As a non-limiting example, an individual service provider, an individual map provider, or the like can use or have at least one external server relating to a conveyance industry segment being a ride-hail industry segment and at least one other external server relating to a conveyance industry segment being a freight industry segment. As a non-limiting example, an individual service provider, an individual map provider, or the like can use or have at least one external server for at least one conveyance service request, at least one conveyance service offering, or a combination thereof.

As a non-limiting example, at least one external server can operate on at least one central server. As a non-limiting example, at least one external server can include at least one distinct server operably linked in the same or at least one different geographical location. As non-limiting example, at least one external server can optionally be perceived or referred to as at least one peer-to-peer network. As a non-limiting example, at least one external server can transmit at least one conveyance service request, at least one conveyance service offering, or a combination thereof, that can be pre-standardized to or with at least one central server or at least one application. As a non-limiting example, at least one external server can be but is not limited to at least one server that can connect to or communicate with at least one application, at least one central server, or a combination thereof, by way of at least one link. As a non-limiting example, at least one function of at least one external server can be performed by at least one central server.

As a non-limiting example, at least one conveyance service request can be filtered based on at least one representative preference on at least one central server, at least one external server, at least one application, or a combination thereof, after being pre-filtered or pre-categorized on at least one central server, at least one external server, or at least one application, or a combination thereof. As a non-limiting example, at least one conveyance service offering can be filtered based on at least one conveyance client preference on at least one central server, at least one external server, at least one application, or a combination thereof, after being pre-filtered or pre-categorized on at least one central server, at least one external server, or at least one application, or a combination thereof.

As a non-limiting example, at least one external server can pre-filter or pre-categorize at least one conveyance service request, at least one filtered conveyance service request, at least one preferred conveyance service request, at least one conveyance service offering, at least one filtered conveyance service offering, at least one preferred conveyance service offering, or a combination thereof. As a non-limiting example, at least one external server can pre-filter or pre-categorize at least one conveyance service request, at least one filtered conveyance service request, at least one preferred conveyance service request, at least one conveyance service offering, at least one filtered conveyance service offering, at least one preferred conveyance service offering, or a combination thereof, and at least one central server or at least one application does not need to filter or identify as preferred. As a non-limiting example, at least one external server can pre-filter or pre-categorize at least one conveyance service request, at least one filtered conveyance service request, at least one preferred conveyance service request, at least one conveyance service offering, at least one filtered conveyance service offering, at least one preferred conveyance service offering, or a combination thereof, relating to at least one geographical area. As a non-limiting example, at least one external server can pre-filter or pre-categorize at least one conveyance service request, at least one filtered conveyance service request, at least one preferred conveyance service request, at least one conveyance service offering, at least one filtered conveyance service offering, at least one preferred conveyance service offering, or a combination thereof, relating to at least one at least one level of service preference.

As a non-limiting example, at least one external server can filter and identify including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of at least one preferred conveyance service offering in conjunction with corresponding conveyance data, all or some of at least one filtered conveyance service offering in conjunction with corresponding conveyance data, all or some of at least one conveyance service offering in conjunction with corresponding conveyance data, all or some of subsequent or additional plurality of filtered conveyance service offerings in conjunction with corresponding conveyance data, all or some of subsequent or additional at least one preferred conveyance service offering in conjunction with corresponding conveyance data, at least one beginning service geographical location, at least one ending service geographical location, all or some of at least one real time or near real time geographical location of at least one representative, all or some of at least one real time or near real time geographical location of at least one conveyance client, at least one representative preference, at least one conveyance client preference, at least one secured or obtained preferred conveyance service request, at least one secured or obtained preferred conveyance service offering, or a combination thereof, together or separately.

As a non-limiting example, at least one external server, at least one central server, at least one application, at least one terminal, at least one link, or a combination thereof, can be combined or integrated. As a non-limiting example, at least one external server, at least one central server, at least one application, at least one terminal, at least one link, or a combination thereof, can be combined or integrated on at least one smartphone. As a non-limiting example, at least one external server can manage or process at least one conveyance service offering the same or similar as at least one conveyance service request. As a non-limiting example, at least one external server can manage or process at least one conveyance service request the same or similar as at least one conveyance service offering.

As a non-limiting example, at least one external server can secure or obtain at least one preferred conveyance service request, at least one filtered conveyance service request, at least one conveyance service request, at least one preferred conveyance service offering, at least one filtered conveyance service offering, at least one conveyance service offering, or a combination thereof, and can communicate directly or indirectly with at least one central server, at least one external server, at least one application, at least one autonomous vehicle, at least one owner or at least one controller of at least one autonomous vehicle, at least one service provider, at least one good supplier, at least one fleet manager, at least one logistics provider, at least one logistics supplier, at least one map provider, at least one third party, at least one representative, at least one conveyance client, or a combination thereof.

As a non-limiting example, at least one preferred conveyance service request or at least one preferred conveyance service offering can be secured or obtained by at least one central server or at least one external server through at least one application. As a non-limiting example, at least one preferred conveyance service request or at least one preferred conveyance service offering can be secured or obtained and transmitted between at least one application and at least one central server by way of at least one link. As a non-limiting example, at least one preferred conveyance service request or at least one preferred conveyance service offering can be secured or obtained and transmitted between at least one application and at least one external server by way of at least one link. As a non-limiting example, at least one preferred conveyance service request or at least one preferred conveyance service offering can be secured or obtained and transmitted between at least one application and at least one external server through at least one central server by way of at least one link. As a non-limiting example, at least one external server can connect to or communicate with two central servers belonging to two different entities. As a non-limiting example, at least one secured or obtained preferred conveyance service request, at least one secured or obtained preferred conveyance service offering, or a combination thereof, can be transmitted from at least one application to at least one external server or at least one central server through at least one link.

Conveyance Data

Conveyance data can be information or data that can for example be used to facilitate at least one operation or at least one function to secure or obtain at least one preferred conveyance service request or at least one preferred conveyance service offering. Conveyance data can be information or data that can for example be utilized or managed by at least one representative, at least one conveyance client, at least one service provider, at least one good supplier, t least one owner or at least one controller of at least one autonomous vehicle, at least one fleet manager, at least one logistics provider, at least one logistics supplier, at least one map provider, at least one third party, or a combination thereof.

Conveyance data can be for example data or information corresponding to at least one past metric, at least one current metric, at least one future metric, or a combination thereof, of including but not limited to at least one request or at least one offering for transporting at least one person, at least one good, at least one article, at least one thing, or a combination thereof from at least one geographical location to at least one other geographical location.

Conveyance data relating to at least one representative, at least one conveyance service request, at least one real time or near real time geographical location of at least one representative, or a combination thereof, can be sourced or provided from at least one external server, at least one central server, at least one application, or the like. Conveyance data relating to at least one representative, at least one conveyance service request, at least one real time or near real time geographical location of at least one representative, or a combination thereof, can be sourced or provided by at least one service provider, at least one good supplier, at least one owner or at least one controller of at least one autonomous vehicle, at least one fleet manager, at least one logistics provider, at least one logistics supplier, at least one map provider, at least one third party, at least one representative, or the like.

Conveyance data relating to at least one conveyance client, at least one conveyance service offering, at least one real time or near real time geographical location of at least one conveyance client, or a combination thereof, can be sourced or provided from at least one external server, at least one central server, at least one application, or the like. Conveyance data relating to at least one conveyance client, at least one conveyance service offering, at least one real time or near real time geographical location of at least one conveyance client, or a combination thereof, can be sourced or provided by at least one service provider, at least one good supplier, at least one owner or at least one controller of at least one autonomous vehicle, at least one fleet manager, at least one logistics provider, at least one logistics supplier, at least one map provider, at least one third party, at least one conveyance client, or the like.

Conveyance data relating to at least one representative, at least one conveyance service request, at least one real time or near real time geographical location of at least one representative, or a combination thereof, can be generated by at least one external server, at least one central server, at least one application, or the like. Conveyance data relating to at least one representative, at least one conveyance service request, at least one real time or near real time geographical location of at least one representative, or a combination thereof, can be generated by at least one service provider, at least one good supplier, at least one owner or at least one controller of at least one autonomous vehicle, at least one fleet manager, at least one logistics provider, at least one logistics supplier, at least one map provider, at least one third party, at least one representative, or the like.

Conveyance data relating to at least one conveyance client, at least one conveyance service offering, at least one real time or near real time geographical location of at least one conveyance client, or a combination thereof, can be generated by at least one external server, at least one central server, at least one application, or the like. Conveyance data relating to at least one conveyance client, at least one conveyance service offering, at least one real time or near real time geographical location of at least one conveyance client, or a combination thereof, can be generated by at least one service provider, at least one good supplier, at least one owner or at least one controller of at least one autonomous vehicle, at least one fleet manager, at least one logistics provider, at least one logistics supplier, at least one map provider, at least one third party, at least one conveyance client, or the like.

Conveyance data can be sourced, provided, or generated by at least one technology, at least one software, at least one hardware, or a combination thereof, relating to at least one representative or at least one conveyance client. All or some of conveyance data relating to at least one conveyance service request or at least one conveyance service offering can be used by at least one service provider, at least one good supplier, at least one fleet manager, at least one owner or at least one controller of at least one autonomous vehicle, at least one logistics provider, at least one logistics supplier, at least one map provider, at least one third party, at least one conveyance client, at least one representative, or a combination thereof, to analyze or evaluate and then secure or obtain at least one preferred conveyance service request or at least one preferred conveyance service offering.

Conveyance data can be but is not limited to any data or information corresponding to at least one conveyance service request, at least one filtered conveyance service request, at least one preferred conveyance service request, or a combination thereof, that can for example be transmitted between at least one external server, at least one central server, at least one application, at least one terminal, or a combination thereof, by way of at least one link. Conveyance data can be but is not limited to any data or information corresponding to at least one conveyance service offering, at least one filtered conveyance service offering, at least one preferred conveyance service offering, or a combination thereof, that can for example be transmitted between at least one external server, at least one central server, at least one application, at least one terminal, or a combination thereof, by way of at least one link. Conveyance data can be for example, used by at least one representative, at least one conveyance client, or a combination thereof, to analyze or evaluate and then secure or obtain at least one conveyance service.

Conveyance data can for example be transmitted from at least one external server to at least one central server, at least one application, at least one external server, or a combination thereof. Conveyance data retrieved from at least one external server can be for example cached on at least one central server, at least one application, at least one external server, or a combination thereof, to provide enhanced performance and better avoid at least one relevant limitation including but not limited to at least one central server limitation, at least one external server limitation, at least one service provider or the like limitation, at least one link limitation, and any involved service provider or the like limitation.

Conveyance data can be stored or cached in at least one database. Conveyance data can be stored or cached in at least one database table. Conveyance data can be updated or refreshed in real time or near real time and can refer to being updated or refreshed in the highest level of development or state of the art. Conveyance data can correspond to at least one preferred conveyance service request, at least one filtered conveyance service request, at least one conveyance service request, or a combination thereof, relating to at least one service provider, at least one good supplier, at least one owner or at least one controller of at least one autonomous vehicle, at least one fleet manager, at least one logistics provider, at least one logistics supplier, at least one map provider, at least one third party, at least one conveyance client, at least one representative, or a combination thereof, operating in at least one conveyance industry segment. Conveyance data can correspond to at least one preferred conveyance service offering, at least one filtered conveyance service offering, at least one conveyance service offering, or a combination thereof, relating to at least one service provider, at least one good supplier, at least one owner or at least one controller of at least one autonomous vehicle, at least one fleet manager, at least one logistics provider, at least one logistics supplier, at least one map provider, at least one third party, at least one conveyance client, at least one representative, or a combination thereof, operating in at least one conveyance industry segment.

All or some of conveyance data can be but is not limited to any data or information relating to at least one conveyance service request, at least one filtered conveyance service request, at least one preferred conveyance service request, or a combination thereof, that can be used to filter at least one conveyance service request into at least one filtered conveyance service request. All or some of conveyance data can be but is not limited to any data or information relating to at least one conveyance service offering, at least one filtered conveyance service offering, at least one preferred conveyance service offering, or a combination thereof, that can be used to filter at least one conveyance service offering into at least one filtered conveyance service offering.

All or some of conveyance data can be but is not limited to any data or information relating to at least one conveyance service request, at least one filtered conveyance service request, at least one preferred conveyance service request, or a combination thereof, that can be used to identify at least one preferred conveyance service request from at least one filtered conveyance service request. All or some of conveyance data can be but is not limited to any data or information relating to at least one conveyance service offering, at least one filtered conveyance service offering, at least one preferred conveyance service offering, or a combination thereof, that can be used to identify at least one preferred conveyance service offering from at least one filtered conveyance service offering.

All or some of conveyance data can be but is not limited to any data or information relating to at least one conveyance service request, at least one filtered conveyance service request, at least one preferred conveyance service request, at least one conveyance service offering, at least one filtered conveyance service offering, at least one preferred conveyance service offering, or a combination thereof, can be stored, aggregated, standardized, filtered, identified as preferred, or the like.

All or some of conveyance data can be but is not limited to any data or information relating to at least one conveyance service request, at least one filtered conveyance service request, at least one preferred conveyance service request, at least one conveyance service offering, at least one filtered conveyance service offering, at least one preferred conveyance service offering, or a combination thereof, can be pre-filtered or pre-categorized. All or some of conveyance data relating to at least one conveyance service request, at least one filtered conveyance service request, at least one preferred conveyance service request, at least one conveyance service offering, at least one filtered conveyance service offering, at least one preferred conveyance service offering, or a combination thereof, can be pre-filtered or pre-categorized based on all or some of at least one real time or near real time geographical location of at least one representative or at least one conveyance client respectfully.

Conveyance data can be for example used by at least one central server, at least one external server, at least one application, at least one representative, at least one conveyance client, or a combination thereof, to analyze or evaluate and then secure or obtain at least one preferred conveyance service request or at least one preferred conveyance service offering.

Conveyance data can be optimized to identify at least one preferred conveyance service request or at least one preferred conveyance service offering. Conveyance data can include but is not limited to optimization data that can come from at least one autonomous vehicle, at least one autonomous vehicle sensor, at least one sensor data, at least one third party provider, at least one mapping provider, at least one remote server, at least one external server, at least one service provider, at least one conveyance client, at least one representative, or the like. Conveyance data can for example, include but is not limited to, demographic data relating to at least one geographical area, at least one conveyance service request, at least one conveyance service offering, all or some of conveyance data, all or some of conveyance data relating to at least one autonomous vehicle, at least one conveyance client, at least one representative, at least one autonomous vehicle, at least one owner or at least one controller of at least one autonomous vehicle, at least one service provider, at least one good supplier, at least one fleet manager, at least one logistics provider, at least one logistics supplier, at least one map provider, at least one third party, or the like.

Conveyance data can include but is not limited to at least one statistical variable of at least one filtered conveyance service request or at least one filtered conveyance service offering. Conveyance data can include but is not limited to at least one statistical variable of at least one preferred conveyance service request or at least one preferred conveyance service offering.

As a non-limiting example, conveyance data can preferably be in real time or near real time and can include but is not limited to at least one beginning service geographical location, at least one ending service geographical location, pricing information, elevated pricing information, at least one representative preference, at least one conveyance client preference, at least one distance parameter, at least one estimated time of arrival, at least one time to destination, at least one conveyance client geographical location, at least one conveyance client review, at least one conveyance client rating, at least one conveyance client detail, at least one conveyance service detail, at least one conveyance service route, at least one preferred conveyance client, at least one sensor data, at least one representative geographical location, at least one representative review, at least one representative rating, at least one representative detail, at least one autonomous vehicle geographical location, at least one autonomous vehicle review, at least one autonomous vehicle rating, at least one autonomous vehicle detail, at least one preferred autonomous vehicle, at least one route planning preference, at least one fuel economy preference, at least one battery longevity preference, at least one vehicle capacity preference, at least one vehicle diagnostic preference, at least one conveyance data preference, at least one service provider geographical location, at least one service provider review, at least one service provider rating, at least one service provider detail, at least one preferred service provider, at least one good supplier geographical location, at least one good supplier review, at least one good supplier rating, at least one good supplier detail, at least one preferred good supplier, at least one owner or at least one controller of at least one autonomous vehicle geographical location, at least one owner or at least one controller of at least one autonomous vehicle review, at least one owner or at least one controller of at least one autonomous vehicle rating, at least one owner or at least one controller of at least one autonomous vehicle detail, at least one preferred owner or at least one preferred controller of at least one autonomous vehicle, at least one fleet manager geographical location, at least one fleet manager review, at least one fleet manager rating, at least one fleet manager detail, at least one preferred fleet manager, at least one logistics provider geographical location, at least one logistics provider review, at least one logistics provider rating, at least one logistics provider detail, at least one preferred logistics provider, at least one logistics supplier geographical location, at least one logistics supplier review, at least one logistics supplier rating, at least one logistics supplier detail, at least one preferred logistics supplier, at least one conveyance industry segment detail, at least one preferred conveyance industry segment, at least one good detail, at least one item detail, at least one type of vehicle detail, at least one vehicle detail, at least one measurement of at least one statistical variable, at least one level of service detail, at least one fuel consumption, at least one battery level, at least one vehicle diagnostic, at least one vehicle capacity, or a combination thereof.

As a non-limiting example, all or some of conveyance data can be communicated with at least one application, at least one terminal, at least one central server, at least one external server, at least one link, or a combination thereof, that can be combined or integrated. As a non-limiting example, conveyance data can include for example at least one vehicle detail or at least one autonomous vehicle detail, which can utilized to identify at least one preferred vehicle type, at least one preferred vehicle service, or a combination thereof. As a non-limiting example, conveyance data relating to at least one conveyance service offering or at least one conveyance service request can be sourced or provided by at, least one external server relating to at least one owner or at least one controller of at least one autonomous vehicle, at least one service provider, at least one good supplier, at least one fleet manager, at least one logistics provider, at least one logistics supplier, at least one map provider, at least one third party, or the like. As a non-limiting example, all or some of conveyance data can be related to at least one scooter, at least one scooter service, at least one bicycle, at least one bicycle service, or the like.

As a non-limiting example, conveyance data can be generated or provided from at least one central server, at least one application, at least one external server, at least one terminal, or a combination thereof. As a non-limiting example, conveyance data relating to at least one statistical variable can be used to compile at least one heat map. As a non-limiting example, conveyance data relating to at least one statistical variable can comprise at least one measurement of at least one of conveyance service availability, pricing, elevated pricing, conveyance service request density, filtered conveyance service request density, preferred conveyance service request density, conveyance service offering density, filtered conveyance service offering density, preferred conveyance service offering density, level of service density, at least one conveyance service distance, at least one estimated time of arrival, preferred conveyance client density, preferred good supplier density, at least one preferred conveyance industry segment, conveyance industry segment density, representative density, conveyance client density, service provider density, good supplier density, or a combination thereof.

As a non-limiting example, all or some of conveyance data relating to at least one conveyance service offering or at least one conveyance service request, can include optimization data that can be provided by at least one third party map provider to be utilized with route planning and identifying at least one preferred conveyance service offering or at least one preferred conveyance service request. As a non-limiting example, conveyance data can relate to at least one battery level of at least one device or at least one terminal belonging to at least one conveyance client. As a non-limiting example, conveyance data can include but is not limited to milestones, awards, incentives, number of rides completed, monetary earnings, financial information, or scheduling information.

As a non-limiting example, at least one sensor data relating to at least one autonomous vehicle can be communicated to at least one other autonomous vehicle, at least one service provider, at least one good supplier, at least one owner or at least one controller of at least one autonomous vehicle, at least one fleet manager, at least one logistics provider, at least one logistics supplier, at least one map provider, at least one third party, at least one conveyance client, at least one representative, or a combination thereof. As a non-limiting example, at least one sensor data can be used to communicate at least one status of at least one autonomous vehicle. As a non-limiting example, at least one real time or near real time geographical location of at least one autonomous vehicle can be based on or related to at least one sensor data. As a non-limiting example, conveyance data relating to at least one autonomous vehicle such as at least one real time or near real time geographical location of at least one autonomous vehicle can be sourced or provided by at least one external server. As a non-limiting example, all or some of conveyance data sourced or provided by at least one autonomous vehicle can be sourced from at least one various type of input such as at least one sensor, at least one transceiver, at least one receiver, at least one interface, at least one application, at least one terminal, or the like.

Conveyance Service Request

At least one conveyance service request can be for example at least one request from at least one conveyance client or at least one entity for the transportation of including but not limited to at least one person, at least one good, at least one article, at least one thing, or a combination thereof from at least one geographical location to at least one other geographical location. Once, for example, at least one beginning service geographical location, at least one ending service geographical location, or a combination thereof, is inputted or provided into at least one application, at least one central server or at least one external server, at least one conveyance service request relating to at least one conveyance client can be generated. When at least one conveyance service request is considered, at least one conveyance service request in conjunction with corresponding conveyance data can also be considered.

At least one conveyance service request in conjunction with corresponding conveyance data can be sourced or provided from, including but not limited to, at least one external server, at least one service provider, at least one good supplier, at least one fleet manager, at least one map provider, at least one third party, or the like. At least one conveyance service request can be stored or cached in at least one computer readable memory and/or at least one database of at least one central server. At least one conveyance service request can relate to at least one conveyance industry segment. At least one conveyance service request can relate to at least one service provider, at least one good supplier, at least one fleet manager, at least one owner or at least one controller of at least one autonomous vehicle, at least one logistics provider, at least one logistics supplier, at least one map provider, at least one third party, at least one representative, at least one conveyance client, or a combination thereof.

All or some of at least one conveyance service request can have or be associated with corresponding conveyance data. All or some of at least one conveyance service request can have or be associated with intrinsic conveyance data that can be stored in at least one database. All or some of at least one conveyance service request can be associated with or inherently have associated conveyance data that can be used to filter and identify at least one preferred conveyance service request to be secured or obtained.

At least one conveyance service request can be updated or refreshed in real time or near real time and can refer to being updated or refreshed in the highest level of development or state of the art. At least one conveyance service request can be pre-filtered or pre-categorized on at least one central server, at least one external server, at least one application, or a combination thereof. At least one conveyance service request can be at least one filtered conveyance service request, at least one preferred conveyance service request, or a combination thereof, relating to at least one representative preference. At least one conveyance service request can become at least one filtered conveyance service request, at least one preferred conveyance service request, or a combination thereof, based on at least one representative preference inputted or provided by at least one representative, at least one service provider, at least one good supplier, at least one fleet manager, at least one logistics provider, at least one logistics supplier, at least one map provider, at least one third party, or the like. At least one conveyance service request can be filtered once or more than once.

As a non-limiting example, at least one conveyance service request can be at least one ride-hail service request, at least one ride-share service request, at least one car-share service request, at least one peer-to-peer conveyance service request, at least one transportation service request, at least one scooter service request, at least one bicycle service request, at least one person delivery service request, at least one taxi service request, at least one shuttle service request, at least one good delivery service request, at least one item delivery service request, at least one medical service and delivery request, at least one food delivery service request, at least one courier delivery service request, at least one freight delivery service request, at least one animal delivery service request, at least one delivery service request, or a combination thereof.

As a non-limiting example, at least one conveyance service request can be perceived or referred to as at least one filtered conveyance service request or at least one preferred conveyance service request. As a non-limiting example, at least one conveyance service request can be identified or referred to as at least one filtered conveyance service request or at least one preferred conveyance service request for or with at least one representative, at least one service provider, at least one good supplier, at least one fleet manager, at least one logistics provider, at least one logistics supplier, at least one map provider, at least one third party, or a combination thereof. As a non-limiting example, at least one conveyance service request can include at least one waypoint. As a non-limiting example, at least one conveyance service request can include at least one waypoint where at least one conveyance client can walk to at least one designated area to be picked up for at least one conveyance service. As a non-limiting example, if at least one conveyance service request is secured or obtained, that same at least one secured or obtained conveyance service request can be referred to or identified as at least one preferred conveyance service request.

As a non-limiting example, at least one conveyance service request can be pre-scheduled. As a non-limiting example, at least one thing to be conveyed can include but is not limited to at least one personal item such as but not limited to keys or documents. As a non-limiting example, at least one conveyance service request can include special request information. As a non-limiting example, at least one conveyance service request can be stored or cached in at least one computer readable memory and/or at least one database of at least one application. As a non-limiting example, at least one conveyance service request can relate to at least one individual conveyance industry segment. As a non-limiting example, at least one conveyance service request can relate to at least one individual service provider, at least one individual map provider, at least one individual third party, at least one individual good supplier, at least one individual fleet manager, or the like. As a non-limiting example, at least one conveyance service request can be at least one pre-filtered conveyance service request. As a non-limiting example, a plurality of conveyance service requests can be a single conveyance service request. As a non-limiting example, at least one conveyance service request can be pre-filtered or pre-categorized on at least one central server based on at least one geographical location.

Filtered Conveyance Service Request

At least one filtered conveyance service request can be for example at least one conveyance service request that can be filtered with including but not limited to at least one representative preference, at least one real time or near real time geographical location of at least one representative, or a combination thereof. When at least one filtered conveyance service request is considered, at least one filtered conveyance service request in conjunction with corresponding conveyance data can also be considered.

At least one filtered conveyance service request can be stored or cached in at least one computer readable memory and/or at least one database of at least one central server. When at least one representative preference is updated, modified, added, removed, and/or refreshed, at least one new set of at least one filtered conveyance service request can be generated. At least one filtered conveyance service request can relate to at least one conveyance industry segment. At least one filtered conveyance service request can relate to at least one service provider, at least one good supplier, at least one fleet manager, at least one owner or at least one controller of at least one autonomous vehicle, at least one logistics provider, at least one logistics supplier, at least one map provider, at least one third party, at least one representative, at least one conveyance client, or a combination thereof.

All or some of at least one filtered conveyance service request can have or be associated with corresponding conveyance data. All or some of at least one filtered conveyance service request can have or be associated with intrinsic conveyance data that can be stored in at least one database. All or some of at least one filtered conveyance service request can be associated with or inherently have associated conveyance data that can be used to identify at least one preferred conveyance service request to be secured or obtained.

At least one filtered conveyance service request can be updated or refreshed in real time or near real time and can refer to being updated or refreshed in the highest level of development or state of the art. At least one filtered conveyance service request can be pre-filtered or pre-categorized on at least one central server, at least one external server, at least one application, or a combination thereof. At least one filtered conveyance service request can be filtered more than once. At least one filtered conveyance service request can be at least one conveyance service request that matches or satisfies at least one representative preference. At least one filtered conveyance service request can become at least one preferred conveyance service request based on at least one representative preference inputted or provided by at least one representative, at least one service provider, at least one good supplier, at least one fleet manager, at least one logistics provider, at least one logistics supplier, at least one map provider, at least one third party, or the like.

As a non-limiting example, at least one filtered conveyance service request can be displayed on at least one application. As a non-limiting example, at least one filtered conveyance service request can be displayed on at least one geographical map of at least one visual representation. As a non-limiting example, at least one filtered conveyance service request can relate to at least one individual conveyance industry segment. As a non-limiting example, at least one filtered conveyance service request can relate to at least one individual service provider, at least one individual map provider, at least one individual third party, at least one individual good supplier, at least one individual fleet manager, or the like. As a non-limiting example, if at least one representative secures or obtains at least one filtered conveyance service request, that same at least one secured or obtained filtered conveyance service request can be referred to or identified as at least one preferred conveyance service request. As a non-limiting example, at least one filtered conveyance service request can be at least one pre-filtered conveyance service request. As a non-limiting example, at least one filtered conveyance service request can be perceived or referred to as at least one conveyance service request. As a non-limiting example, a plurality of filtered conveyance service requests can be a single filtered conveyance service request. As a non-limiting example, at least one filtered conveyance service request can be related to at least one scooter, at least one scooter service, at least one bicycle, at least one bicycle service, or the like.

Preferred Conveyance Service Request

At least one preferred conveyance service request can be for example at least one request for transporting including but not limited to at least one person, at least one good, at least one thing, at least one article, or a combination thereof, from at least one geographical location to at least one other geographical location that can be identified from at least one filtered conveyance service request. At least one preferred conveyance service request can be for example at least one request that including but not limited to at least one central server, at least one representative, at least one application, at least one good supplier, at least one fleet manager, at least one logistics provider, at least one logistics supplier, at least one map provider, at least one third party, or a combination thereof, identifies as preferred. When at least one preferred conveyance service request is considered, at least one preferred conveyance service request in conjunction with corresponding conveyance data can also be considered.

At least one preferred conveyance service request can be stored or cached in at least one computer readable memory and/or at least one database of at least one central server. At least one preferred conveyance service request can for example be originally sourced or provided by at least one external server, at least one service provider, at least one good supplier, at least one fleet manager, at least one map provider, at least one third party, or the like. At least one preferred conveyance service request can be at least one conveyance service request or at least one filtered conveyance service request that matches or satisfies at least one representative preference. At least one filtered conveyance service request can be identified as preferred by at least one representative, at least one application, at least one owner or at least one controller of at least one autonomous vehicle, at least one autonomous vehicle, at least one service provider, at least one good supplier, at least one fleet manager, at least one logistics provider, at least one logistics supplier, at least one map provider, at least one third party, or a combination thereof, and then at least one filtered conveyance service request can become at least one preferred conveyance service request.

At least one preferred conveyance service request can be updated or changed in real time or near real time as at least one real time or near real time geographical location of at least one representative changes or updates. At least one preferred conveyance service request can relate to at least one conveyance industry segment. At least one preferred conveyance service request can relate to at least one service provider, at least one good supplier, at least one fleet manager, at least one logistics provider, at least one logistics supplier, at least one map provider, at least one third party, or a combination thereof. At least one preferred conveyance service request can be updated or refreshed in real time or near real time and can refer to being updated or refreshed in the highest level of development or state of the art. At least one preferred conveyance service request can be identified as preferred with at least one highest weighted average of at least one representative preference. When at least one representative preference is updated, modified, added, removed, and/or refreshed, at least one new set of at least one preferred conveyance service request can be generated or identified.

At least one conveyance service request can be filtered in real time or near real time by using at least one representative preference to create at least one set of at least one filtered conveyance service request. At least one filtered conveyance service request can preferably be sorted in real time or near real time relating to at least one weighted average of at least one representative preference to identify at least one preferred conveyance service request.

As a non-limiting example, at least one preferred conveyance service request can be updated in real time or near real time as traffic information changes or updates. As a non-limiting example, at least one different geographical location can be used other than at least one real time or near real time geographical location of at least one representative or the like, when filtering at least one conveyance service request, to identify at least one preferred conveyance service request. As a non-limiting example, at least one application can secure or obtain at least one preferred conveyance service request. As a non-limiting example, at least one preferred conveyance service request can relate to at least one individual service provider, at least one individual map provider, at least one individual third party, at least one individual good supplier, at least one individual fleet manager, or the like.

As a non-limiting example, at least one preferred conveyance service request can be visually identifiable from at least one filtered conveyance service request displayed on at least one visual representation. As a non-limiting example, at least one preferred conveyance service request can be displayed on at least one geographical map of at least one visual representation. As a non-limiting example, at least one preferred conveyance service request can be displayed on at least one application. As a non-limiting example, at least one preferred conveyance service request can relate to at least one individual conveyance industry segment. As a non-limiting example, at least one central server, at least one application, at least one representative, or a combination thereof, can secure or obtain at least one preferred conveyance service request for or with at least one representative.

As a non-limiting example, at least one preferred conveyance service request can be pre-filtered or pre-categorized on at least one central server, at least one external server, at least one application, or a combination thereof.

As a non-limiting example, at least one preferred conveyance service request can be identified from at least one filtered conveyance service request that has at least one highest weighted average of at least one representative preference. As a non-limiting example, at least one representative preference can have at least one equal weight or at least one unequal weight when using at least one weighted average to identify at least one preferred conveyance service request. As a non-limiting example, at least one preferred conveyance service request can be perceived or referred to as at least one conveyance service request or at least one filtered conveyance service request. As a non-limiting example, more than one preferred conveyance service request can be secured or obtained concurrently. As a non-limiting example, at least one preferred conveyance service request can be related to at least one scooter, at least one scooter service, at least one bicycle, at least one bicycle service, or the like.

Conveyance Service Offering

At least one conveyance service offering can be for example at least one offering from at least one representative, at least one autonomous vehicle, at least one service provider or the like for the transportation of including but not limited to at least one person, at least one good, at least one article, at least one thing, or a combination thereof, from at least one geographical location to at least one other geographical location. Once, for example, at least one beginning service geographical location, at least one ending service geographical location, pricing information, or a combination thereof, is known, at least one conveyance service offering relating to at least one representative or at least one autonomous vehicle can be generated. When at least one conveyance service offering is considered, at least one conveyance service offering in conjunction with corresponding conveyance data can also be considered.

At least one conveyance service offering in conjunction with corresponding conveyance data can be sourced or provided from, including but not limited to, at least one external server, at least one service provider, at least one good supplier, at least one fleet manager, at least one map provider, at least one third party, or the like. At least one conveyance service offering can be stored or cached in at least one computer readable memory and/or at least one database of at least one central server. At least one conveyance service offering can relate to at least one conveyance industry segment. At least one conveyance service offering can relate to at least one service provider, at least one good supplier, at least one fleet manager, at least one owner or at least one controller of at least one autonomous vehicle, at least one logistics provider, at least one logistics supplier, at least one map provider, at least one third party, at least one representative, at least one conveyance client, or a combination thereof.

All or some of at least one conveyance service offering can have or be associated with corresponding conveyance data. All or some of at least one conveyance service offering can have or be associated with intrinsic conveyance data that can be stored in at least one database. All or some of at least one conveyance service offering can be associated with or inherently have associated conveyance data that can be used to filter and identify at least one preferred conveyance service offering to be secured or obtained.

At least one conveyance service offering can be updated or refreshed in real time or near real time and can refer to being updated or refreshed in the highest level of development or state of the art. At least one conveyance service offering can be pre-filtered or pre-categorized on at least one central server, at least one external server, at least one application, or a combination thereof. At least one conveyance service offering can be at least one filtered conveyance service offering, at least one preferred conveyance service offering, or a combination thereof, relating to at least one conveyance client preference. At least one conveyance service offering can become at least one filtered conveyance service offering, at least one preferred conveyance service offering, or a combination thereof, based on at least one conveyance client preference inputted or provided by at least one conveyance client. At least one conveyance service offering can be filtered once or more than once.

As a non-limiting example, at least one conveyance service offering can be at least one ride-hail service offering, at least one ride-share service offering, at least one car-share service offering, at least one peer-to-peer conveyance service offering, at least one transportation service offering, at least one scooter service offering, at least one bicycle offering, at least one person delivery service offering, at least one taxi service offering, at least one shuttle service offering, at least one good delivery service offering, at least one item delivery service offering, at least one medical service and delivery offering, at least one food delivery service offering, at least one courier delivery service offering, at least one freight delivery service offering, at least one animal delivery service offering, at least one delivery service offering, or a combination thereof.

As a non-limiting example, at least one conveyance service offering can be perceived or referred to as at least one filtered conveyance service offering or at least one preferred conveyance service offering. As a non-limiting example, at least one conveyance service offering can be identified or referred to as at least one filtered conveyance service offering or at least one preferred conveyance service offering for or with at least one conveyance client. As a non-limiting example, at least one conveyance service offering can include at least one waypoint. As a non-limiting example, at least one conveyance service offering can include at least one waypoint where at least one conveyance client can walk to at least one designated area to be picked up for at least one conveyance service. As a non-limiting example, if at least one conveyance service offering is secured or obtained, that same at least one secured or obtained conveyance service offering can be referred to or identified as at least one preferred conveyance service offering.

As a non-limiting example, at least one conveyance service offering can be pre-scheduled. As a non-limiting example, at least one thing to be conveyed can include but is not limited to at least one personal item such as at least one clothing item or at least one purse. As a non-limiting example, at least one conveyance service offering can include special offering information. As a non-limiting example, at least one conveyance service offering can relate to at least one individual conveyance industry segment. As a non-limiting example, at least one conveyance service offering can relate to at least one individual service provider, at least one individual map provider, at least one individual third party, at least one individual good supplier, at least one individual fleet manager, or the like. As a non-limiting example, at least one conveyance service offering can be at least one pre-filtered conveyance service offering. As a non-limiting example, a plurality of conveyance service offerings can be a single conveyance service offering. As a non-limiting example, at least one conveyance service offering can be pre-filtered or pre-categorized on at least one central server based on at least one geographical location.

Filtered Conveyance Service Offering

At least one filtered conveyance service offering can be for example at least one conveyance service offering that can be filtered with including but not limited to at least one conveyance client preference, at least one real time or near real time geographical location of at least one conveyance client, or a combination thereof. When at least one filtered conveyance service offering is considered, at least one filtered conveyance service offering in conjunction with corresponding conveyance data can also be considered.

At least one filtered conveyance service offering can be stored or cached in at least one computer readable memory and/or at least one database of at least one central server. When at least one conveyance client preference is updated, modified, added, removed, and/or refreshed, at least one new set of at least one filtered conveyance service offering can be generated. At least one filtered conveyance service offering can relate to at least one conveyance industry segment. At least one filtered conveyance service offering can relate to at least one service provider, at least one good supplier, at least one fleet manager, at least one owner or at least one controller of at least one autonomous vehicle, at least one logistics provider, at least one logistics supplier, at least one map provider, at least one third party, at least one representative, at least one conveyance client, or a combination thereof.

All or some of at least one filtered conveyance service offering can have or be associated with corresponding conveyance data. All or some of at least one filtered conveyance service offering can have or be associated with intrinsic conveyance data that can be stored in at least one database. All or some of at least one filtered conveyance service offering can be associated with or inherently have associated conveyance data that can be used to identify at least one preferred conveyance service offering to be secured or obtained.

At least one filtered conveyance service offering can be updated or refreshed in real time or near real time and can refer to being updated or refreshed in the highest level of development or state of the art. At least one filtered conveyance service offering can be pre-filtered or pre-categorized on at least one central server, at least one external server, at least one application, or a combination thereof. At least one filtered conveyance service offering can be filtered more than once. At least one filtered conveyance service offering can be at least one conveyance service offering that matches or satisfies at least one conveyance client preference. At least one filtered conveyance service offering can become at least one preferred conveyance service offering based on at least one conveyance client preference inputted or provided by at least one conveyance client or the like.

As a non-limiting example, at least one filtered conveyance service offering can be displayed on at least one application. As a non-limiting example, at least one filtered conveyance service offering can be displayed on at least one geographical map of at least one visual representation. As a non-limiting example, at least one filtered conveyance service offering can relate to at least one individual conveyance industry segment. As a non-limiting example, at least one filtered conveyance service offering can relate to at least one individual service provider, at least one individual map provider, at least one individual third party, at least one individual good supplier, at least one individual fleet manager, or the like. As a non-limiting example, if at least one conveyance client secures or obtains at least one filtered conveyance service offering, that same at least one secured or obtained filtered conveyance service offering can be referred to or identified as at least one preferred conveyance service offering. As a non-limiting example, at least one filtered conveyance service offering can be at least one pre-filtered conveyance service offering. As a non-limiting example, at least one filtered conveyance service offering can be perceived or referred to as at least one conveyance service offering. As a non-limiting example, a plurality of filtered conveyance service offerings can be a single filtered conveyance service offering. As a non-limiting example, at least one filtered conveyance service offering can be related to at least one scooter, at least one scooter service, at least one bicycle, at least one bicycle service, or the like.

Preferred Conveyance Service Offering

At least one preferred conveyance service offering can be for example at least one offering for transporting including but not limited to at least one person, at least one good, at least one thing, at least one article, or a combination thereof, from at least one geographical location to at least one other geographical location that can be identified from at least one filtered conveyance service offering. At least one preferred conveyance service offering can be for example at least one offering that including but not limited to at least one conveyance client, at least one central server, at least one application, at least one good supplier, at least one fleet manager, at least one logistics provider, at least one logistics supplier, at least one map provider, at least one third party, or a combination thereof, identifies as preferred. When at least one preferred conveyance service offering is considered, at least one preferred conveyance service offering in conjunction with corresponding conveyance data can also be considered.

At least one preferred conveyance service offering can be stored or cached in at least one computer readable memory and/or at least one database of at least one central server. At least one preferred conveyance service offering can for example be originally sourced or provided by at least one external server, at least one service provider, at least one good supplier, at least one fleet manager, at least one map provider, at least one third party, or the like. At least one preferred conveyance service offering can be at least one conveyance service offering or at least one filtered conveyance service offering that can match or satisfy at least one conveyance client preference. At least one filtered conveyance service offering can be identified as preferred by at least one conveyance client, at least one service provider, at least one good supplier, at least one fleet manager, at least one logistics provider, at least one logistics supplier, at least one map provider, at least one third party, or a combination thereof, and then preferably at least one filtered conveyance service offering can become at least one preferred conveyance service offering.

At least one preferred conveyance service offering can be updated or changed in real time or near real time as at least one real time or near real time geographical location of at least one conveyance client changes or updates. At least one preferred conveyance service offering can relate to at least one conveyance industry segment. At least one preferred conveyance service offering can relate to at least one service provider, at least one good supplier, at least one fleet manager, at least one logistics provider, at least one logistics supplier, at least one map provider, at least one third party, or a combination thereof. At least one preferred conveyance service offering can be updated or refreshed in real time or near real time and can refer to being updated or refreshed in the highest level of development or state of the art. At least one preferred conveyance service offering can be identified as preferred with at least one highest weighted average of at least one conveyance client preference. When at least one conveyance client preference is updated, modified, added, removed, and/or refreshed, at least one new set of at least one preferred conveyance service offering can be generated or identified.

At least one conveyance service offering can be filtered in real time or near real time by using to at least one conveyance client preference to create at least one set of at least one filtered conveyance service offering. At least one filtered conveyance service offering can preferably be sorted in real time or near real time relating to at least one weighted average of at least one conveyance client preference to identify at least one preferred conveyance service offering.

As a non-limiting example, at least one preferred conveyance service offering can be updated in real time or near real time as traffic information changes or updates. As a non-limiting example, at least one different geographical location can be used other than at least one real time or near real time geographical location of at least one conveyance client or the like, when filtering at least one conveyance service offering, to identify at least one preferred conveyance service offering. As a non-limiting example, at least one application can secure or obtain at least one preferred conveyance service offering. As a non-limiting example, at least one preferred conveyance service offering can be visually identifiable from at least one filtered conveyance service offering displayed on at least one visual representation. As a non-limiting example, at least one preferred conveyance service offering can relate to at least one individual conveyance industry segment. As a non-limiting example, at least one preferred conveyance service offering can relate to at least one individual service provider, at least one individual map provider, at least one individual third party, at least one individual good supplier, at least one individual fleet manager, or the like.

As a non-limiting example, at least one preferred conveyance service offering can be identified from at least one filtered conveyance service offering that has at least one highest weighted average of at least one conveyance client preference. As a non-limiting example, at least one conveyance client preference can have at least one equal weight or at least one unequal weight when using at least one weighted average to identify at least one preferred conveyance service offering. As a non-limiting example, at least one preferred conveyance service offering can be perceived or referred to as at least one conveyance service offering or at least one filtered conveyance service offering. As a non-limiting example, more than one representative or more than one autonomous vehicle can be secured or obtained for at least one individual preferred conveyance service offering.

As a non-limiting example, at least one preferred conveyance service offering can be displayed on at least one geographical map of at least one visual representation. As a non-limiting example, at least one preferred conveyance service offering can be displayed on at least one application. As a non-limiting example, at least one central server, at least one application, at least one conveyance client, or a combination thereof, can secure or obtain at least one preferred conveyance service offering for or with at least one conveyance client. As a non-limiting example, at least one preferred conveyance service offering can be pre-filtered or pre-categorized on at least one central server, at least one external server, at least one application, or a combination thereof.

As a non-limiting example, at least one level of service preference can be used by at least one conveyance client to identify at least one at least one luxury vehicle, at least one environmentally friendly vehicle, at least one driverless vehicle, or the like. As a non-limiting example, at least one level of service preference can be utilized to identify at least one newer vehicle over at least one older vehicle. As a non-limiting example, at least one preferred conveyance service offering can be related to at least one scooter, at least one scooter service, at least one bicycle, at least one bicycle service, or the like.

Representative Preference

At least one representative preference can be at least one rule or at least one parameter that can for example be used to facilitate at least one operation or at least one function to secure or obtain at least one preferred conveyance service request. At least one representative preference can be at least one rule or at least one parameter that can for example be utilized or operated by at least one representative, at least one service provider, at least one good supplier, at least one fleet manager, at least one logistics provider, at least one logistics supplier, at least one map provider, at least one third party, or a combination thereof. At least one representative preference can be any rule or parameter that can be used or utilized during at least one process of filtering and/or identifying at least one preferred conveyance service request.

At least one representative preference can be at least one rule or at least one parameter that can optimize all or some of conveyance data, at least one conveyance service request, or a combination thereof. At least one representative preference can relate directly or indirectly to at least one preferred conveyance service request. At least one representative preference can be associated with or have at least one feature or at least one various feature that can be used to match at least one representative for or with at least one preferred conveyance service request, at least one conveyance client, or a combination thereof. At least one representative preference can be at least one rule implemented in at least one rules based system, at least one rules based method, or a combination thereof.

At least one representative preference can for example be used by at least one representative, at least one good supplier, at least one fleet manager, at least one logistics provider, at least one logistics supplier, at least one map provider, at least one third party, or a combination thereof, to identify and preferably secure or obtain at least one preferred conveyance service request for or with at least one representative. At least one representative preference or at least one set of at least one representative preference can be used to filter, identify as preferred, secure or obtain, or a combination thereof, at least one preferred conveyance service request.

At least one representative preference can be refined or customized by at least one representative, at least one service provider, at least one good supplier, at least one fleet manager, at least one logistics provider, at least one logistics supplier, at least one map provider, at least one third party, or a combination thereof At least one representative preference can be fixed or built-in on at least one central server, at least one external server, at least one application, or a combination thereof. At least one representative preference can be made not-editable. At least one representative preference can be at least one digit or at least one number.

At least one representative preference can be at least one tool, for example, at least one rule or at least one parameter to filter, identify, secure or obtain, or a combination thereof, at least one preferred conveyance service request, at least one filtered conveyance service request, at least one conveyance service request, or a combination thereof.

At least one representative preference can be used to match or satisfy at least one preferred conveyance service request, at least one filtered conveyance service request, at least one conveyance service request, or a combination thereof, with or for at least one representative. At least one representative preference can be used to match or satisfy at least one representative for or with at least one preferred conveyance service request, at least one filtered conveyance, service request, at least one conveyance service request, or a combination thereof. At least one representative preference can for example be utilized by at least one representative, at least one service provider, at least one good supplier, at least one owner or at least one controller of at least one autonomous vehicle, at least one fleet manager, at least one logistics provider, at least one logistics supplier, at least one map provider, at least one third party, or a combination thereof, to identify and preferably secure or obtain at least one preferred conveyance service request.

At least one representative preference can include but is not limited to at least one option for example selected or provided by at least one representative, at least one good supplier, at least one fleet manager, at least one logistics provider, at least one logistics supplier, at least one map provider, at least one third party, or a combination thereof, to filter and/or preferably sort at least one conveyance service request in real time or near real time in order to identify at least one preferred conveyance service request. At least one representative preference can, for example, be used to filter and identify at least one preferred conveyance service request and then filter and identify at least one representative that can be identified as preferred, all or some of conveyance data relating to at least one representative, or a combination thereof, and preferably be secured or obtained together. At least one representative preference can have or be associated with at least one set of preferences or at least one set of parameters that can be used to filter and identify at least one preferred conveyance service request, at least one filtered conveyance service request, at least one conveyance service request, or a combination thereof.

At least one representative preference can be used to filter at least one conveyance service request in any order prior to securing or obtaining at least one match between at least one preferred conveyance service request and at least one representative. At least one representative preference can be used to identify at least one preferred conveyance service request in any order prior to securing or obtaining at least one match between at least one preferred conveyance service request and at least one representative.

At least one representative preference can be pre-set on including but not limited to at least one central server, at least one external server, at least one application, at least one terminal or a combination thereof. At least one representative preference can be either inclusive or exclusive for filtering or the like at least one conveyance service request. At least one individual representative preference can have at least one equal weight or at least one unequal weight when calculating at least one weighted average to identify at least one preferred conveyance service request. At least one filtered conveyance service request can preferably be sorted in real time or near real time in at least one order relating to at least one weighted average of at least one representative preference to identify at least one preferred conveyance service request.

At least one representative, at least one good supplier, at least one fleet manager, at least one logistics provider, at least one logistics supplier, at least one map provider, at least one third party, or a combination thereof, can optionally choose at least one weight for at least one representative preference to have at least one equal weight or at least one unequal weight. At least one representative, at least one good supplier, at least one fleet manager, at least one logistics provider, at least one logistics supplier, at least one map provider, at least one third party, or a combination thereof, can optionally choose at least one weight for at least one representative preference to filter, identify, secure or obtain, or a combination thereof, at least one preferred conveyance service request.

At least one representative preference can be used to filter at least one conveyance service request into at least one filtered conveyance service request. At least one representative preference can be used to identify at least one preferred conveyance service request from at least one filtered conveyance service request. At least one representative preference can be used to filter all or some of conveyance data relating to at least one representative.

At least one representative preference can be stored or cached on including but not limited to at least one central server, at least one application, at least one external server, at least one terminal, or a combination thereof. At least one representative preference can be stored or cached on or transmitted to including but not limited to at least one central server, at least one external server, at least one terminal, at least one application, or a combination thereof. At least one representative preference can be stored on or retrieved from at least one server that can be remote from at least one central server, at least one external server, at least one application, or a combination. At least one representative preference can be stored or cached in at least one database. At least one representative preference can be used in at least one database to filter and identify at least one preferred conveyance service request, at least one filtered conveyance service request, at least one conveyance service request, or a combination thereof.

At least one representative, at least one owner or at least one controller of at least one autonomous vehicle, at least one service provider, at least one good supplier, at least one fleet manager, at least one logistics provider, at least one logistics supplier, at least one map provider, at least one third party, or a combination thereof, can use at least one representative preference to filter and identify at least one preferred conveyance service request, at least one filtered conveyance service request, at least one conveyance service request, or a combination thereof.

At least one representative can input or provide at least one representative preference into at least one application, at least one central server, at least one external server, or a combination thereof, that can be used to identify and preferably secure or obtain at least one preferred conveyance service request. At least one representative, at least one owner or at least one controller of at least one autonomous vehicle, at least one service provider, at least one good supplier, at least one fleet manager, at least one logistics provider, at least one logistics supplier, at least one map provider, at least one third party, or a combination thereof, can input or provide at least one representative preference into at least one application, at least one central server, or at least one external server that can be used to identify and preferably secure or obtain at least one preferred conveyance service request for or with at least one representative.

At least one representative, at least one owner or at least one controller of at least one autonomous vehicle, at least one service provider, at least one good supplier, at least one fleet manager, at least one logistics provider, at least one logistics supplier, at least one map provider, at least one third party, or a combination thereof, can use at least one representative preference to manage, control, or operate at least one at least one autonomous vehicle, at least one representative, or a combination thereof.

At least one representative preference can be updated or refreshed in real time or near real time and can refer to being updated or refreshed in the highest level of development or state of the art. At least one representative preference can be used to perform at least one function in real time or near real time being updated or refreshed in the highest level of development or state of the art. At least one representative preference can be updated or changed and at least one new or different set of including but not limited to at least one filtered conveyance service request, at least one preferred conveyance service request, or a combination thereof, can be identified.

At least one central server, at least one application, at least one external server, or a combination thereof, can for example, filter out, hide, or remove at least one conveyance service request that does not meet or match at least one representative preference criteria for at least one representative. At least one representative preference can be used in conjunction with at least one real time or near real time geographical location of at least one representative or at least one different geographical location to filter at least one conveyance service request into at least one filtered conveyance service request.

At least one representative preference can be used to identify at least one preferred conveyance service request from at least one filtered conveyance service request or at least one pre-filtered conveyance service request. At least one representative preference can be used by at least one representative, at least one service provider, at least one good supplier, at least one owner or at least one controller of at least one autonomous vehicle, at least one fleet manager, at least one logistics provider, at least one logistics supplier, at least one map provider, at least one third party, or a combination thereof, operating in at least one conveyance industry segment.

At least one representative preference can be at least one rule or at least one parameter that can utilize at least one route planning information. At least one representative preference can be learned over time relating to at least one conveyance service request, all or some of conveyance data, at least one conveyance client, at least one representative, at least one autonomous vehicle, at least one owner or at least one controller of at least one autonomous vehicle, at least one service provider, at least one good supplier, at least one fleet manager, at least one logistics provider, at least one logistics supplier, at least one map provider, at least one third party, or a combination thereof. At least one representative preference can be at least one predictive preference that can utilize machine learning technology and/or quantum computing or the like.

At least one level of service preference can be used to identify, for example, at least one vehicle type, at least one service type, at least one vehicle detail, at least one autonomous vehicle detail, or the like. At least one representative preference can have or relate to at least one cultural trait of at least one regional area or at least one country. At least one representative preference can be at least one capacity preference that can be utilized to manage or monitor at least one capacity level relating to at least one vehicle, at least one autonomous vehicle, at least one representative, at least one owner or at least one controller of at least one autonomous vehicle, at least one service provider, at least one good supplier, at least one fleet manager, at least one logistics provider, at least one logistics supplier, at least one map provider, at least one third party, or a combination thereof.

As a non-limiting example, at least one representative preference can be but is not limited to at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one sensor preference, at least one event inclusion preference, at least one event exclusion preference, at least one traffic based preference, at least one road condition preference, at least one weather condition preference, at least one transportation preference, at least one route planning preference, at least one fuel economy preference, at least one battery longevity preference, at least one vehicle capacity preference, at least one vehicle diagnostic preference, at least one conveyance data preference, at least one duration of conveyance service preference, at least one level of service preference, at least one conveyance service request density preference, at least one conveyance client density preference, at least one conveyance client detail preference, at least one conveyance client rating preference, at least one representative density preference, at least one service provider inclusion preference, at least one service provider exclusion preference, at least one service provider density preference, at least one level of service preference, at least one good supplier inclusion preference, at least one good supplier exclusion preference, at least one good supplier density preference, at least one owner or at least one controller of at least one autonomous vehicle preference, at least one owner or at least one controller of at least one autonomous vehicle density preference, at least one fleet manager preference, at least one fleet manager density preference, at least one logistics provider preference, at least one logistics provider density preference, at least one logistics supplier preference, at least one logistics supplier density preference, at least one good detail preference, at least one conveyance industry segment preference, at least one freight preference, at least one waypoint preference, at least one delivery service preference, at least one oldest outstanding request preference, at least one oldest outstanding offering preference, or a combination thereof.

As a non-limiting example, at least one representative preference can be but is not limited to at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one sensor preference, at least one event preference, at least one traffic based preference, at least one road condition preference, at least one weather condition preference, at least one transportation preference, at least one route planning preference, at least one fuel economy preference, at least one battery longevity preference, at least one vehicle capacity preference, at least one vehicle diagnostic preference, at least one conveyance data preference, at least one duration of conveyance service preference, at least one conveyance service request density preference, at least one conveyance client density preference, at least one conveyance client detail preference, at least one conveyance client rating preference, at least one representative density preference, at least one autonomous vehicle density preference, at least one service provider preference, at least one service provider density preference, at least one level of service preference, at least one good supplier preference, at least one good supplier density preference, at least one owner or at least one controller of at least one autonomous vehicle preference, at least one owner or at least one controller of at least one autonomous vehicle density preference, at least one fleet manager preference, at least one fleet manager density preference, at least one logistics provider preference, at least one logistics provider density preference, at least one logistics supplier preference, at least one logistics supplier density preference, at least one good detail preference, at least one conveyance industry segment preference, at least one freight preference, at least one waypoint preference, at least one delivery service preference, at least one oldest outstanding request preference, or a combination thereof.

As a non-limiting example, if at least one efficiency preference is selected, at least one representative can accept at least one additional food delivery service request for the same restaurant to perform at least one additional conveyance service and earn more money. As a non-limiting example, if at least one price preference is selected, then preferably at least one conveyance service request priced higher than at least one set minimum price can be identified as at least one preferred conveyance service request. As a non-limiting example, if a distance preference is selected, then preferably at least one conveyance service request within a selected distance can be identified as at least one preferred conveyance service request. As a non-limiting example, at least one good detail preference can include at least one item being fragile. As a non-limiting example, if at least one good detail preference is selected, then preferably at least one conveyance service request for conveying at least one certain type and/or quantity of at least one good that at least one representative is capable of delivering can be identified as at least one preferred conveyance service request, such as the capability to deliver at least one refrigerator or at least one mirror. As a non-limiting example, if at least one freight preference is selected, then preferably at least one conveyance service request for conveying freight that at least one representative is capable of delivering can be identified as at least one preferred conveyance service request, such as at least one conveyance service request to deliver at least one biohazardous material or at least one flammable material.

As a non-limiting example, at least one representative preference can be transmitted between or from at least one application to at least one external server by way of at least one link between at least one application and at least one external server.

As a non-limiting example at least one representative preference can be associated with at least one database, at least one database query, at least one database table, at least one database result set, or the like. As a non-limiting example at least one database query can include or be associated with at least one representative preference. As a non-limiting example at least one representative preference can be related to or associated with another at least one representative preference. As a non-limiting example at least one representative preference can be used to retrieve data from database. As a non-limiting example at least one representative preference can be at least one internal part of at least one central server. As a non-limiting example, at least one representative preference can be in at least one form or at least one format relating to at least one SQL parameter, at least one variable, or the like. As a non-limiting example multiple representative preferences can be used multiple times during at least one process of filtering and/or identifying at least one preferred conveyance service request for or with at least one representative. As a non-limiting example, at least one representative preference can be used with or within at least one conditional statement, at least one conditional expression, at least one conditional construct, or the like. As a non-limiting example at least one representative preference can be used for altering at least one control flow based on at least one condition.

As a non-limiting example, at least one representative preference can have or be associated with at least one different set of preferences or at least one different set of parameters that can be used to filter and identify at least one preferred conveyance service request, at least one filtered conveyance service request, at least one conveyance service request, or a combination thereof. As a non-limiting example, some representative preferences can be more relevant than other representative preferences when at least one central server filters and/or identifies at least one preferred conveyance service request, at least one filtered conveyance service request, at least one conveyance service request, or a combination thereof. As a non-limiting example, at least one representative preference can be used for filtering at least one conveyance service request in at least one food delivery industry segment and at least one different representative preference can be used for filtering at least one conveyance service request in at least one ride-hail industry segment.

As a non-limiting example, anytime at least one conveyance service request is going through at least one process to become filtered or identified as preferred, all or some of conveyance data relating to at least one representative can go through at least one same or at least one similar process. As a non-limiting example, at least one representative preference can use at least one sensor data to analyze or evaluate and preferably secure or obtain at least one preferred conveyance service request with or for at least one representative. As a non-limiting example, at least one representative preference can use at least one sensor data to identify if at least one autonomous vehicle has enough battery to perform at least one conveyance service.

As a non-limiting example, at least one transportation preference can be at least one parameter or at least one rule that can identify at least one conveyance service preference. As a non-limiting example, at least one transportation preference can identify at least one conveyance service request that requires handicap assistance. As a non-limiting example, at least one transportation preference can identify at least one conveyance service request that requires at least one luxury vehicle. As a non-limiting example, at least one efficiency preference can be at least one parameter or at least one rule that can optimize vehicle utilization. As a non-limiting example, at least one representative preference can be stored or cached in at least one database table. As a non-limiting example, at least one representative preference can be stored or cached in at least one database that at least one central server, at least one external server, at least one application, or a combination thereof, can connect to or be associated with.

As a non-limiting example, at least one predictive preference can be identified or learned over time based on at least one pattern relating to at least one conveyance service request, all or some of conveyance data relating to at least one representative, at least one conveyance client, at least one representative, at least one autonomous vehicle, at least one owner or at least one controller of at least one autonomous vehicle, at least one service provider, at least one good supplier, at least one fleet manager, at least one logistics provider, at least one logistics supplier, at least one map provider, at least one third party, or a combination thereof.

As a non-limiting example, at least one time preference can relate to at least one time range, at least one pick-up time, at least one drop-off time, at least one pre-scheduled time, or the like, during at least one time of at least one day, at least one time of at least one week, at least one time of at least one month, at least one time of at least one year, or a combination thereof. As a non-limiting example, at least one conveyance client detail preference can be at least one route preference provided by at least one conveyance client, at least one application, at least one central server, at least one external server, at least one third party, at least one map provider, or a combination thereof. As a non-limiting example, at least one route planning preference can identify at least one route that can avoid toll roads. As a non-limiting example, at least one route planning preference can identify at least one optimal navigational route that can aid in identifying at least one preferred conveyance service request.

As a non-limiting example, at least one route preference can be utilized to identify at least one historical route, at least one specific route, at least one favored route, at least one area, at least one specific location, at least one pricing information, or the like. As a non-limiting example, at least one route preference can be learned over time to avoid traffic congestion on Highway Interstate 5 around 5 PM during the week. As a non-limiting example, at least one route preference can be to avoid at least one road, at least one street, at least one highway, at least one neighborhood, or the like, that at least one conveyance client or at least one recipient of at least one conveyance service prefers.

As a non-limiting example, at least one level of service preference can be displayed as at least one icon or at least one visual with or on said at least one visual representation to allow at least one selection of different levels of service that at least one representative, at least one autonomous vehicle, at least one service provider, at least one good supplier, or the like can provide or perform.

As a non-limiting example, at least one level of service preference can be displayed on or with at least one visual representation to identify different levels of service that at least one owner or at least one controller of at least one autonomous vehicle, at least one service provider, at least one good supplier, at least one fleet manager, at least one logistics provider, at least one logistics supplier, at least one map provider, at least one third party, at least one representative, at least one autonomous vehicle, at least one conveyance client, or the like, can provide or receive. As a non-limiting example, at least one level of service preference can be displayed as at least one icon with or on at least one visual representation to allow at least one selection of different levels of service that at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one map provider, at least one third party, or the like, can provide or receive.

As a non-limiting example, at least one level of service preference can be displayed on at least one dynamic map to identify different levels of service that at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one map provider, at least one third party, or the like, can provide or receive. As a non-limiting example, at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one map provider, at least one third party, or a combination thereof, can be displayed on or with at least one dynamic map that can display at least one level of service preference and can be represented by at least one mobile or transitory icon.

As a non-limiting example, at least one event inclusion preference can identify at least one destination rating with 4 out of 5 stars for or with at least one representative or the like. As a non-limiting example, at least one event inclusion preference can identify at least one event or at least one area that can be optimal for at least one representative, at least one service provider, or the like that can be currently well positioned in or near that event or area, but it may not be optimal for other representatives, service providers, or the like further away from that event or area.

As a non-limiting example, at least one representative preference can be at least one good supplier preference that can enable at least one good supplier to delay or postpone at least one current or at least one future conveyance service request. As a non-limiting example, at least one conveyance client preference or at least one preference of at least one recipient of at least one conveyance service, can be compared to or with at least one representative preference, to identify at least one match and preferably secure or obtain at least one preferred conveyance service request for or with at least one representative.

As a non-limiting example, at least one representative preference can have or relate to at least one cultural trait that can impact at least one match between at least one representative and at least one preferred conveyance service request. As a non-limiting example, at least one representative preference can have or relate to at least one cultural trait that can impact all or some of at least one conveyance service request in conjunction with corresponding conveyance data. As a non-limiting example, Americans prefer to have at least one representative preference with a shorter estimated time of arrival compared to Canadians.

As a non-limiting example, at least one capacity preference can identify a maximum number of passengers or goods in at least one vehicle or at least one autonomous vehicle. As a non-limiting example, at least one conveyance client can utilize at least one preference to specify if at least one conveyance client prefers at least one autonomous vehicle or at least one representative. As a non-limiting example, at least one representative preference can be at least carpool preference. As a non-limiting example, at least one representative preference can be used to identify at least one conveyance client or at least one group of at least one conveyance client that can be pooled together for at least one conveyance service to at least one ending service geographical location. As a non-limiting example, at least one representative preference can relate to safety for example, at least one vehicle being handicap friendly.

As a non-limiting example, at least one delivery service preference pan be to filter out deliveries that can add more than 10 minutes to total travel time. As a non-limiting example, at least one delivery service preference can specify at least one dimension for at least one good, at least one item, or the like. As a non-limiting example, at least one delivery service preference can be used to identify at least one representative or at least one vehicle with at least one specific feature relating to at least one good delivery, at least one item delivery, or the like. As a non-limiting example, at least one delivery service preference can be used to identify at least one pre-scheduled conveyance service request or at least one pre-scheduled conveyance client or the like.

As a non-limiting example, at least one vehicle diagnostic preference can be to take at least one vehicle off the road or to not secure or obtain another conveyance service request if at least one vehicle is due for maintenance. As a non-limiting example, at least one vehicle diagnostic preference can be to take at least one vehicle off the road or to not secure or obtain another conveyance service request if at least one criteria regarding at least one vehicle is met. As a non-limiting example, at least one vehicle diagnostic preference can be related to at least one sensor data on at least one vehicle or at least one autonomous vehicle.

As a non-limiting example, at least one central server or at least one application can use or apply a second representative preference and at least one process can optionally be referred to or seen as at least one additional level of filtering. As a non-limiting example, at least one central server or at least one application can filter conveyance service requests using a two step process to first filter conveyance service requests based on at least one representative preference and then filter at least one subset of conveyance service requests based on at least one different representative preference.

As a non-limiting example, at least one representative preference can be transmitted to or uploaded to at least one external server. As a non-limiting example, at least one representative preference can be utilized for pre-filtering conveyance service requests on or at at least one external server, at least one central server, at least one application, or a combination thereof.

As a non-limiting example, when at least one individual representative preference has at least one unequal weight, at least one pricing preference can have 70% weight and at least one distance preference can have 30% weight which can be used to identify at least one preferred conveyance service request when determining which at least one filtered conveyance service request has the highest weighted average.

As a non-limiting example, at least one representative preference can be used for at least one individual conveyance industry segment. As a non-limiting example, at least one representative preference can be used for at least one individual service provider, at least one map provider, or the like. As a non-limiting example, at least one representative can specify at least one representative preference to work in at least one given area by using at least one geographical location preference. As a non-limiting example, at least one representative can specify at least one representative preference to work in a six-mile perimeter by using at least one geographical location preference.

As a non-limiting example, at least one representative preference, once inputted or provided into at least one application, can be stored or cached on at least one application, at least one computer readable memory of at least one central server, or a combination thereof, and at least one representative preference is not inputted or provided again into at least one application by at least one representative. As a non-limiting example, at least one representative preference can be stored or cached in at least one computer readable memory of at least one central server and at least one representative preference is not transmitted again from at least one application to at least one central server. As a non-limiting example, at least one representative preference, at least one real time or near real time geographical location of at least one representative, or a combination thereof, can be transmitted from at least one application to at least one central server at any time prior to filtering or the like at least one conveyance service request.

As a non-limiting example, at least one representative preference can be the same or similar to at least one conveyance client preference. As a non-limiting example, at least one representative preference can be the same or have similar logic as at least one conveyance client preference.

Conveyance Client Preference

At least one conveyance client preference can be at least one rule or at least one parameter that can for example be used to facilitate at least one operation or at least one function to secure or obtain at least one preferred conveyance service offering. At least one conveyance client preference can be at least one rule or at least one parameter that can for example be utilized or operated by at least one conveyance client, at least one service provider, at least one good supplier, at least one fleet manager, at least one logistics provider, at least one logistics supplier, at least one map provider, at least one third party, or a combination thereof. At least one conveyance client preference can be any rule or parameter that can be used or utilized during at least one process of filtering and/or identifying at least one preferred conveyance service offering.

At least one conveyance client preference can be at least one rule or at least one parameter that can optimize all or some of conveyance data, at least one conveyance service offering, or a combination thereof. At least one conveyance client preference can relate directly or indirectly to at least one preferred conveyance service offering. At least one conveyance client preference can be associated with or have at least one feature or at least one various feature that can be used to match at least one conveyance client for or with at least one preferred conveyance service offering, at least one representative, at least one autonomous vehicle, or a combination thereof. At least one conveyance client preference can be at least one rule implemented in at least one rules based system, at least one rules based method, or a combination thereof.

At least one conveyance client preference can for example be used by at least one conveyance client, at least one good supplier, at least one fleet manager, at least one logistics provider, at least one logistics supplier, at least one map provider, at least one third party, or a combination thereof, to identify and preferably secure or obtain at least one preferred conveyance service offering for or with at least one conveyance client. At least one conveyance client preference or at least one set of at least one conveyance client preference can be used to filter, identify as preferred, secure or obtain, or a combination thereof, at least one preferred conveyance service offering.

At least one conveyance client preference can be refined or customized by at least one conveyance client, at least one service provider, at least one good supplier, at least one fleet manager, at least one logistics provider, at least one logistics supplier, at least one map provider, at least one third party, or a combination thereof. At least one conveyance client preference can be fixed or built-in on at least one central server, at least one external server, at least one application, or a combination thereof. At least one conveyance client preference can be made not-editable. At least one conveyance client preference can be at least one digit or at least one number.

At least one conveyance client preference can be at least one tool, for example, at least one rule or at least one parameter to filter, identify, secure or obtain, or a combination thereof, at least one preferred conveyance service offering, at least one filtered conveyance service offering, at least one conveyance service offering, or a combination thereof.

At least one conveyance client preference can be used to match or satisfy at least one preferred conveyance service offering, at least one filtered conveyance service offering, at least one conveyance service offering, or a combination thereof, with or for at least one conveyance client. At least one conveyance client preference can be used to match or satisfy at least one conveyance client for or with at least one preferred conveyance service offering, at least one filtered conveyance service offering, at least one conveyance service offering, or a combination thereof. At least one conveyance client preference can for example be utilized by at least one conveyance client, at least one service provider, at least one good supplier, at least one owner or at least one controller of at least one autonomous vehicle, at least one fleet manager, at least one logistics provider, at least one logistics supplier, at least one map provider, at least one third party, or a combination thereof, to identify and preferably secure or obtain at least one preferred conveyance service offering.

At least one conveyance client preference can include but is not limited to at least one option for example selected or provided by at least one conveyance client, at least one good supplier, at least one fleet manager, at least one logistics provider, at least one logistics supplier, at least one map provider, at least one third party, or a combination thereof, to filter and/or preferably sort at least one conveyance service offering in real time or near real time in order to identify at least one preferred conveyance service offering. At least one conveyance client preference can, for example, be used to filter and identify at least one preferred conveyance service offering and then filter and identify at least one conveyance client that can be identified as preferred, all or some of conveyance data relating to at least one conveyance client, or a combination thereof, and preferably be secured or obtained together. At least one conveyance client preference can have or be associated with at least one set of preferences or at least one set of parameters that can be used to filter and identify at least one preferred conveyance service offering, at least one filtered conveyance service offering, at least one conveyance service offering, or a combination thereof.

At least one conveyance client preference can be used to filter at least one conveyance service offering in any order prior to securing or obtaining at least one match between at least one preferred conveyance service offering and at least one conveyance client. At least one conveyance client preference can be used to identify at least one preferred conveyance service offering in any order prior to securing or obtaining at least one match between at least one preferred conveyance service offering and at least one conveyance client.

At least one conveyance client preference can be pre-set on including but not limited to at least one central server, at least one external server, at least one application, at least one terminal or a combination thereof. At least one conveyance client preference can be either inclusive or exclusive for filtering or the like at least one conveyance service offering. At least one individual conveyance client preference can have at least one equal weight or at least one unequal weight when calculating at least one weighted average to identify at least one preferred conveyance service offering. At least one filtered conveyance service offering can preferably be sorted in real time or near real time in at least one order relating to at least one weighted average of at least one conveyance client preference to identify at least one preferred conveyance service offering.

At least one conveyance client, at least one good supplier, at least one fleet manager, at least one logistics provider, at least one logistics supplier, at least one map provider, at least one third party, or a combination thereof, can optionally choose at least one weight for at least one conveyance client preference to have at least one equal weight or at least one unequal weight. At least one conveyance client, at least one good supplier, at least one fleet manager, at least one logistics provider, at least one logistics supplier, at least one map provider, at least one third party, or a combination thereof, can optionally choose at least one weight for at least one conveyance client preference to filter, identify, secure or obtain, or a combination thereof, at least one preferred conveyance service offering.

At least one conveyance client preference can be used to filter at least one conveyance service offering into at least one filtered conveyance service offering. At least one conveyance client preference can be used to identify at least one preferred conveyance service offering from at least one filtered conveyance service offering. At least one conveyance client preference can be used to filter all or some of conveyance data relating to at least one conveyance client.

At least one conveyance client preference can be stored or cached on including but not limited to at least one central server, at least one application, at least one external server, at least one terminal, or a combination thereof. At least one conveyance client preference can be stored or cached on or transmitted to including but not limited to at least one central server, at least one external server, at least one terminal, at least one application, or a combination thereof. At least one conveyance client preference can be stored on or retrieved from at least one server that can be remote from at least one central server, at least one external server, at least one application, or a combination. At least one conveyance client preference can be stored or cached in at least one database. At least one conveyance client preference can be used in at least one database to filter and identify at least one preferred conveyance service offering, at least one filtered conveyance service offering, at least one conveyance service offering, or a combination thereof.

At least one conveyance client, at least one service provider, at least one good supplier, at least one fleet manager, at least one owner or at least one controller of at least one autonomous vehicle, at least one logistics provider, at least one logistics supplier, at least one map provider, at least one third party, or a combination thereof, can use at least one conveyance client preference to filter and identify at least one preferred conveyance service offering, at least one filtered conveyance service offering, at least one conveyance service offering, or a combination thereof.

At least one conveyance client can input or provide at least one conveyance client preference into at least one application, at least one central server, at least one external server, or a combination thereof, that can be used to identify and preferably secure or obtain at least one preferred conveyance service offering. At least one conveyance client, at least one owner or at least one controller of at least one autonomous vehicle, at least one service provider, at least one good supplier, at least one fleet manager, at least one logistics provider, at least one logistics supplier, at least one map provider, at least one third party, or a combination thereof, can input or provide at least one conveyance client preference into at least one application, at least one central server, or at least one external server that can be used to identify and preferably secure or obtain at least one preferred conveyance service offering for or with at least one conveyance client.

At least one conveyance client preference can be updated or refreshed in real time or near real time and can refer to being updated or refreshed in the highest level of development or state of the art. At least one conveyance client preference can be used to perform at least one function in real time or near real time being updated or refreshed in the highest level of development or state of the art. At least one conveyance client preference can be updated or changed and at least one new or different set of including but not limited to at least one filtered conveyance service offering, at least one preferred conveyance service offering, or a combination thereof, can be identified.

At least one central server, at least one application, at least one external server, or a combination thereof, can for example, filter out, hide, or remove at least one conveyance service offering that does not meet or match at least one conveyance client preference criteria for at least one conveyance client. At least one conveyance client preference can be used in conjunction with at least one real time or near real time geographical location of at least one conveyance client or at least one different geographical location to filter at least one conveyance service offering into at least one filtered conveyance service offering.

At least one conveyance client preference can be used to identify at least one preferred conveyance service offering from at least one filtered conveyance service offering or at least one pre-filtered conveyance service offering. At least one conveyance client preference can be used by at least one conveyance client, at least one service provider, at least one good supplier, at least one owner or at least one controller of at least one autonomous vehicle, at least one fleet manager, at least one logistics provider, at least one logistics supplier, at least one map provider, at least one third party, or a combination thereof, operating in at least one conveyance industry segment.

At least one conveyance client preference can be at least one rule or at least one parameter that can utilize at least one route planning information. At least one conveyance client preference can be learned over time relating to at least one conveyance service offering, all or some of conveyance data, at least one conveyance client, at least one representative, at least one autonomous vehicle, at least one owner or at least one controller of at least one autonomous vehicle, at least one service provider, at least one good supplier, at least one fleet manager, at least one logistics provider, at least one logistics supplier, at least one map provider, at least one third party, or a combination thereof. At least one conveyance client preference can be at least one predictive preference that can utilize machine learning technology and/or quantum computing or the like.

At least one level of service preference can be used to identify, for example, at least one vehicle type, at least one service type, at least one vehicle detail, at least one autonomous vehicle detail, or the like. At least one conveyance client preference can have or relate to at least one cultural trait of at least one regional area or at least one country. At least one conveyance client preference can be at least one capacity preference that can be utilized to manage or monitor at least one capacity level relating to at least one vehicle, at least one autonomous vehicle, at least one conveyance client, at least one representative, at least one owner or at least one controller of at least one autonomous vehicle, at least one service provider, at least one good supplier, at least one fleet manager, at least one logistics provider, at least one logistics supplier, at least one map provider, at least one third party, or a combination thereof.

As a non-limiting example, at least one conveyance client preference can be including but is not limited to at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one event inclusion preference, at least one event exclusion preference, at least one traffic based preference, at least one road condition preference, at least one weather condition preference, at least one duration of conveyance service preference, at least one conveyance service offering density preference, at least one representative detail preference, at least one representative rating preference, at least one representative density preference, at least one conveyance client density preference, at least one service provider inclusion preference, at least one service provider exclusion preference, at least one service provider density preference, at least one level of service preference, at least one good supplier inclusion preference, at least one good supplier exclusion preference, at least one good supplier density preference, at least one good detail preference, at least one conveyance industry segment preference, at least one freight preference, at least one waypoint preference, at least one delivery service preference, or a combination thereof.

As a non-limiting example, at least one conveyance client preference can be including but is not limited to at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one sensor preference, at least one event preference, at least one traffic based preference, at least one road condition preference, at least one weather condition preference, at least one transportation preference, at least one route planning preference, at least one fuel economy preference, at least one battery longevity preference, at least one vehicle capacity preference, at least one vehicle diagnostic preference, at least one conveyance data preference, at least one duration of conveyance service preference, at least one conveyance service offering density preference, at least one conveyance client density preference, at least one conveyance client detail preference, at least one conveyance client rating preference, at least one representative density preference, at least one autonomous vehicle density preference, at least one service provider preference, at least one service provider density preference, at least one level of service preference, at least one good supplier preference, at least one good supplier density preference, at least one owner or at least one controller of at least one autonomous vehicle preference, at least one owner or at least one controller of at least one autonomous vehicle density preference, at least one fleet manager preference, at least one fleet manager density preference, at least one logistics provider preference, at least one logistics provider density preference, at least one logistics supplier preference, at least one logistics supplier density preference, at least one good detail preference, at least one conveyance industry segment preference, at least one freight preference, at least one waypoint preference, at least one delivery service preference, at least one oldest outstanding offering preference, or a combination thereof.

As a non-limiting example, if at least one price preference is selected as at least one conveyance client preference, then preferably at least one conveyance service offering without elevated pricing can be identified as at least one preferred conveyance service offering. As a non-limiting example, if at least one level of service preference is selected, then preferably at least one conveyance service offering with at least one higher quality of service such as "white glove services" or luxury services can be identified as at least one preferred conveyance service offering. As a non-limiting example, if at least one price preference is selected, then preferably at least one conveyance service offering priced lower than at least one set maximum price can be identified as at least one preferred conveyance service offering for at least one conveyance client.

As a non-limiting example, if at least one representative rating preference is selected, then preferably at least one conveyance service offering from at least one representative with a rating greater than or equal to a set minimum rating can be identified as at least one preferred conveyance service offering. As a non-limiting example when at least one individual conveyance client preference has at least one unequal weight, at least one pricing preference can have 90% weight and at least one service provider inclusion preference can have 10% weight which can be used to identify at least one preferred conveyance service offering when determining which at least one filtered conveyance service offering has at least one highest weighted average. As a non-limiting example, if at least one additional conveyance client preference were added to at least one first conveyance client preference, at least one weight of at least one conveyance client preference would sum to 100%.

As a non-limiting example, at least one conveyance client preference can be transmitted between or from at least one application to at least one external server by way of at least one link between at least one application and at least one external server.

As a non-limiting example at least one conveyance client preference can be associated with at least one database, at least one database query, at least one database table, at least one database result set, or the like. As a non-limiting example at least one database query can include or be associated with at least one conveyance client preference. As a non-limiting example at least one conveyance client preference can be related to or associated with another at least one conveyance client preference. As a non-limiting example at least one conveyance client preference can be used to retrieve data from database. As a non-limiting example at least one conveyance client preference can be at least one internal part of at least one central server. As a non-limiting example, at least one conveyance client preference can be in at least one form or at least one format relating to at least one SQL parameter, at least one variable, or the like. As a non-limiting example multiple conveyance client preferences can be used multiple times during at least one process of filtering and/or identifying at least one preferred conveyance service offering for or with at least one conveyance client. As a non-limiting example, at least one conveyance client preference can be used with or within at least one conditional statement, at least one conditional expression, at least one conditional construct, or the like. As a non-limiting example at least one conveyance client preference can be used for altering at least one control flow based on at least one condition.

As a non-limiting example, at least one conveyance client preference can have or be associated with at least one different set of preferences or at least one different set of parameters that can be used to filter and identify at least one preferred conveyance service offering, at least one filtered conveyance service offering, at least one conveyance service offering, or a combination thereof. As a non-limiting example, some conveyance client preferences can be more relevant than other conveyance client preferences when at least one central server filters and/or identifies at least one preferred conveyance service offering, at least one filtered conveyance service offering, at least one conveyance service offering, or a combination thereof As a non-limiting example, at least one conveyance client preference can be used for filtering at least one conveyance service offering in at least one food delivery industry segment and at least one different conveyance client preference can be used for filtering at least one conveyance service offering in at least one ride-hail industry segment.

As a non-limiting example, anytime at least one conveyance service offering is going through at least one process to become filtered or identified as preferred, all or some of conveyance data relating to at least one conveyance client can go through at least one same or at least one similar process. As a non-limiting example, at least one conveyance client preference can use at least one sensor data from at least one vehicle to analyze or evaluate and preferably secure or obtain at least one preferred conveyance service offering with or for at least one conveyance client. As a non-limiting example, at least one conveyance client preference can use at least one sensor data to identify if at least one autonomous vehicle has enough battery to perform at least one conveyance service.

As a non-limiting example, at least one transportation preference can be at least one parameter or at least one rule that can identify at least one conveyance service preference. As a non-limiting example, at least one transportation preference can identify at least one conveyance service offering that requires handicap assistance. As a non-limiting example, at least one transportation preference can identify at least one conveyance service offering that requires at least one luxury vehicle. As a non-limiting example, at least one efficiency preference can be at least one parameter or at least one rule that can optimize vehicle utilization. As a non-limiting example, at least one conveyance client preference can be stored or cached in at least one database table. As a non-limiting example, at least one conveyance client preference can be stored or cached in at least one database that at least one central server, at least one external server, at least one application, or a combination thereof, can connect to or be associated with.

As a non-limiting example, at least one predictive preference can be identified or learned over time based on at least one pattern relating to at least one conveyance service offering, all or some of conveyance data relating to at least one conveyance client, at least one conveyance client, at least one representative, at least one autonomous vehicle, at least one owner or at least one controller of at least one autonomous vehicle, at least one service provider, at least one good supplier, at least one fleet manager, at least one logistics provider, at least one logistics supplier, at least one map provider, at least one third party, or a combination thereof.

As a non-limiting example, at least one time preference can relate to at least one time range, at least one pick-up time, at least one drop-off time, at least one pre-scheduled time, or the like, during at least one time of at least one day, at least one time of at least one week, at least one time of at least one month, at least one time of at least one year, or a combination thereof. As a non-limiting example, at least one conveyance client detail preference can be at least one route preference provided by at least one conveyance client, at least one application, at least one central server, at least one external server, at least one third party, at least one map provider, or a combination thereof. As a non-limiting example, at least one route planning preference can identify at least one route that can avoid toll roads. As a non-limiting example, at least one route planning preference can identify at least one optimal navigational route that can aid in identifying at least one preferred conveyance service offering.

As a non-limiting example, at least one route preference can be utilized to identify at least one historical route, at least one specific route, at least one favored route, at least one area, at least one specific location, at least one pricing information, or the like. As a non-limiting example, at least one route preference can be learned over time to avoid traffic congestion on Highway Interstate 5 around 5 PM during the week. As a non-limiting example, at least one route preference can be to avoid at least one road, at least one street, at least one highway, at least one neighborhood, or the like, that at least one conveyance client or at least one recipient of at least one conveyance service prefers.

As a non-limiting example, at least one level of service preference can be displayed as at least one icon or at least one visual with or on said at least one visual representation to allow at least one selection of different levels of service that at least one representative, at least one autonomous vehicle, at least one service provider, at least one good supplier, or the like can provide or perform.

As a non-limiting example, at least one level of service preference can be displayed on or with at least one visual representation to identify different levels of service that at least one owner or at least one controller of at least one autonomous vehicle, at least one service provider, at least one good supplier, at least one fleet manager, at least one logistics provider, at least one logistics supplier, at least one map provider, at least one third party, at least one representative, at least one autonomous vehicle, at least one conveyance client, or the like, can provide or receive. As a non-limiting example, at least one level of service preference can be displayed as at least one icon with or on at least one visual representation to allow at least one selection of different levels of service that at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one map provider, at least one third party, or the like, can provide or receive. As a non-limiting example, at least one conveyance client preference can be related to at least one scooter, at least one scooter service, at least one bicycle, at least one bicycle service, or the like.

As a non-limiting example, at least one level of service preference can be displayed on at least one dynamic map to identify different levels of service that at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one map provider, at least one third party, or the like, can provide or receive. As a non-limiting example, at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one map provider, at least one third party, or a combination thereof, can be displayed on or with at least one dynamic map that can display at least one level of service preference and can be represented by at least one mobile or transitory icon.

As a non-limiting example, at least one conveyance client preference can be at least one good supplier preference that can enable at least one good supplier to rush or advance at least one current or at least one future conveyance service offering. As a non-limiting example, at least one conveyance client preference or at least one preference of at least one recipient of at least one conveyance service, can be compared to or with at least one representative preference, to identify at least one match and preferably secure or obtain at least one preferred conveyance service offering for or with at least one conveyance client.

As a non-limiting example, at least one conveyance client preference can have or relate to at least one cultural trait that can impact at least one match between at least one conveyance client and at least one preferred conveyance service offering. As a non-limiting example, at least one conveyance client preference can have or relate to at least one cultural trait that can impact all or some of at least one conveyance service offering in conjunction with corresponding conveyance data. As a non-limiting example, Americans prefer to have at least one conveyance client preference with a shorter estimated time of arrival compared to Canadians.

As a non-limiting example, at least one capacity preference can identify a maximum number of passengers or goods in at least one vehicle or at least one autonomous vehicle. As a non-limiting example, at least one conveyance client can utilize at least one preference to specify if at least one conveyance client prefers at least one autonomous vehicle or at least one representative. As a non-limiting example, at least one conveyance client preference can be at least carpool preference. As a non-limiting example, at least one conveyance client preference can be used to identify at least one conveyance client or at least one group of at least one conveyance client that can be pooled together for at least one conveyance service to at least one ending service geographical location. As a non-limiting example, at least one conveyance client preference can relate to safety for example, at least one vehicle being handicap friendly.

As a non-limiting example, at least one delivery service preference can be to filter out deliveries that can add more than 10 minutes to total travel time. As a non-limiting example, at least one delivery service preference can specify at least one dimension for at least one good, at least one item, or the like. As a non-limiting example, at least one delivery service preference can be used to identify at least one representative or at least one vehicle with at least one specific feature relating to at least one good delivery, at least one item delivery, or the like. As a non-limiting example, at least one delivery service preference can be used to identify at least one pre-scheduled conveyance service offering or at least one pre-scheduled representative or the like.

As a non-limiting example, at least one central server or at least one application can use or apply a second conveyance client preference and at least one process can optionally be referred to or seen as at least one additional level of filtering. As a non-limiting example, at least one central server or at least one application can filter conveyance service offerings using a two step process to first filter conveyance service offerings based on at least one conveyance client preference and then filter at least one subset of conveyance service offerings based on at least one different conveyance client preference.

As a non-limiting example, at least one conveyance client preference can be transmitted to or uploaded to at least one external server. As a non-limiting example, at least one conveyance client preference can be utilized for pre-filtering conveyance service offerings on or at at least one external server, at least one central server, at least one application, or a combination thereof. As a non-limiting example, at least one conveyance client preference can be used for at least one individual conveyance industry segment. As a non-limiting example, at least one conveyance client preference can be used for at least one individual service provider, at least one map provider, or the like.

As a non-limiting example, at least one conveyance client preference, once inputted or provided into at least one application, can be stored or cached on at least one application, at least one computer readable memory of at least one central server, or a combination thereof, and at least one conveyance client preference is not inputted or provided again into at least one application by at least one conveyance client. As a non-limiting example, at least one conveyance client preference can be stored or cached in at least one computer readable memory of at least one central server and at least one conveyance client preference is not transmitted again from at least one application to at least one central server. As a non-limiting example, at least one conveyance client preference, at least one real time or near real time geographical location of at least one conveyance client, or a combination thereof, can be transmitted from at least one application to at least one central server at any time prior to filtering or the like at least one conveyance service offering.

As a non-limiting example, at least one conveyance client preference can be the same or similar to at least one representative preference. As a non-limiting example, at least one conveyance client preference can be the same or have similar logic as at least one representative preference.

Geographical Location of at Least One Conveyance Client, Representative, Autonomous Vehicle, Service Provider, or Good Supplier At least one geographical location of at least one conveyance client can be but is not limited to at least one geographical location, at least one coordinate, at least one position, or at least one place where at least one conveyance client can be at any given point in time. At least one geographical location of at least one conveyance client, at least one representative, at least one autonomous vehicle, at least one service provider, at least one good supplier, or a combination thereof, can be for example in real time, near real time, static, or non-real time.

At least one geographical location of any individual person, machine, entity, or a combination thereof, can be related to or have at least one longitude and at least one latitude in at least one decimal point or format. At least one geographical location of any individual person, machine, entity, or a combination thereof, can be related to or have at least one longitude and at least one latitude in at least one database with at least one decimal point or format. At least one geographical location of any individual person, machine, entity, or a combination thereof, can be related to or have at least one longitude and at least one latitude in at least one different decimal point or format. At least one geographical location of any individual person, machine, entity, or a combination thereof, can be related to or have at least one longitude and at least one latitude in at least one database with at least one different decimal point or format.

At least one geographical location of at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can have or utilize at least one variable precision, that can preferably be standardized in at least one uniform format. Due to many different systems and methods of coding at least one geographical location, at least one variable precision can be preferred to standardize at least one geographical location. Due to many different systems and methods of coding at least one real time or near real time geographical location of at least one conveyance client, at least one variable precision can be preferred to standardize at least one digit or at least one decimal.

At least one geographical location of at least one representative can be but is not limited to at least one geographical location, at least one coordinate, at least one position, or at least one place where at least one representative can be at any given point in time. At least one geographical location of at least one autonomous vehicle can be but is not limited to at least one geographical location, at least one coordinate, at least one position, or at least one place where at least one autonomous vehicle can be at any given point in time. At least one geographical location of at least one service provider can be but is not limited to at least one geographical location, at least one coordinate, at least one position, or at least one place where at least one service provider can be at any given point in time. At least one geographical location of at least one good supplier can be but is not limited to at least one geographical location, at least one coordinate, at least one position, or at least one place where at least one good supplier can be at any given point in time.

At least one geographical location of at least one conveyance client, at least one representative, at least one autonomous vehicle, at least one service provider, at least one good supplier, at least one fleet manager, at least one owner or at least one controller of at least one autonomous vehicle, at least one logistics provider, at least one logistics supplier, at least one third party, at least one map provider, or a combination thereof, can be for example displayed on at least one visual representation.

At least one geographical location of any individual person, machine, entity, or a combination thereof, can be updated or refreshed in real time or near real time and can refer to being updated or refreshed in the highest level of development or state of the art. At least one geographical location of any individual person, machine, entity, or a combination thereof, can be used to perform at least one function in real time or near real time being updated or refreshed in the highest level of development or state of the art. At least one geographical location can be pre-set on including but not limited to at least one central server, at least one external server, at least one application, at least one visual representation, or a combination thereof. At least one geographical location of at least one conveyance client, at least one representative, at least one autonomous vehicle, at least one service provider, at least one good supplier, or a combination thereof, can relate to at least one service provider operating in at least one conveyance industry segment.

When at least one geographical location of any individual person, machine, entity, or a combination thereof, is considered, at least one geographical location of at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one third party, at least one map provider, or the like, can also be considered.

As a non-limiting example, at least one geographical location of at least one conveyance client, at least one representative, at least one autonomous vehicle, at least one service provider and/or at least one good supplier can be used for respective density preferences. As a non-limiting example, at least one geographical location of at least one conveyance client, at least one representative, at least one autonomous vehicle, at least one service provider, at least one good supplier, or a combination thereof, can be used for at least one dynamic map. As a non-limiting example, at least one geographical location of at least one conveyance client, at least one representative, at least one autonomous vehicle, at least one service provider, at least one good supplier, or a combination thereof, can be used for at least one heat map. As a non-limiting example, at least one geographical location of at least one conveyance client, at least one representative, at least one autonomous vehicle, at least one service provider, at least one good supplier, or a combination thereof, can relate to at least one individual service provider operating in at least one individual conveyance industry segment.

As a non-limiting example, at least one geographical location of at least one conveyance client, at least one representative, at least one autonomous vehicle, at least one service provider, at least one good supplier, or a combination thereof, can be static or non-real time. As a non-limiting example, at least one geographical location of at least one good supplier can be static or non-real time as it can relate to at least one brick and mortar geographical location.

As a non-limiting example, at least one geographical location of any individual person, machine, entity, or a combination thereof, can be sourced or provided from three external servers, and can be associated with or have at least one longitude and at least one latitude in at least one database table with at least one different decimal point or format that can be standardized to have at least one similar decimal point or format. As a non-limiting example, at least one geographical location of at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one third party, at least one map provider, or a combination thereof, can have or be associated with at least one variable precision, that can preferably be standardized in at least one uniform format.

As a non-limiting example, at least one geographical location of at least one individual person, at least one individual machine, at least one individual entity, at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one third party, at least one map provider, or a combination thereof, can have or be associated with at least one longitude and at least one latitude in at least one database table with at least one decimal point or format. As a non-limiting example, at least one geographical location of at least one individual person, at least one individual machine, at least one individual entity, at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one third party, at least one map provider, or a combination thereof, can have or be associated with at least one longitude and at least one latitude in at least one database table with at least one different decimal point or format.

As a non-limiting example, due to many different systems and methods of coding at least one geographical location of at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, at least one third party, at least one map provider, or a combination thereof, at least one variable precision is preferred to standardize at least one digit or at least one decimal.

Beginning Service Geographical Location

At least one beginning service geographical location can be but is not limited to at least one geographical location for example requested by at least one conveyance client or at least one entity where at least one conveyance service begins or is requested. At least one beginning service geographical location can be modified before and/or during at least one conveyance service, if utilizing at least one waypoint. At least one beginning service geographical location need not be at least one real time or near real time geographical location of at least one conveyance client. At least one beginning service geographical location can be updated or refreshed in real time or near real time and can refer to being updated or refreshed in the highest level of development or state of the art. At least one beginning service geographical location can be used to perform at least one function in real time or near real time being updated or refreshed in the highest level of development or state of the art. At least one beginning service geographical location can be pre-set or pre-determined on including but not limited to at least one central server, at least one external server, at least one application, or a combination thereof. At least one beginning service geographical location can be associated with at least one conveyance service request or at least one conveyance service offering.

As a non-limiting example, at least one conveyance client can input or provide at least one beginning service geographical location into at least one application. As a non-limiting example, at least one conveyance client can input or provide at least one beginning service geographical location into at least one application to find at least one conveyance service offering, at least one filtered conveyance service offering, at least one preferred conveyance service offering, or a combination thereof. As a non-limiting example, at least one beginning service geographical location can be static or non-real time. As a non-limiting example, at least one representative or at least one autonomous vehicle can pick up at least one conveyance client at at least one beginning service geographical location.

As a non-limiting example, at least one beginning service geographical location can have or be associated with at least one way-point. As a non-limiting example, at least one beginning service geographical location can have or be associated with at least one way-point, where at least one conveyance client can walk to at least one beginning service geographical location. As a non-limiting example, at least one conveyance client can have or use two or multiple beginning service geographical locations including at least one way-point, where at least one conveyance client can take a public bus from one beginning service geographical location to then be picked up by at least one autonomous vehicle from a second beginning service geographical location.

As a non-limiting example, at least one beginning service geographical location can be at at least one future beginning service geographical location. As a non-limiting example, at least one beginning service geographical location can used for or with at least one autonomous vehicle to create at least one conveyance service offering. As a non-limiting example, at least one beginning service geographical location can be dynamic. As a non-limiting example, at least one beginning service geographical location can be associated with latitude and longitude.

Ending Service Geographical Location

At least one ending service geographical location can be but is not limited to at least one geographical location for example requested by at least one conveyance client or at least one entity where at least one conveyance service ends. At least one ending service geographical location can be modified before and/or during at least one conveyance service. At least one ending service geographical location can include at least one waypoint. At least one ending service geographical location can be updated or refreshed in real time or near real time and can refer to being updated or refreshed in the highest level of development or state of the art. At least one ending service geographical location can be used to perform at least one function in real time or near real time being updated or refreshed in the highest level of development or state of the art. At least one ending service geographical location can be pre-set or pre-determined on including but not limited to at least one central server, at least one external server, at least one application, or a combination thereof. At least one ending service geographical location can be associated with at least one conveyance service request or at least one conveyance service offering.

As a non-limiting example, at least one conveyance client can input or provide at least one ending service geographical location into at least one application. As a non-limiting example, at least one conveyance client can input or provide at least one ending service geographical location into at least one application to find at least one conveyance service offering, at least one filtered conveyance service offering, at least one preferred conveyance service offering, or a combination thereof. As a non-limiting example, at least one ending service geographical location can be static or non-real time. As a non-limiting example, at least one representative or at least one autonomous vehicle can drop off at least one conveyance client at at least one ending service geographical location.

As a non-limiting example, at least one ending service geographical location can have or be associated with at least one way-point, where at least one conveyance client can stop at a coffee shop prior to being dropped off at at least one ending service geographical location. As a non-limiting example, at least one ending service geographical location can be at at least one future ending service geographical location. As a non-limiting example, at least one ending service geographical location can used for or with at least one autonomous vehicle to create at least one conveyance service offering. As a non-limiting example, at least one ending service geographical location can be dynamic. As a non-limiting example, at least one ending service geographical location can be associated with latitude and longitude.

Conveyance Industry Segment

The conveyance industry can be for example an industry categorized by the transportation of someone or something from at least one geographical location to at least one other geographical location. The conveyance industry can be for example an industry categorized by the transportation of someone or something from at least one geographical location to at least one other geographical location in real time or near real time. At least one conveyance industry segment can be for example a smaller part of the overall conveyance industry as a whole, categorized by different limiting characteristics. At least one conveyance industry segment can be updated or refreshed in real time or near real time and can refer to being updated or refreshed in the highest level of development or state of the art.

At least one service provider, at least one owner or at least one controller of at least one autonomous vehicle, at least one good supplier, at least one fleet manager, at least one logistics provider, at least one logistics supplier, at least one autonomous vehicle, at least one third party, at least one map provider, or a combination thereof, can operate in at least one conveyance industry segment. At least one owner or at least one controller of at least one autonomous vehicle, at least one service provider, at least one good supplier, at least one fleet manager, at least one logistics provider, at least one logistics supplier, at least one third party, at least one map provider, or a combination thereof, can manage, control, operate, or the like, at least one autonomous vehicle or at least one representative in at least one conveyance industry segment. At least one conveyance service request or at least one conveyance service offering can be associated with at least one conveyance industry segment.

As a non-limiting example, at least one conveyance industry segment can be but is not limited to at least one ride-hail industry segment, at least one ride-share industry segment, at least one car-share industry segment, at least one peer-to-peer conveyance industry segment, at least one person delivery industry segment, at least one taxi industry segment, at least one item delivery industry segment, at least one good delivery industry segment, at least one freight industry segment, at least one medical service and delivery industry segment, at least one food delivery industry segment, at least one courier industry segment, at least one animal delivery industry segment, at least one transportation industry segment, at least one mobility industry segment, or a combination thereof.

As a non-limiting example, at least one individual service provider or the like can operate in at least one individual conveyance industry segment. As a non-limiting example, the present invention can allow at least one conveyance client to receive a ride back home in the ride-hail industry segment and order food to be delivered home more or less at the same time from at least one similar service provider. As a non-limiting example, at least one transportation industry segment can be related to at least one scooter service or the like. As a non-limiting example, at least one transportation industry segment can be related to at least one bicycle service or the like.

EXAMPLES

Example 1

General Description of Preferred Elements and Preferred Interactions Thereof

This general description of some but not all elements of some but not all aspects and embodiments of the present inventions disclosed relate to some preferred non-limiting aspects of at least one exemplary system of the present invention and at least one exemplary method of use of at least one system of the present invention at least one conveyance industry segment, particularly as set forth in the figures and the description thereof. Not all of these elements need be used in the present invention, other elements can be included or some elements removed, and inventions without any of these elements can be part of the present invention. Numerical references refer to those in the figures. The following are elements shown in FIG. 1 through FIG. 14.

At least one conveyance client 1 can be but is not limited to at least one person, at least one robot, at least one machine, or a combination thereof, that can analyze or evaluate and then preferably secure or obtain at least one preferred conveyance service offering 18. At least one conveyance client 1 does not necessarily have to be at least one consumer of at least one service. At least one conveyance client 1 can receive at least one conveyance service. At least one conveyance client 1 can input or provide at least one conveyance client preference 4 used to identify at least one preferred conveyance service offering 18.

At least one representative 2 can be but is not limited to at least one person, at least one robot, at least one machine, or a combination thereof, that can analyze or evaluate and then preferably secure or obtain at least one preferred conveyance service request 15. At least one representative 2 can provide or perform at least one conveyance service of including but not limited to at least one person, at least one good, at least one thing, at least one article, at least one item, at least one conveyance client 1, or a combination thereof. At least one representative 2 can input or provide at least one representative preference 3 used to identify at least one preferred conveyance service request 15. At least one representative 2 can provide or perform at least one conveyance service relating to at least one service provider 5 operating in at least one conveyance industry segment.

At least one representative preference 3 can be but is not limited to at least one option selected or provided by at least one representative 2 that can be used to filter at least one conveyance service request 13 and preferably identify at least one preferred conveyance service request 15. At least one representative preference 3 can be stored or cached on at least one central server 9, at least one external server 10, at least one application 6, or a combination thereof. At least one representative preference 3 can be inclusive or exclusive for filtering at least one conveyance service request 13.

At least one conveyance client preference 4 can be but is not limited to at least one option selected or provided by at least one conveyance client 1 that can be used to filter at least one conveyance service offering 16 and preferably identify at least one preferred conveyance service offering 18. At least one conveyance client preference 4 can be stored or cached on at least one central server 9, at least one external server 10, at least one application 6, or a combination thereof. At least one conveyance client preference 4 can be inclusive or exclusive for filtering of at least one conveyance service offering 16.

At least one service provider 5 can be for example at least one entity or at least one business that can retain or contract with including but not limited to at least one representative 2, at least one autonomous vehicle, at least one good supplier, or a combination thereof. At least one service provider 5 can facilitate at least one conveyance service between including but not limited to at least one representative 2, at least one autonomous vehicle, at least one good supplier, at least one conveyance client 1, or a combination thereof. At least one service provider 5 can operate in at least one conveyance industry segment.

At least one application 6 can be but is not limited to software accessible through at least one terminal 7. At least one application 6 can display at least one visual representation including but not limited to at least one heat map 12, at least one dynamic map 11, or a combination thereof. At least one application 6 can be for example used to analyze, evaluate, secure, or obtain at least one preferred conveyance service request 15 or at least one preferred conveyance service offering 18. At least one application 6 can display including but not limited to at least one preferred conveyance service request 15 or at least one preferred conveyance service offering 18. At least one representative 2 can input or provide at least one representative preference 3 into at least one application 6. At least one conveyance client 1 can input or provide at least one conveyance client preference 4 into at least one application 6.

At least one terminal 7 can be but is not limited to at least one electronic computing device. At least one terminal 7 can include but is not limited to at least one computer processor, at least one computer readable memory, at least one input source, at least one geographical location module, at least one display, at least one network interface, or a combination thereof. At least one terminal 7 can be capable of communicating by way of at least one link 8. At least one terminal 7 can be used to access at least one application 6. At least one terminal 7 can encompass hardware and/or software alone or in a combination.

At least one link 8 can be but is not limited to at least one connection or at least one association with at least one software function, at least one software operation, at least one software component, at least one software module, or a combination thereof. At least one link 8 can be but is not limited to at least one electronic communication network channel. At least one link 8 can be at least one combination of connections between including but not limited to at least one central server 9, at least one external server 10, a least one terminal 7, at least one application 6, or a combination thereof. At least one link 8 can encompass hardware and/or software alone or in a combination.

At least one central server 9 can execute at least one operation of the present invention including but not limited to receiving, transmitting, storing, standardizing, aggregating, and filtering at least one conveyance service request 13 and identifying at least one preferred conveyance service request 15 for at least one representative 2. At least one central server 9 can execute at least one operation of the present invention including but not limited to receiving, transmitting, storing, standardizing, aggregating, and filtering at least one conveyance service offering 16 and identifying at least one preferred conveyance service offering 18 for at least one conveyance client 1. At least one central server 9 can include but is not limited to at least one computer processor, at least one computer readable memory, at least one network interface, or a combination thereof. At least one central server 9 can connect to or communicate with including but not limited to at least one external server 10, at least one application 6, at least one terminal 7, or a combination thereof, by way of at least one link 8. At least one central server 9 can include or connect to at least one database. At least one central server 9 can encompass hardware and/or software alone or in a combination.

At least one external server 10, can be but is not limited to at least one source of at least one conveyance service request 13 in conjunction with corresponding conveyance data, at least one conveyance service offering 16 in conjunction with corresponding conveyance data, or a combination thereof. At least one external server 10 can include but is not limited to at least one computer processor, at least one computer readable memory, at least one network interface, or a combination thereof. At least one external server 10 can connect to or communicate with at least one central server 9, at least one application 6, at least one terminal 7, or a combination thereof, by way of at least one link 8. At least one external server 10 can include or connect to at least one database. At least one external server 10 can encompass hardware and/or software alone or in a combination.

At least one dynamic map 11 can be for example at least one geographical map that can display including but not limited to at least one distinguishable good supplier, at least one distinguishable service provider 5, at least one distinguishable representative 2, at least one distinguishable autonomous vehicle, at least one distinguishable conveyance client 1, or a combination thereof. At least one good supplier, at least one service provider 5, at least one representative 2, at least one autonomous vehicle, at least one conveyance client 1, or a combination thereof, can be displayed as at least one mobile icon or at least one dynamic icon on at least one geographical map. At least one dynamic map 11 can be used by at least one representative 2 to analyze or evaluate and then preferably secure or obtain at least one preferred conveyance service request 15. At least one dynamic map 11 can be used by at least one conveyance client 1 to analyze or evaluate and then preferably secure or obtain at least one preferred conveyance service offering 18. At least one geographical location of including but not limited to at least one good supplier, at least one service provider 5, at least one conveyance client 1, at least one representative 2, at least one autonomous vehicle, or a combination thereof, can be updated, changed, or refreshed in real time or near real time and can optionally reflect their respective availability status. At least one dynamic map 11 can be viewed from including but not limited to at least one perspective, at least one point of reference, at least one point of interest, or a combination thereof.

At least one heat map 12 can be but is not limited to visually display how at least one measurement of at least one statistical variable can vary across at least one geographical area or can show at least one level of variability within at least one geographical region. At least one heat map 12 can be for example at least one geographical map in which at least one area is shaded or patterned in proportion to at least one measurement of at least one statistical variable being displayed on at least one geographical map. At least one heat map 12 can be used by at least one representative 2 to analyze or evaluate and then preferably secure or obtain at least one preferred conveyance service request 15. At least one heat map 12 can be used by at least one conveyance client 1 to analyze or evaluate and then preferably secure or obtain at least one preferred conveyance service offering 18. At least one heat map 12 can be viewed from including but not limited to at least one perspective, at least one point of reference, at least one point of interest, or a combination thereof.

At least one conveyance service request 13 can be for example at least one request for transportation of including but not limited to at least one person, at least one good, at least one article, at least one thing, at least one item, at least one conveyance client 1, or a combination thereof, from at least one geographical location to at least one other geographical location. At least one conveyance service request 13 can be but is not limited to at least one request from at least one conveyance client 1. At least one conveyance service request 13 can be sourced or provided from at least one external server 10. At least one conveyance service request 13 can be sourced or provided by at least one service provider 5. At least one conveyance service request 13 can be updated in real time or near real time.

At least one filtered conveyance service request 14 can be for example at least one conveyance service request 13 that can be filtered by using including but not limited to at least one representative preference 3, at least one real time or near real time geographical location of at least one representative 2, or a combination thereof. At least one filtered conveyance service request 14 can be updated in real time or near real time.

At least one preferred conveyance service request 15 can be for example at least one filtered conveyance service request 14 that can be identified as preferred by including but not limited to at least one representative 2, at least one central server 9, at least one application 6, or a combination thereof. At least one preferred conveyance service request 15 can be identified as preferred for example by using at least one representative preference 3. At least one preferred conveyance service request 15 can be updated in real time or near real time.

At least one conveyance service offering 16 can be for example at least one offering for transportation of including but not limited to at least one person, at least one good, at least one article, at least one thing, at least one item, or a combination thereof; from at least one geographical location to at least one other geographical location. At least one conveyance service offering 16 can be but is not limited to at least one offering from at least one representative 2, at least one service provider 5, at least one autonomous vehicle, or a combination thereof. At least one conveyance service offering 16 can be sourced or provided from at least one external server 10. At least one conveyance service offering 16 can be sourced or provided by at least one service provider 5. At least one conveyance service offering 16 can be updated in real time or near real time.

At least one filtered conveyance service offering 17 can be for example at least one conveyance service offering 16 that can be filtered by using including but not limited to at least one conveyance client preference 4, at least one real time or near real time geographical location of at least one conveyance client 1, or a combination thereof. At least one filtered conveyance service offering 17 can be updated in real time or near real time.

At least one preferred conveyance service offering 18 can be for example at least one filtered conveyance service offering 17 that can be identified as preferred by including but not limited to at least one conveyance client 1, at least one central server 9, at least one application 6, or a combination thereof. At least one preferred conveyance service offering 18 can be identified as preferred for example by using at least one conveyance client preference 4. At least one preferred conveyance service offering 18 can be updated in real time or near real time.

Example 2

This example establishes some preferred non-limiting aspects of an exemplary system of the present invention and an exemplary method of use of a system of the present invention where at least one representative can benefit from the present invention, particularly as set forth in the figures and the description thereof. Numerical references refer to those in the figures. The following are steps of an exemplary method in a preferable but not required order. Generally see FIG. 1, FIG. 2, FIG. 4, FIG. 5, and FIG. 14 for a non-limiting and exemplary system and FIG. 3 and FIG. 9 for a method of the present invention.

Step 1. At least one conveyance service request can be transmitted from at least one external server to at least one central server continuously in real time or near real time by way of at least one link Step 2. At least one conveyance service request can be stored, standardized, aggregated, or a combination thereof, at least once on at least one central server Step 3. At least one representative can use at least one terminal to access at least one application Step 4. At least one representative can be authenticated Step 5. At least one representative can input or provide at least one representative preference into at least one application Step 6. At least one representative preference and preferably at least one real time or near real time geographical location of at least one representative can be transmitted from at least one application to at least one central server by way of at least one link Step 7. At least one conveyance service request can be filtered by at least one central server using at least one representative preference and preferably at least one real time or near real time geographical location of at least one representative into at least one filtered conveyance service request Step 8. At least one filtered conveyance service request can preferably be sorted in at least one order relating to at least one weighted average of at least one representative preference to identify at least one preferred conveyance service request Step 9. At least one preferred conveyance service request can be identified by at least one central server as at least one filtered conveyance service request that has the highest weighted average from at least one filtered conveyance service request Step 10. At least one filtered conveyance service request and at least one preferred conveyance service request can be transmitted from at least one central server to at least one application by way of at least one link Step 11. At least one application can, for example, compile at least one dynamic map by combining at least one geographical map with at least one filtered conveyance service request with corresponding conveyance data and preferably at least one preferred conveyance service request with corresponding conveyance data and then preferably at least one dynamic map can be displayed on at least one application and updated in real time or near real time Step 12. At least one preferred conveyance service request can be displayed as at least one visually distinguishable icon alongside at least one filtered conveyance service request on at least one dynamic map Step 13. At least one representative can analyze or evaluate at least one dynamic map Step 14. After analysis or evaluation of at least one dynamic map, at least one representative can secure or obtain at least one preferred conveyance service request Step 15. At least one representative can perform at least one conveyance service The present non-limiting example can be applied to any conveyance of goods or services, however, the following is a non-limiting example in the ride-hail industry segment. In this non-limiting example, a representative 2 can be a driver, a conveyance client 1 can be a passenger, and a conveyance service request 13 can be a ride service request. A central server 9 can continuously receive conveyance service requests 13 from preferably more than one external server 10 by way of at least one link 8 in real time or near real time and can store, standardize, aggregate, and filter conveyance service requests 13 in real time or near real time. A central server 9 can preferably sort filtered conveyance service requests 14 in real time or near real time, or use another technique, to identify a preferred conveyance service request 15. In a situation where a representative 2 does not have an application 6 downloaded to a terminal 7, a representative 2 could, for example, download an application 6 and can optionally register an account to create a representative 2 profile if desired/required. A representative 2 can access an application 6 using a terminal 7 to gain knowledge of the ride-hail industry segment, for example. When a representative 2 would like to provide a ride in the ride-hail industry segment, for example, a representative 2 would preferably login to an application 6 and can be authenticated.

Once logged into an application 6, a representative 2 can input or provide, for example, representative preferences 3 into an application 6. In this non-limiting example, a representative 2 can input or provide two representative preferences 3, a pricing preference and a service duration preference. A pricing preference can be, for example, a preference of over $20 income per each individual conveyance service request 13. A service duration preference can be, for example, a preference of conveyance services shorter than 15 minutes.

Preferably, these two representative preferences 3 can enable a representative 2 to analyze or evaluate a dynamic map 11 with a preferred conveyance service request 15 and filtered conveyance service requests 14 that can be more desired by a representative 2. For example, a central server 9 can filter out conveyance service requests 13 that do not match or satisfy the two representative preferences 3 for a representative 2. Benefits of representative preferences 3 can be to allow a representative 2 to better meet their criteria in providing conveyance services such as but not limited to higher earning potential, better efficiencies, more suitable conveyance service requests 13, or a combination thereof. The two representative preferences 3 for this example and preferably the real time or near real time geographical location of a representative 2 can be transmitted from an application 6 to a central server 9 by way of at least one link 8.

A central server 9 can filter conveyance service requests 13 into filtered conveyance service requests 14 by comparing to, for example, the two representative preferences 3 and preferably the real time or near real time geographical location of a representative 2. Conveyance service requests 13 that match the indicated two representative preferences 3 can be identified as filtered conveyance service requests 14. Conveyance service requests 13 that do not match the indicated two representative preferences 3 can be discarded or ignored as not being filtered conveyance service requests 14. Filtered conveyance service requests 14 can preferably be sorted by a weighted average of, for example, the two representative preferences 3 to identify a preferred conveyance service request 15. Representative preferences 3 can be but are not limited to an equal weight of 50% when calculating a weighted average. Representative preferences 3 chosen by a representative 2 can optionally be given unequal weights for example but not limited to a 60% and 40% respectively. A representative 2 can optionally choose for representative preferences 3 to have equal or unequal weights.

Preferably, a filtered conveyance service request 14 with the highest weighted average can be identified as a preferred conveyance service request 15. For example, a central server 9 can identify a preferred conveyance service request 15 from filtered conveyance service requests 14 by preferably using the highest weighted average of the pricing preference and service duration preference. Preferably, additional conveyance service requests 13 can be received and continuously filtered by a central server 9 into additional filtered conveyance service requests 14. Preferably, additional filtered conveyance service requests 14 can be sorted by a central server 9 into preferred conveyance service requests 15.

Filtered conveyance service requests 14 in conjunction with corresponding conveyance data and a preferred conveyance service request 15 in conjunction with corresponding conveyance data can be transmitted from a central server 9 to an application 6 by way of at least one link 8. An application 6 can then compile a dynamic map 11 of filtered conveyance service requests 14 and a preferred conveyance service request 15 based on a representative's 2 preferences. A dynamic map 11 can be compiled on an application 6 by combining a geographical map relating to the real time or near real time geographical location of a representative 2 with filtered conveyance service requests 14 and a preferred conveyance service request 15. Filtered conveyance service requests 14 and a preferred conveyance service request 15 can be positioned on a dynamic map 11 relating to corresponding geographical locations contained therein.

A preferred conveyance service request 15 can be displayed on a dynamic map 11 as a visually distinguishable icon compared to filtered conveyance service requests 14. A dynamic map 11 can preferably be refreshed continuously in real time or near real time with updated filtered conveyance service requests 14 and a preferred conveyance service request 15.

A representative 2 can then preferably visually analyze or evaluate a dynamic map 11 prior to securing or obtaining a filtered conveyance service request 14 or a preferred conveyance service request 15. For example, in order to find another filtered conveyance service request 14 or another preferred conveyance service request 15, a representative 2 can update a representative preference 3. In this non-limiting example, a representative 2 chooses to secure or obtain a preferred conveyance service request 15 identified by a central server 9. A representative 2 can then preferably perform a conveyance service. At least one application 6, at least one central server 9, at least one external server 10, at least one terminal 7, at least one link 8, or a combination thereof, can be combined or integrated. A representative 2 can utilize at least one visual representation that can display at least one dynamic map 11 on at least one terminal 7 that can be integrated or associated with at least one application 6, at least one central server 9, at least one external server 10, at least one link 8, or a combination thereof.

Example 3

This example establishes some preferred non-limiting aspects of an exemplary system of the present invention and an exemplary method of use of a system of the present invention where at least one conveyance client can benefit of the present invention, particularly as set forth in the figures and the description thereof. Numerical references refer to those in the figures. The following are steps of an exemplary method in a preferable but not required order. Generally see FIG. 6, FIG. 7, FIG. 12, FIG. 13, and FIG. 14 for a non-limiting and exemplary system and FIG. 8 and FIG. 10, for a method of the present invention.

- Step 1. At least one conveyance client can use at least one terminal to access at least one application
- Step 2. At least one conveyance client can be authenticated
- Step 3. At least one conveyance client can input or provide at least one beginning service geographical location and at least one ending service geographical location into at least one application
- Step 4. At least one beginning service geographical location and at least one ending service geographical location can be transmitted from at least one application to at least one central server by way of at least one link
- Step 5. At least one beginning service geographical location and at least one ending service geographical location can be transmitted from at least one central server to at least one external server by way of at least one link
- Step 6. At least one conveyance service offering can be transmitted from at least one external server to at least one central server continuously in real time or near real time by way of at least one link
- Step 7. At least one conveyance service offering can be stored, standardized, aggregated, or a combination thereof, at least once on at least one central server
- Step 8. At least one conveyance client can input or provide at least one conveyance client preference into at least one application
- Step 9. At least one conveyance client preference and preferably at least one real time or near real time geographical location of at least one conveyance client can be transmitted from at least one application to at least one central server by way of at least one link
- Step 10. At least one conveyance service offering can be filtered by at least one central server using at least one conveyance client preference and preferably at least one real time or near real time geographical location of at least one conveyance client into at least one filtered conveyance service offering
- Step 11. At least one filtered conveyance service offering can be transmitted from at least one central server to at least one application by way of at least one link
- Step 12. At least one application can, for example, compile at least one heat map by combining at least one geographical map with conveyance data relating to at least one filtered conveyance service offering and then preferably at least one heat map can be displayed on at least one application and updated in real time or near real time
- Step 13. At least one conveyance client can analyze or evaluate at least one heat map
- Step 14. After analysis or evaluation of at least one heat map, at least one conveyance client can secure or obtain at least one preferred conveyance service offering
- Step 15. At least one conveyance client can receive at least one conveyance service The present non-limiting example can be applied to any conveyance of goods or services, however, the following is a non-limiting example in the ride-hail industry segment. In this non-limiting example, a conveyance client 1 can be a passenger, a representative 2 can be a driver, and a preferred conveyance service offering 18 can be a ride service offering. A central server 9 can continuously receive conveyance service offerings 16 from preferably more than one external server 10 by way of at least one link 8 in real time or near real time and can store, standardize, and aggregate conveyance service offerings 16 in real time or near real time. A central server 9 can preferably sort filtered conveyance service offerings 17 in real time or near real time, or use another technique, to identify a preferred conveyance service offering 18. A conveyance client 1 can access an application 6 using a terminal 7 to gain knowledge of the ride-hail industry segment, such as current prices of conveyance service offerings 16. When a conveyance client 1 would like to receive a ride in the ride-hail industry segment, for example, a conveyance client 1 would preferably login to an application 6 and can be authenticated.

Once logged into an application 6, a conveyance client 1 can input or provide, for example, a beginning service geographical location, an ending service geographical location, and a conveyance client preference 4 into an application 6. In this non-limiting example, a conveyance client 1 can input or provide one conveyance client preference 4, a pricing preference. A pricing preference can be, for example, a preference of elevated pricing of no more than 2× normal pricing for the cost of a conveyance service.

Preferably, this conveyance client preference 4 can enable a conveyance client 1 to analyze or evaluate a heat map 12 with filtered conveyance service offerings 17 that can be more desired by a conveyance client 1. For example, a central server 9 can filter out conveyance service offerings 16 that do not match or satisfy the conveyance client preference 4 for a conveyance client 1. Benefits of conveyance client preferences 4 can be to allow a conveyance client 1 to better meet their criteria in receiving a conveyance service such as but not limited to lower pricing, shorter wait time, shorter time to destination, more suitable conveyance service offerings 16, or a combination thereof. The conveyance client preference 4 for this example and preferably the real time or near real time geographical location of a conveyance client 1 can be transmitted to a central server 9 by way of at least one link 8.

A central server 9 can filter conveyance service offerings 16 into filtered conveyance service offerings 17 by comparing to, for example, a conveyance client preference 4 and preferably the real time or near real time geographical location of a conveyance client 1. Conveyance service offerings 16 that match the indicated two conveyance client preferences 4 can be identified as filtered conveyance service offerings 17. Conveyance service offerings 16 that do not match the indicated two conveyance client preferences 4 can be discarded or ignored as not being filtered conveyance service offerings 17. Preferably, additional conveyance service offerings 16 can be received and continuously filtered by a central server 9 into additional filtered conveyance service offerings 17.

Filtered conveyance service offerings 17 in conjunction with corresponding conveyance data can be transmitted from a central server 9 to an application 6 by way of at least one link 8. An application 6 can then compile a heat map 12 displaying, for example, elevated pricing metrics of filtered conveyance service offerings 17 as distinguishable shades of color on a heat map 12. A heat map 12 can be compiled on an application 6 by combining a geographical map relating to the real time or near real time geographical location of a conveyance client 1 with conveyance data relating to, for example, elevated pricing metrics of filtered conveyance service offerings 17. Conveyance data relating to the elevated pricing metrics of filtered conveyance service offerings 17 can be positioned on a heat map 12 relating to corresponding geographical locations contained therein. A heat map 12 can preferably be refreshed continuously in real time or near real time with updated conveyance data relating to the elevated pricing metrics of filtered conveyance service offerings 17.

A conveyance client 1 can then preferably visually analyze or evaluate a heat map 12 prior to securing or obtaining a filtered conveyance service offering 17 or a preferred conveyance service offering 18.

In this non-limiting example, service providers 5 #1 and #2 can display elevated pricing of 1.5× at the real time or near real time geographical location of a conveyance client 1. Service provider 5 #3 can display, for example, elevated pricing of 2× at the real time or near real time geographical location of a conveyance client 1 and elevated pricing of 1.8× one hundred yards east of the real time or near real time geographical location of a conveyance client 1. For example, a conveyance client 1 can analyze or evaluate a heat map 12 and find that just two hundred feet north of the real time or near real time geographical location of a conveyance client 1, there is no elevated pricing for service provider 5 #1.

From here in this non-limiting example, a conveyance client 1 chooses to walk north two hundred feet to secure or obtain the preferred conveyance service offering 18 with no elevated pricing from service provider 5 #1. A conveyance client 1 can receive a conveyance service from service provider 5 #1.

At least one application 6, at least one central server 9, at least one external server 10, at least one terminal 7, at least one link 8, or a combination thereof, can be combined or integrated. A conveyance client 1 can utilize at least one visual representation that can display at least one heat map 12 on at least one terminal 7 that can be integrated or associated with at least one application 6, at least one central server 9, at least one external server 10, at least one link 8, or a combination thereof.

Example 4

This example establishes some preferred non-limiting aspects of an exemplary system of the present invention and an exemplary method of use of a system of the present invention, where at least one conveyance client can benefit from the present invention, particularly as set forth in the figures and the description thereof. The following is a non-limiting example where at least one dynamic map is used by at least one conveyance client. Numerical references refer to those in the figures. The following are steps of an exemplary method in a preferable but not required order. Generally see FIG. 11 and FIG. 14 for both a non-limiting and exemplary system and for a method of the present invention.

The present non-limiting example can illustrate how conveyance service offerings 16 can become filtered conveyance service offerings 17 and then a preferred conveyance service offering 18. In this non-limiting example, a conveyance client 1 can be a passenger, a representative 2 can be a driver, and a preferred conveyance service offering 18 can be a ride service offering. In this non-limiting example, a conveyance client 1 can use a dynamic map 11 to secure or obtain a preferred conveyance service offering 18.

A central server 9 can receive conveyance service offerings 16 from an external server 10 continuously or repeatedly in real time or near real time. A central server 9 can store, standardize, aggregate, or a combination thereof, conveyance service offerings 16 in any order. A conveyance client 1 can input or provide two conveyance client preferences 4, the real time or near real time geographical location of a conveyance client 1, or a combination thereof, to a central server 9.

A central server 9 can compare conveyance service offerings 16 to the real time or near real time geographical location of a conveyance client 1 and discard or ignore conveyance service offerings 16 that are not associated with selected service providers 5. A subset of conveyance service offerings 16 that match or satisfy a service provider inclusion preference can be identified as filtered conveyance service offerings 17.

In this non-limiting specific example, a service provider inclusion preference can be given a weight of 40% by a conveyance client 1 and can be set to include only Company A and Company B. A filtered conveyance service offering 17 associated with Company A and Company B can be assigned a score of 10 out of 10 by a central server 9. A filtered conveyance service offering 17 not associated with Company A and Company B can be assigned a score of 0 out of 10 by a central server 9.

A pricing preference can be given a weight of 60% and can be set by a conveyance client 1 to include filtered conveyance service offerings 17 that cost less than $20.00. A filtered conveyance service offering 17 that costs more than $20.00 can be assigned a score of 0 out of 10 by a central server 9. A filtered conveyance service offering 17 that costs between $10.00-$20.00 can be assigned a score of 5 out of 10 by a central server 9. A filtered conveyance service offering 17 that costs less than $10.00 can be assigned a score of 10 out of 10 by a central server 9.

For example, a filtered conveyance service offering 17 associated with Company A and costs $15.00 can be calculated or determined by a central server 9 as having a weighted average of (40% of 10) plus (60% of 5) that can equal 7 based on a service provider inclusion preference and a pricing preference. A filtered conveyance service offering 17 can preferably be sorted in a descending order relating to a weighted average of 7 in this instance and can be identified as a preferred conveyance service offering 18 in comparison to other filtered conveyance service offerings 17 with lower weighted averages.

A conveyance client 1 can analyze or evaluate a dynamic map 11 and then secure or obtain a preferred conveyance service offering 18 relating to Company A and costs $15.00. A conveyance client 1 can receive a conveyance service provided by Company A.

At least one application 6, at least one central server 9, at least one external server 10, at least one terminal 7, at least one link 8, or a combination thereof, can be combined or integrated. A conveyance client 1 can utilize at least one visual representation that can display at least one dynamic map 11 on at least one terminal 7 that can be integrated or associated with at least one application 6, at least one central server 9, at least one external server 10, at least one link 8, or a combination thereof.

Example 5

This example establishes some preferred non-limiting aspects of an exemplary system of the present invention and an exemplary method of use of a system of the present invention, where at least one representative can benefit from the present invention, particularly as set forth in the figures and the description thereof. The following is a non-limiting example where at least one representative can use at least one representative preference to identify and secure or obtain at least one preferred conveyance service request. Numerical references refer to those in the figures. The following are steps of an exemplary method in a preferable but not required order. Generally see FIG. 9 and FIG. 14 for both a non-limiting and exemplary system and for a method of the present invention.

The present non-limiting example can illustrate how conveyance service requests 13 can become filtered conveyance service requests 14 and then a preferred conveyance service request 15. The present non-limiting example can be applied to any conveyance of goods or services, however, the following is a non-limiting example in a freight delivery industry segment. In this non-limiting example, a conveyance client 1 can be a company that orders biohazardous material, a representative 2 can be a truck driver, and a preferred conveyance service request 15 can be a freight delivery service request.

A central server 9 can receive conveyance service requests 13 from an external server 10 continuously or repeatedly in real time or near real time and can pre-categorize conveyance service requests 13 by city. A central server 9 can store, standardize, aggregate, or a combination thereof, conveyance service requests 13 in any order. A representative 2 can input or provide one representative preference 3, the real time or near real time geographical location of a representative 2, or a combination thereof, to a central server 9.

A central server 9 can compare pre-categorized conveyance service requests 13 to the real time or near real time geographical location of a representative 2 and discard or ignore conveyance service requests 13 being in a different city other than a representative 2. A subset of conveyance service requests 13 within the city of a representative 2 that also matches or satisfies a freight preference can be identified as filtered conveyance service requests 14.

In this non-limiting specific example, a freight preference can be given a weight of 100% and can be set to include only conveyance service requests 13 relating to conveying biohazardous materials. A filtered conveyance service request 14 relating to conveying biohazardous materials can be assigned a score of 10 out of 10 by a central server 9. A filtered conveyance service request 14 not relating to conveying biohazardous materials can be assigned a score of 0 out of 10 by a central server 9.

For example, a filtered conveyance service request 14 in a freight delivery industry segment that relates to conveying biohazardous materials can be calculated or determined by a central server 9 as having a weighted average of (100% of 10) that can equal 10 based on a freight preference. A maximum function can be utilized to identify a filtered conveyance service request 14 having the highest weighted average in comparison to other filtered conveyance service requests 14 with lower weighted averages as a preferred conveyance service request 15. A representative 2 can secure or obtain the preferred conveyance service request 15.

At least one application 6, at least one central server 9, at least one external server 10, at least one terminal 7, at least one link 8, or a combination thereof, can be combined or integrated.

Example 6

This example establishes some preferred non-limiting aspects of an exemplary system of the present invention and an exemplary method of use of a system of the present invention, where at least one conveyance client can benefit from the present invention, particularly as set forth in the figures and the description thereof. The following is a non-limiting example where at least one conveyance client can use at least one conveyance client preference to identify and secure or obtain at least one preferred conveyance service offering. Numerical references refer to those in the figures. The following are steps of an exemplary method in a preferable but not required order. Generally see FIG. 10 and FIG. 14 for both a non-limiting and exemplary system and for a method of the present invention.

The present non-limiting example can illustrate how conveyance service offerings 16 can become filtered conveyance service offerings 17 and then a preferred conveyance service offering 18. The present non-limiting example can be applied to any conveyance of goods or services, however, the following is a non-limiting example in a food delivery industry segment. In this non-limiting example, a conveyance client 1 can be a person that can order food, a representative 2 can be a driver, and a preferred conveyance service offering 18 can be a food delivery service offering.

A central server 9 can receive conveyance service offerings 16 from an external server 10 continuously or repeatedly in real time or near real time and can pre-categorize conveyance service offerings 16 by zip code. A central server 9 can store, standardize, aggregate, or a combination thereof, conveyance service offerings 16 in any order. A conveyance client 1 can input or provide one conveyance client preference 4, the real time or near real time geographical location of a conveyance client 1, or a combination thereof, to a central server 9.

A central server 9 can compare pre-categorized conveyance service offerings 16 to the real time or near real time geographical location of a conveyance client 1 and discard or ignore conveyance service offerings 16 being in a different zip code area other than a conveyance client 1. A subset of conveyance service offerings 16 within the zip code area of a conveyance client 1 that also matches or satisfies an estimated time of arrival preference can be identified as filtered conveyance service offerings 17.

In this non-limiting specific example, an estimated time of arrival preference can be given a weight of 100% and can be set to less than twenty minutes by a conveyance client 1. A filtered conveyance service offering 17 with an estimated time of arrival of more than twenty minutes can be assigned a score of 10 out of 10 by a central server 9. A filtered conveyance service offering 17 with an estimated time of arrival of less than or equal to twenty minutes can be assigned a score of 0.5 per minute by a central server 9. For example a filtered conveyance service offering 17 with an estimated time of arrival of fourteen minutes can be assigned a score of 7 out of 10 or a filtered conveyance service offering 17 with an estimated time of arrival of six minutes can be assigned a score of 3 out of 10.

For example, a filtered conveyance service offering 17 in a food delivery industry segment with an estimated time of arrival of four minutes can be calculated or determined by a central server 9 as having a weighted average of (100% of 2) that can equal 2 based on an estimated time of arrival preference. A minimum function can be utilized to identify a filtered conveyance service offering 17 having the lowest weighted average in comparison to other filtered conveyance service offerings 17 with higher weighted averages as a preferred conveyance service offering 18. A conveyance client 1 can secure or obtain the preferred conveyance service offering 18.

At least one application 6, at least one central server 9, at least one external server 10, at least one terminal 7, at least one link 8, or a combination thereof, can be combined or integrated.

All publications, including patent documents and scientific articles, referred to in this application and the bibliography and attachments are incorporated by reference in their entirety for all purposes to the same extent as if each individual publication were individually incorporated by reference.

All headings and titles are for the convenience of the reader and should not be used to limit the meaning of the text that follows the heading, unless so specified. When the singular is referred to, the plural is also included; and when the plural is referred to the singular is also included.

What is claimed is:

1. A network for communicating and securing one or more conveyance service offerings from at least one representative that controls at least one vehicle configured to perform conveyance services to a conveyance client, the at least one representative having a representative device in communication with the network, the network comprising:
    at least one external server in communication with the network, the network configured for receiving the one or more conveyance service offerings from the at least one representative, the at least one external server associated with a business entity that provides goods or services and comprising a substantially real time source of the one or more conveyance service offerings, wherein the one or more conveyance service offerings is dynamic and continuously updated;
    at least one central server in communication with the network, the at least one central server configured for receiving the one or more conveyance service offerings from the at least one external server in substantially real time, the at least one central server having associated therewith at least one application configured for entry of one or a combination of geographical location data and at least one conveyance client preference;
    at least one terminal in communication with the network and configured for interacting with the at least one application and for providing the geographical location data that relates to the conveyance client to the at least one central server, the at least one terminal comprising a display device and an input device;
    wherein the at least one central server is configured to process the one or more conveyance service offerings comprising conveyance data corresponding to at least one feature of the one or more conveyance service offerings, the geographical location data, the at least one conveyance client preference, and wherein the at least one central server is further configured to:
        perform one or more of standardizing and aggregating the one or more conveyance service offerings;
        filter the one or more conveyance service offerings by using the at least one conveyance client preference and the geographical location data to identify a filtered subset of conveyance service offerings;
        identify one or more preferred conveyance service offerings from the filtered subset of conveyance service offerings based on the at least one conveyance client preference; and wherein the at least one application is further configured to:
        generate at least one interactive visual representation comprising at least one geographical map and one or more selectable offering options associated with one or a combination of the filtered subset of conveyance service offerings, the one or more preferred conveyance service offerings, and the at least one conveyance client preference, wherein the at least one interactive visual representation is displayed on the at least one terminal, wherein the at least one interactive visual representation comprises a dynamic map that is updated in substantially real time to display updated results for the one or more selectable offering options; and
    secure the one or more selectable offering options in response to an entry by the conveyance client via the at least one input device.

2. The network of claim 1, wherein at least one function of the at least one central server or the at least one external server is performed by the at least one application.

3. The network of claim 1, wherein the at least one application operates on the at least one central server.

4. The network of claim 1, wherein at least one function of the at least one application is performed by the at least one central server or the at least one external server.

5. The network of claim 1, wherein conveyance data comprises one or more characteristic of the group consisting of beginning service geographical location, ending service geographical location, pricing information, the at least one conveyance client preference, distance parameter, estimated time of arrival, time to destination, conveyance client geographical location, conveyance client review, conveyance client detail, conveyance service route, preferred representative, sensor data, representative geographical location, representative review, representative detail, autonomous vehicle geographical location, autonomous vehicle review, autonomous vehicle detail, preferred autonomous vehicle, route planning preference, fuel economy preference, battery longevity preference, vehicle capacity preference, vehicle diagnostic preference, service provider geographical location, service provider review, service provider detail, preferred service provider, good supplier geographical location, good supplier review, good supplier detail, preferred good supplier, an autonomous vehicle (AV) owner/controller geographical location, an AV owner/controller review, an AV owner/controller detail, a preferred AV owner/controller, fleet manager geographical location, fleet manager review, fleet manager detail, preferred fleet manager, logistics provider geographical location, logistics provider review, logistics provider detail, preferred logistics provider, logistics supplier geographical location, logistics supplier review, logistics supplier detail, preferred logistics supplier, conveyance industry segment detail, preferred conveyance industry segment, business entity detail, good detail, item detail, vehicle detail, statistical variable measurement, level of service detail, fuel consumption, battery level, vehicle diagnostic, and vehicle capacity.

6. The network of claim 1, wherein the filtered subset of conveyance service offerings comprises one or more pre-filtered conveyance service offerings.

7. The network of claim 1, wherein the at least one conveyance client preference comprises one or more preference selected from pricing, geographical location, distance, route, service duration, beginning service geographical location, ending service geographical location, time, predictive, historical, efficiency, sensor, event, traffic based, road condition, weather condition, transportation, route planning, fuel economy, battery longevity, vehicle capacity, vehicle diagnostic, conveyance data, duration of conveyance service, conveyance service offering density, conveyance client density, conveyance client detail, conveyance client rating, representative density, autonomous vehicle density, service provider, service provider density, level of service, good supplier, good supplier density, an automated vehicle (AV) owner/controller, AV owner/controller density, fleet manager, fleet manager density, logistics provider, logistics provider density, logistics supplier, logistics supplier density, good detail, conveyance industry segment, freight, waypoint, delivery service, and oldest outstanding offering.

8. The network of claim 1, wherein the at least one interactive visual representation is compiled on the at least one central server and transmitted to the at least one application.

9. The network of claim 1, wherein the conveyance client utilizes the at least one interactive visual representation to secure or obtain the one or more preferred conveyance service offerings in substantially real time.

10. The network of claim 1, wherein the at least one conveyance client preference is arranged as at least one icon or at least one visual within the at least one interactive visual representation.

11. The network of claim 1, wherein one or a combination of the one or more preferred conveyance service offerings and the at least one conveyance client preference is displayed in at least one visually identifiable format compared to the filtered subset of conveyance service offerings relating to the business entity.

12. The network of claim 1, wherein one or a combination of the one or more preferred conveyance service offerings, the filtered subset of conveyance service offerings, the one or more conveyance service offerings, conveyance data, the one or more selectable offering options, at least one waypoint, subsequent or additional filtered subset of conveyance service offerings, subsequent or additional one or more preferred conveyance service offerings, the geographical location data, the at least one conveyance client preference, at least one beginning service geographical location, and at least one ending service geographical location is identified or updated in substantially real time as the geographical location data updates or changes or as traffic information updates or changes.

13. The network of claim 1, wherein the display device is associated with one or more of a remote display, a computer or computing device terminal, a computer program, a mobile application, a smartphone device, an In-Vehicle display device, a business entity application, a service provider application, and a good supplier application.

14. The network of claim 1, wherein the at least one application enables the conveyance client to browse or navigate at least one area of the at least one interactive visual representation to secure the one or more selectable offering options.

15. The network of claim 1, wherein one or a combination of the at least one application, the at least one terminal, the at least one central server, and the at least one external server is combined or integrated.

16. The network of claim 1, wherein one or a combination of the one or more preferred conveyance service offerings, the filtered subset of conveyance service offerings, the one or more conveyance service offerings, the geographical location data, the at least one conveyance client preference, conveyance data, the one or more selectable offering options, at least one waypoint, subsequent or additional filtered subset of conveyance service offerings, subsequent or additional one or more preferred conveyance service offerings, one or more secured or obtained preferred conveyance service offerings, at least one beginning service geographical location, and at least one ending service geographical location is transmitted in substantially real time between the at least one application and the at least one central server.

17. The network of claim 1, wherein one or a combination of the one or more preferred conveyance service offerings, the filtered subset of conveyance service offerings, the one or more conveyance service offerings, the geographical location data, the at least one conveyance client preference, conveyance data, the one or more selectable offering options, at least one waypoint, subsequent or additional filtered subset of conveyance service offerings, subsequent or additional one or more preferred conveyance service offerings, one or more secured or obtained preferred conveyance service offerings, at least one beginning service geographical location, and at least one ending service geographical location is transmitted in substantially real time between the at least one application and the at least one external server communication with the network.

18. The network of claim 1, wherein one or a combination of the one or more preferred conveyance service offerings, the filtered subset of conveyance service offerings, the one or more conveyance service offerings, the geographical location data, the at least one conveyance client preference, conveyance data, the one or more selectable offering options, at least one waypoint, subsequent or additional filtered subset of conveyance service offerings, subsequent or additional one or more preferred conveyance service offerings, one or more secured preferred conveyance service offerings, at least one beginning service geographical location, and at least one ending service geographical location is transmitted in substantially real time between the at least one central server and the at least one external server.

19. The network of claim 1, wherein the at least one application enables the conveyance client to secure or obtain the one or more preferred conveyance service offerings or one or more filtered subset of conveyance service offerings in response to an entry by the conveyance client by selecting or applying at least one of the one or more preferred conveyance service offerings, the one or more filtered subset of conveyance service offerings, the one or more selectable offering options, and the at least one conveyance client preference.

20. The network of claim 1, wherein, in response to an entry by the conveyance client, the one or more preferred conveyance service offerings is secured for at least one other conveyance client.

21. The network of claim 1, wherein, in response to an entry by the conveyance client, the at least one conveyance client preference is utilized to secure or obtain the one or more preferred conveyance service offerings for at least one other conveyance client.

22. The network of claim 1, wherein the at least one terminal comprises one or a combination of a terminal, a computer, a smartphone, tablet, a laptop, a wearable, a plug-in, a mobile computing device, an In-Vehicle infotainment device, an Internet of Things (IoT) device, a projecting device, a computing device embedded in the at least one vehicle, and a head-up display.

23. The network of claim 1, wherein the input device comprises one or a combination of a touchscreen, a keypad, a keyboard, and a voice controlled input.

24. The network of claim 1, wherein the conveyance client preference is inputted, provided, or selected by the conveyance client and stored or cached on one or a combination of the at least one application, the at least one central server, and the at least one external server.

25. The network of claim 1, wherein the geographical location data is in substantially real time.

26. The network of claim 1, wherein the geographical location data is static or non-real time.

27. The network of claim 1, wherein the geographical location data is pre-set on one or a combination of the at least one central server, the at least one external server, the at least one terminal, and the at least one application.

28. The network of claim 1, wherein the geographical location data comprises one or more of a coordinate, a position, a point of reference, a point of interest, a geographical location of interest, a perspective, and a geographical location of one or more of the at least one representative, the conveyance client, an autonomous vehicle, the at least one vehicle, an entity, a service provider, a good supplier, a freight provider, the business entity, a brick and mortar, one or more objects, one or more persons, freight, a static location, a beginning service location, an ending service location, a waypoint, a past location, a future location, and an estimated location.

29. The network of claim 1, wherein at least one different geographical location is used other than the geographical location data when filtering the one or more conveyance service offerings.

30. The network of claim 1, wherein the geographical location data is associated with at least one point in time.

31. The network of claim 1, wherein the at least one interactive visual representation comprises one or a combination of a list, a visual, and a digital format.

32. The network of claim 1, wherein the at least one interactive visual representation is configured to repeatedly update with at least one of subsequent or additional filtered subset of conveyance service offerings, subsequent or additional one or more preferred conveyance service offerings, the one or more selectable offering options, conveyance data, and the at least one conveyance client preference.

33. The network of claim 1, wherein the at least one interactive visual representation is configured to repeatedly update in substantially real time with at least one of subsequent or additional filtered subset of conveyance service offerings, subsequent or additional one or more preferred conveyance service offerings, the one or more selectable offering options, conveyance data, and the at least one conveyance client preference.

34. The network of claim 1, wherein the at least one geographical map encompasses the geographical location data of one or a combination of the conveyance client, the at least one representative, the at least one vehicle, one or more persons or objects, the business entity, a freight provider, a service provider, a good supplier, and an autonomous vehicle.

35. The network of claim 1, wherein the one or more selectable offering options comprise one or more filtered subset of conveyance service offerings.

36. The network of claim 1, wherein the at least one external server comprises a plurality of external servers, and wherein a first business entity is associated with a first external server and a second business entity is associated with a second external server.

37. The network of claim 1, wherein the at least one external server comprises a plurality of external servers, and wherein each external server is associated with a different business entity.

38. The network of claim 1, wherein the business entity comprises one or a combination of a business, an entity that provides goods or services, an entity that conveys goods or services, an entity that produces or supplies freight, a freight provider, a service provider, a good supplier, and a courier, and an autonomous vehicle (AV) owner/controller.

39. The network of claim 1, wherein at least one level of service preference is arranged within the at least one interactive visual representation.

40. The network of claim 1, wherein at least one level of service preference is arranged within the at least one interactive visual representation in conjunction with the at least one dynamic map.

41. The network of claim 1, wherein the conveyance client comprises one or a combination of a person, a machine, an entity, a business, the business entity, an entity that provides goods or services, an entity that conveys goods or services, an entity that produces or supplies freight, a freight provider, a service provider, a good supplier, a fleet manager, a logistics provider, a logistics supplier, a map provider, a third party, a courier, and an autonomous vehicle (AV) owner/controller.

42. The network of claim 1, wherein the one or more conveyance service offerings comprises one or more service offering selected from the group consisting of ride-hail, ride-share, car-share, peer-to-peer conveyance, transportation, scooter, bicycle, person delivery, pre-filtered conveyance, taxi, shuttle, good delivery, item delivery, medical delivery, food delivery, courier delivery, freight delivery, and animal delivery.

43. The network of claim 42, wherein one or a combination of the conveyance client, the at least one central server, and the at least one application secures the one or more selectable offering options in at least one specified conveyance industry segment.

44. The network of claim 1, wherein the one or more conveyance service offerings comprises one or more pre-filtered conveyance service offerings.

45. The network of claim 44, wherein one or a combination of the one or more pre-filtered conveyance service offerings and the one or more conveyance service offerings is structured in at least one different format, wherein the at least one central server is further configured to standardize or convert the one or more pre-filtered conveyance service offerings into at least one uniform format.

46. The network of claim 44, wherein one or a combination of the one or more pre-filtered conveyance service offerings and the one or more conveyance service offerings is structured in at least one uniform format prior to being transmitted from the at least one external server to the at least one central server, and is not standardized.

47. The network of claim 44, wherein one or a combination of the one or more conveyance service offerings, conveyance data, and the one or more pre-filtered conveyance service offerings is sourced or provided by the business entity operating in at least one conveyance industry segment, via the at least one external server.

48. The network of claim 1, wherein the one or more conveyance service offerings is filtered relating to the at least one conveyance client preference and the geographical location data, to identify the filtered subset of conveyance service offerings by at least one of the processes of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, and comparing.

49. The network of claim 48, wherein the one or more preferred conveyance service offerings is identified from the filtered subset of conveyance service offerings relating to at least one weighted average of the at least one conveyance client preference.

50. The network of claim 48, wherein at least one different geographical location is used other than the geographical location data when filtering the one or more conveyance service offerings.

51. The network of claim 1, wherein the at least one interactive visual representation further comprises one or more heat map selected from a substantially real time heat map, a historical heat map, and a predictive heat map.

52. The network of claim 51, wherein the one or more heat map displays at least one visual depiction of at least one statistical variable of the one or more conveyance service offerings, the filtered subset of conveyance service offerings, the one or more preferred conveyance service offerings, the at least one conveyance client preference, and the one or more selectable offering options.

53. The network of claim 52, wherein the at least one statistical variable comprises at least one measurement of at least one of conveyance service availability, pricing, conveyance service request density, filtered subset of conveyance service request density, preferred conveyance service request density, level of service density, conveyance service distance, estimated time of arrival, preferred conveyance industry segment, conveyance industry segment density, representative density, conveyance client density, vehicle density, the business entity density, service provider density, and good supplier density.

54. The network of claim 53, wherein at least one area of the one or more heat map is distinguished in proportion to a measurement of the at least one statistical variable and displayed as having one or a combination of distinguishable visual characteristics selected from hue, shade, saturation, opacity, color, pattern, hatch fill, shape, image, and animation.

55. The network of claim 52, wherein the one or more heat map is a substantially real time heat map compiled from the at least one statistical variable of at least one of the one or more conveyance service offerings, the filtered subset of conveyance service offerings, the one or more preferred conveyance service offerings, and the at least one conveyance client preference.

56. The network of claim 52, wherein the one or more heat map is a historical heat map compiled from the at least one statistical variable of at least one of one or more past conveyance service offerings, filtered subset of past conveyance service offerings, one or more past preferred conveyance service offerings, and the at least one conveyance client preference.

57. The network of claim 1, wherein the dynamic map displays in substantially real time at least one dynamic graphic representing at least one of the at least one representative, an autonomous vehicle, the conveyance client, conveyance data, a point of interest, the business entity, the one or more selectable offering options, the one or more conveyance service offerings, the filtered subset of conveyance service offerings, the one or more preferred conveyance service offerings, and the at least one conveyance client preference.

58. The network of claim 57, wherein the at least one dynamic graphic relating to the business entity is displayed individually as at least one mobile or transitory icon or at least one mobile or transitory visual and updates or changes in substantially real time.

59. The network of claim 57, wherein the at least one dynamic graphic relating to the business entity is displayed as at least one distinguishable icon or at least one distinguishable visual and updates or changes in substantially real time.

60. The network of claim 57, wherein the at least one dynamic graphic relating to at least one individual business entity is displayed as at least one icon or at least one visual and updates or changes geographical location in substantially real time.

61. The network of claim 57, wherein the at least one dynamic graphic relating to the business entity is displayed as or with one or a combination of at least one different icon, at least one different symbol, at least one different color, at least one different shading, at least one different pattern, and at least one different visual.

62. The network of claim 57, wherein the at least one dynamic graphic relating to the business entity is displayed as or with one or a combination of at least one similar icon, at least one similar symbol, at least one similar color, at least one similar shading, at least one similar pattern, and at least one similar visual.

63. The network of claim 57, wherein the at least one central server is configured to further process and display one or more updated selectable offering options in substantially real time in response to entry of at least one updated conveyance client preference.

64. The network of claim 57, wherein the at least one dynamic graphic is individually arranged on the at least one dynamic map and dynamically updates or changes geographical location in substantially real time.

65. The network of claim 52, wherein the one or more heat map is a predictive heat map compiled from the at least one statistical variable of at least one of one or more past conveyance service offerings, filtered subset of past conveyance service offerings, one or more past preferred conveyance service offerings, the one or more conveyance service offerings, the filtered subset of conveyance service offerings, the one or more preferred conveyance service offerings, and the at least one conveyance client preference.

66. The network of claim 65, wherein the one or more heat map is a predictive heat map that identifies or estimates at least one of future conveyance service availability, future pricing, future conveyance service offering density, future filtered conveyance service offering density, future preferred conveyance service offering density, future level of service density, future conveyance industry segment density, future representative density, future conveyance client density, future business entity density, future service provider density, future good supplier density, future level of service supply, future conveyance industry segment supply, future conveyance service supply, future business entity supply, future business entity demand, future service provider supply, future good supplier supply, future conveyance service demand, and future conveyance client demand.

67. The network of claim 65, wherein the one or more heat map is a predictive heat map that generates a visual notification or an audio notification to notify the conveyance client of a future change or update to at least one of the at least one statistical variable, the at least one measurement of the at least one statistical variable, the one or more conveyance service offerings, and the one or more selectable offering options.

68. The network of claim 1, wherein the one or more preferred conveyance service offerings is identified using one or more algorithm configured for sorting, selection, searching, merging, maximizing, minimizing, and comparing.

69. The network of claim 68, wherein the one or more preferred conveyance service offerings is identified from the filtered subset of conveyance service offerings relating to at least one weighted average of the at least one conveyance client preference.

70. The network of claim 1, wherein the at least one interactive visual representation further comprises at least one graphic representing one or more of a coordinate, a point of reference, a point of interest, a geographical location of interest, a perspective, the one or more conveyance service requests, the filtered subset of conveyance service requests, the one or more preferred conveyance service requests, the one or more selectable request options, subsequent or additional one or more preferred conveyance service requests, subsequent or additional filtered subset of conveyance service requests, a geographical location of one or more of the at least one representative, the at least one conveyance client, an autonomous vehicle, the at least one vehicle, an entity, a service provider, a good supplier, a freight provider, a brick and mortar, the business entity, one or more persons or objects, freight, a static location, a beginning service location, an ending service location, a waypoint, a past location, a future location, and an estimated location.

71. The network of claim 70, wherein the at least one graphic is associated with one or a combination of a service provider, a freight provider, a good supplier, and the business entity.

72. The network of claim 70, wherein the at least one graphic is individually arranged on the at least one dynamic map and dynamically updates or changes geographical location.

73. The network of claim 1, wherein the at least one application retrieves one or a combination of the one or more conveyance service offerings and conveyance data from the at least one external server.

74. The network of claim 57, wherein the at least one dynamic graphic is associated with one or a combination of a service provider, a freight provider, a good supplier, and the business entity.

75. A method for communicating and securing one or more conveyance service offerings from at least one representative to a conveyance client within a network, the at least one representative having a representative device in communication within the network, the method comprising:
 a) receiving at at least one central server in communication with the network in substantially real time, in any order:
  i) the one or more conveyance service offerings from at least one external server associated with a business entity that provides goods or services, the one or more conveyance service offerings comprising conveyance data corresponding to at least one feature of the one or more conveyance service offerings, from at least one first geographical location to at least one second geographical location, wherein the at least one external server comprises a substantially real time source of the one or more conveyance service offerings, and wherein the one or more conveyance service offerings is dynamic and continuously updated;
  ii) at least one conveyance client preference entered via at least one application, at least one terminal having a display device and an input device; and
  iii) geographical location data;
 b) processing the one or more conveyance service offerings by:
  i) filtering the one or more conveyance service offerings by using the at least one conveyance client preference and the geographical location data to identify a filtered subset of conveyance service offerings;
  ii) identifying one or more preferred conveyance service offerings from the filtered subset of conveyance service offerings based on the at least one conveyance client preference;
 c) generating at least one interactive visual representation comprising at least one geographical map and one or more selectable offering options associated with one or a combination of the filtered subset of conveyance service offerings, the one or more preferred conveyance service offerings, and the at least one conveyance client preference, wherein the at least one interactive visual representation is displayed on the at least one terminal, wherein the at least one interactive visual representation comprises a dynamic map that is updated in substantially real time to display updated results for the one or more selectable offering options; and
 d) securing the one or more selectable offering options in response to an entry by the conveyance client via the at least one input device.

76. The method of claim 75, wherein the conveyance client preference, once inputted or provided into the at least one application, is stored or cached on one or more of the at least one application, the at least one central server, and the at least one external server.

77. The method of claim 75, wherein the at least one conveyance client preference is stored or cached in at least one computer readable memory of the at least one central server.

78. The method of claim 75, wherein the one or more conveyance service offerings is filtered relating to the at least one conveyance client preference and the geographical location data, to identify the filtered subset of conveyance service offerings by at least one of the processes of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, and comparing.

79. The method of claim 75, wherein the step of filtering is executed by the at least one application.

80. The method of claim 75, wherein at least one different geographical location is used when filtering the one or more conveyance service offerings.

81. The method of claim 75, wherein the step of identifying is executed by the at least one application.

82. The method of claim 75, wherein the at least one interactive visual representation is compiled on the at least one central server and transmitted to the at least one application.

83. The method of claim 75, wherein the display device is associated with one or more of a remote display, a computer or computing device terminal a computer program, a mobile application, a smartphone device, an In-Vehicle display device, a business entity application, a service provider application, and a good supplier application.

84. The method of claim 75, wherein the conveyance client utilizes the at least one interactive visual representation to secure the one or more preferred conveyance service offerings in substantially real time.

85. The method of claim 75, wherein the at least one conveyance client preference is arranged as at least one icon or at least one visual within the at least one interactive visual representation.

86. The method of claim 75, wherein one or a combination of the one or more preferred conveyance service offerings and the at least one conveyance client preference is displayed in at least one visually identifiable format compared to the filtered subset of conveyance service offerings relating to the business entity.

87. The method of claim 75, wherein at least one function of the at least one central server or the at least one external server is performed by the at least one application.

88. The method of claim 75, wherein the at least one application operates on or associates with the at least one central server.

89. The method of claim 75, wherein at least one function of the at least one application is performed by the at least one central server or the at least one external server.

90. The method of claim 75, wherein one or a combination of the conveyance client, the at least one central server, and the at least one application secures the one or more selectable offering options in at least one specified conveyance industry segment.

91. The method of claim 75, wherein the at least one application secures the one or more selectable offering options comprising the at least one representative or at least one autonomous vehicle.

92. The method of claim 75, wherein one or a combination of the one or more preferred conveyance service offerings, the filtered subset of conveyance service offerings, the one or more conveyance service offerings, conveyance data, the one or more selectable offering options, at least one waypoint, subsequent or additional filtered subset of conveyance service offerings, subsequent or additional one or more preferred conveyance service offerings, the geographical location data, the at least one conveyance client preference, at least one beginning service geographical location, and at least one ending service geographical location is identified or updated in substantially real time as the geographical location data updates or changes or as traffic information updates or changes.

93. The method of claim 75, wherein the filtered subset of conveyance service offerings comprises one or more pre-filtered conveyance service offerings.

94. The method of claim 75, wherein the at least one application enables the conveyance client to browse or navigate at least one area of the at least one interactive visual representation to secure the one or more selectable offering options.

95. The method of claim 75, wherein one or a combination of the at least one application, the at least one terminal, the at least one central server, and the at least one external server is combined or integrated.

96. The method of claim 75, wherein one or a combination of the one or more preferred conveyance service offerings, the filtered subset of conveyance service offerings, the one or more conveyance service offerings, the geographical location data, the at least one conveyance client preference, conveyance data, the one or more selectable offering options, at least one waypoint, subsequent or additional filtered subset of conveyance service offerings, subsequent or additional one or more preferred conveyance service offerings, one or more secured or obtained preferred conveyance service offerings, at least one beginning service geographical location, and at least one ending service geographical location is transmitted in substantially real time between the at least one application and the at least one central server.

97. The method of claim 75, wherein one or a combination of the one or more preferred conveyance service offerings, the filtered subset of conveyance service offerings, the one or more conveyance service offerings, the geographical location data, the at least one conveyance client preference, conveyance data, the one or more selectable offering options, at least one waypoint, subsequent or additional filtered subset of conveyance service offerings, subsequent or additional one or more preferred conveyance service offerings, one or more secured or obtained preferred conveyance service offerings, at least one beginning service geographical location, and at least one ending service geographical location is transmitted in substantially real time between the at least one application and the at least one external server.

98. The method of claim 75, wherein one or a combination of the one or more preferred conveyance service offerings, the filtered subset of conveyance service offerings, the one or more conveyance service offerings, the geographical location data, the at least one conveyance client preference, conveyance data, the one or more selectable offering options, at least one waypoint, subsequent or additional filtered subset of conveyance service offerings, subsequent or additional one or more preferred conveyance service offerings, one or more secured or obtained preferred conveyance service offerings, at least one beginning service geographical location, and at least one ending service geographical location, is transmitted in substantially real time between the at least one central server and the at least one external server.

99. The method of claim 75, wherein the geographical location data is in substantially real time.

100. The method of claim 75, wherein the geographical location data is static or non-real time.

101. The method of claim 75, wherein the geographical location data is pre-set on one or a combination of the at least one central server, the at least one external server, the at least one terminal, and the at least one application.

102. The method of claim 75, wherein the geographical location data comprises one or more of a coordinate, a position, a point of reference, a point of interest, a geographical location of interest, a perspective, and a geographical location of one or more of the at least one representative, the at least one conveyance client, an autonomous vehicle, the at least one vehicle, an entity, a service provider, a good supplier, a freight provider, the business entity, a brick and mortar, the one or more persons or objects, freight, a static location, a beginning service location, an ending service location, a waypoint, a past location, a future location, and an estimated location.

103. The method of claim 75, wherein at least one different geographical location is used other than the geographical location data when filtering the one or more conveyance service offerings.

104. The method of claim 75, wherein the geographical location data is associated with at least one point in time.

105. The method of claim 75, wherein the at least one application enables the conveyance client to secure the one or more preferred conveyance service offerings or one or more filtered subset of conveyance service offerings in response to an entry by the at least one conveyance client by selecting or applying at least one of the one or more preferred conveyance service offerings, the one or more filtered subset of conveyance service offerings, the one or more selectable offering options, and the at least one conveyance client preference.

106. The method of claim 75, wherein, in response to an entry by the conveyance client, the one or more preferred conveyance service offerings is secured for at least one other conveyance client.

107. The method of claim 75, wherein, in response to an entry by the conveyance client, the conveyance client preference is utilized to secure the one or more preferred conveyance service offerings for at least one other conveyance client.

108. The method of claim 75, wherein the at least one comprises one or a combination of a computer, a smartphone, a tablet, a laptop, a wearable, a plug-in, a mobile computing device, an In-Vehicle infotainment device, an Internet of Things (IoT) device, a projecting device, a computing device embedded in the at least one vehicle, and a head-up display.

109. The method of claim 75, wherein the input device comprises one or a combination of a touchscreen, a keypad, a keyboard, and a voice controlled input.

110. The method of claim 75, wherein the at least one conveyance client preference is inputted, provided, or selected by the conveyance client and stored or cached on one or a combination of the at least one application, the at least one central server, and the at least one external server.

111. The method of claim 75, wherein the at least one interactive visual representation comprises one or a combination of a list, a visual, and a digital format.

112. The method of claim 75, wherein the at least one interactive visual representation is configured to repeatedly update with at least one of subsequent or additional filtered subset of conveyance service offerings, subsequent or additional one or more preferred conveyance service offerings, the one or more selectable offering options, conveyance data, and the at least one conveyance client preference.

113. The method of claim 75, wherein the at least one interactive visual representation is configured to repeatedly update in substantially real time with at least one of subsequent or additional filtered subset of conveyance service offerings, subsequent or additional one or more preferred conveyance service offerings, the one or more selectable offering options, conveyance data, and the at least one conveyance client preference.

114. The method of claim 75, wherein the at least one geographical map encompasses the geographical location data for one or a combination of the conveyance client, the at least one representative, one or more persons or objects, the business entity, a freight provider, a service provider, a good supplier, and an autonomous vehicle.

115. The method of claim 75, wherein the one or more selectable offering options comprise one or more filtered subset of conveyance service offerings.

116. The method of claim 75, wherein the at least one visual representation is associated with one or a combination of a service provider, a freight provider, a good supplier, a map provider, and the business entity, operating in conveyance industry segment.

117. The method of claim 75, wherein the at least one external server comprises a plurality of external servers, and wherein a first business entity is associated with a first external server and a second business entity is associated with a second external server.

118. The method of claim 75, wherein the at least one external server comprises a plurality of external servers, and wherein each external server is associated with a different business entity.

119. The method of claim 75, wherein the business entity comprises one or a combination of a business, an entity that provides goods or services, an entity that conveys goods or services, an entity that produces or supplies freight, a freight provider, a service provider, a good supplier, and a courier, and an autonomous vehicle (AV) owner/controller.

120. The method of claim 75, wherein the one or more conveyance service offerings comprises one or more service offering selected from the group consisting of ride-hail, ride-share, car-share, peer-to-peer conveyance, transportation, scooter, bicycle, person delivery, pre-filtered conveyance, taxi, shuttle, good delivery, item delivery, medical delivery, food delivery, courier delivery, freight delivery, and animal delivery.

121. The method of claim 75, wherein the conveyance client preference comprises one or more preference selected from pricing, geographical location, distance, route, service duration, beginning service geographical location, ending service geographical location, time, predictive, historical, efficiency, sensor, event, traffic based, road condition, weather condition, transportation, route planning, fuel economy, battery longevity, vehicle capacity, vehicle diagnostic, conveyance data, duration of conveyance service, conveyance service offering density, conveyance client density, conveyance client detail, conveyance client rating, representative density, autonomous vehicle density, service provider, service provider density, level of service, good supplier, good supplier density, owner/controller of an autonomous vehicle, owner/controller of an autonomous vehicle density, fleet manager, fleet manager density, logistics provider, logistics provider density, logistics supplier, logistics supplier density, good detail, conveyance industry segment, freight, waypoint, delivery service, and oldest outstanding offering.

122. The method of claim 75, wherein the at least one application retrieves one or a combination of the one or more conveyance service offerings and conveyance data from the at least one external server.

123. The method of claim 75, wherein at least one level of service preference is arranged within the at least one interactive visual representation.

124. The method of claim 75, wherein at least one level of service preference is arranged within the at least one interactive visual representation in conjunction with the at least one dynamic map.

125. The method of claim 75, wherein the conveyance client comprises one or a combination of a person, a machine, an entity, a business, the business entity, an entity that provides goods or services, an entity that conveys goods or services, an entity that produces or supplies freight, a freight provider, a service provider, a good supplier, a fleet manager, a logistics provider, a logistics supplier, a map provider, a third party, a courier, and an autonomous vehicle (AV) owner/controller.

126. The method of claim 75, wherein conveyance data comprises at least one data type selected from the group consisting of data corresponding to a geographical location of one or more of a beginning service, an ending service, the at least one representative, the conveyance client, the at least one vehicle, an autonomous vehicle (AV) owner/controller, a service provider, a good supplier, a fleet manager, a logistics provider, the business entity, the geographical location data, a perspective, and a point of interest, data corresponding to one or more of pricing information, the at least one conveyance client preference, data corresponding to one or more parameter of distance, estimated time of arrival, timing, route, and traffic, and data corresponding to details about one or more of the conveyance client, the conveyance service, the at least one representative, the at least one vehicle, the AV owner/controller, the service provider, the good supplier, the fleet manager, the logistics provider, the business entity, the geographical location data, a good or a service to be conveyed, and a conveyance industry segment.

127. The method of claim 75, wherein the one or more preferred conveyance service offerings is identified using one or more algorithm configured for sorting, selection, searching, merging, maximizing, minimizing, and comparing.

128. The method of claim 127, wherein the one or more preferred conveyance service offerings is identified from the filtered subset of conveyance service offerings relating to at least one weighted average of the at least one conveyance client preference.

129. The method of claim 75, wherein the at least one interactive visual representation further comprises one or more heat map selected from a substantially real time heat map, a historical heat map, and a predictive heat map.

130. The method of claim 129, wherein the one or more heat map displays at least one visual depiction of at least one statistical variable of the one or more conveyance service offerings, the filtered subset of conveyance service offerings, the one or more preferred conveyance service offerings, the conveyance client preference, and the one or more selectable offering options.

131. The method of claim 130, wherein the one or more heat map is a substantially real time heat map compiled from the at least one statistical variable of at least one of the one or more conveyance service offerings, the filtered subset of conveyance service offerings, the one or more preferred conveyance service offerings, and the at least one conveyance client preference.

132. The method of claim 130, wherein the one or more heat map is a historical heat map compiled from the at least one statistical variable of at least one of one or more past conveyance service offerings, filtered subset of past conveyance service offerings, one or more past preferred conveyance service offerings, and the at least one conveyance client preference.

133. The method of claim 130, wherein the at least one statistical variable comprises at least one measurement of at least one of conveyance service availability, pricing, elevated pricing, conveyance service offering density, filtered conveyance service offering density, preferred conveyance service offering density, preferred good supplier density, at least one preferred conveyance industry segment, conveyance industry segment density, level of service density, at least one conveyance service distance, at least one estimated time of arrival, preferred representative density, representative density, conveyance client density, the business entity density, service provider density, and good supplier density.

134. The method of claim 133, wherein at least one area of the or more heat map is distinguished in proportion to a measurement of the at least one statistical variable and displayed as having one or a combination of distinguishable visual characteristics selected from hue, shade, saturation, opacity, color, pattern, hatch fill, shape, image, and animation.

135. The method of claim 130, wherein the one or more heat map is a predictive heat map compiled from the at least one statistical variable of at least one of one or more past conveyance service offerings, filtered subset of past conveyance service offerings, one or more past preferred conveyance service offerings, the one or more conveyance service offerings, the filtered subset of conveyance service offerings, the one or more preferred conveyance service offerings, and the at least one conveyance client preference.

136. The method of claim 135, wherein the one or more heat map is a predictive heat map that identifies or estimates at least one of future conveyance service availability, future pricing, future conveyance service offering density, future filtered conveyance service offering density, future preferred conveyance service offering density, future level of service density, future conveyance industry segment density, future representative density, future conveyance client density, future business entity density, future service provider density, future good supplier density, future level of service supply, future conveyance industry segment supply, future conveyance service supply, future business entity supply, future business entity demand, future service provider supply, future good supplier supply, future conveyance service demand, and future conveyance client demand.

137. The method of claim 135, wherein the one or more heat map is a predictive heat map that generates a visual notification or an audio notification to notify the conveyance client of a future change or update to at least one of the at least one statistical variable, the at least one measurement of the at least one statistical variable, the one or more conveyance service offerings, and the one or more selectable offering options.

138. The method of claim 75, wherein the dynamic map displays in substantially real time at least one dynamic graphic representing at least one of the at least one representative, an autonomous vehicle, the conveyance client, conveyance data, a point of interest, the business entity, the one or more selectable offering options, the one or more conveyance service offerings, the filtered subset of conveyance service offerings, the one or more preferred conveyance service offerings, and the at least one conveyance client preference.

139. The method of claim 138, wherein the at least one dynamic graphic relating to the business entity is displayed individually as at least one mobile or transitory icon or at least one mobile or transitory visual and updates or changes in substantially real time.

140. The method of claim 138, wherein the at least one dynamic graphic relating to the business entity is displayed as at least one distinguishable icon or at least one distinguishable visual and updates or changes in substantially real time.

141. The method of claim 138, wherein the at least one dynamic graphic relating to the business entity is displayed as at least one icon or at least one visual and updates or changes geographical location in substantially real time.

142. The method of claim 138, wherein the at least one dynamic graphic relating to the business entity is displayed as or with one or a combination of at least one different icon, at least one different symbol, at least one different color, at least one different shading, at least one different pattern, and at least one different visual.

143. The method of claim 138, wherein the at least one dynamic graphic relating to the business entity is displayed as or with one or a combination of at least one similar icon, at least one similar symbol, at least one similar color, at least one similar shading, at least one similar pattern, and at least one similar visual.

144. The method of claim 138, wherein the at least one central server is configured to further process and display one or more updated selectable offering options in substantially real time in response to entry of at least one updated conveyance client preference.

145. The method of claim 138, wherein the at least one dynamic graphic is associated with one or a combination of a service provider, a freight provider, a good supplier, and the business entity.

146. The method of claim 138, wherein the at least one dynamic graphic is individually arranged on the at least one dynamic map and dynamically updates or changes geographical location in substantially real time.

147. The method of claim 75, wherein the one or more conveyance service offerings comprises one or more pre-filtered conveyance service offerings.

148. The method of claim 93, wherein one or a combination of the one or more pre-filtered conveyance service offerings and the one or more conveyance service offerings is structured in at least one uniform format prior to being transmitted from the at least one external server to the at least one central server in communication with the network.

149. The method of claim 93, wherein the at least one central server performs one or more of standardizing and aggregating one or a combination of the one or more conveyance service offerings and the one or more pre-filtered conveyance service offerings.

150. The method of claim 93, wherein one or a combination of the one or more conveyance service offerings, conveyance data, and the one or more pre-filtered conveyance service offerings is sourced or provided by the business entity operating in at least one conveyance industry segment, via the at least one external server.

151. The method of claim 93, wherein one or a combination of the one or more pre-filtered conveyance service offerings and the one or more conveyance service offerings is structured in at least one different format, wherein the at least one central server is further configured to standardize or convert the one or more pre-filtered conveyance service offerings into at least one uniform format.

152. The method of claim 75, wherein the at least one interactive visual representation further comprises at least one graphic representing one or more of a coordinate, a point of reference, a point of interest, a geographical location of interest, a perspective, the one or more conveyance service requests, the filtered subset of conveyance service offerings, the one or more preferred conveyance service offerings, the one or more selectable offering options, subsequent or additional one or more preferred conveyance service offerings, subsequent or additional filtered subset of conveyance service offerings, and a geographical location of one or more of the at least one representative, the conveyance client, an autonomous vehicle, the at least one vehicle, an entity, a service provider, a good supplier, a freight provider, a brick and mortar, the business entity, one or more persons or objects, freight, a static location, a beginning service location, an ending service location, a waypoint, a past location, a future location, and an estimated location.

153. The method of claim 152, wherein the at least one graphic is associated with one or a combination of a service provider, a freight provider, a good supplier, and the business entity.

154. The method of claim 152, wherein the at least one graphic is individually arranged on the at least one dynamic map and dynamically updates or changes geographical location.

* * * * *